(12) United States Patent
Parati

(10) Patent No.: US 12,046,962 B2
(45) Date of Patent: Jul. 23, 2024

(54) METHOD AND PROCESSING LINE FOR MANUFACTURING A STATOR FOR ELECTRIC MOTORS

(71) Applicant: MARSILLI S.p.A., Castelleone (IT)

(72) Inventor: Gian Battista Parati, Castelleone (IT)

(73) Assignee: MARSILLI S.p.A., Castelleone (IT)

( * ) Notice: Subject to any disclaimer, the term of this patent is extended or adjusted under 35 U.S.C. 154(b) by 0 days.

(21) Appl. No.: 18/027,693

(22) PCT Filed: Sep. 1, 2021

(86) PCT No.: PCT/IB2021/057982
§ 371 (c)(1),
(2) Date: Mar. 22, 2023

(87) PCT Pub. No.: WO2022/084760
PCT Pub. Date: Apr. 28, 2022

(65) Prior Publication Data
US 2023/0261556 A1     Aug. 17, 2023

(30) Foreign Application Priority Data

| Oct. 20, 2020 | (IT) | 102020000024691 |
| May 6, 2021 | (IT) | 102021000011540 |
| May 6, 2021 | (IT) | 102021000011564 |

(51) Int. Cl.
*H02K 15/02*     (2006.01)
*H02K 1/14*     (2006.01)
(Continued)

(52) U.S. Cl.
CPC ........... *H02K 15/024* (2013.01); *H02K 1/148* (2013.01); *H02K 3/487* (2013.01); *H02K 15/045* (2013.01); *H02K 15/085* (2013.01); *H02K 15/12* (2013.01)

(58) Field of Classification Search
CPC .. H05K 15/024; H05K 15/045; H05K 15/085; H05K 15/066; H02K 1/148; H02K 1/16; H02K 1/165
See application file for complete search history.

(56) References Cited

U.S. PATENT DOCUMENTS 3,348,183 A * 10/1967 Hodges ................ H02K 15/045
                                                          29/605
5,787,567 A     8/1998 Miyazaki
(Continued)

FOREIGN PATENT DOCUMENTS

| CN | 109120121 A | 1/2019 |
| CN | 110971092 A | 4/2020 |

(Continued)

OTHER PUBLICATIONS

Foreign communication from related application—International Search Report and Written Opinion of the International Searching Authority, dated Sep. 1, 2021 for application No. PCT/IB2021/057982 filed Sep. 1, 2021, 14 pages.

*Primary Examiner* — Livius R. Cazan
(74) *Attorney, Agent, or Firm* — Ryan D. Jenlink; Conley Rose, P.C.

(57) ABSTRACT

A method, a processing line and components of the processing line for making a stator for electric motors, and the resultant stator. The conducting wire is wound in coils having at least one straight portion which is inserted into a corresponding stator sector. The sector is thus deformed to move its teeth close to each other and to close the straight portion of the coil. Multiple stator sectors so made are assembled together to form a stator complete with windings. During the production of stator sectors, the coils and/or stator sectors are rototranslated to bring them to the final position they must take inside the finished stator. Measures are provided to maximize the filling factor, to minimize (Continued)

torque ripple phenomena, to minimize noise and the vibrations of the electric motor achieved with the stator, and to maximize its performance, under other equal conditions.

29 Claims, 102 Drawing Sheets

(51) Int. Cl.
  *H02K 3/487* (2006.01)
  *H02K 15/04* (2006.01)
  *H02K 15/085* (2006.01)
  *H02K 15/12* (2006.01)

(56) References Cited

U.S. PATENT DOCUMENTS

| | | | |
|---|---|---|---|
| 2005/0258704 A1 | 11/2005 | Oohashi et al. | |
| 2007/0096587 A1 | 5/2007 | Ionel et al. | |
| 2010/0295405 A1* | 11/2010 | Shikata | H02K 3/28 310/195 |

FOREIGN PATENT DOCUMENTS

| | | |
|---|---|---|
| EP | 217782218 B1 | 11/2022 |
| IT | 102020000024691 | 10/2020 |
| IT | 102021000011540 | 5/2021 |
| IT | 102021000011564 | 5/2021 |
| JP | S4890141 | 10/1973 |
| JP | S58201564 A | 11/1983 |
| JP | S6039347 A | 3/1985 |
| JP | 2006340576 A | 12/2006 |
| JP | 2014121195 A | 6/2014 |
| WO | 2022084760 A1 | 4/2022 |

\* cited by examiner

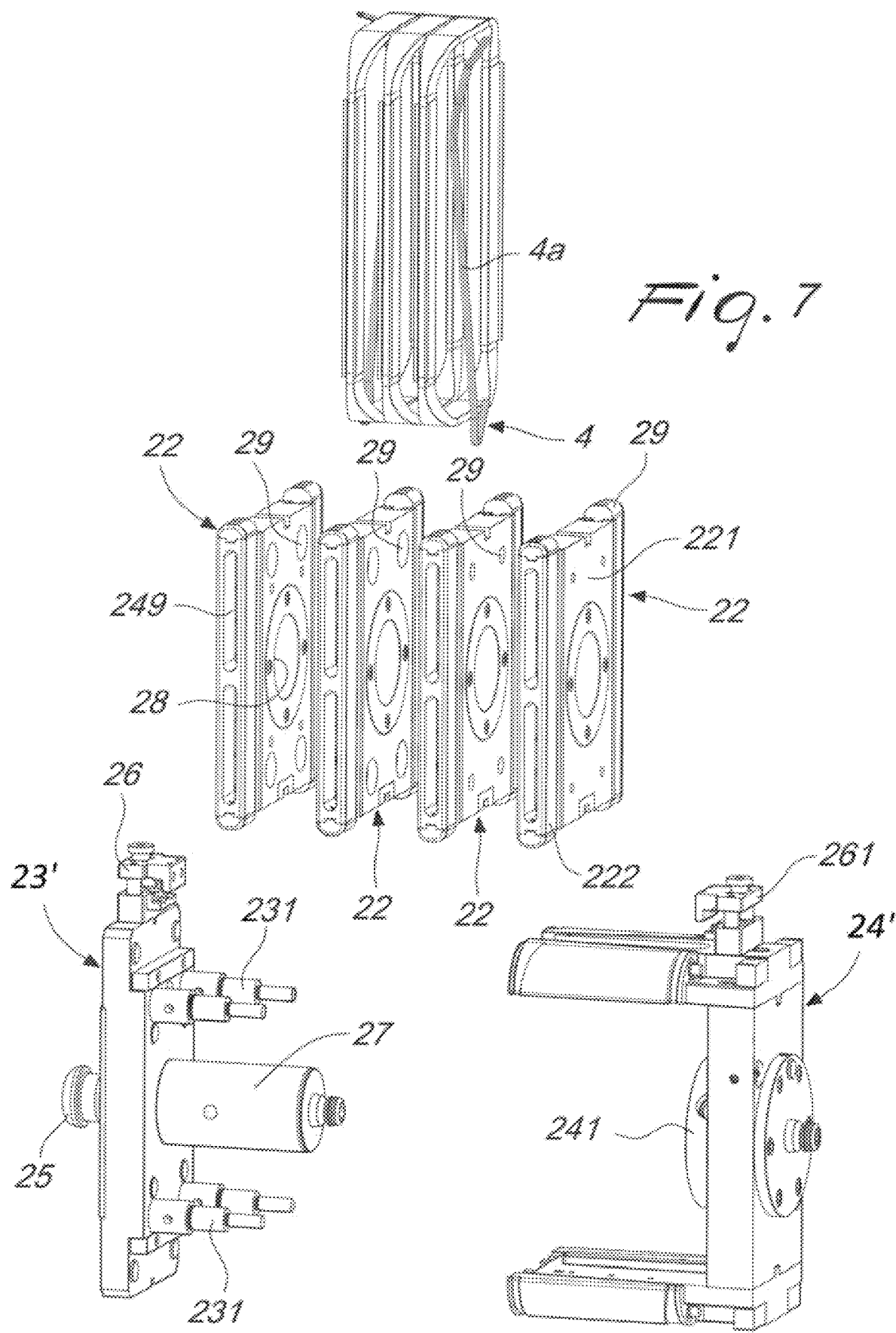

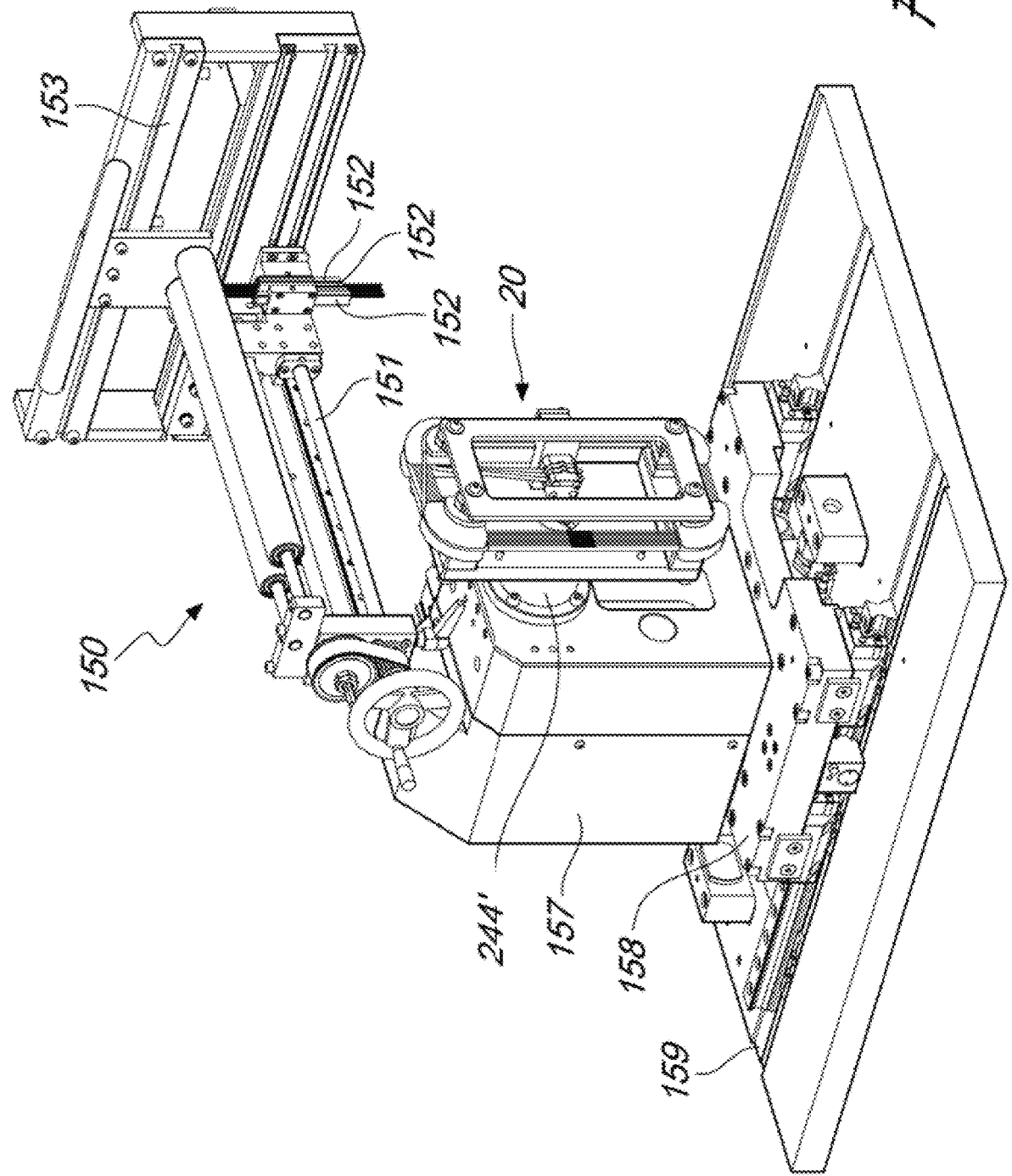

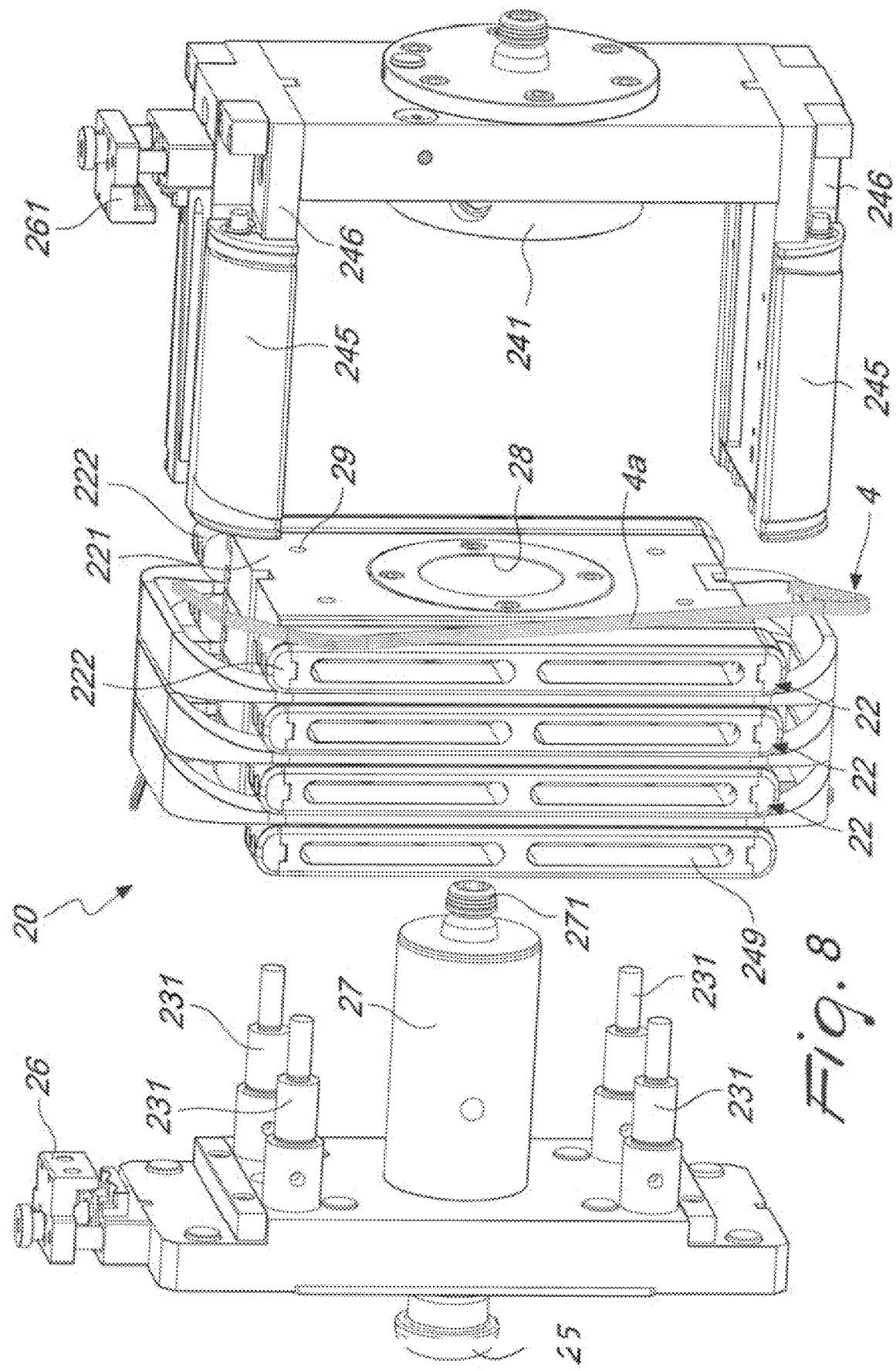

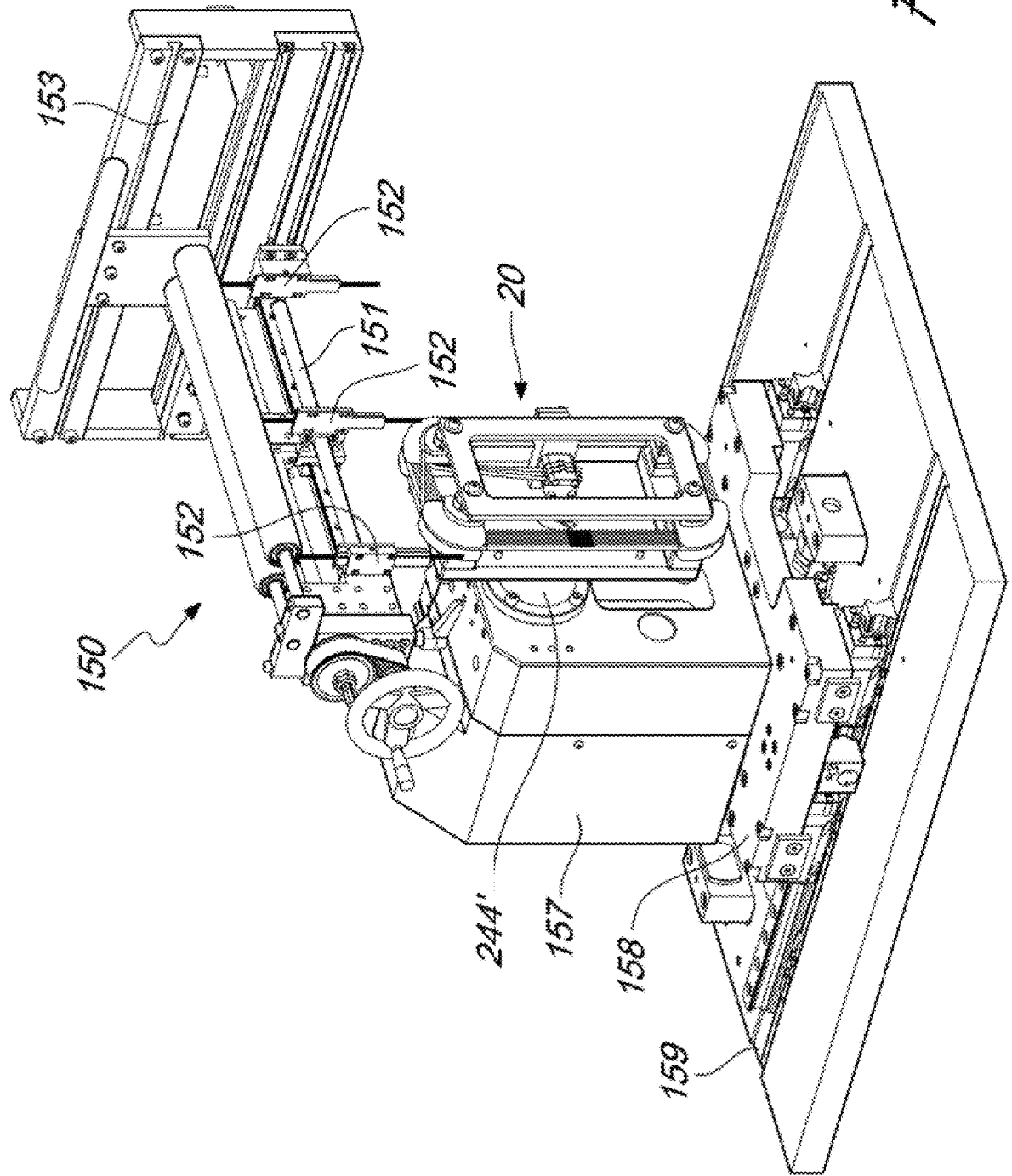

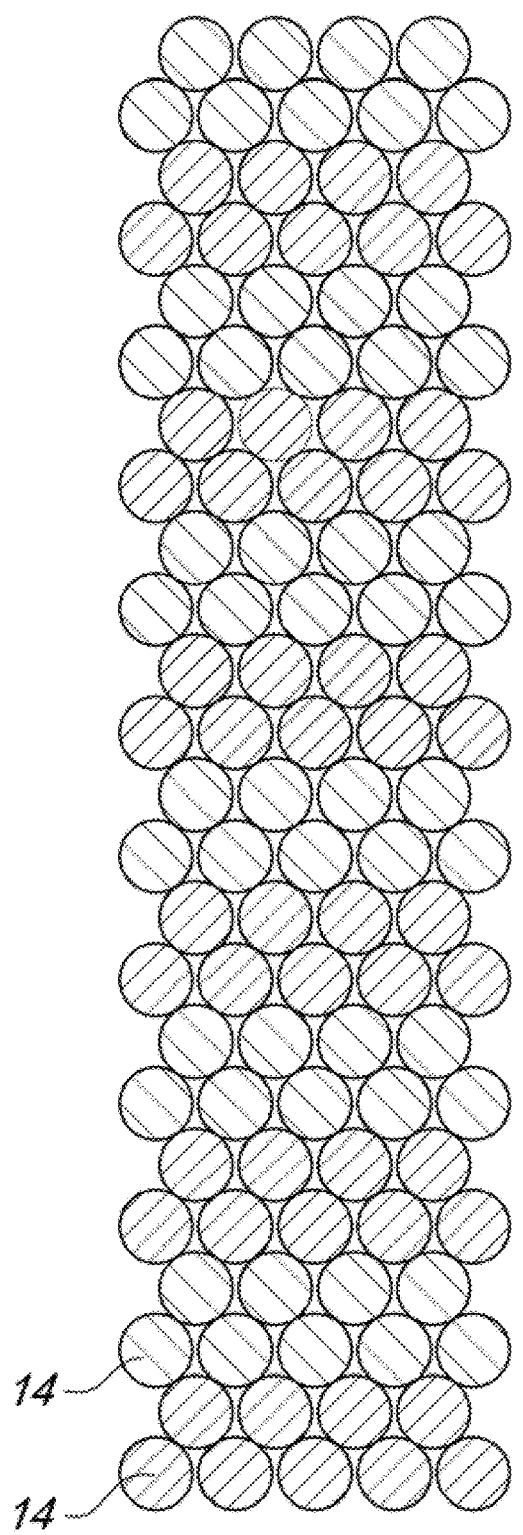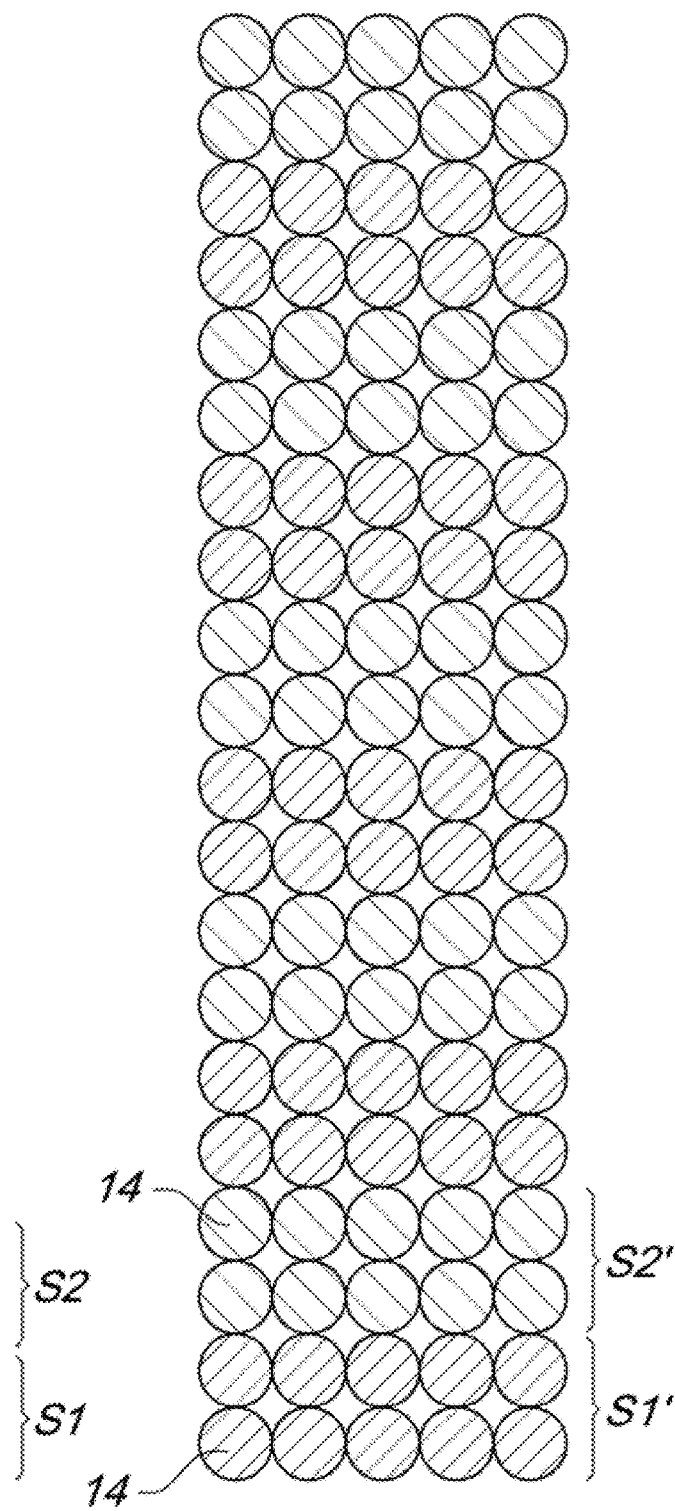

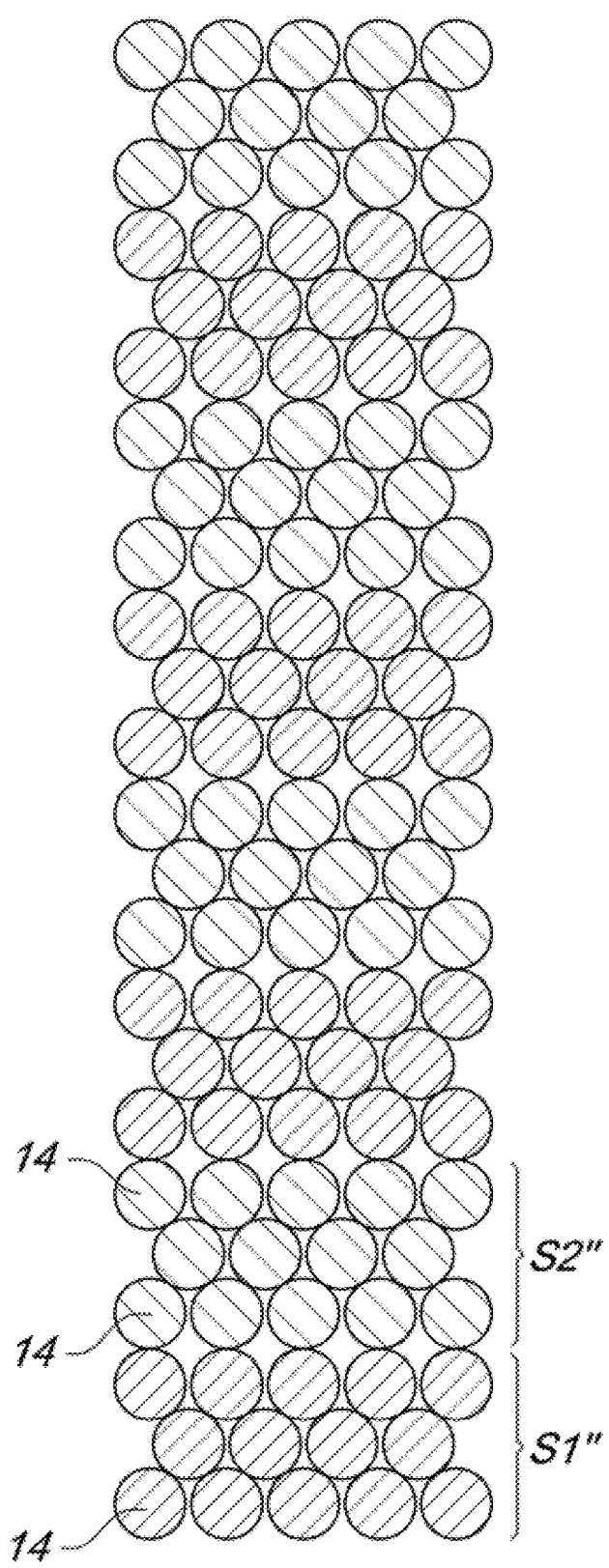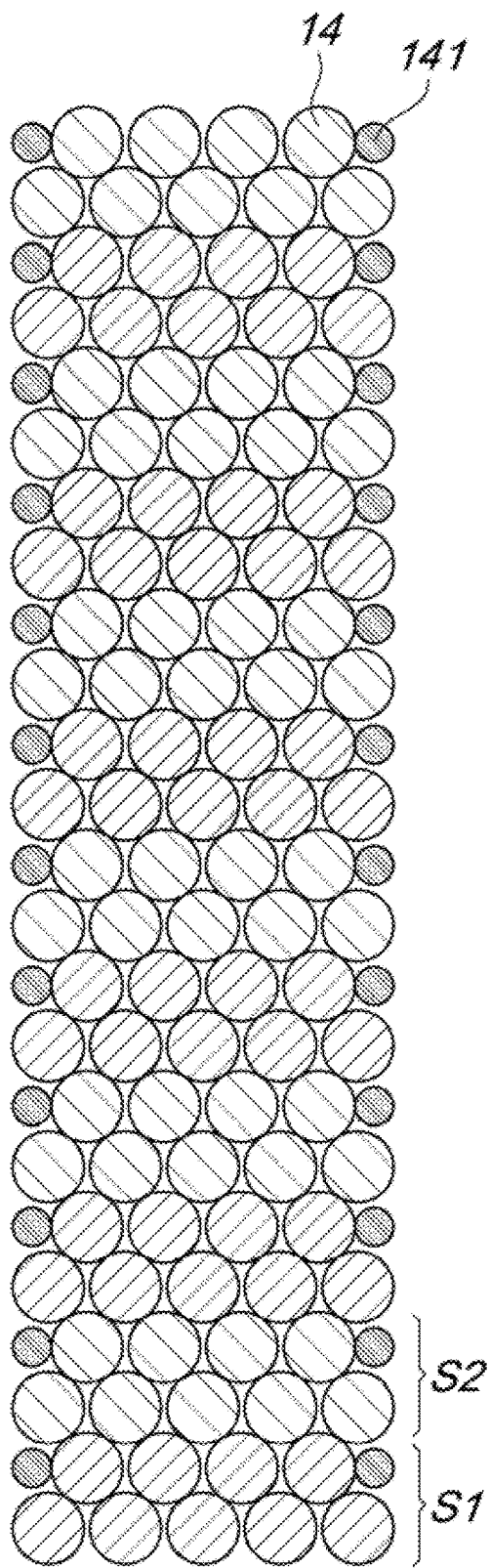

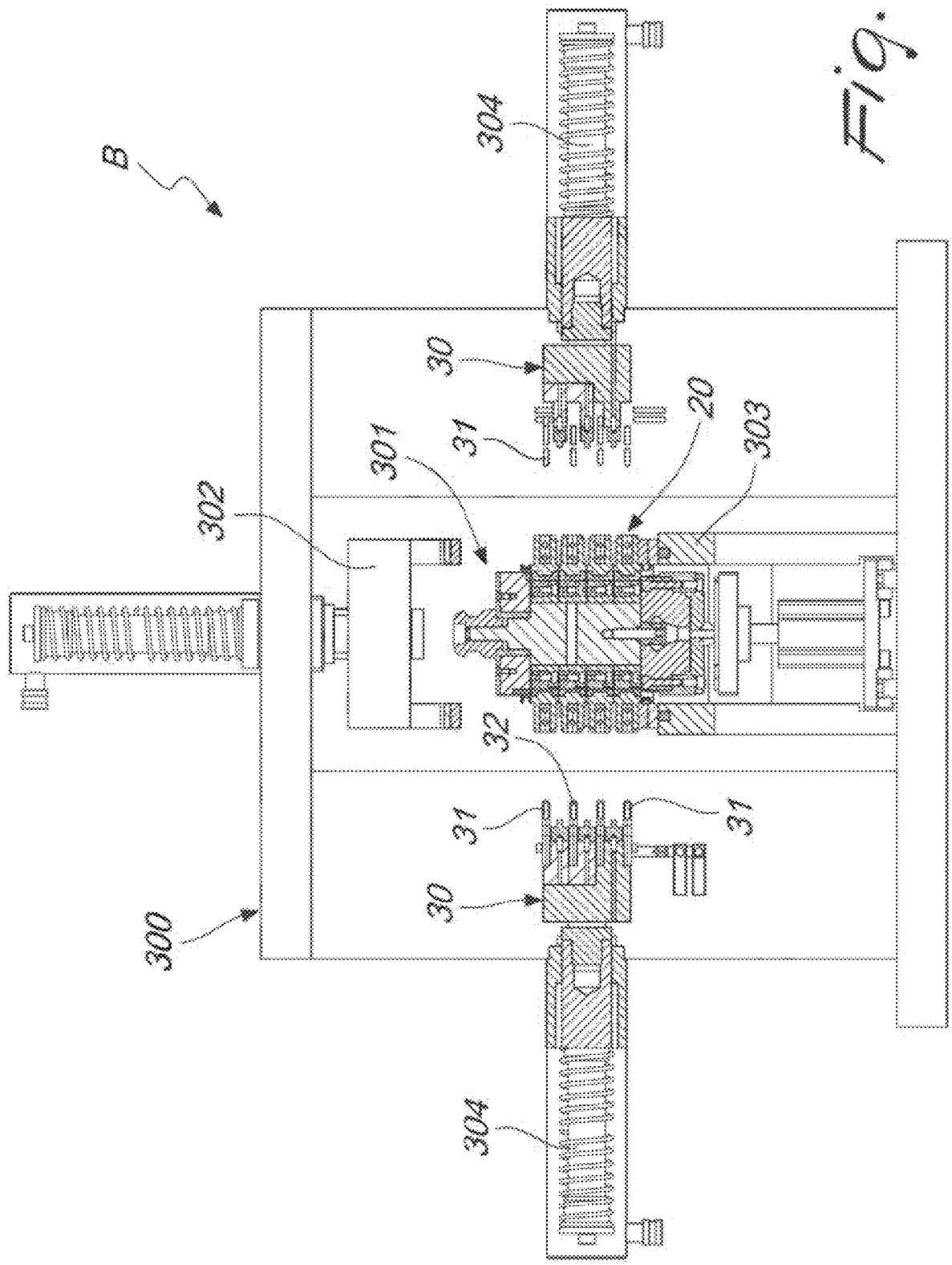

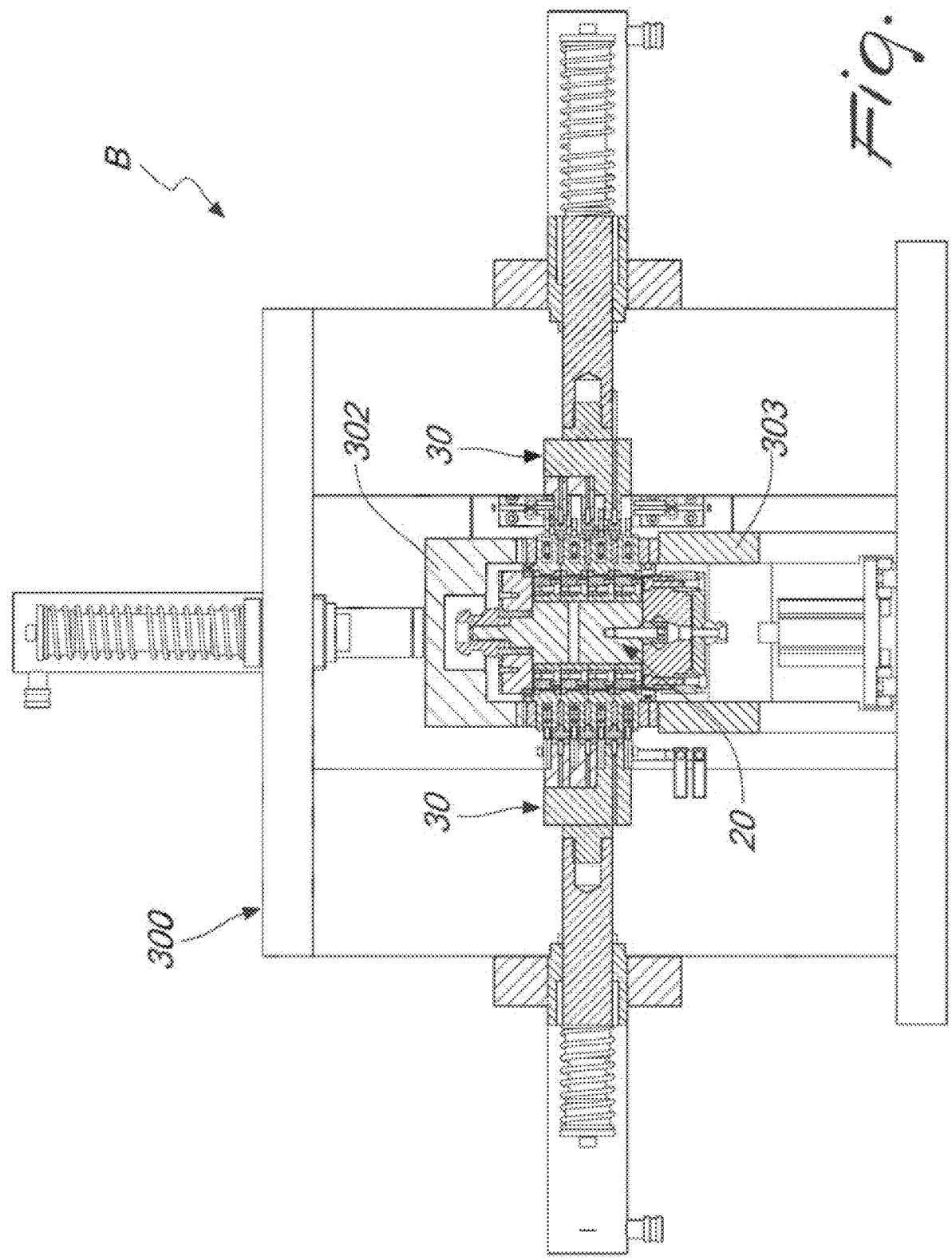

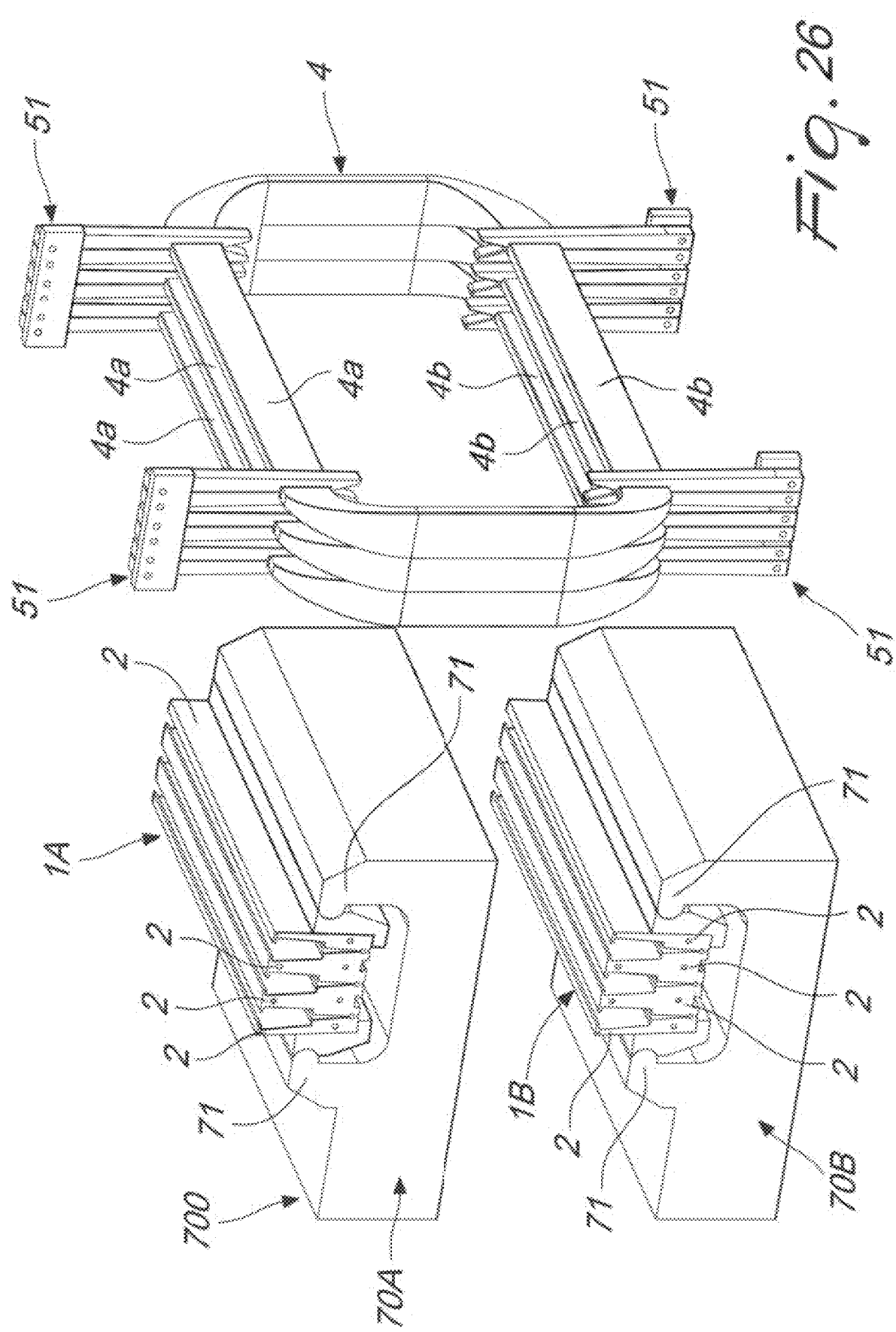

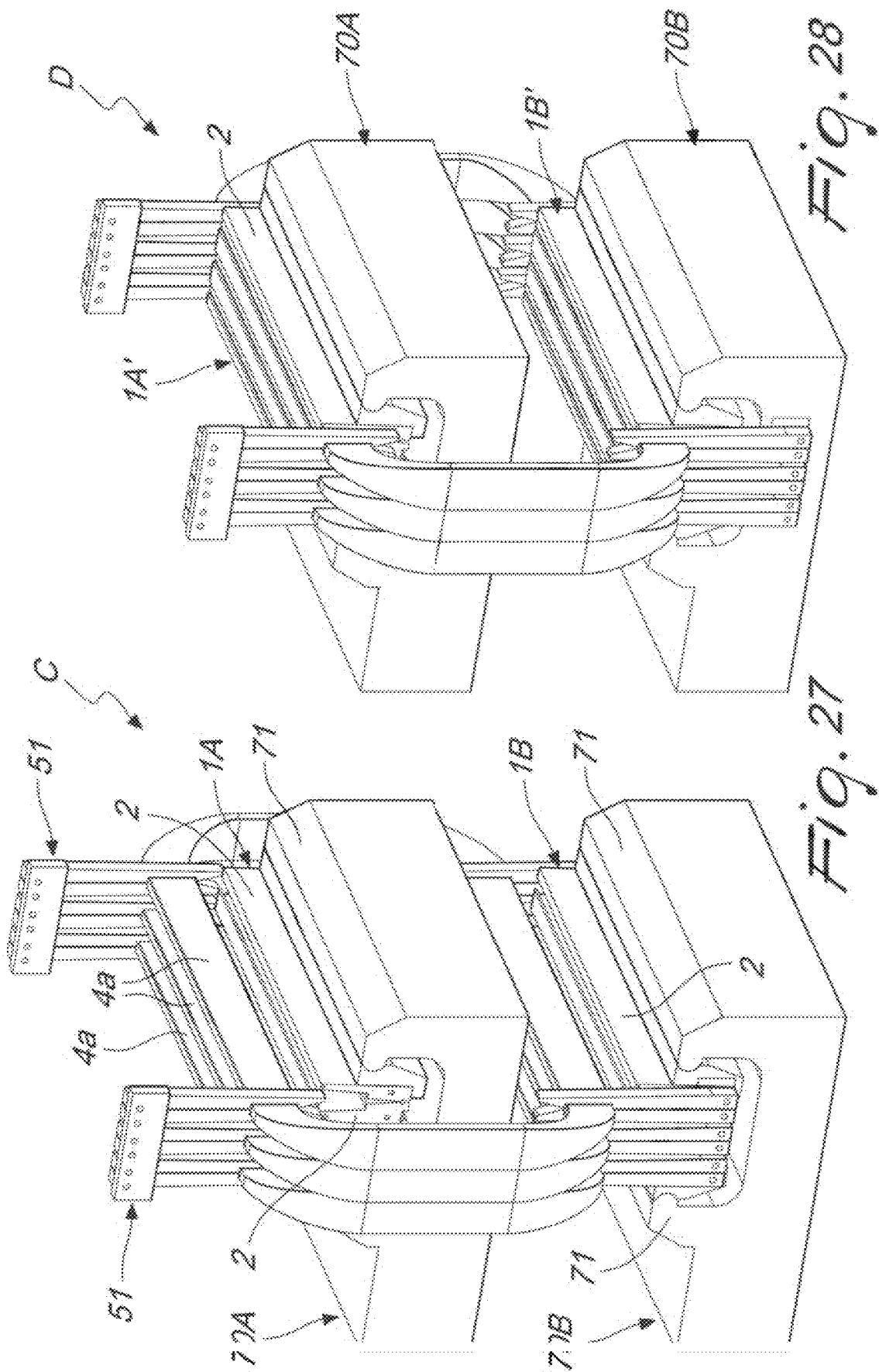

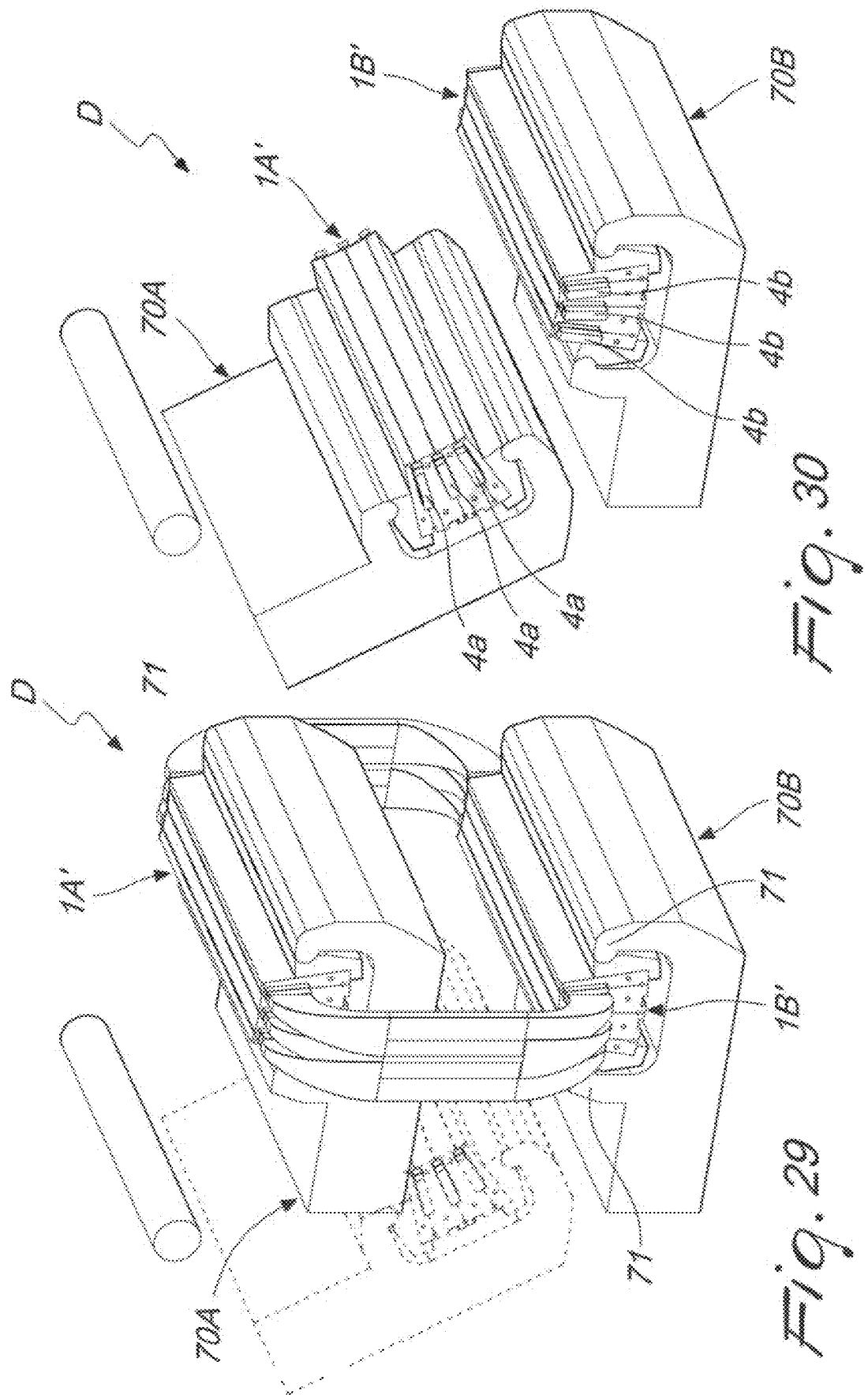

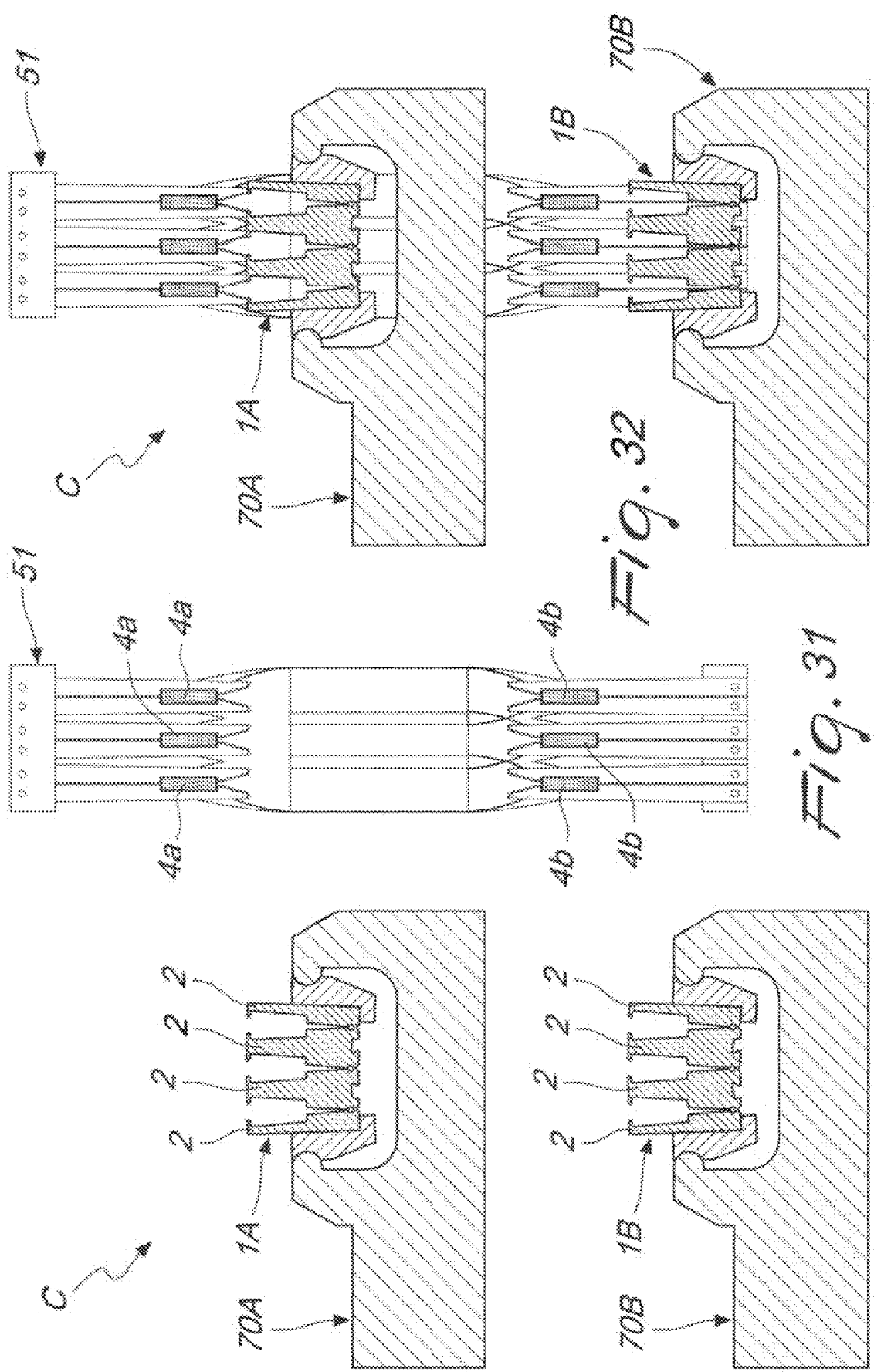

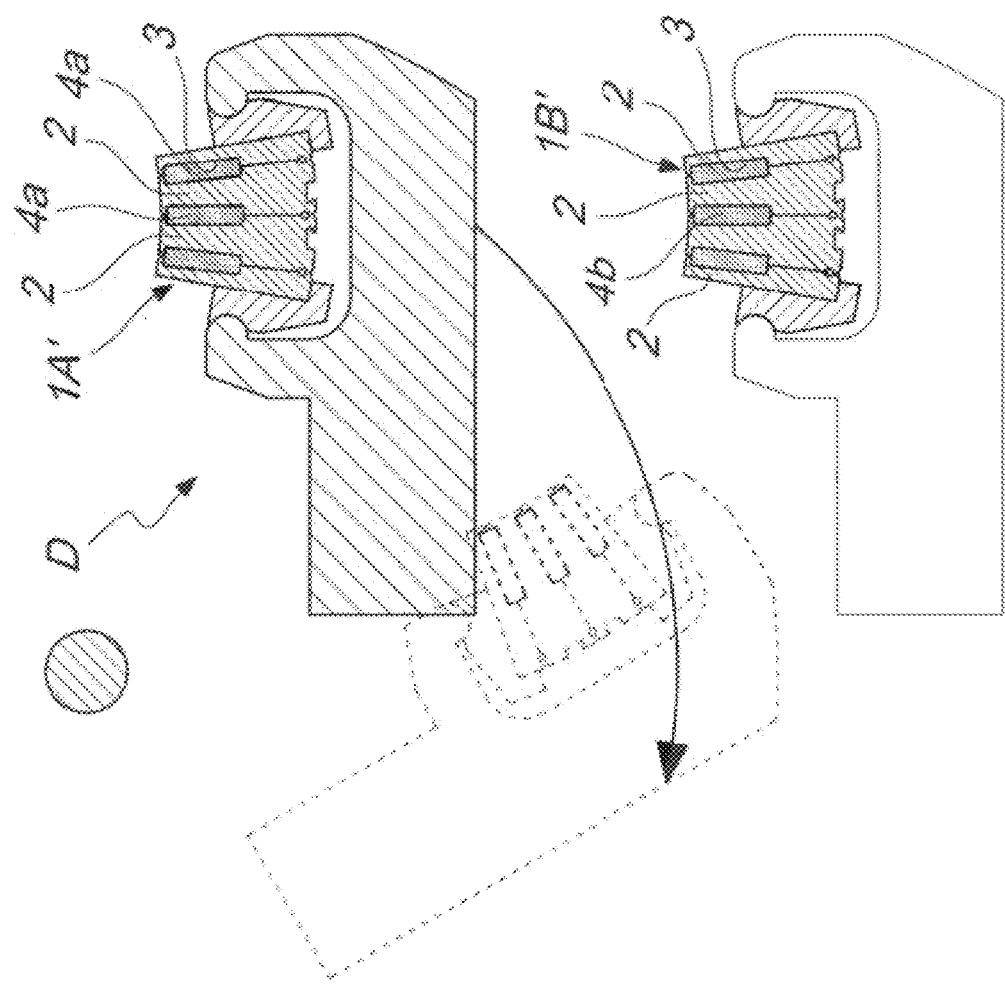
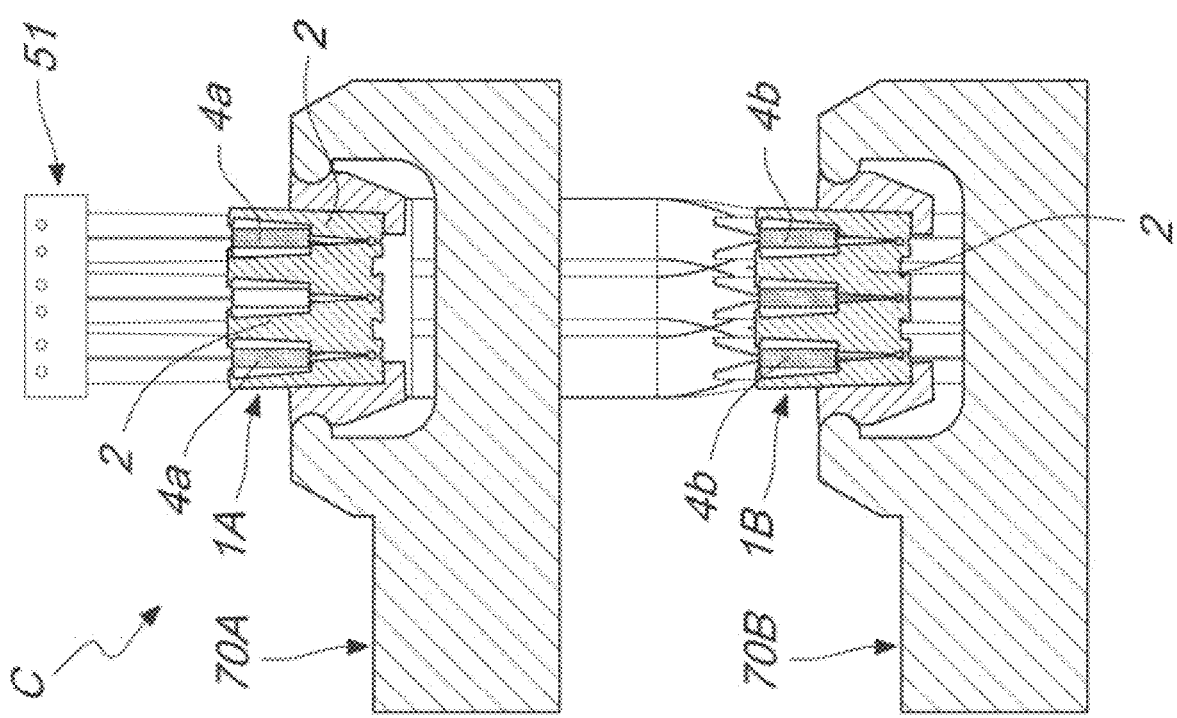

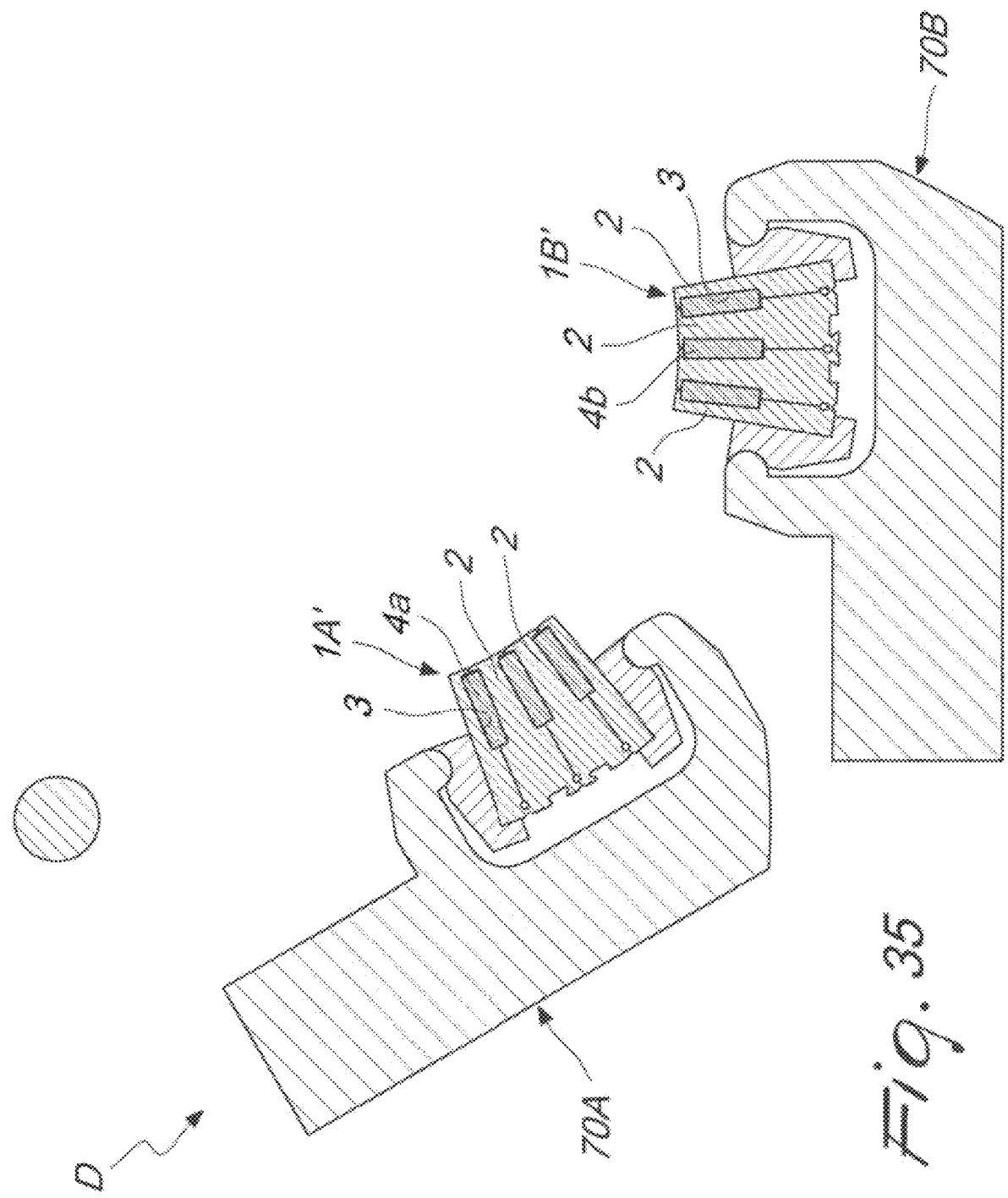

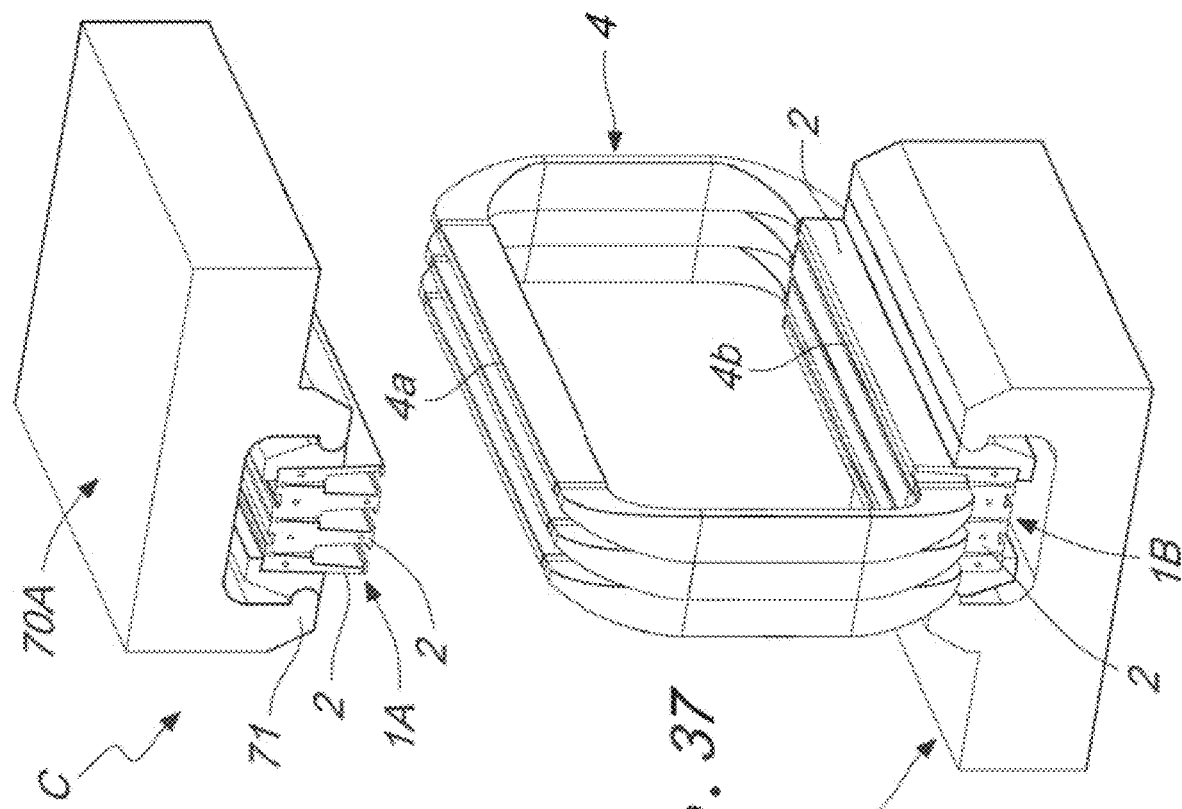
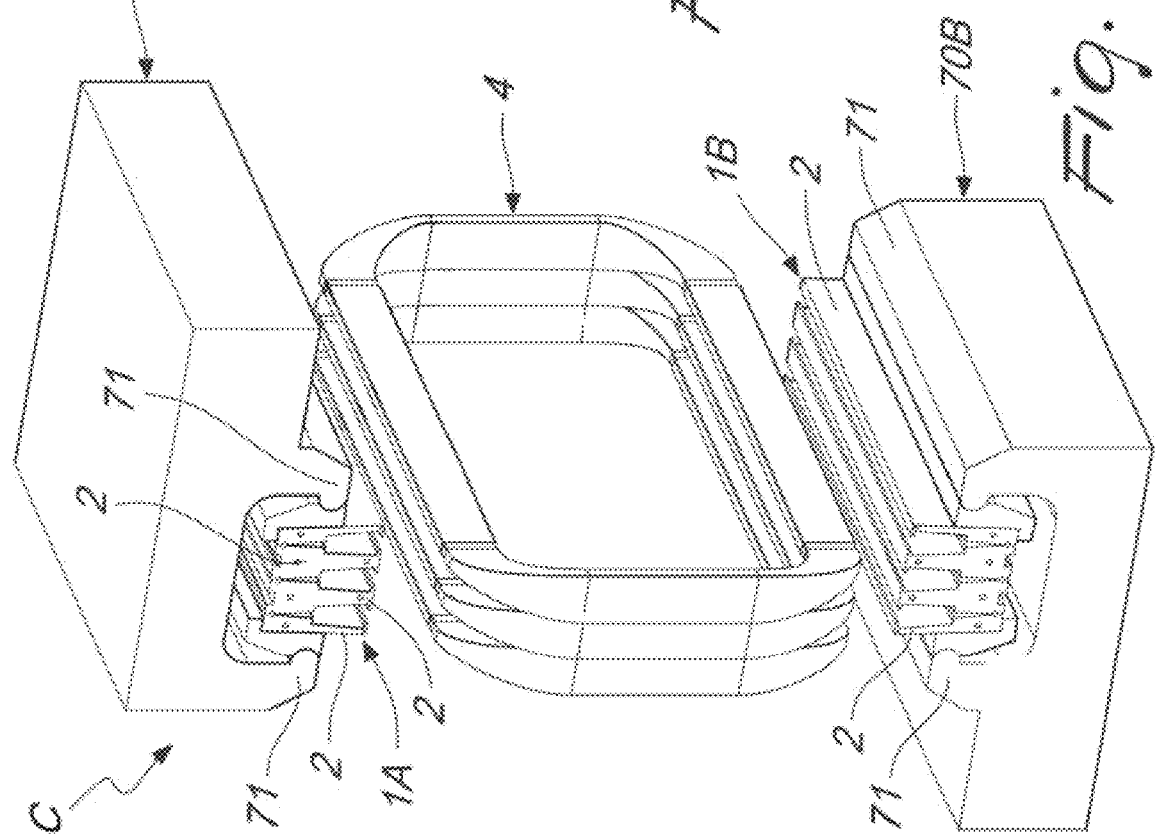

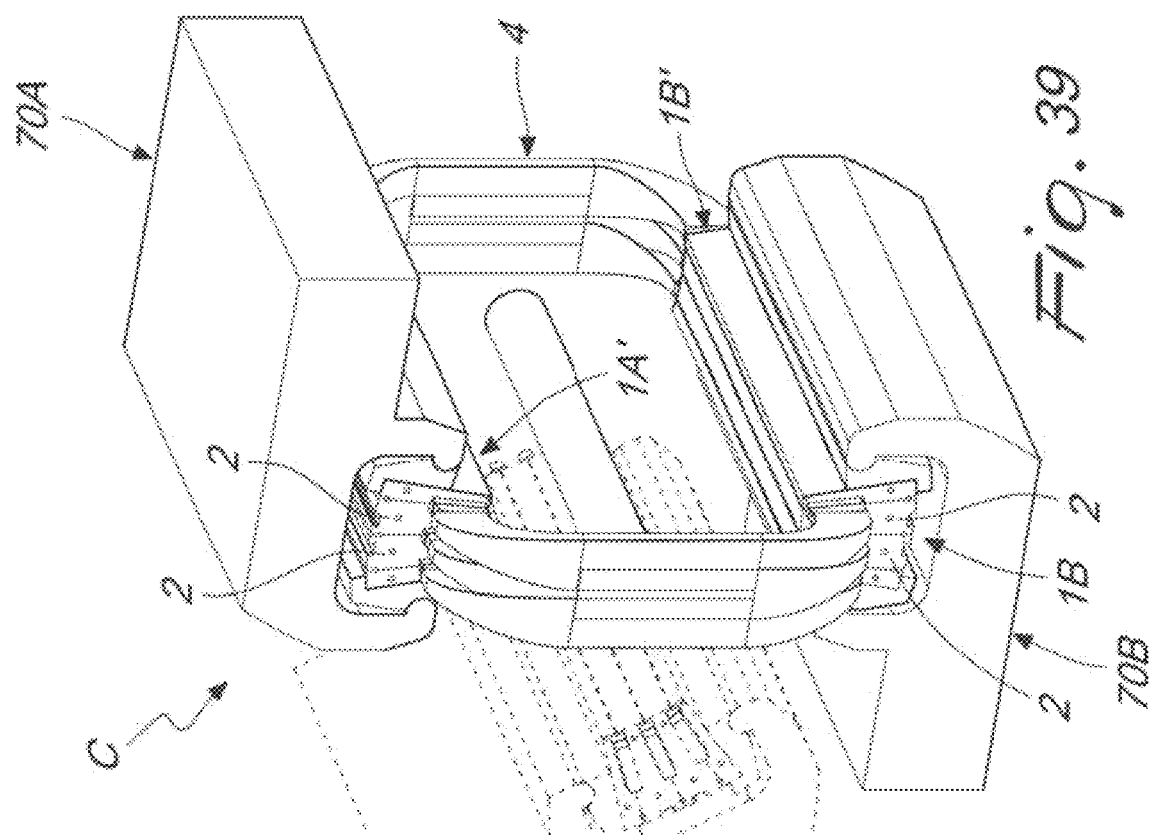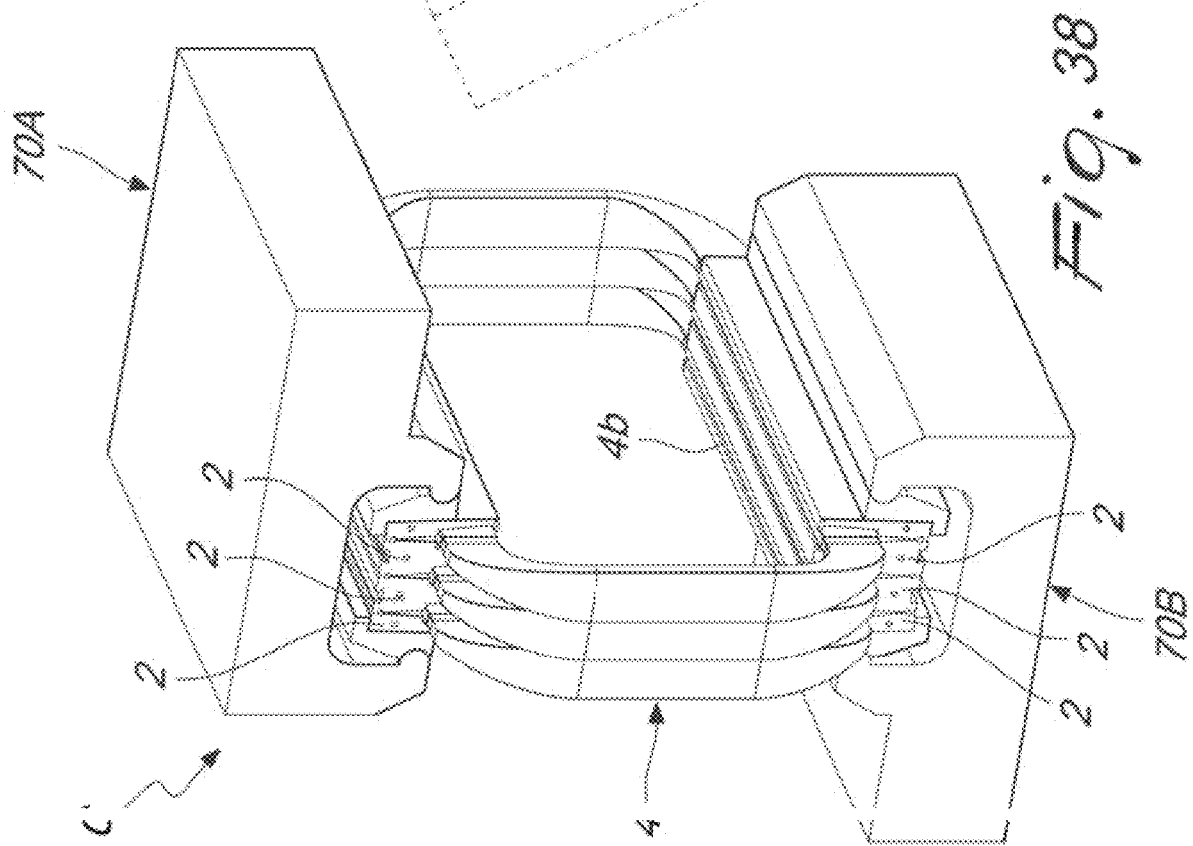

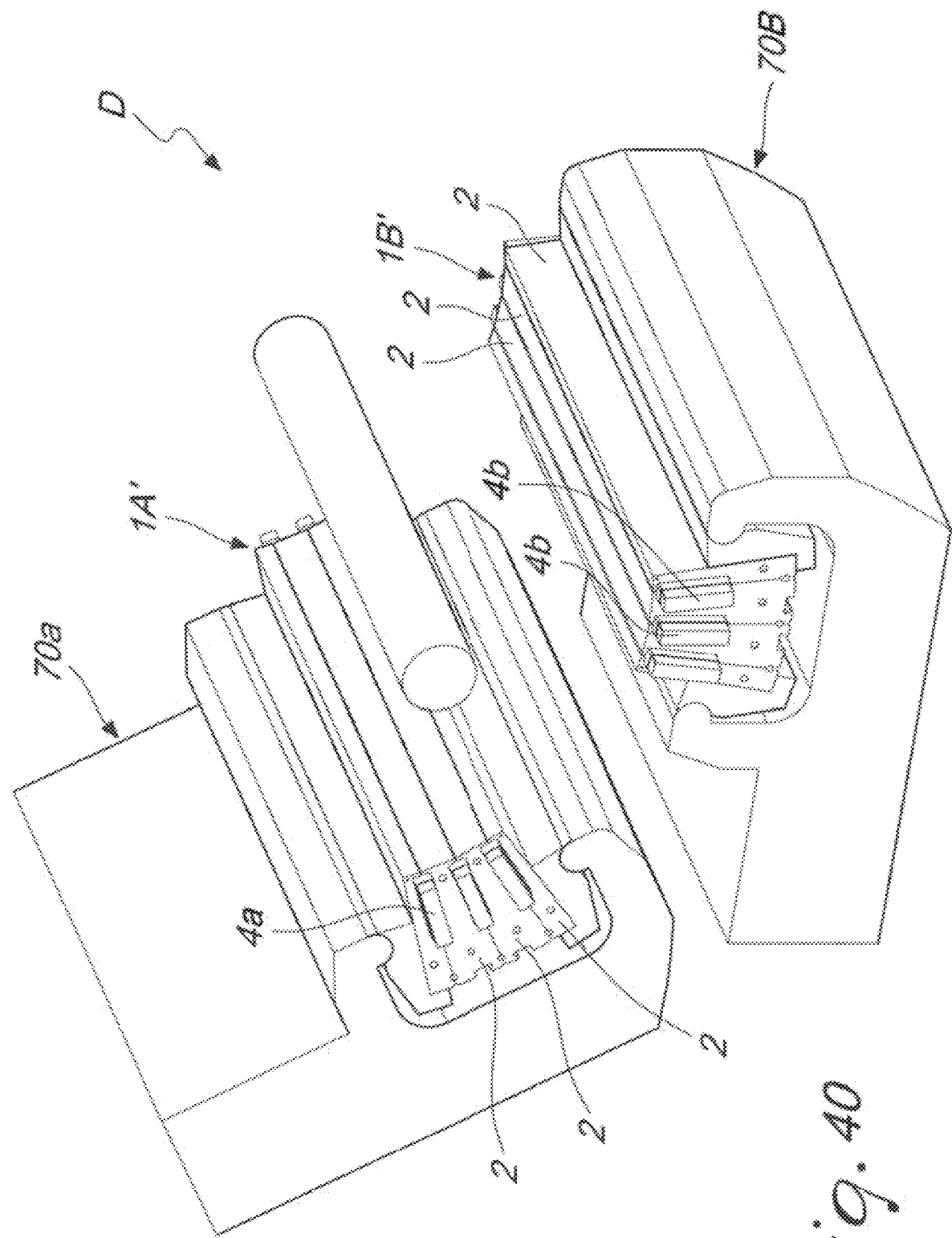

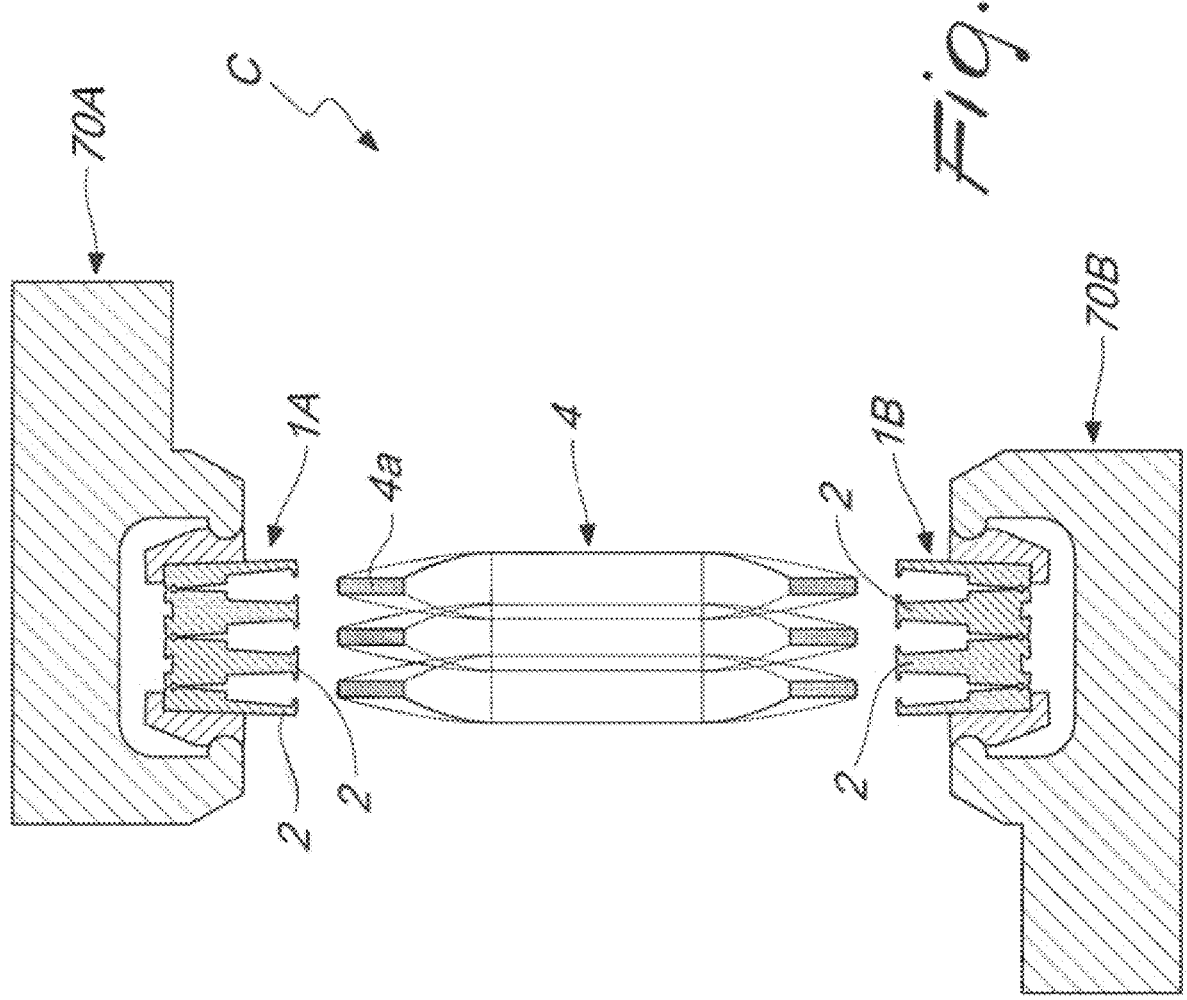

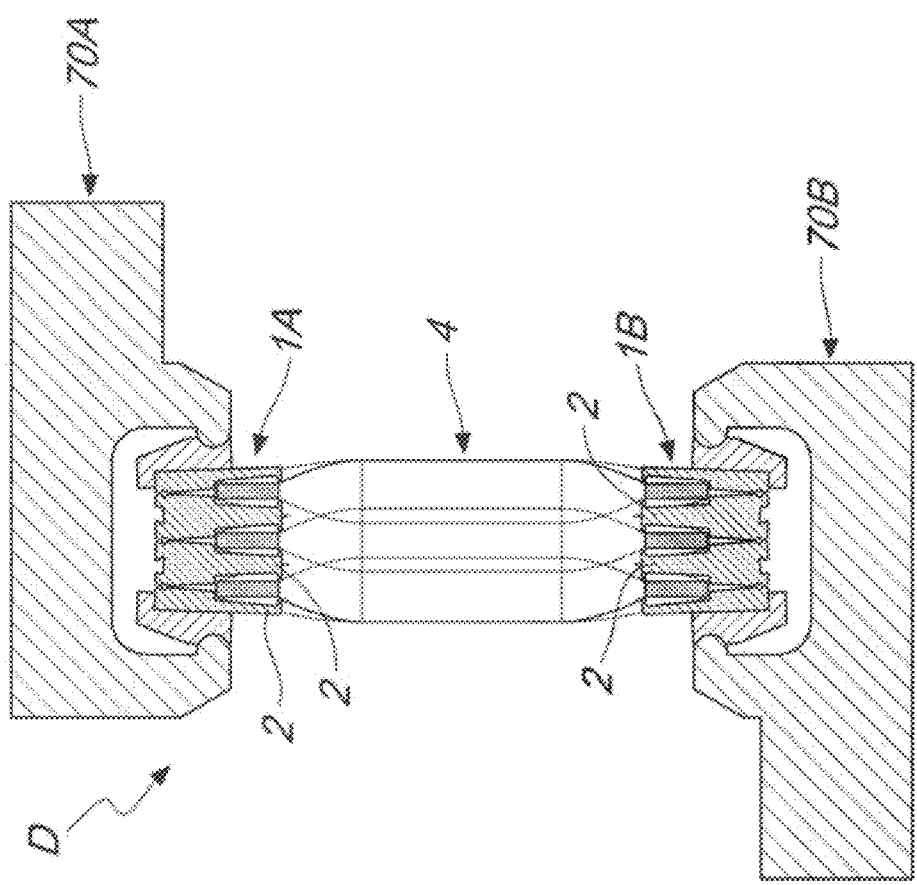
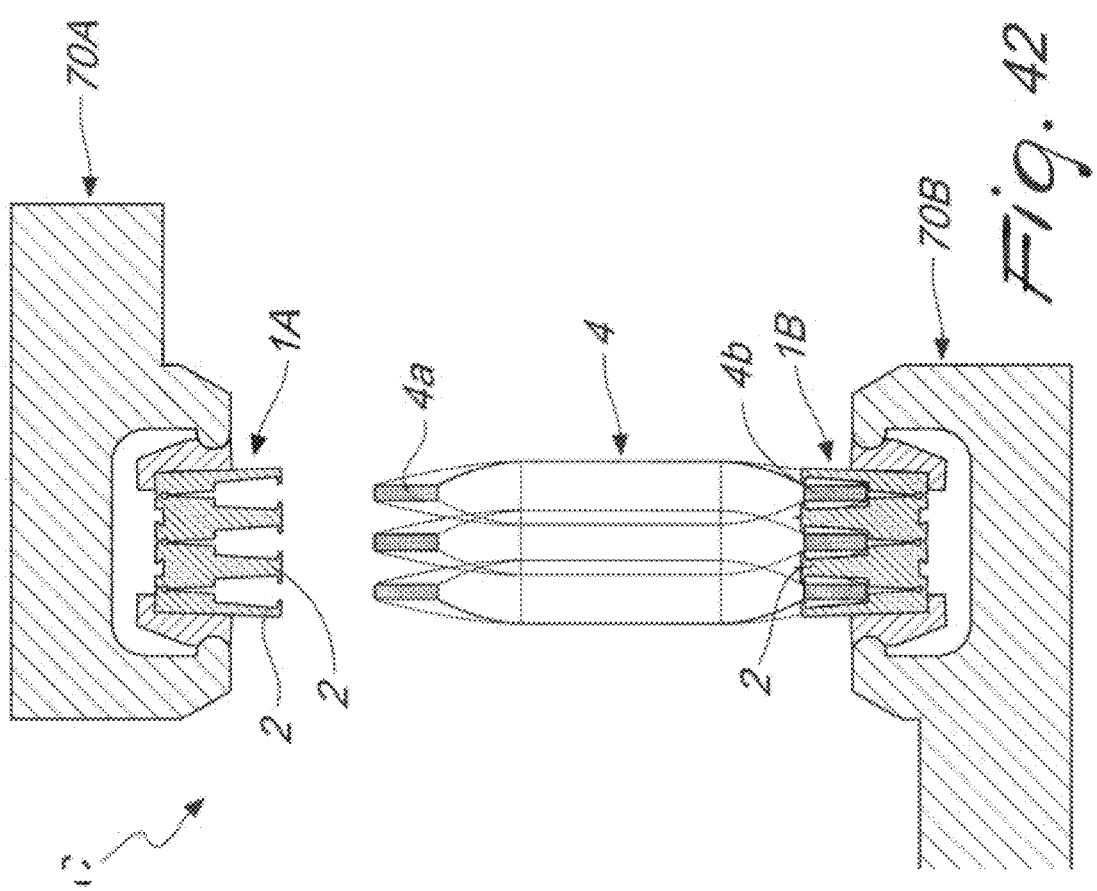

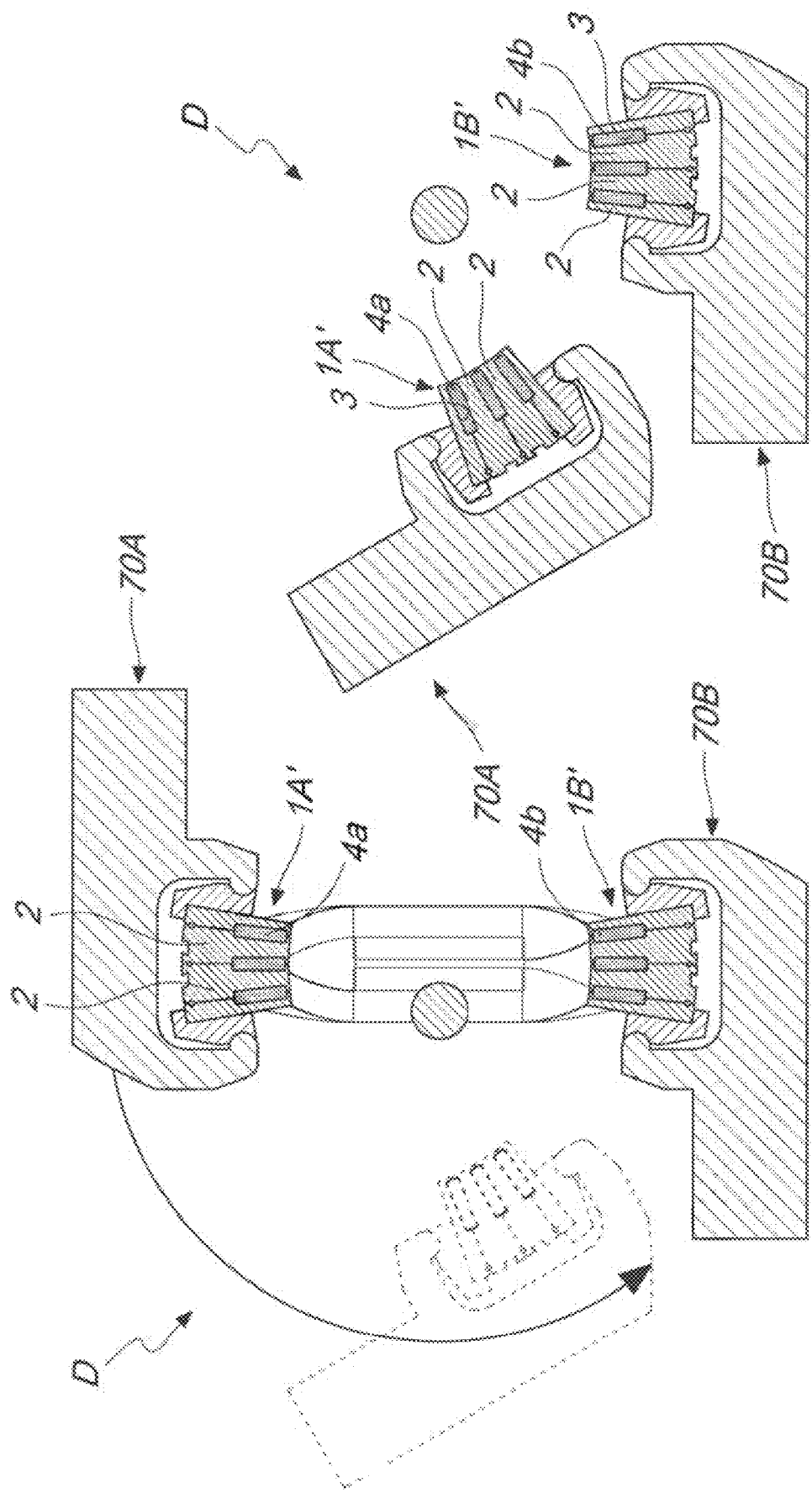

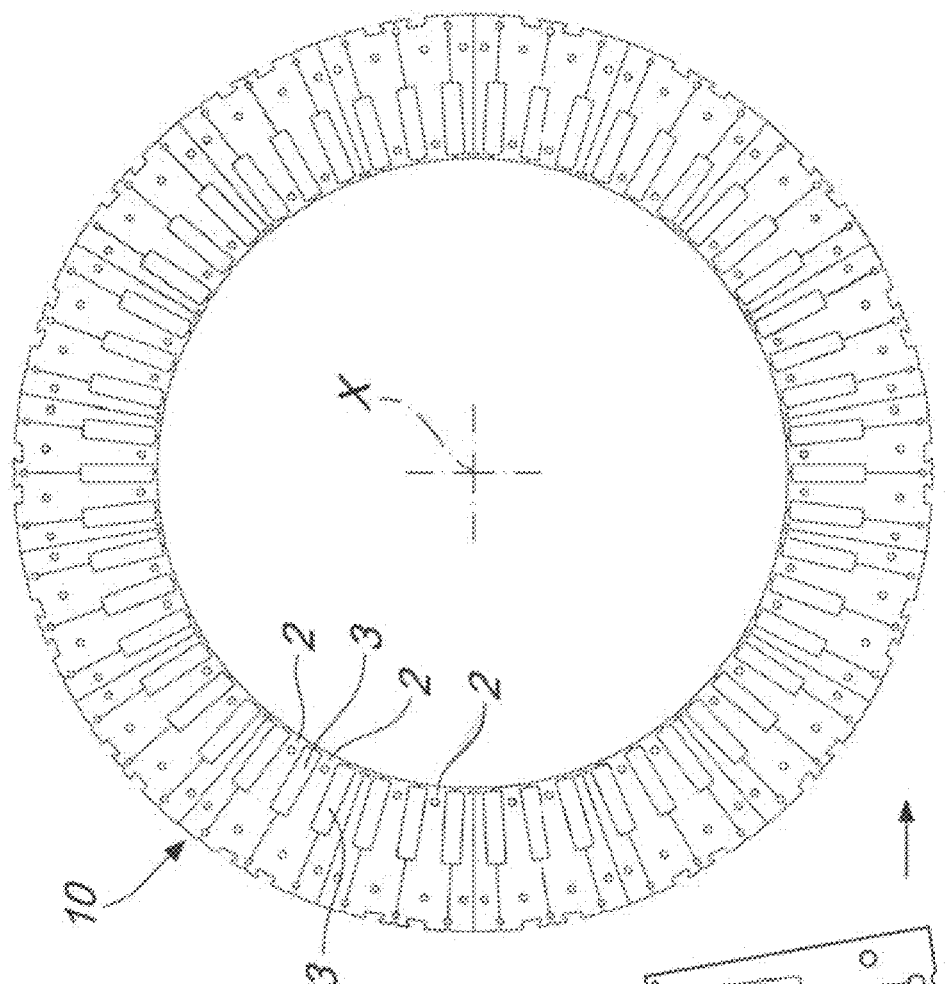
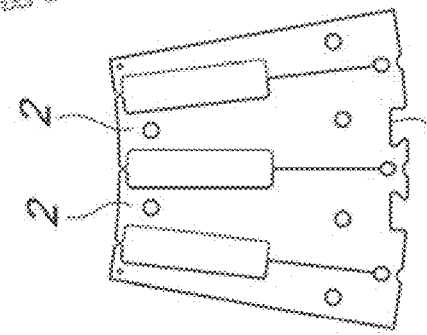
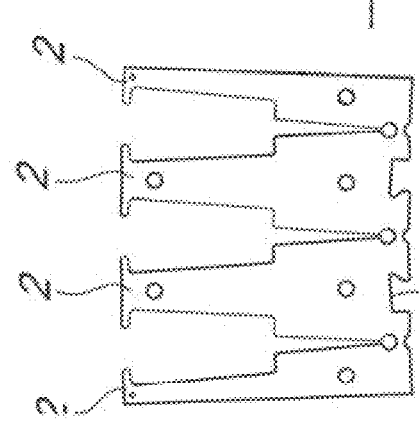
Fig. 54
Fig. 53

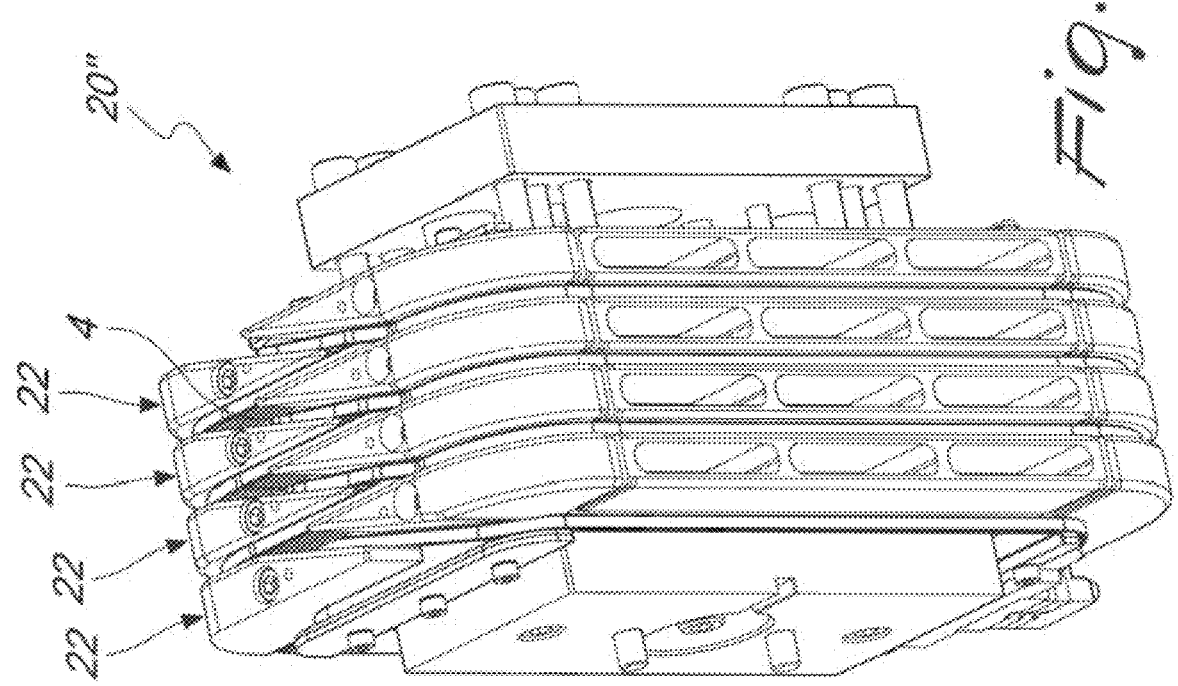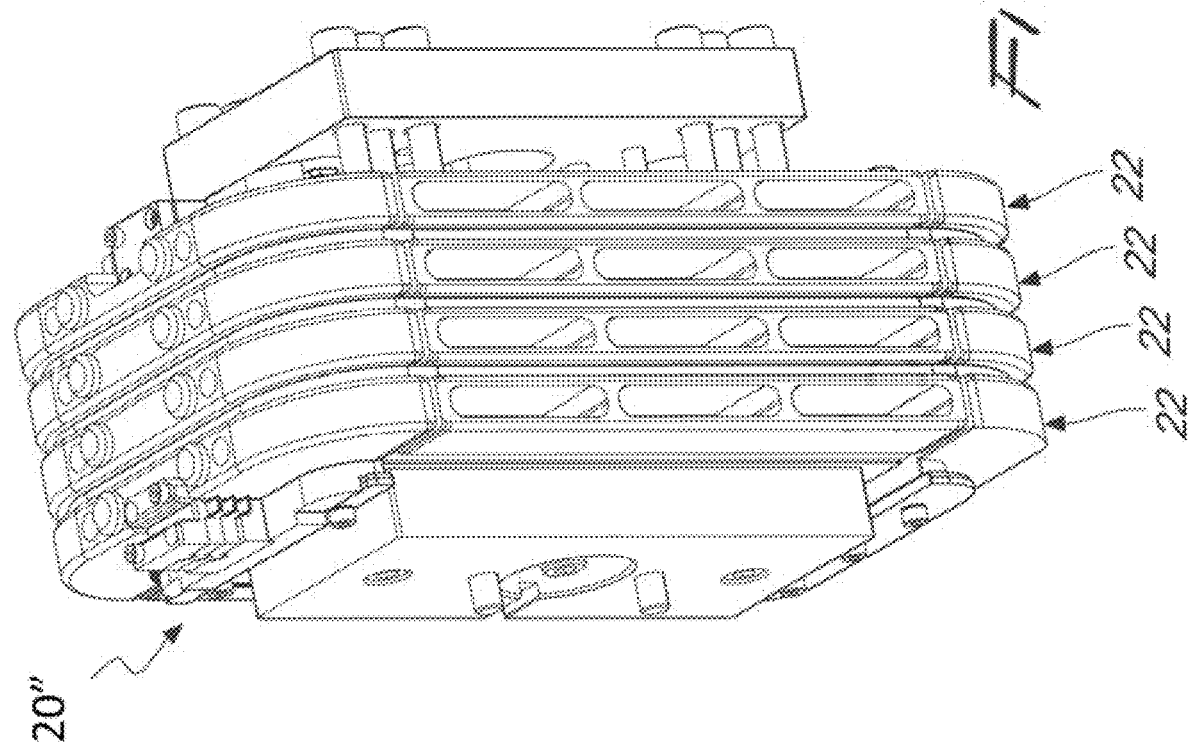

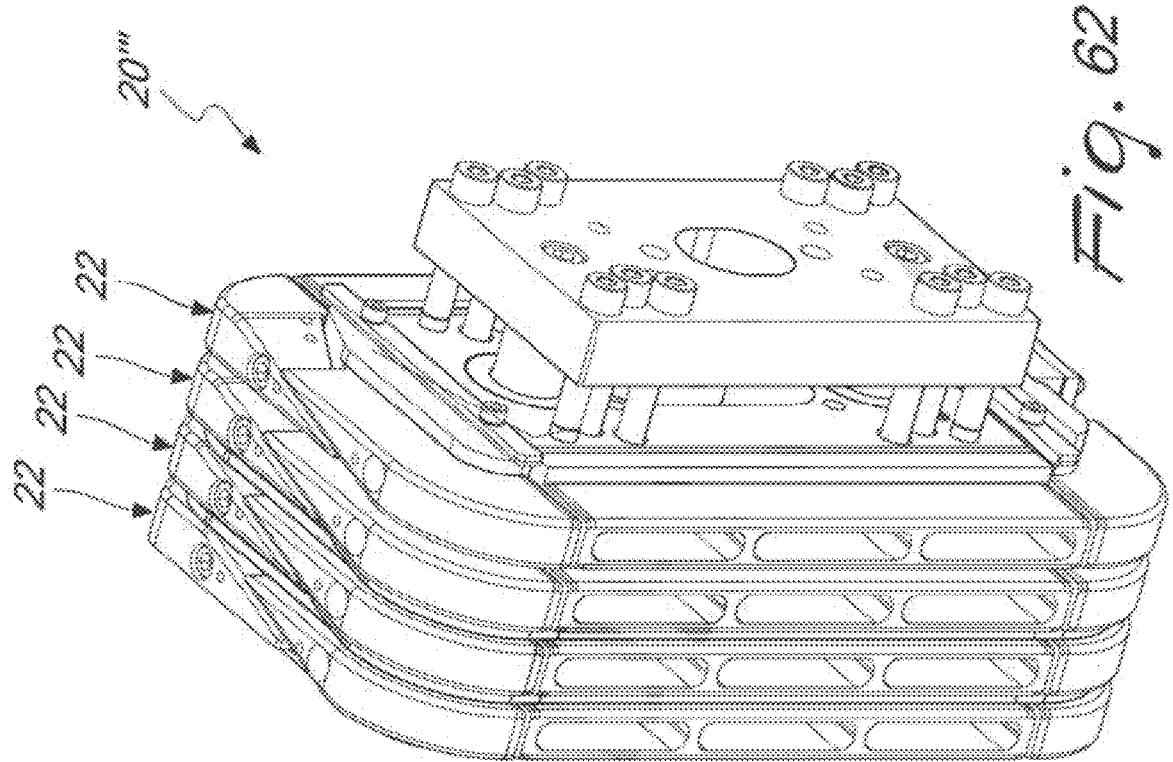
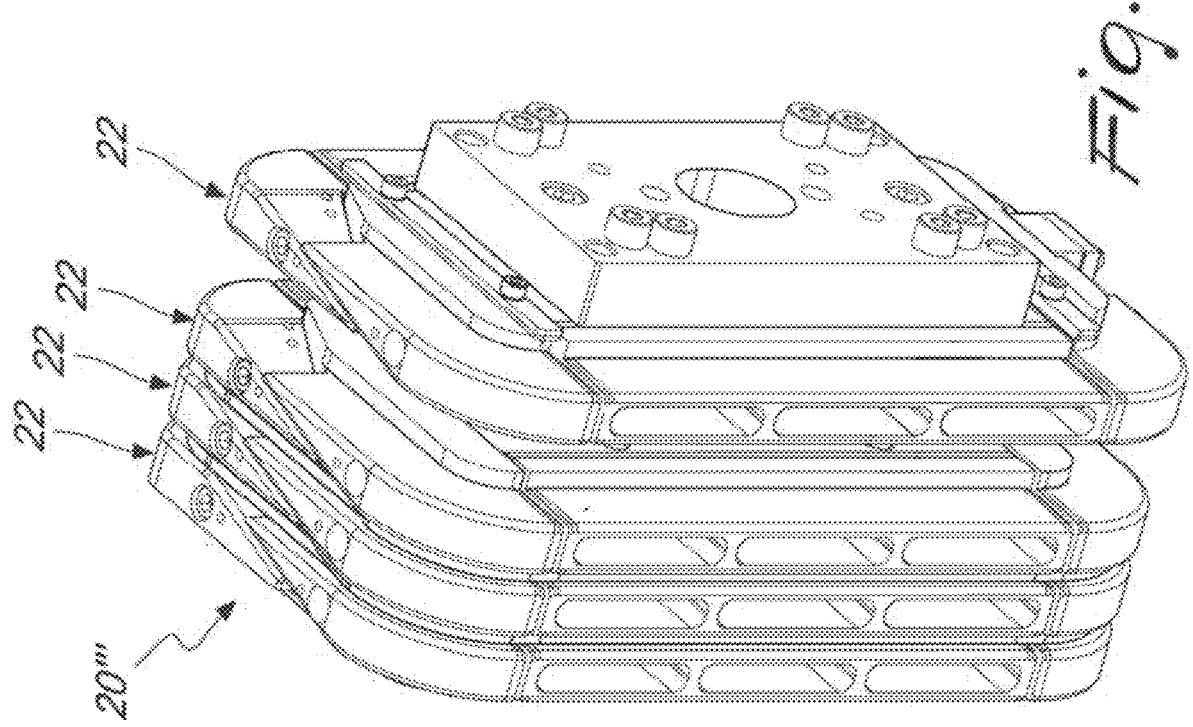

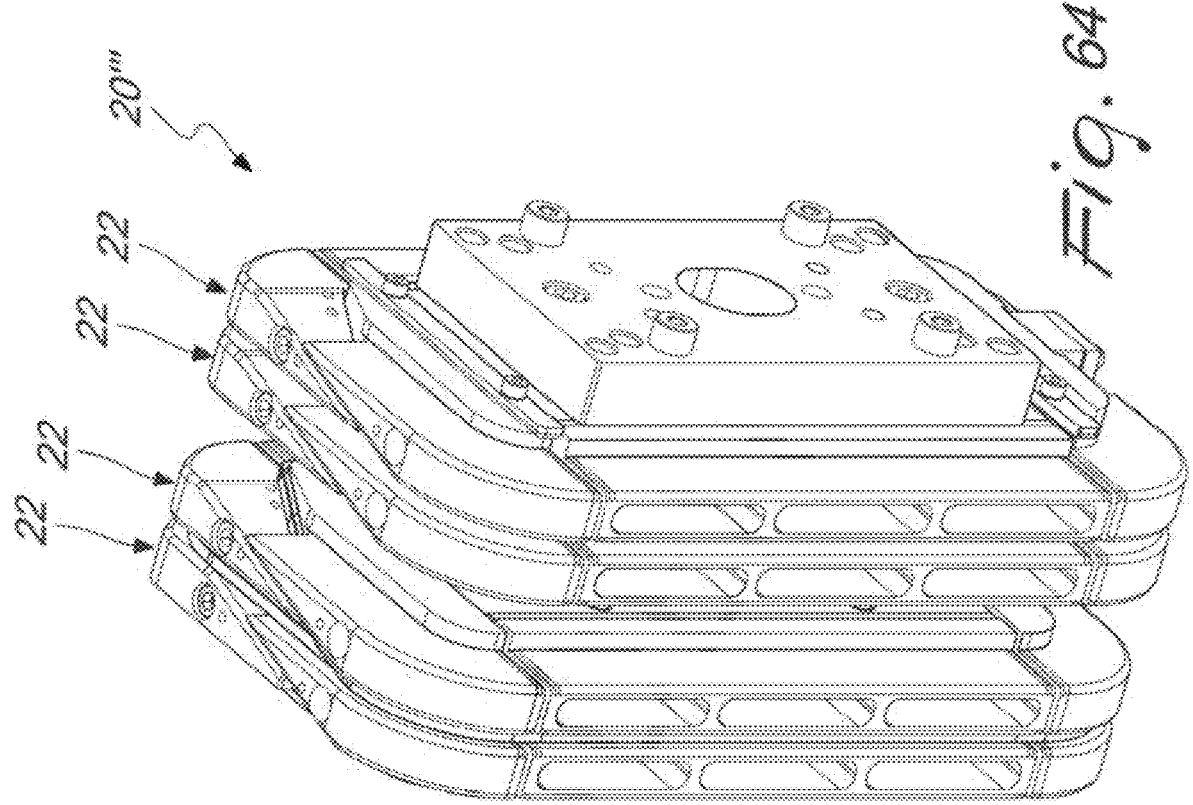
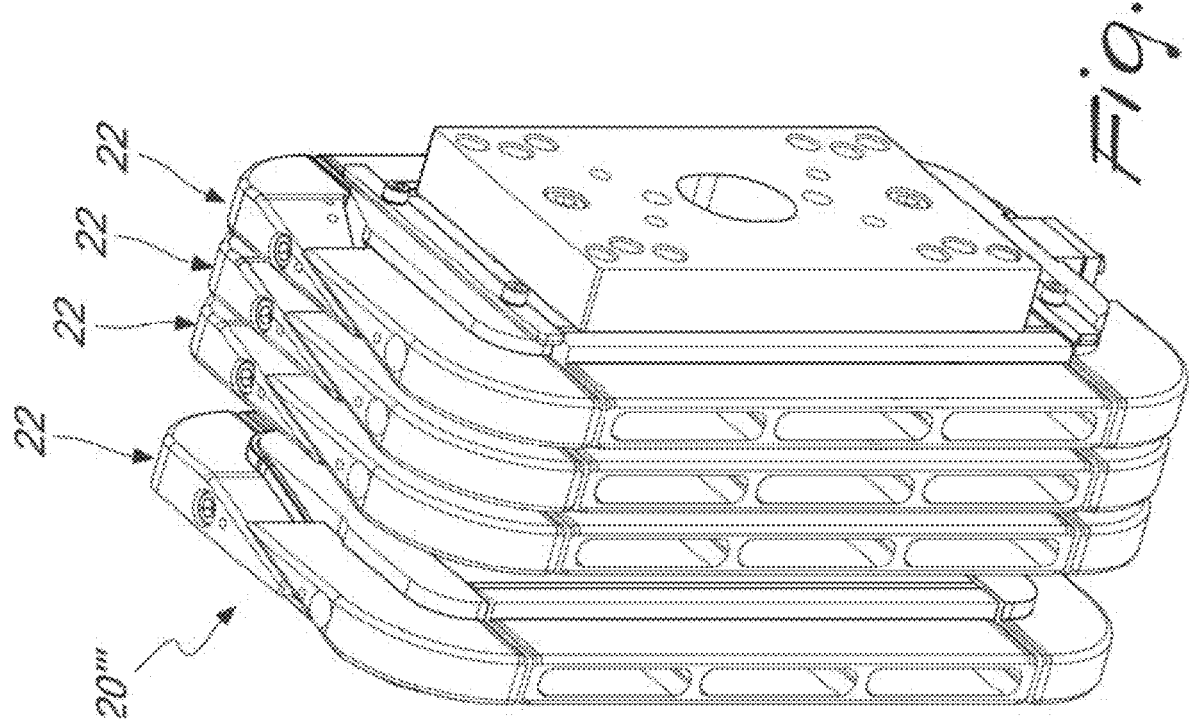

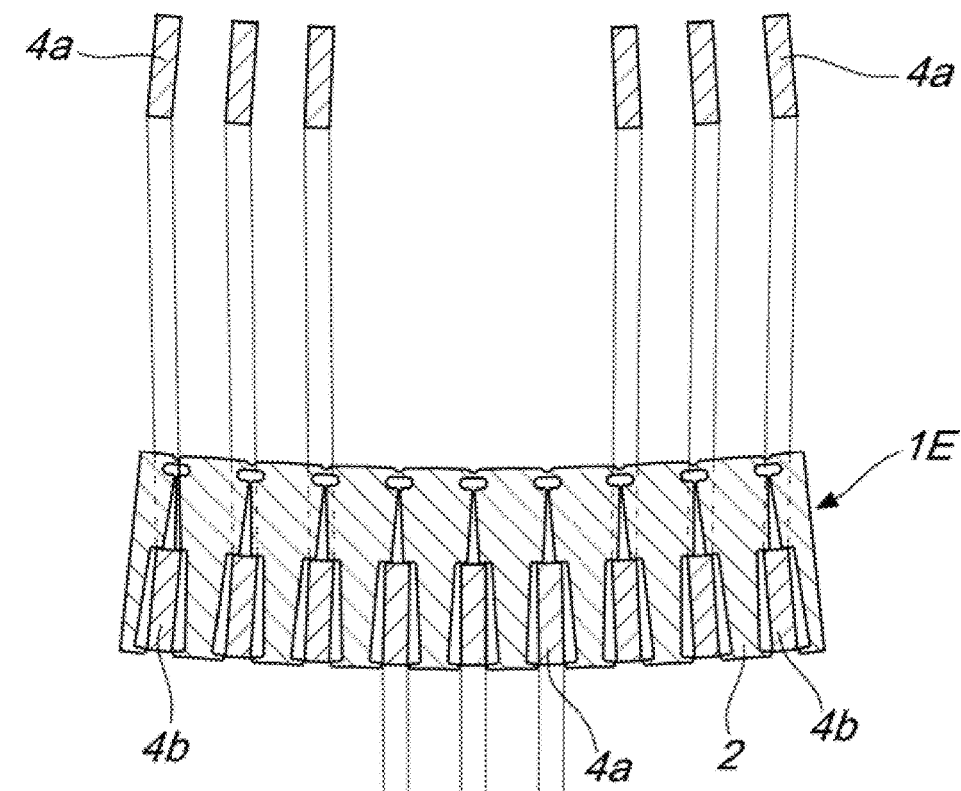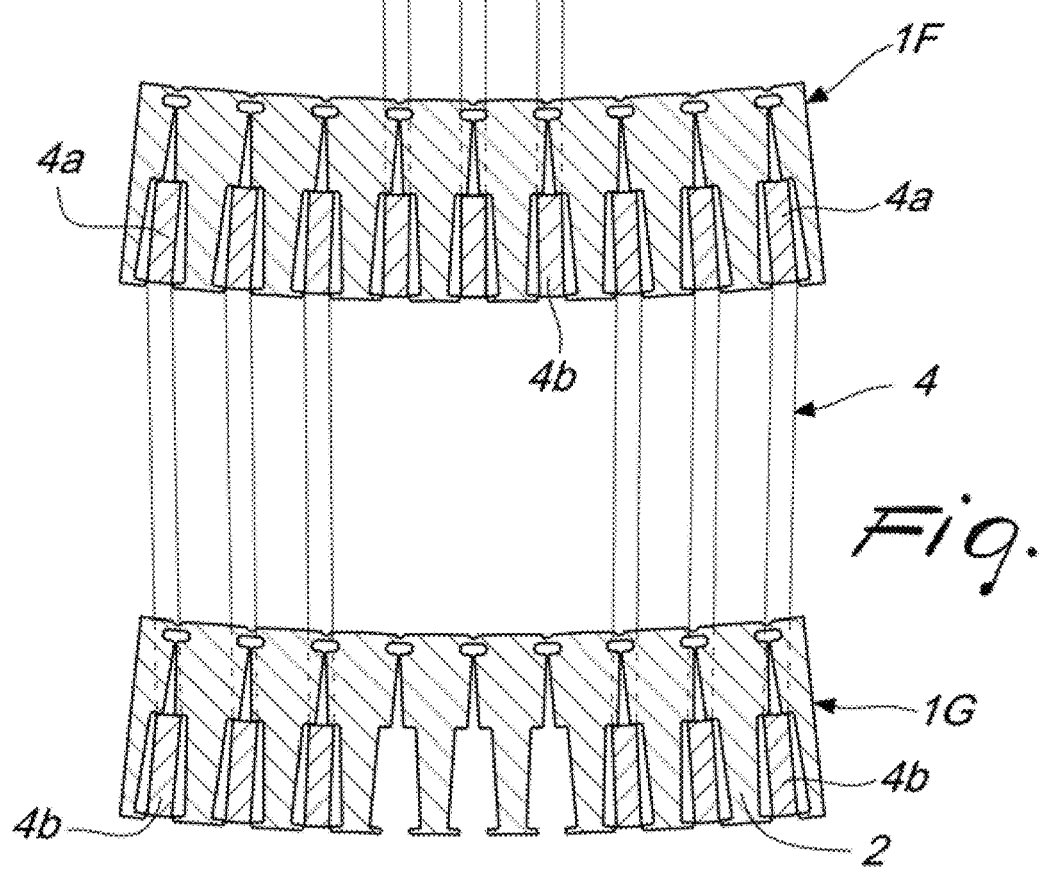
Fig. 66F

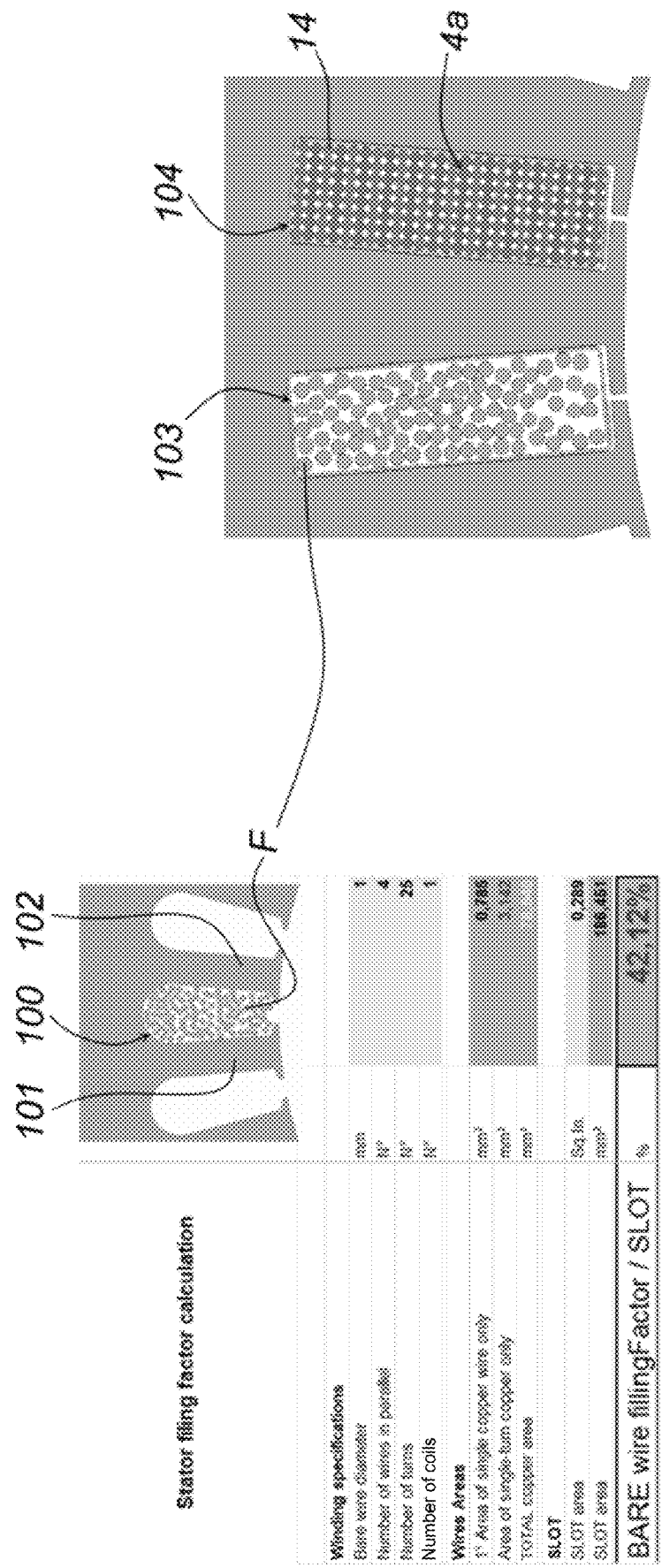

Fig. 81C

METHOD AND PROCESSING LINE FOR MANUFACTURING A STATOR FOR ELECTRIC MOTORS

CROSS REFERENCE TO RELATED APPLICATIONS

This application is a filing under 35 U.S.C. 371 of International Application No. PCT/IB2021/057982, filed Sep. 1, 2021, entitled "Method and Processing Line for Manufacturing of a Stator for Electric Motors," which claims priority to Italian Patent Application No. 102020000024691, filed Oct. 20, 2020, Italian Patent Application No. 102021000011540 filed May 6, 2021 and Italian Patent Application No. 102021000011564 filed May 6, 2021, which applications are incorporated by reference herein in their entirety.

FIELD OF THE INVENTION

The present invention concerns a method and a processing line for manufacturing of a stator for electric motors, as well as a stator made with such method.

STATE OF THE ART

As is known, the stators of the electric motors are generally cylindrical in shape and comprise a plurality of stator poles formed by stator teeth arranged along the inner circumference of the cylinder and which are jutting out towards a common central axis.

One or more windings of conducting wires, also named coils, are placed between the stator teeth, and more precisely in the sectors constituted by the space between the same stator teeth.

Among the stators, there are those with concentrated winding, in which the conducting wires are wound on an individual stator tooth, and those with distributed winding, in which the conducting wires are wound on two or more teeth. The present invention particularly concerns the making of a distributed winding stator.

In the known art, the cylindrical body of the stator is made by first assembling the teeth and -aside on the outside of the stator body—one or more coils of conducting wire which are then inserted into the sectors between the teeth of the already formed cylindrical body, to make a distributed winding stator.

This makes it necessary to have, between the ends of the teeth (named "pole shoes" in the technical field) of two adjacent teeth, an opening defined slot opening, sufficient enough to carry out the insertion of the coils.

Noise phenomena increase as the distance between the pole shoes increases, or as the slot opening increases, in particular torque ripple phenomena (also known as ripple torque and cogging), with a consequent drop in performance and increased vibrations and noise, and this is thus an aspect of the known art which can be improved.

An improvement of the filling factor of the sectors is also desirable in this type of stators, i.e. being able to insert a greater number of conducting wires, or the same number of wires of greater diameter, into the same sector, since this would improve the performance of the electric motor. The filling factor is defined as the ratio between the surface of the cross section occupied by conducting wires inside a stator slot with respect to the total area available (always considered in cross section) in the stator slot.

Moreover, a limit of these stators of known type consists in the fact that, after having inserted the coils into the stator, the individual loops composing the coil are arranged such as some loops are always positioned towards the center of the stator and others always towards the outside of the stator and this involves an increase in the leakage currents of the motor and thus a consequent drop in the efficiency of the motor itself.

It is further desirable to be able to minimize the axial volumes of the stators, with equal performance, in order to achieve more compact and light electric motors with respect to those currently available.

JP 2014 121195 describes a method for making a stator for electric motors comprising: a coil making step, wherein each coil comprises at least one linear portion (references 22a and 22b) which in turn comprises a plurality of individual linear wire portions; a coil housing step, wherein the linear portion of the coil is inserted into a stator component, between two side-by-side teeth; a shaping step, wherein the stator component which has accommodated the linear portion of the coil is deformed such as to move the two side-by-side teeth close to each other, such as to achieve a finished stator portion in which the linear portion of the coil is comprised; an assembling step from the outside, contemporaneously with the shaping step, wherein the coils are arranged side by side and separated, such as to define a torus, and the stator teeth portions are inserted between the coils, in radial direction, from the outside of the torus, so that as the stator teeth portion are gradually deformed and moved close to each other, each tooth is arranged radially and does not interfere with the adjacent coils; this way, it is possible to assemble a complete stator.

US 2007/096587 describes a method wherein each stator sector has a central tooth (505) and two outer teeth (510 and 511), and wherein (FIGS. 14-17) the coils are fitted one by one on the corresponding stator sector, such as to straddle the central tooth; after having received the corresponding coil, the stator sectors are deformed to lock the coils between the outer teeth and, subsequently, these stator sectors are assembled to form a complete stator.

U.S. Pat. No. 5,787,567 and JP S58 201564 describe systems for making coils of conducting wire wherein the coils are compacted by pressing and by applying heat.

SUMMARY OF THE INVENTION

The goal of the present invention is to make a method and a processing line for the making of a stator for electric motors which overcomes the drawbacks and limits of the known art, in one or more of the aspects set forth above.

To achieve this task, an object of the present invention is to implement a method and a processing line for the making of a stator which allow to achieve a stator for electric motors which improves the performance of the motor, in particular in terms of efficiency and/or performance and/or vibrations and/or noise.

A further object of the present invention is to implement a method and a processing line for the making of a stator which allows to improve the filling factor of the sectors inside the stator.

A further object of the present invention is to implement a method and a processing line for the making of a stator which allows to reduce the torque ripple (ripple torque and cogging) phenomena.

Another object of the present invention is to implement a method and a processing line for making a stator which are easy to make and economically convenient with respect to the known art.

Another object of the present invention is to implement a method and a processing line for the making of a stator which allows to achieve stators more compact in height (stack height), all factors being equal, with respect to the stators made with the known techniques and processing lines.

These tasks and others which will become clearer below are achieved by a method according to claim 1 for the making of a stator for electric motors comprising a stator body, which in turn comprises a plurality of stator teeth arranged radially about a common central axis and that define, between them, a plurality of sectors, or slots, in which one or more coils of conducting wire are at least partially inserted.

The method comprises the following steps A, C, D, E: a coil making step A, during which one or more conducting wires are wound on a winding tool such as to form at least one coil comprising at least one linear portion, wherein each linear portion in turn comprises a plurality of individual linear portions of wire and is intended to be inserted into one of the sectors, or slots, of the stator; a coil housing step C, during which the linear portion of the coil is inserted into a stator component comprising a subset of the aforementioned plurality of side-by-side teeth, and in particular the linear portion of the coil is inserted into the slot between said two side-by-side teeth; a shaping step D, during which said stator component is deformed such as to move the at least two side-by-side teeth close to each other, such as to achieve a finished stator portion which comprises the two teeth which define, between them, the sector in which the linear portion of the coil is comprised; an assembling step E, wherein a plurality of finished stator portions, achieved by means of respective housing C and shaping D steps, are assembled to one another such as to form the stator body.

Advantageously, the method provides the step R1, or as an alternative the step R2, described hereunder.

The step R1, implemented following the shaping step D, consists in rototranslating a first finished stator portion with respect to a second finished stator portion, making sure that the first finished stator portion and the second finished stator portion engage the same coil, until reaching the relative position which the first finished stator portion will have with respect to the second finished stator portion in the stator body; this rototranslation R1 consequently further also involves deforming the coil.

The step R2, implemented prior to the shaping step D, consists in rototranslating a first stator component with respect to a second stator component until reaching the relative position which the first stator component will have with respect to the second stator component in the stator body, and consists in deforming the coil correspondingly to the arrangement of the first rototranslated stator component and of the second rototranslated stator component; thus proceeding to the step C of housing the coil in the respective stator components and to the shaping step D.

The method just described allows to achieve different advantages.

One of the advantages which can be obtained is an improved filling factor of the stator sectors. The Applicant has calculated that the method allows to achieve, under other equal conditions, a filling factor greater of at least 15% and 20% on the average with respect to a stator made according to the known techniques, i.e. made through a standard insertion of the windings into the slots between two side-by-side teeth.

A further advantage is constituted by the reduction in the torque ripples: under equal conditions, for example, equal size (power), same rotor and dimensions of the electric motor, same diameter of the conducting wires, etc., the torque ripples are up to 15-30% less in a motor assembled with a stator made with the method just described with respect to an equivalent motor assembled with the known techniques.

The method according to the present invention further allows to make stators characterized by reduced leakages in the windings, up to 30% less with respect to a stator assembled with standard insertion of the coils into the slots between the teeth and up to 15% less with respect to a stator assembled with the technique known under the name "hairpin".

As far as the efficiency is concerned, when comparing the solution according to the present invention to the stators achieved with the standard technique of filling the slots between the teeth and stators achieved with the hairpin technique, under other equal conditions (same size/power, same number of poles, same dimension of the slots between the teeth, same diameter of the conducting wires, same rotor and same stack height), a stator achieved with the method just described allows to achieve a greater efficiency of about 1% at low rotation speeds with respect to a motor assembled with a standard stator, and allows to achieve a greater efficiency of about 2% at high rotation speeds with respect to a motor assembled with a hairpin stator.

Similarly, at low rotation speeds, a motor assembled with a stator made according to the present method has a greater supplied power of about 20% with respect to a motor with standard stator, and even greater at high rotation speeds, under equal conditions (same size/power, same number of poles, same dimension of the slots between the teeth, same diameter of the conducting wires, same rotor and same stack height). At high rotation speeds, a motor provided with a stator made according to the present method has a greater supplied power of about 10% with respect to a motor with hairpin stator.

The method according to the present invention involves further advantages with respect to the axial dimensions of the finished motor. Once the size of the motor is set, for example 55 kW, since the method allows to make stators with an increased filling factor of the slots between the teeth, a significant decrease of the stack height comprising the stator and respective windings is achieved. By comparing a standard stator with a stator achieved with the present method, a decrease of the stack height, which can reach 35%, is achieved.

The method according to the present invention further allows to make electric motor stators, finished with the respective winding, in an economic and simple way, as will be described more in detail in the following description.

Preferably, the coil made in the step A (making the coils) comprises a first linear portion and a second linear portion. In the coil housing step C, the first linear portion of the coil is inserted into a first stator component and the second linear portion of the coil is inserted into a second stator component. Both stator components are deformed in the shaping step D, thus achieving a first finished stator portion and a second finished stator portion, i.e. stator portions provided with a winding.

In the preferred embodiment, the method further comprises a pressing and/or carburizing step B, otherwise optional. It is a step during which at least one of the linear portions of the coil is subjected to a pressing step, or is subjected to a thermal carburizing treatment, or to both the pressing step and the thermal carburizing treatment, in the desired order or contemporaneously, such as to compact said individual linear wire portions according to the orderly arrangement achieved during the coil forming step A. Advantageously, the wires of the linear portions of the coils which were subjected to the pressing and carburizing remain aggregated, they do not separate and they are not displaced one with respect to the other. This detail allows to make and keep the winding in the best geometric configuration possible such as to maximize the filling factor, for each dimension of stator slot to be filled, and to avoid fraying during the movement of the coils.

Preferably, the step B has duration of between 15 seconds and 2 minutes.

In a first making method, in the housing step C, while the linear portions of the coil are inserted respectively into the first and the second stator component, the first and second stator components are aligned along the same plane with the teeth of the first stator component jutting out towards the second stator component and the teeth of the second stator component jutting out away from the first stator component, i.e. from the opposite side, or vice-versa. With this configuration, the outer wires of the first linear portion of the coil are prearranged in the inner part of the slot of the respective stator component, and the outer wires of the second linear portion of the same coil are prearranged in the outer part of the slot of the respective stator component (cross arrangement).

In a second making method, in the housing step C, while the linear portions of the coil are inserted respectively into the first and the second stator component, the first and second stator components are aligned along the same plane with the teeth of the first stator component jutting out towards the second stator component and the teeth of the second stator component jutting out towards the first stator component. With this configuration, the outer wires of the first linear portion and the second linear portion of the coil are prearranged in the inner part of the slot of the respective stator components.

Preferably, during the pressing and/or carburizing step B, the linear portions of the coil are pressed by one or more presser elements and are heated by means of one or more heating devices comprised in, or coupled to, the presser elements, while the coil is wound on a winding tool, i.e. before the coil is picked up from the winding tool.

In a possible method, in the pressing and/or carburizing step B, the thermal carburizing treatment is performed by inserting one or more heating elements between the linear portions of the coils, such as to heat them up to a predetermined carburizing temperature, generally in the range of 170° C.-210° C.

In a possible method, in the carburizing and pressing step B, the linear portions are pressed by means of a pressing device which is inserted between said linear portions of the coil after having removed the heating elements, by keeping the coil accommodated on the winding tool.

In a possible method, during the coil making step A, complementary conducting wires, having a smaller section with respect to the section of the main conducting wires, are added to the conducting wires, definable as main wires; the complementary conducting wires occupy the free spaces between the main side-by-side conducting wires.

Preferably, the method further comprise as step of insulating the conducting wires. An electrically insulating layer: is applied at least on the linear portions of the coil, after the pressing and/or carburizing step B, whenever provided, or is applied between the teeth of the stator components, before the coil housing step C.

Preferably, the coil making step A is implemented by making a series of multiple coils on the same winding tool, by making sure to keep a linear portion of a coil spaced from the linear portion of the successive coil according to a predetermined pitch distance. In this circumstance, following the pressing and/or carburizing step B and before the housing step C, the method provides for: making the series of coils interact mechanically with a pitch-correcting device, for example provided with pliers movable by actuators, configured to correct the pitch distance between the linear portions of the different coils, whenever necessary; displacing the coils by means of the pliers, in order to keep the pitch distance constant between the linear portions of the coils;

using the pliers during the housing step C to insert the coils between the teeth of the respective stator components.

Optionally, the method comprises a coil arranging step C', prior to the coil housing step C. In the step C', some coils are aligned in a predetermined order, such as the first linear portion and the second linear portion of at least one coil are aligned respectively with the first linear portion of at least one second coil and with the second linear portion of at least one third coil.

In this circumstance, before the housing step C and before or during the coil arranging step C', a coil bending step is performed, which consists in bending one or more coils such as to align their linear portions along one or more circumferences, about a common central axis.

For example, in the coil arranging step C', all the linear portions of the coils are aligned along the same circumference and, in the housing step C, the stator components are inserted radially towards the linear portions, such as the teeth are inserted between the linear portions, like a comb.

At this point, preferably, in the coil housing step C, the first linear portion of the coil is inserted into a first stator component and the second linear portion of the coil is inserted into a second stator component. Both stator components are deformed in the shaping step D, thus achieving a first finished stator portion and a second finished stator portion.

In a method, in the housing step C, at least one linear portion of a first coil and one linear portion of a second coil are inserted between two side-by-side teeth, such as at least two linear portions of two different coils are inserted into one or more of said sectors.

Also in the method which provides for the alignment of the straight portions of three coils, in the housing step C, while the linear portions of a first coil are inserted respectively into a first and a second stator component, the two stator components are aligned along the same plane with the teeth of the first stator component jutting out towards the second stator component and the teeth of the second stator component jutting out away from the first stator component, or vice-versa. In the housing step C, the first linear portion of one or more second coils is inserted into the second stator component and the second linear portion of said one or more second coils is inserted into a third stator component whose teeth are jutting out away from the second stator component.

Preferably, the assembling step E in turn comprises: fastening in sequence the plurality of finished stator portions on an outer surface of a drum until forming a cylindrical stator body about the drum, thus removing the stator body from the drum. At this point, the finished stator is ready to be assembled with a rotor to form an electric motor. For this solution, which provides for the assembling about a drum, the Applicant reserves the right to file a divisional patent application.

A further aspect of the present invention concerns a winding tool according to claim 20.

The winding tool, used to make the coils of conducting wire, comprises a supporting frame which supports four series of angular elements. Each series is arranged substantially along an edge of an ideal parallelepiped, and wherein the angular elements of each series are spaced from each other such as to define a series of winding chambers to accommodate the conducting wire forming the coil.

This configuration of the winding tool allows to make coils with the desired number of linear portions and with the desired pitch distance between the linear portions.

A further aspect of the present invention concerns a winding machine according to claim 21 for performing the coil making step A. The winding machine comprises a wire directing device which in turn comprises an axial guide along which a plurality of wire guiding tubes slide in a controlled way and independently of one another. Each wire guiding tube is crossed by, and directs, a layer of one or more wires intended to form a layer of a loop of the coil.

This configuration of the winding machine allows to make the coils with linear portions comprising wires of different diameter, thus being able to maximize the number of wires per unit of area available in the slots between the stator teeth.

A further aspect of the present invention concerns a pressing device according to claim 22, configured to perform the pressing of the linear portions of a coil, during the pressing and/or carburizing step B described above. The pressing device comprises a plate moved by special actuators, to which a series of inclined planes, which are adapted to come into contact with the linear portions and to exert an adjustable pressure on them, for example between 140 bars and 300 bars, is coupled.

A further aspect of the present invention concerns a heating device according to claim 23, configured to perform the carburizing of the linear portions of a coil, during the pressing and/or carburizing step B described above. The heating device comprises one or more heating elements, preferably by induction, shaped and arranged such as to be inserted between the linear portions of a coil. Preferably, the heating elements are combined with or comprised in the inclined planes mentioned in the preceding paragraph.

A further aspect of the present invention concerns a processing line according to claim 24 to produce stators with the respective windings by implementing the manufacturing method described herein. The processing line comprises: at least one winding tool, for example of the type described above, configured to perform the coil making step A, an apparatus for mobilizing the coils, configured to perform at least the coil housing step C, a shaping apparatus, configured to perform the shaping step D, and an assembling apparatus configured to perform the assembling step E.

Advantageously, in a first embodiment, the processing line further comprises a mobilization system, the same one used to perform the step C, or a different system configured to rototranslate R1 a first finished stator portion with respect to a second finished stator portion. The first finished stator portion and the second finished stator portion share the same coil, in the sense that a first linear portion of the coil is inserted into the first finished stator portion and a second linear portion of the same coil is inserted into the second finished stator portion. The rototranslation is actuated up to reaching the relative position which the first finished stator portion will have with respect to the second finished stator portion in the stator body. During the rototranslation R1, the linear portions of the coil are locked in a corresponding slot between the teeth of the respective finished stator portions and, thus, the coil 4 is deformed at the nonlinear portions: the linear portions are brought on different planes, corresponding to the position taken by the finished stator portions.

Advantageously, in a second embodiment alternative to the first, the processing line further comprises a mobilization system, the same used to perform the step C, or a different system configured to rototranslate R2 a first stator component with respect to a second stator component, up to reaching the relative position which said first stator component will have with respect to said second stator component in the stator body, and to deform the coil until ensuring the respective linear portions are mutually arranged correspondingly to the arrangement of the first rototranslated stator component and the second rototranslated stator component. Unlike the first embodiment, the rototranslation R2 occurs before the linear portions of the coil are housed into the first stator component and the second stator component, i.e. does not occur on the finished stator portions but before inserting the linear portions of the coil into the respective stator components.

The advantages provided by the processing line are the same as those described previously referring to the method according to the present invention.

Preferably, the winding tool is of the type described above.

Preferably, the winding tool comprises a plurality of movable walls comprised between an anchoring wall configured to be coupled operatively to a winding spindle, and a removable disassembly wall, which can be decoupled from the anchoring wall to release the movable walls. The movable walls form one or more winding chambers inside which the conducting wires are wound to form the coils.

Preferably, the processing line comprises a winding machine provided with a supporting structure. On the supporting structure, there are mounted: a plurality of wire tensioning devices, whose function is to allow the proper tensioning of the wires to be wound, a wire guiding device provided with a wire guiding tube and movable along a wire guiding guide, and a winding spindle rotated by a motor and configured to rotate the winding tool.

The winding machine can be set up in an operative winding configuration wherein the wires to be wound are tense and come out of the wire tensioning devices towards the wire guiding device, which in turn guides the wires towards the rotating winding tool.

Preferably, the processing line comprises a pressing and/or carburizing apparatus of the type described previously, configured to perform the step B.

In an embodiment, the pressing and/or carburizing apparatus comprises a housing seat configured to house the winding tool and: one or more presser elements configured to exert a pressure on the at least one linear portion of the coil wound on the winding tool, and as an alternative or in addition, at least one heating device configured to heat the linear portion before, after or during the pressing.

Preferably, the mobilization system of the coils, which is mounted on the processing line, comprises a plurality of pliers configured to keep a predetermined pitch distance between the linear portions of the coils by means of a plurality of fingers or pliers adapted to grasp the linear portions.

Preferably, the shaping apparatus comprises a couple of deforming vises, each of which is configured to accommodate a stator component between two jaws. Under the action of an actuator, the jaws compress the stator component such as to move its teeth close to each other and to keep at least one corresponding linear coil portion in the stator slot. At least one of the vises can be displaced by the mobilization system to cause the rototranslation thereof with respect to the other deforming vise, such as to perform the method according to the present invention.

According to a preferential aspect, for which the Applicant reserves the right to file a divisional patent application, the assembling apparatus comprises a substantially cylindrical drum which has an outer surface provided with a series of fastening seats. The fastening seats are used to be engaged by respective fastening elements of the finished stator portions, such as to allow the assembly of the complete stator on the outer surface of the drum, by joining a plurality of finished stator portions.

Preferably, the drum is divided into drum sectors which can be moved close to each other to allow the extraction of the stator body formed on the outer surface of the drum itself.

A further aspect of the present invention concerns a stator sector, directly achieved with the method describe herein. The stator sector directly achieved with the method described is recognizable from a stator sector made with known techniques, under equal conditions, for the following reasons: considering the case of conducting wires with a circular section, the filling factor is at least 15% greater; considering the case of conducting wires with a circular section, the slot opening is smaller than the diameter of the conducting wire used to make the coil; the conducting wires defining the linear portion of the coil comprised in the slots of the stator sector are arranged according to an orderly, repeatable, matrix scheme and not according to a close-range but random scheme, as in the known art; the cross section of the stator slot is substantially rectangular, unlike the trapezoidal slots of the known solutions.

The present invention further concerns a complete stator and an electric motor which integrate the stator sector just described.

BRIEF LIST OF THE FIGURES

Further characteristics and advantages will become clearer from the description of some preferred, but not exclusive, embodiments of a method for making a stator, which are illustrated by way of example and without limitations with the aid of the accompanying drawings, in which:

FIGS. 7 and 8 are exploded views of a first embodiment of a winding tool according to the present invention;

FIGS. 7A and 8A are perspective views of a part of a second possible embodiment of a winding tool according to the present invention;

Figure 10:
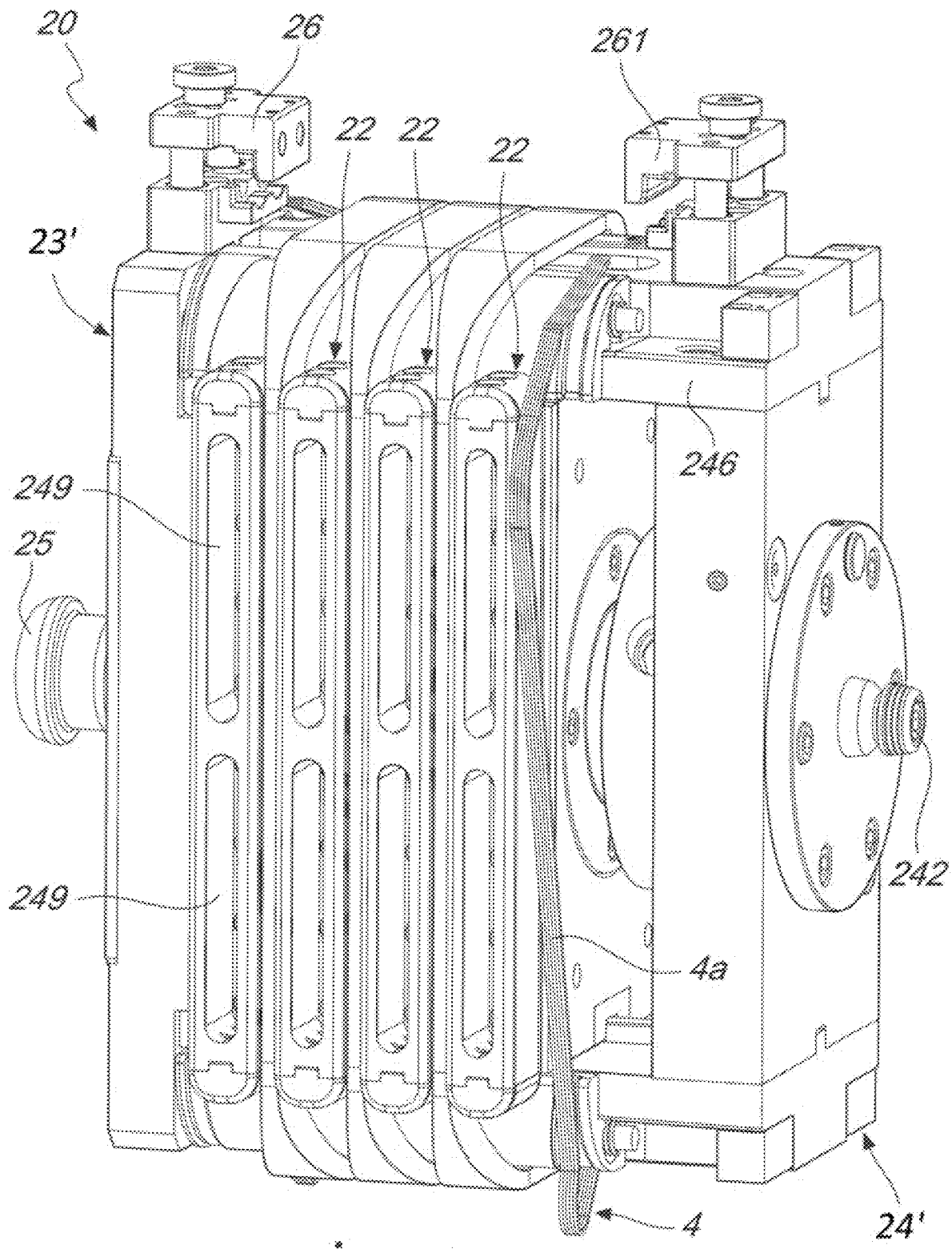
Figure 10B:
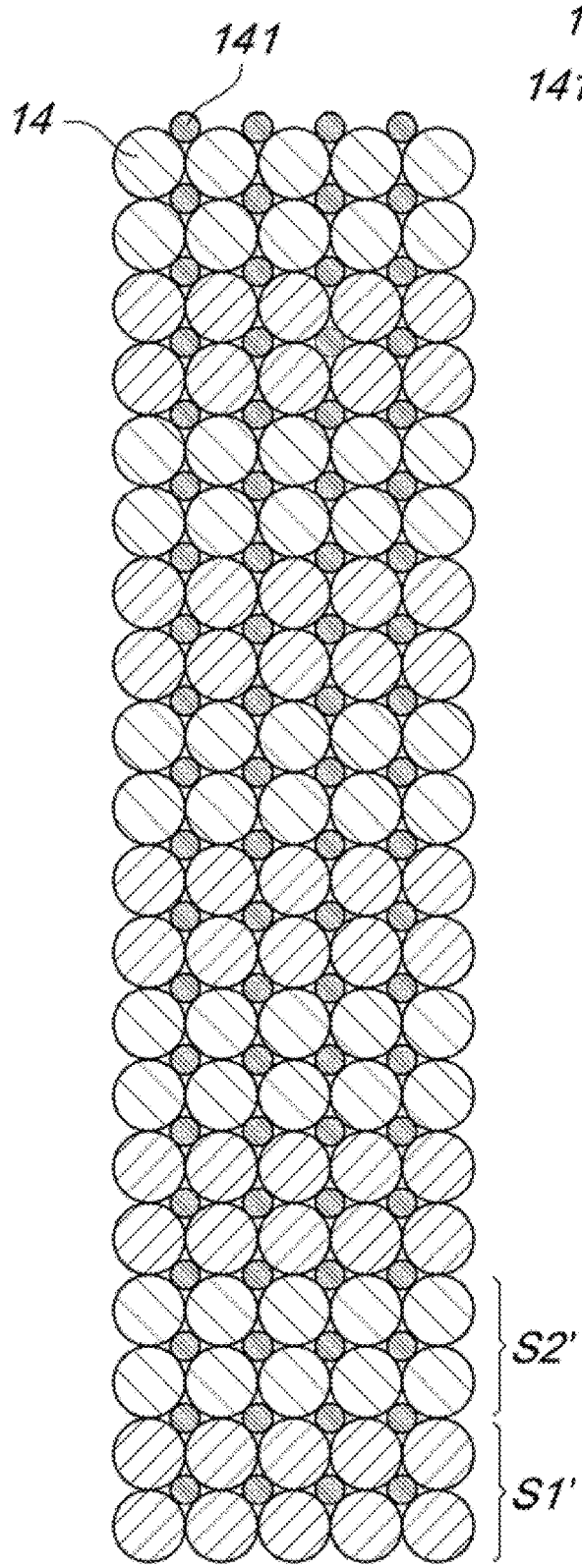
Figure 10C:
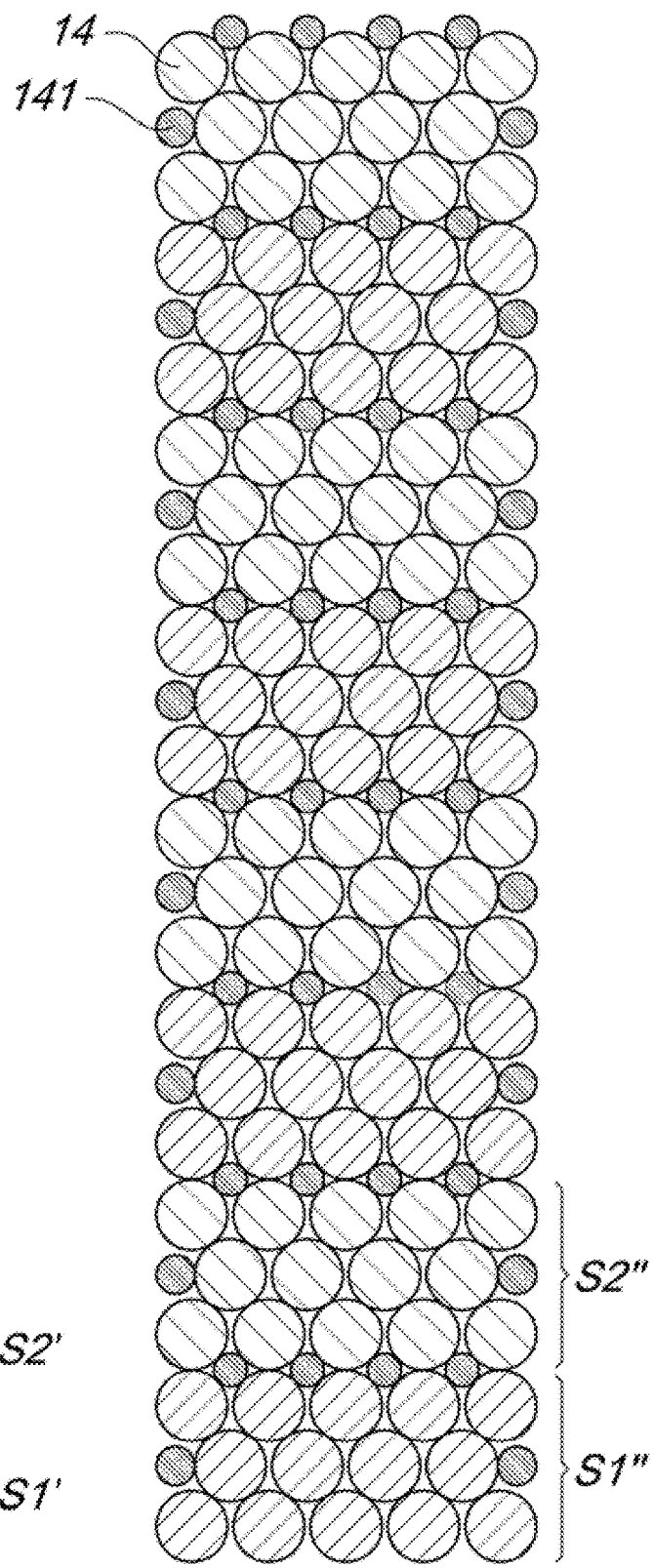
Figure 11:
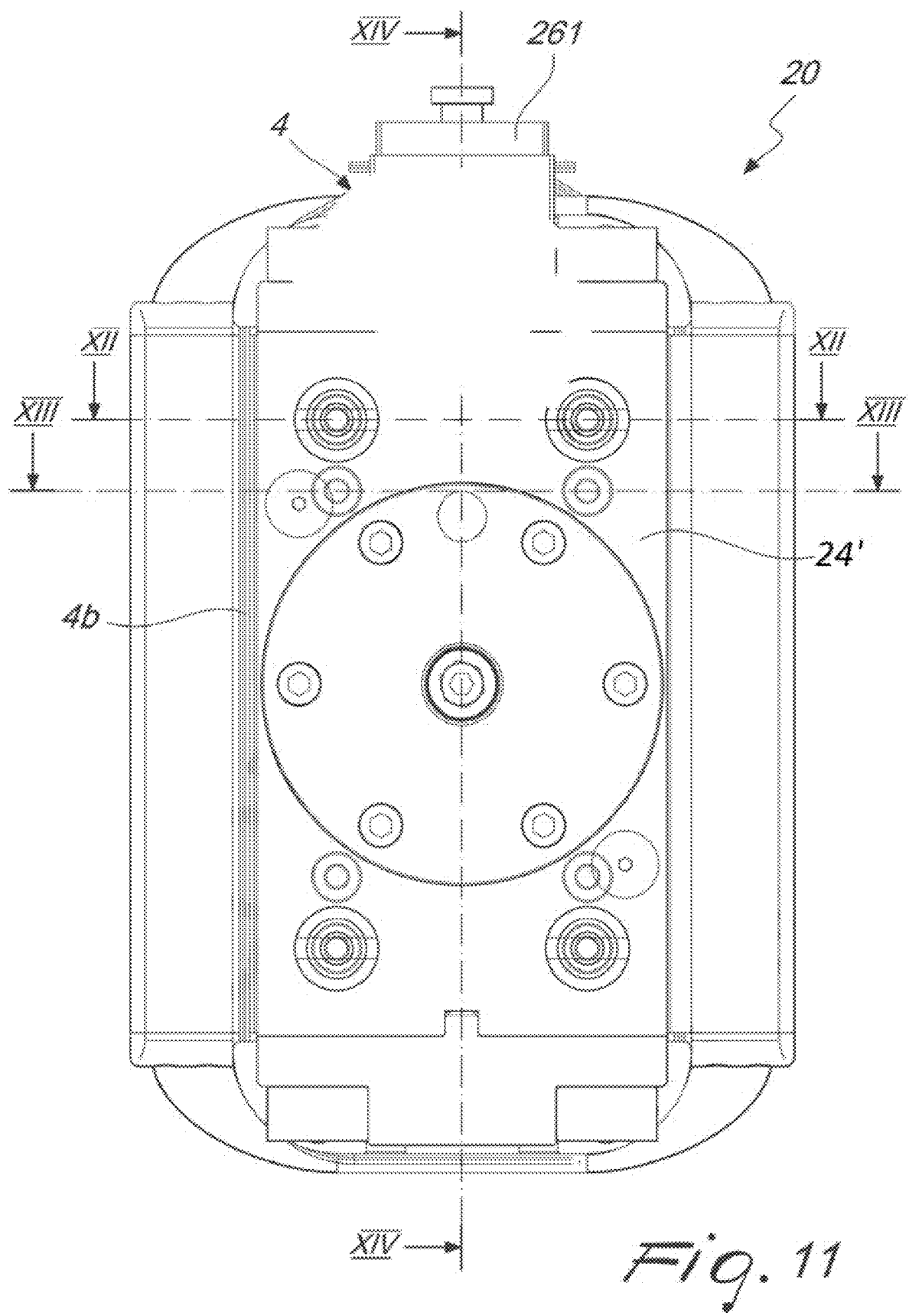
Figure 11A:
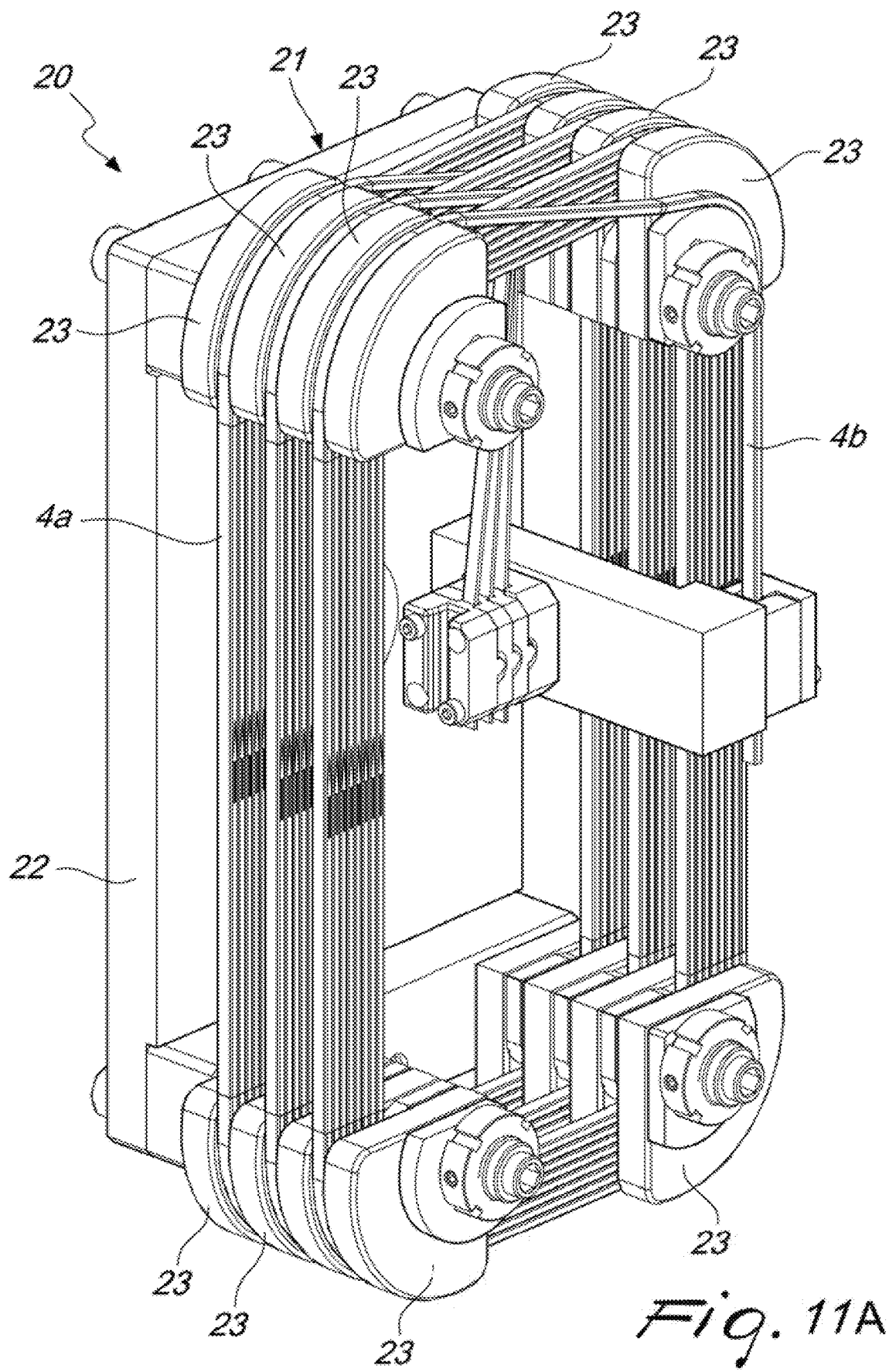
Figure 12:
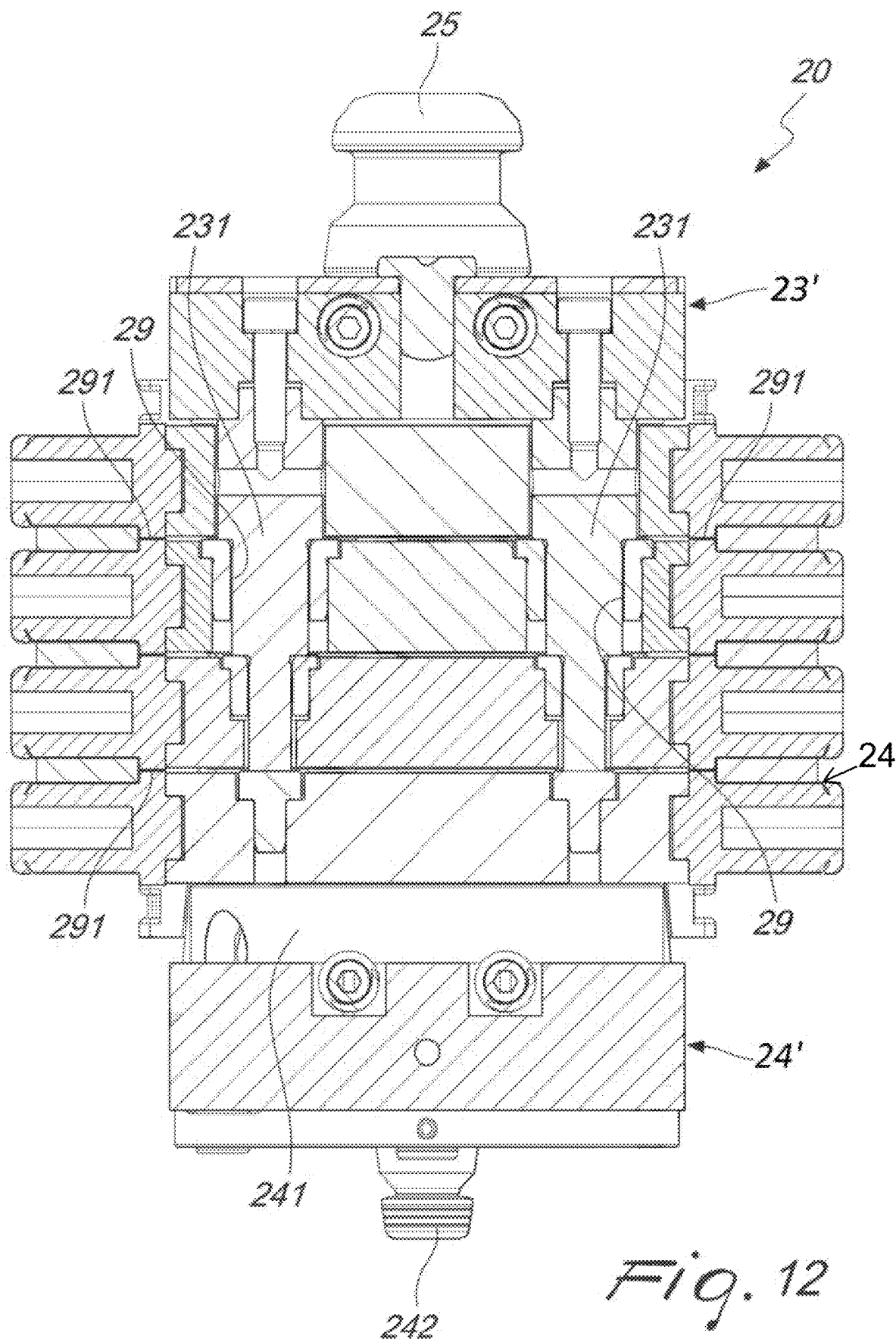
Figure 12A:
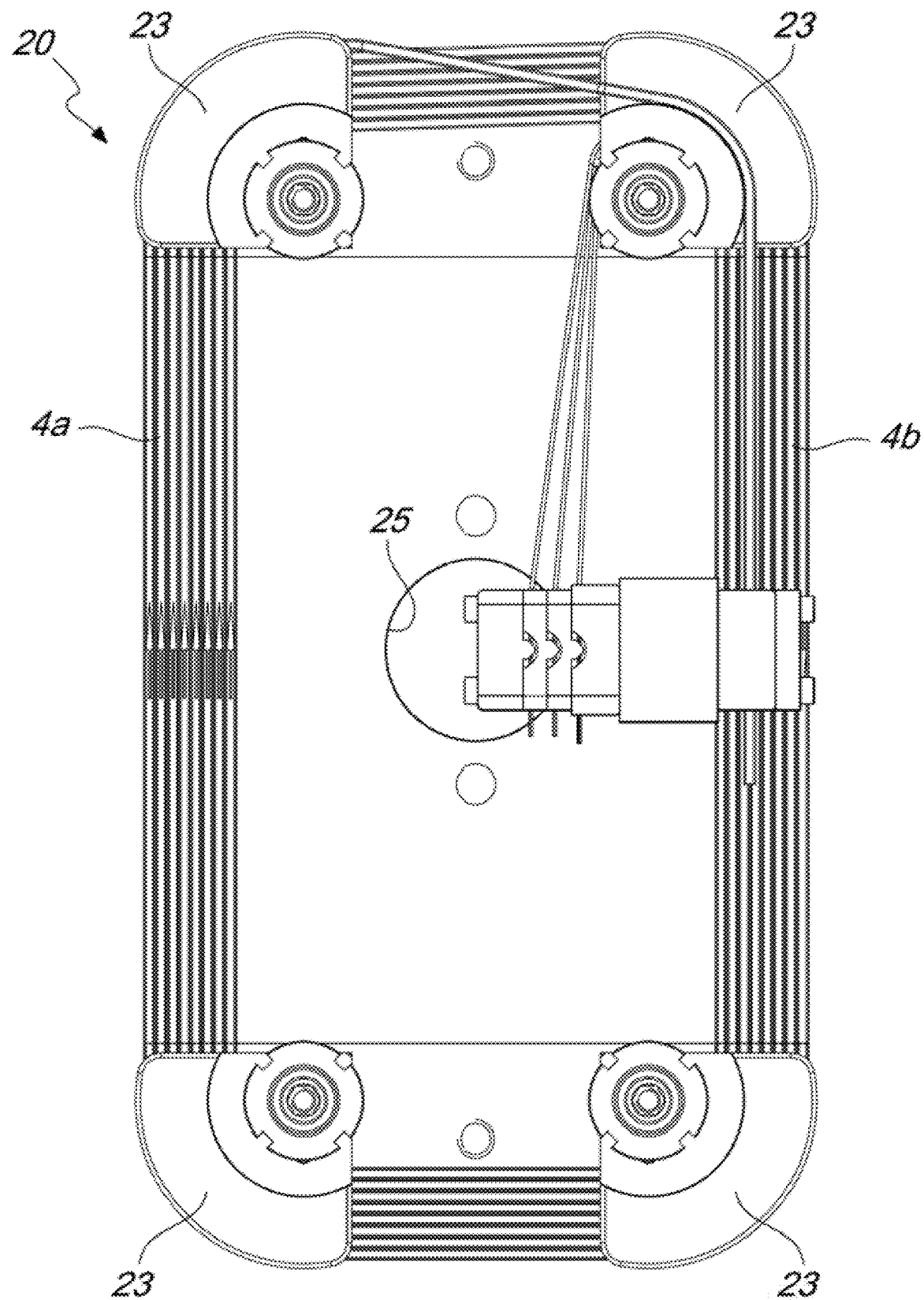
Figure 13:
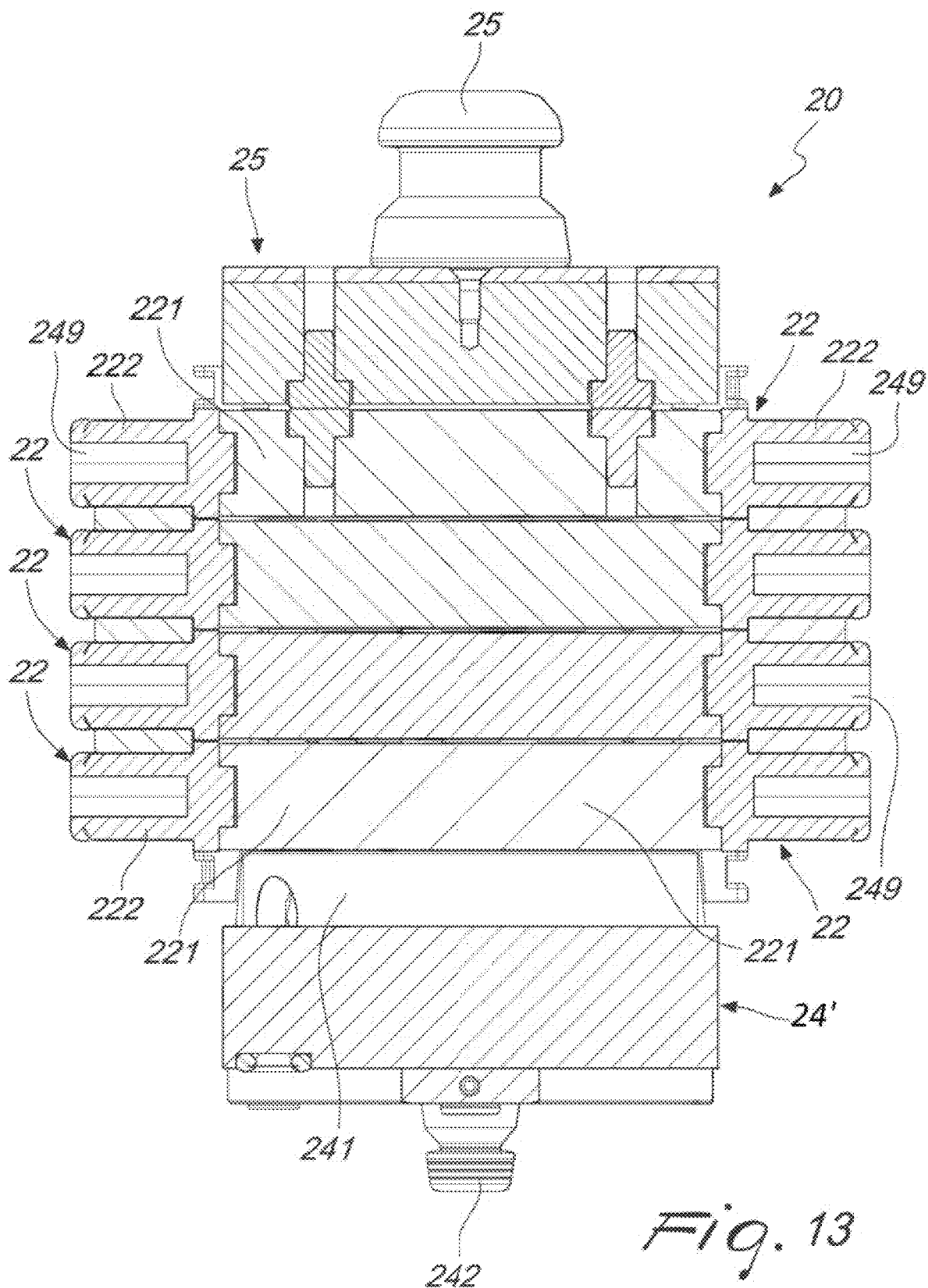
Figure 13A:
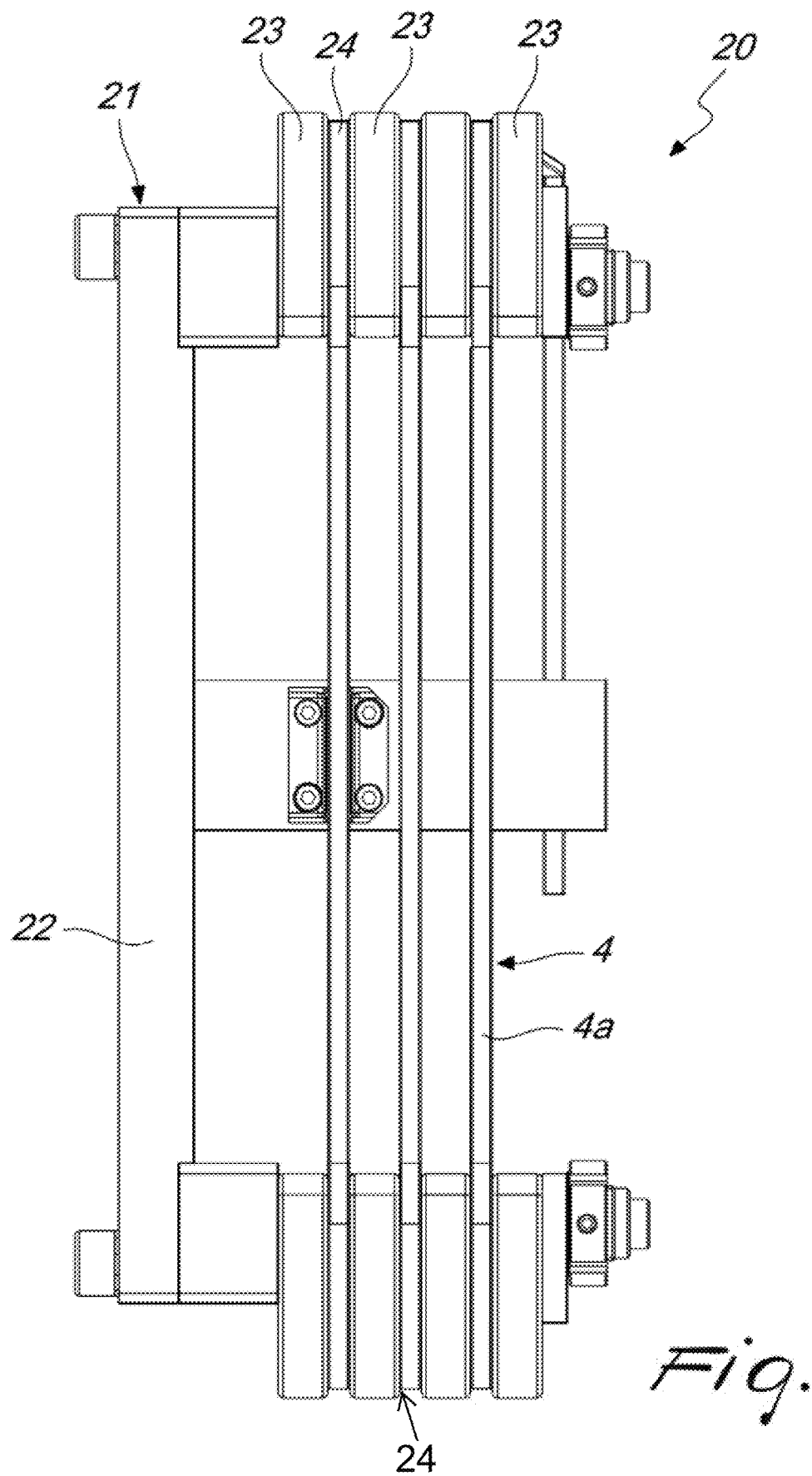
Figure 14:
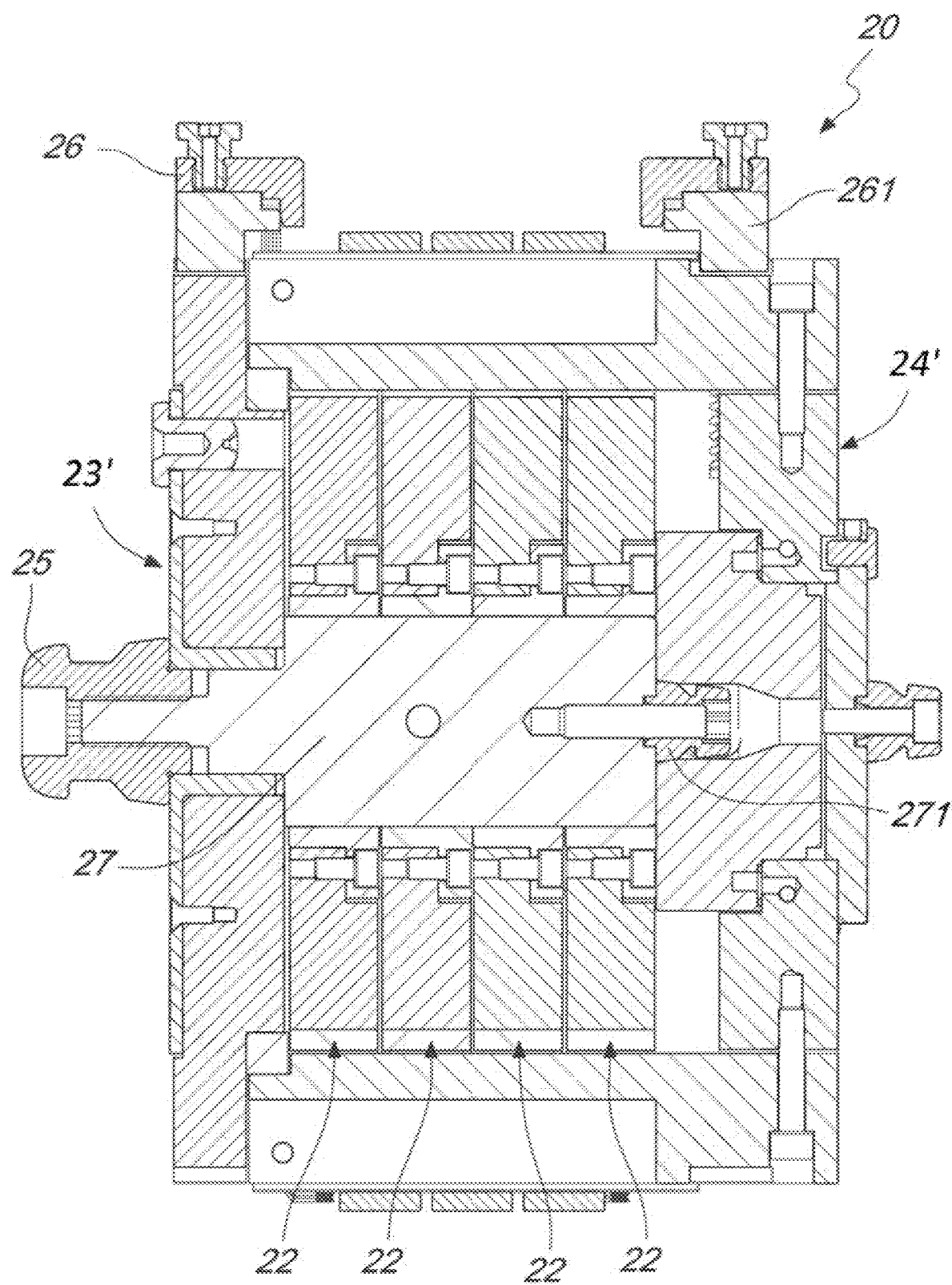
Figure 14A:
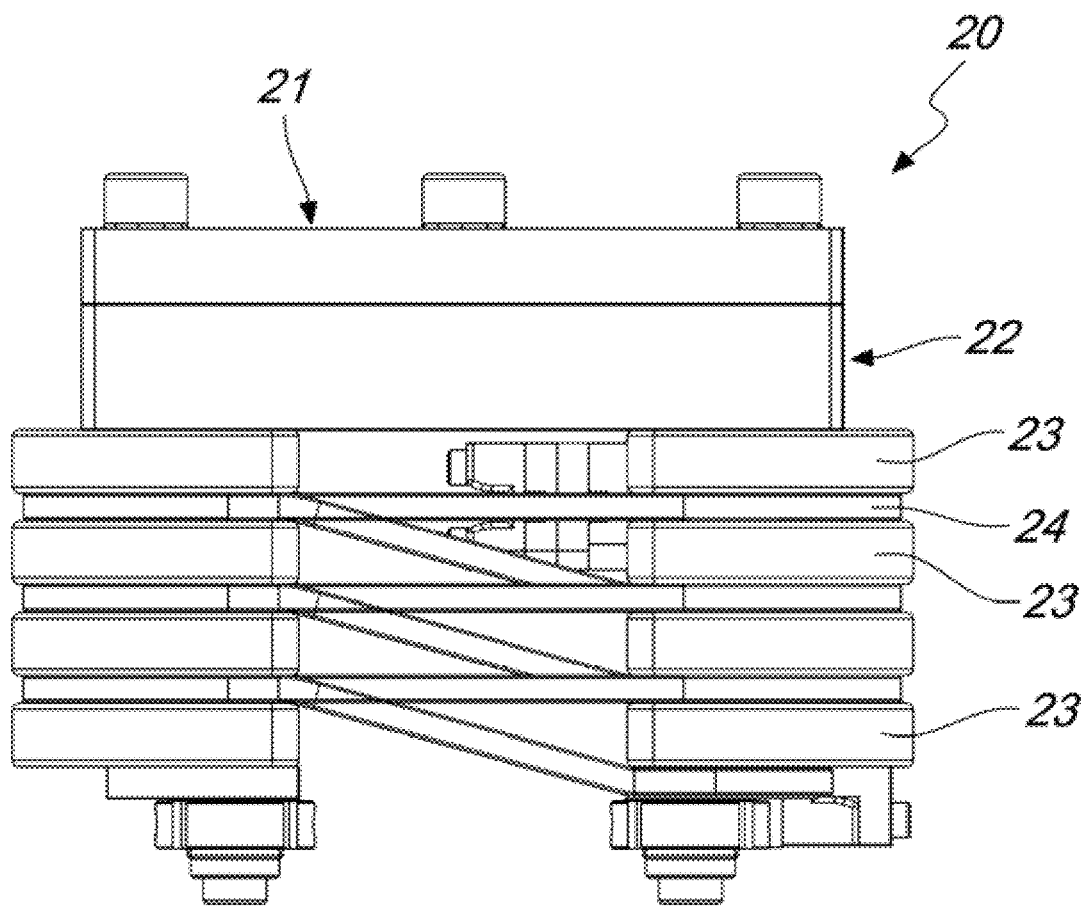
Figure 15:
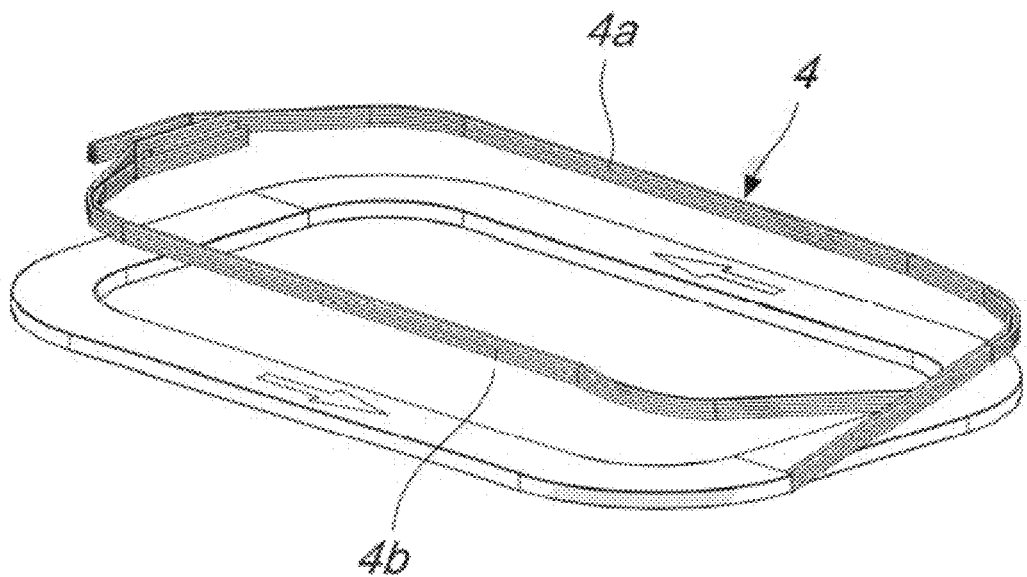
Figure 16:
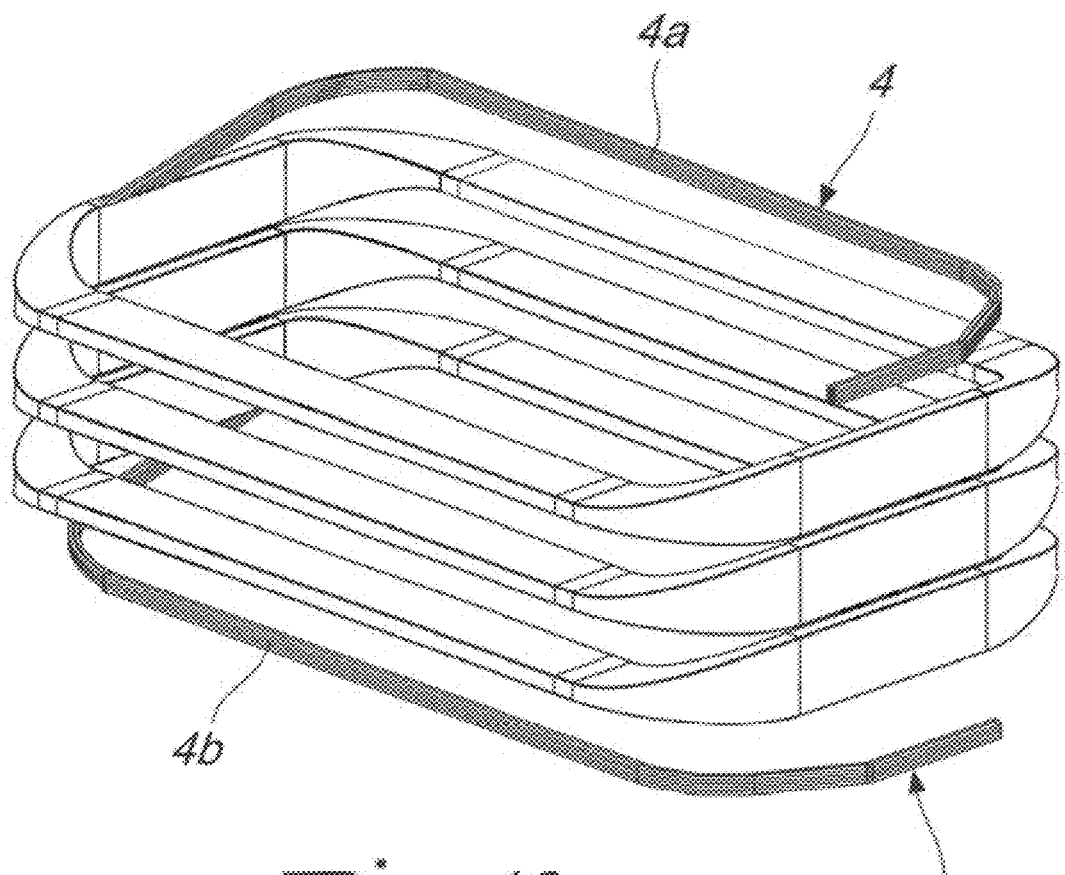
Figure 15A:
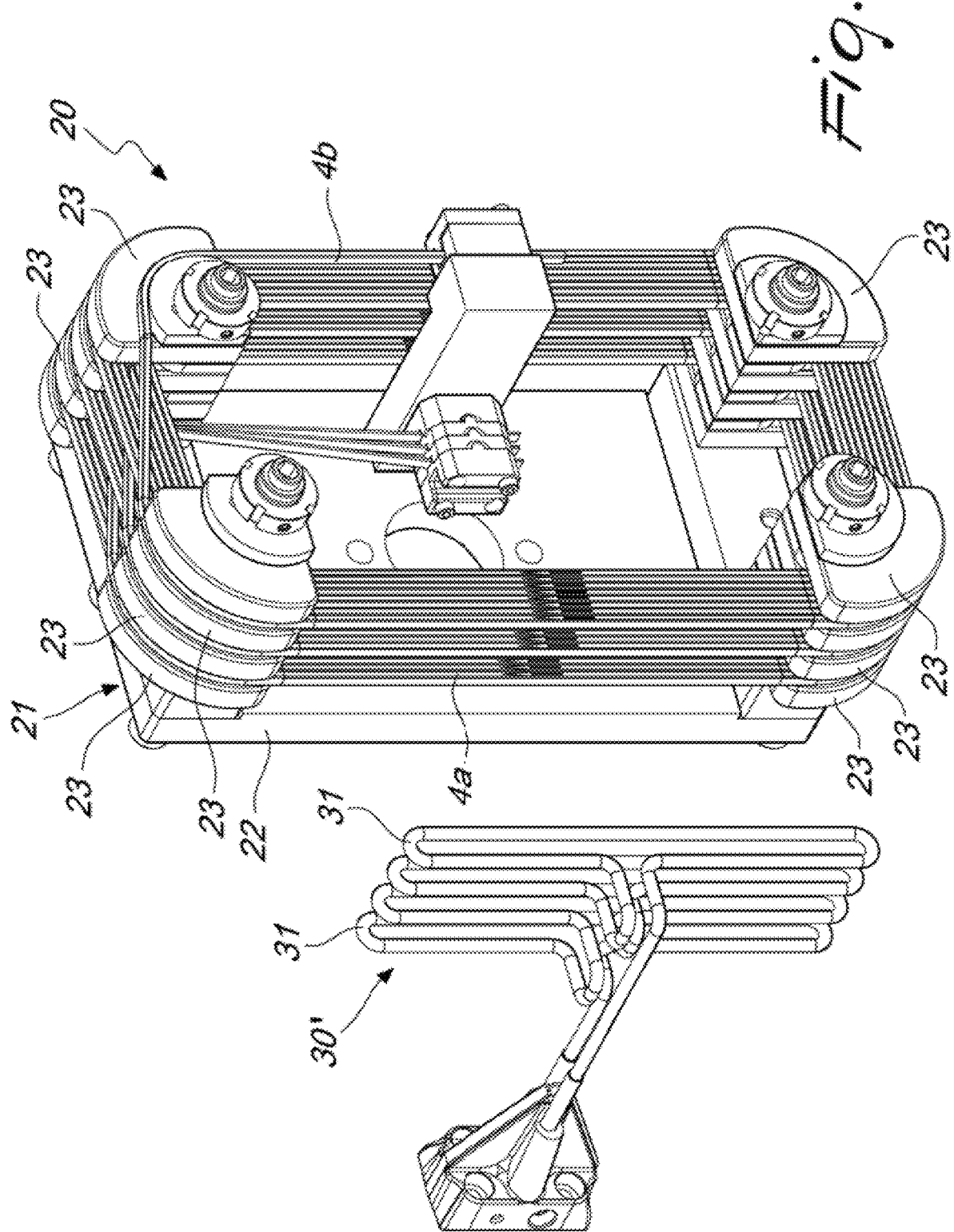
Figure 16A:
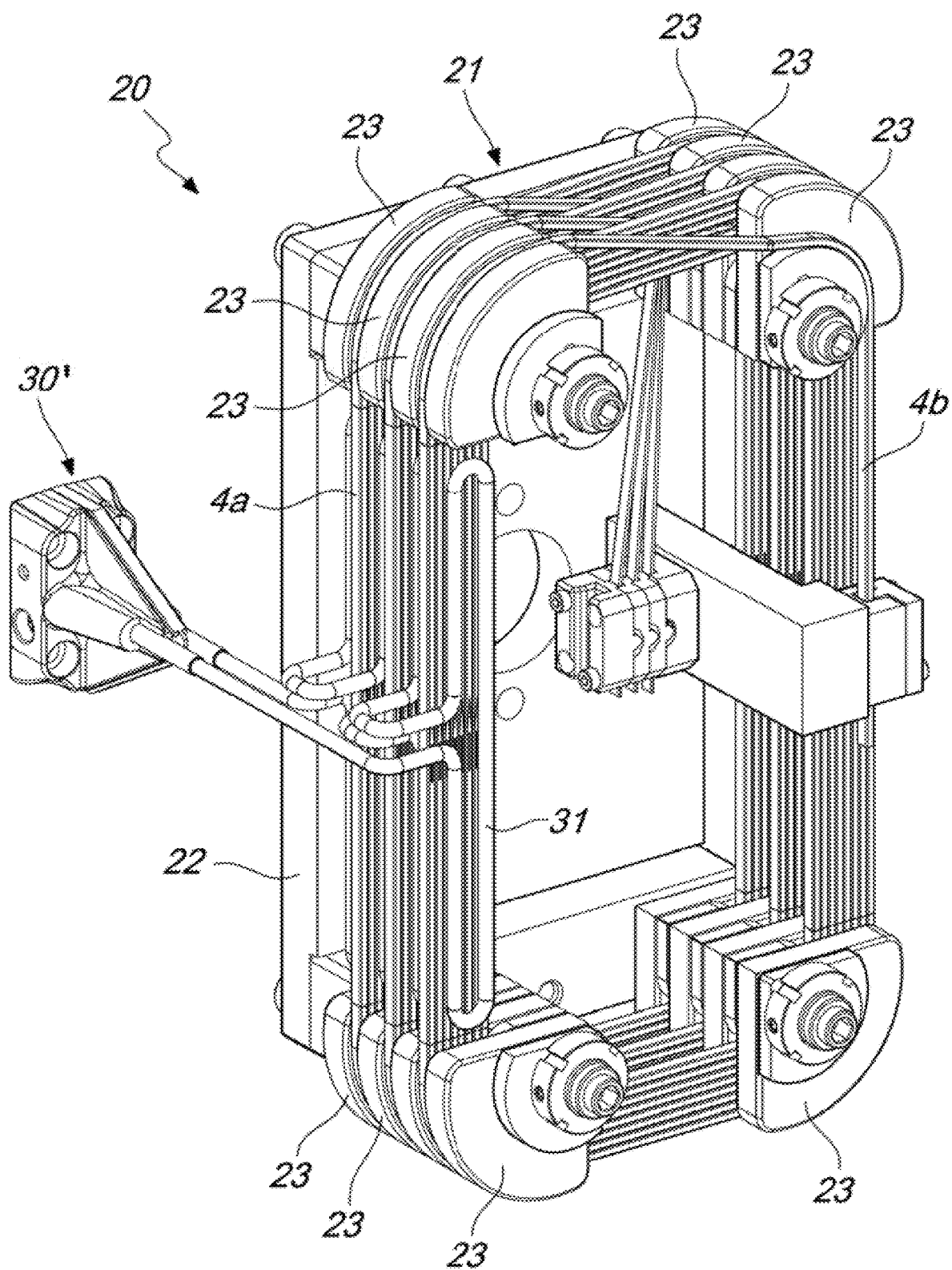
Figure 17:
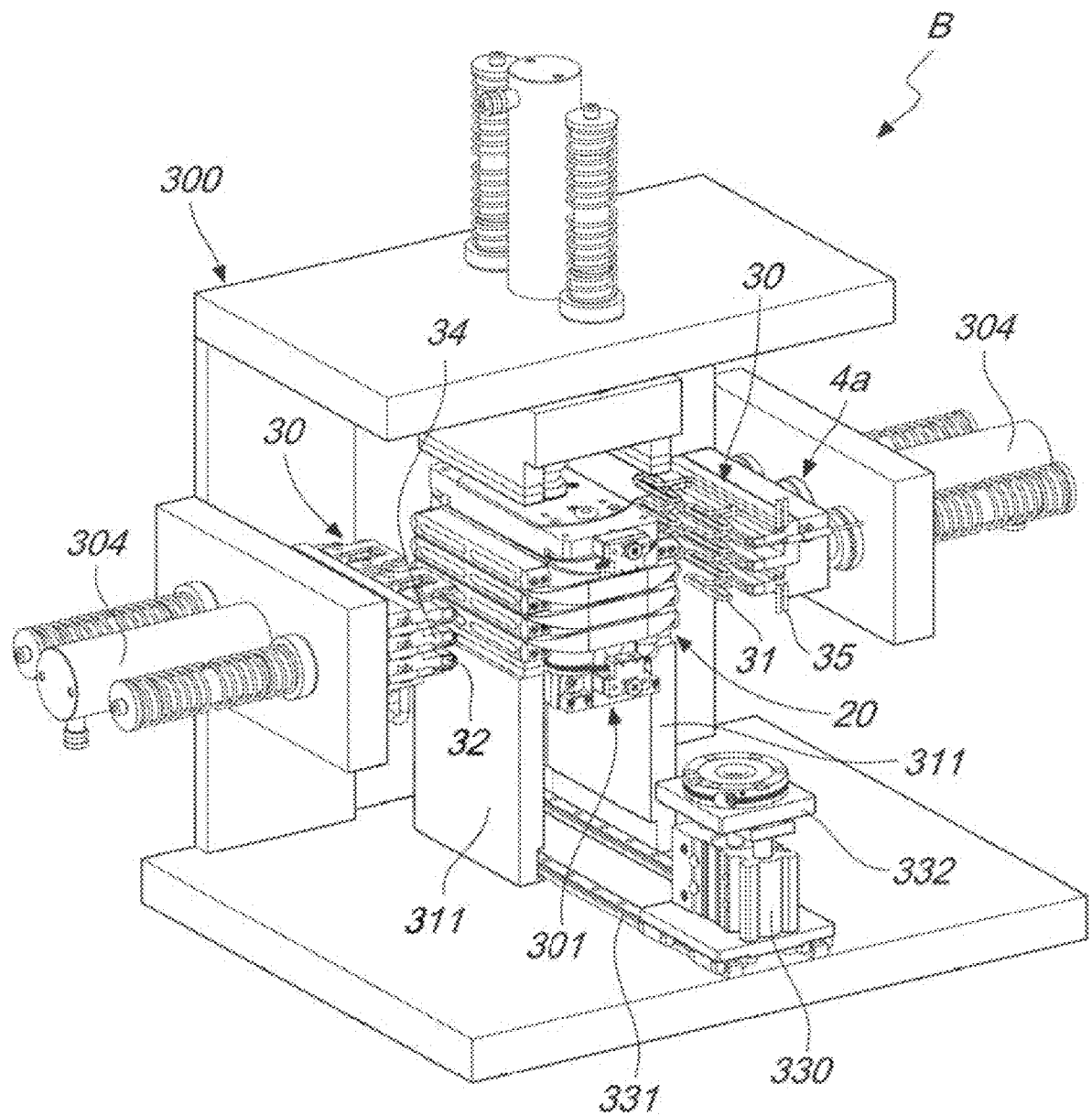
Figure 17A:
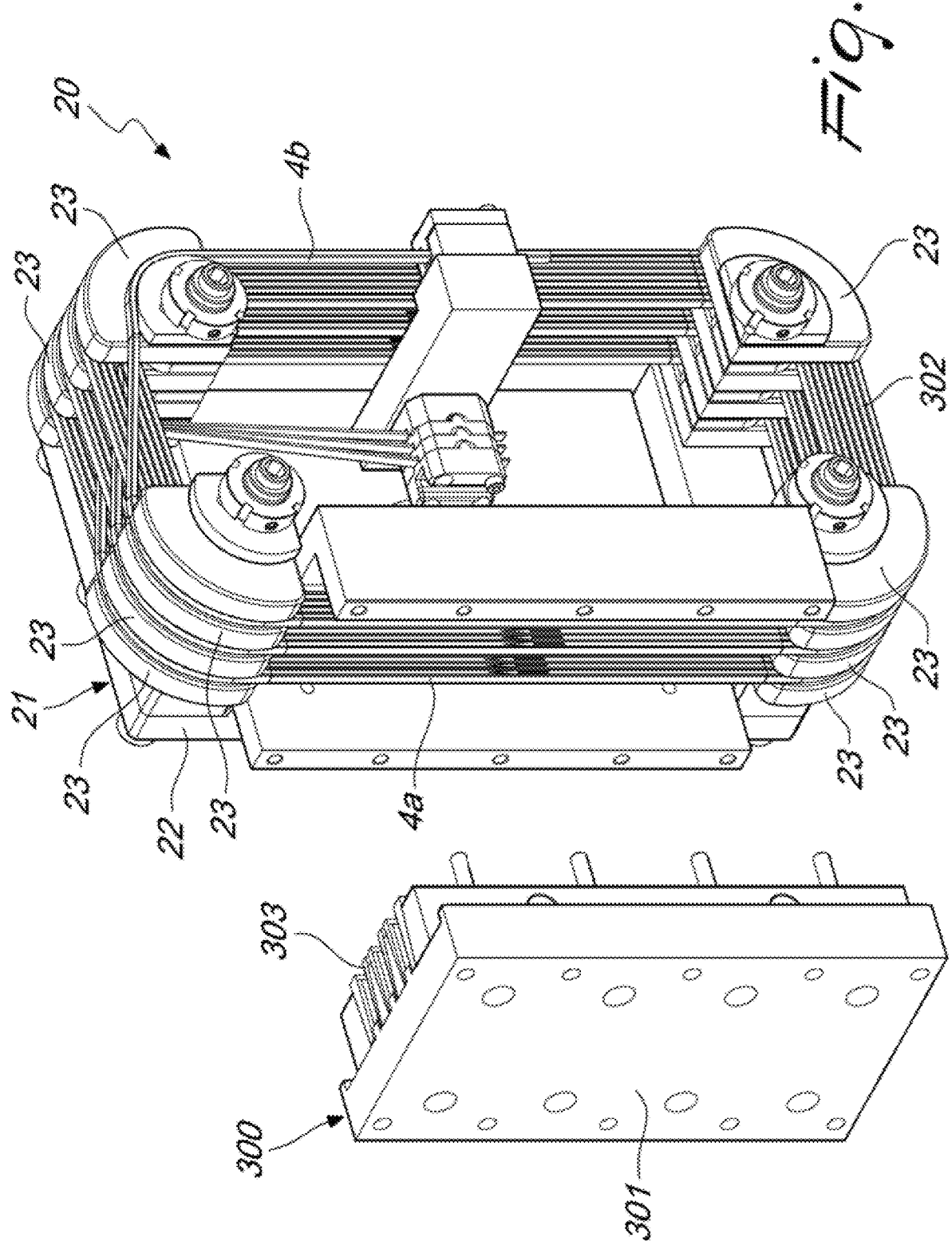
Figure 18A:
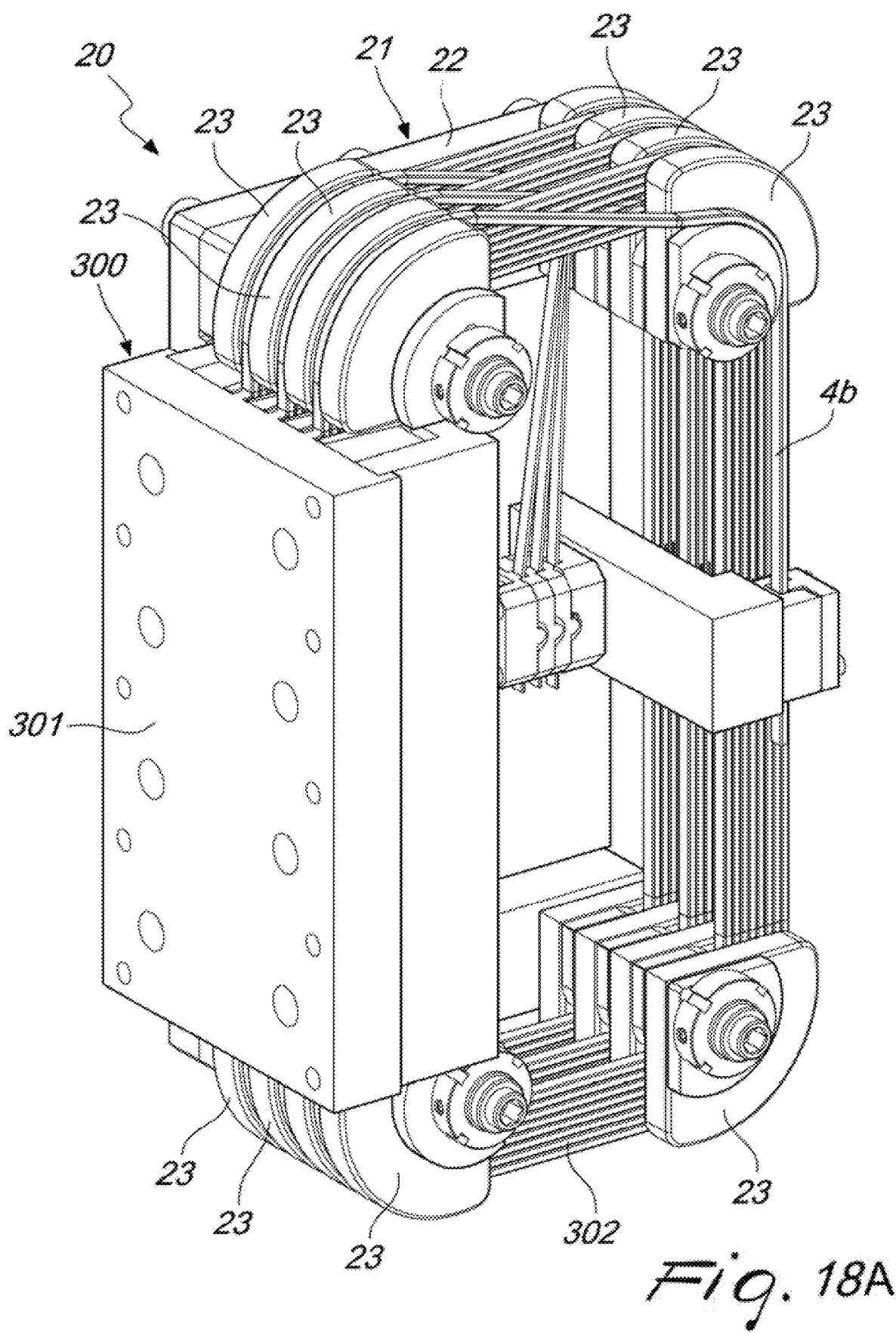
Figure 19A:
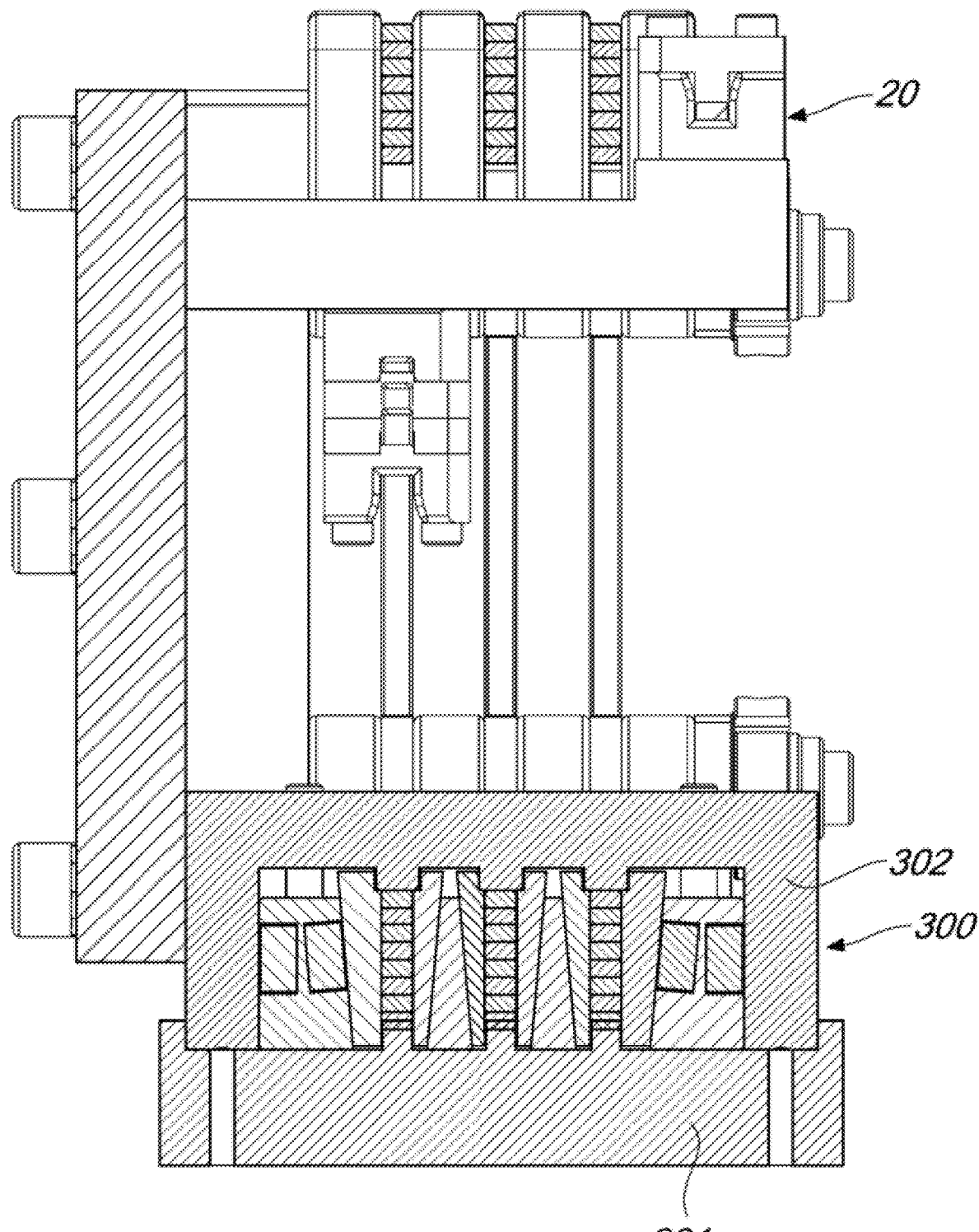
Figure 20:
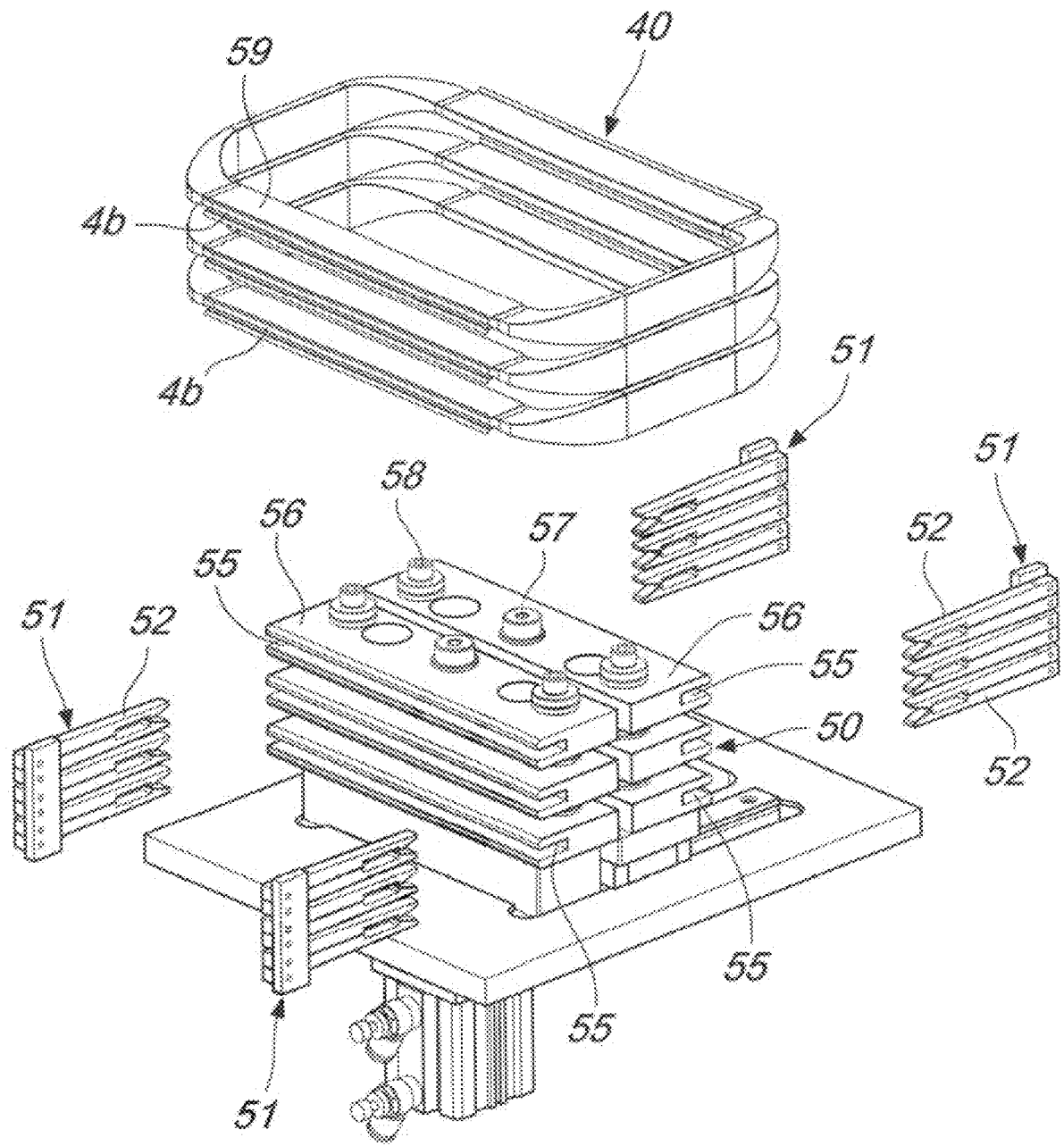
Figure 21:
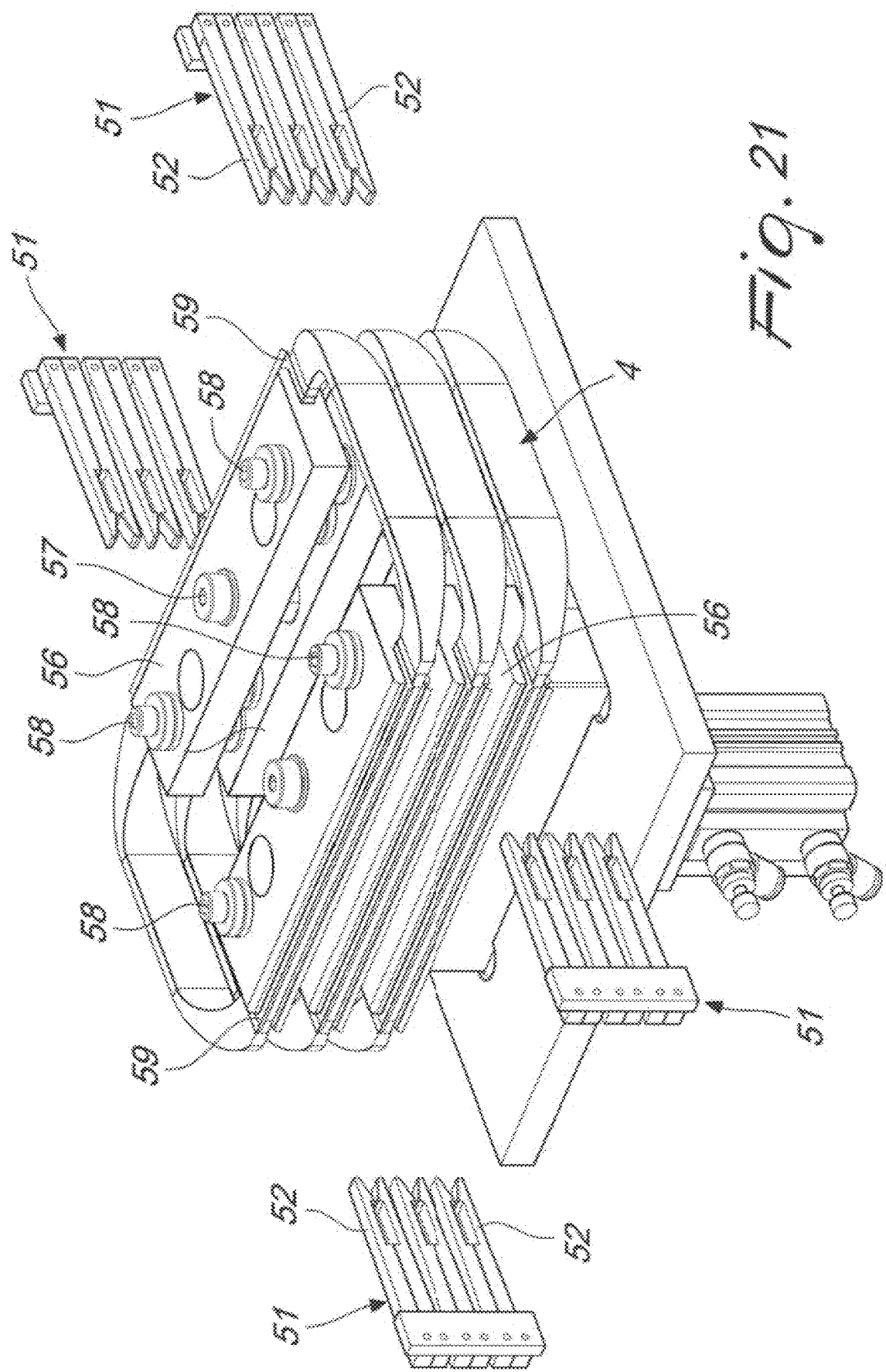
Figure 22:
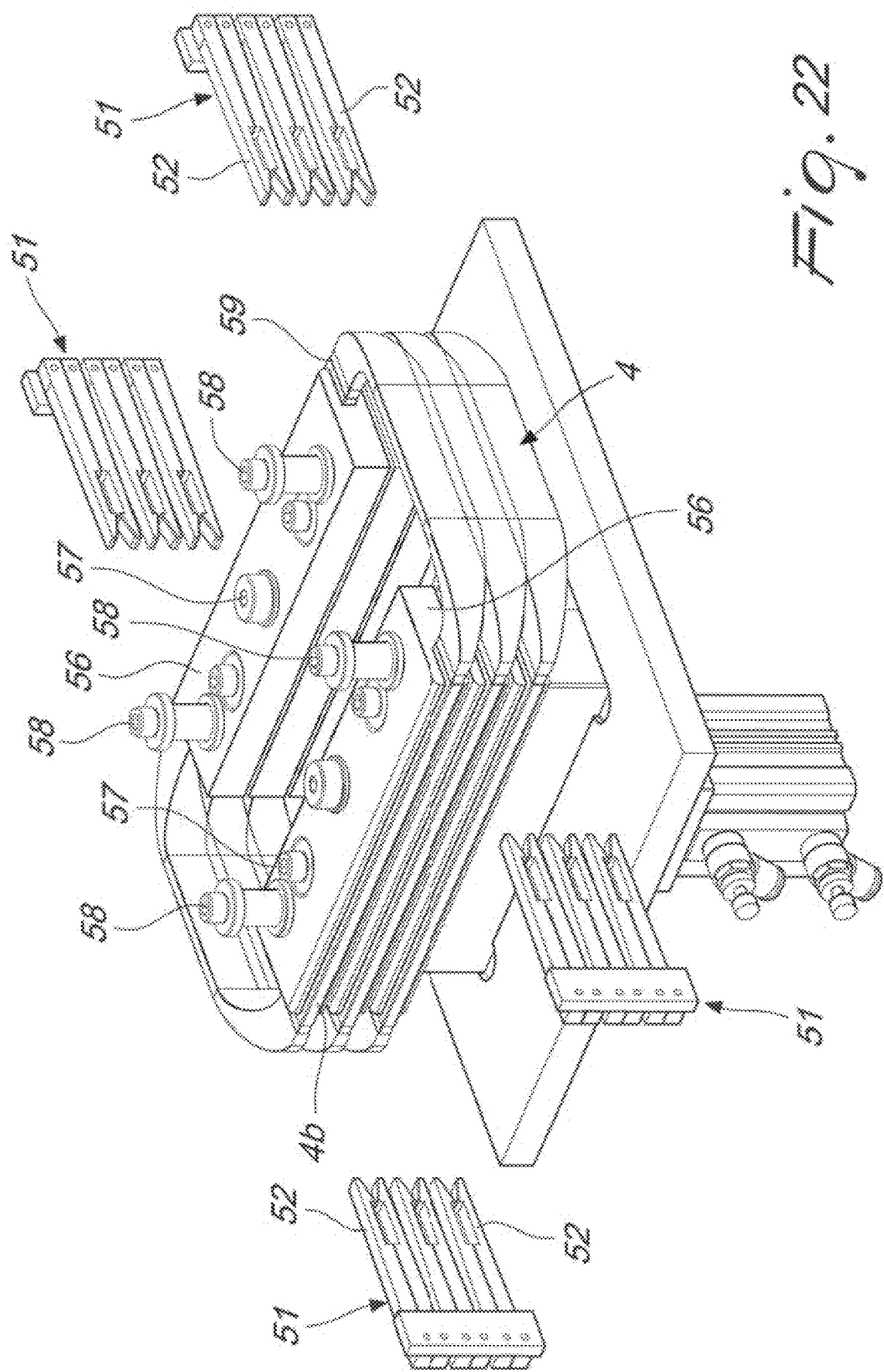
Figure 23:
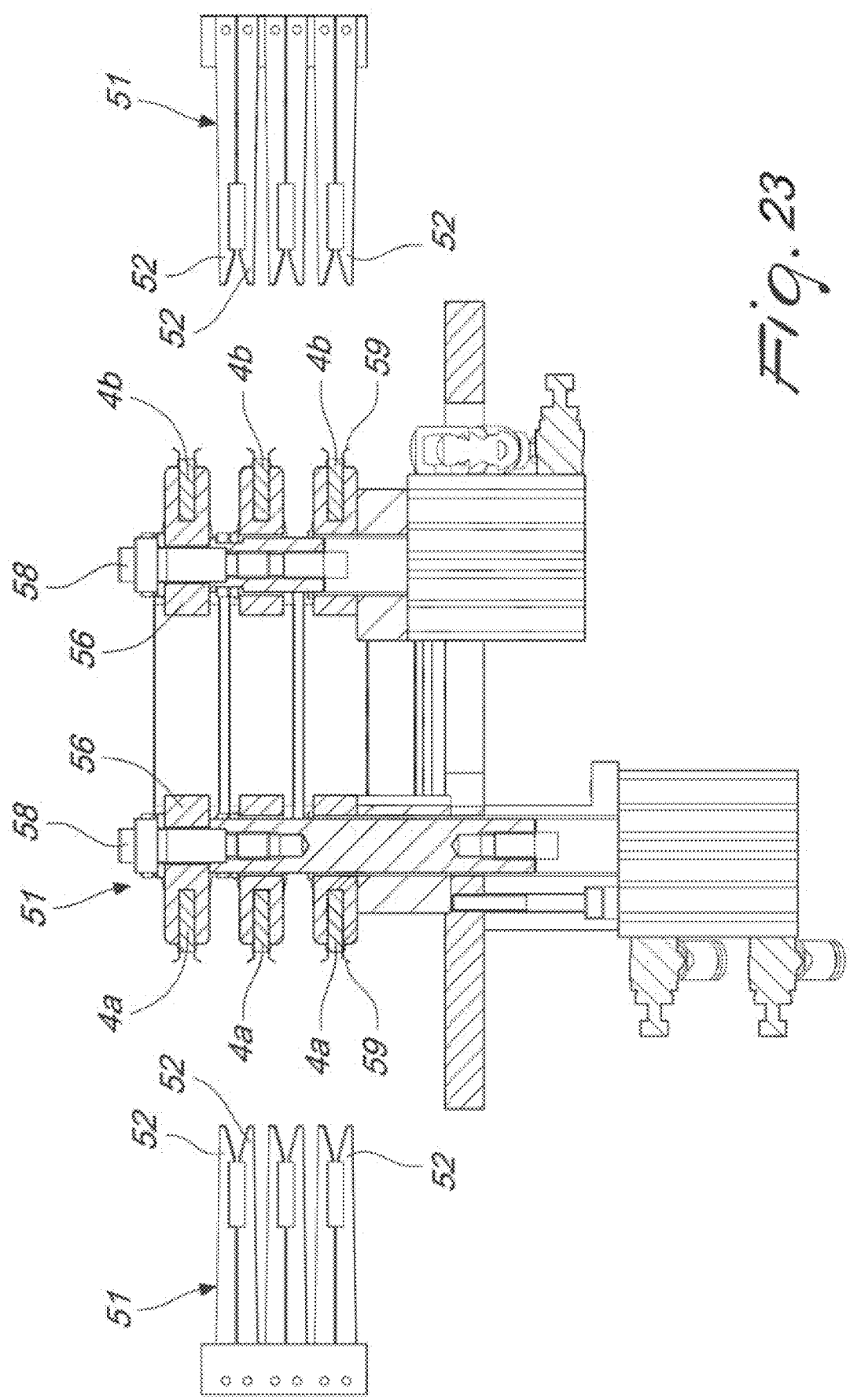
Figure 24:
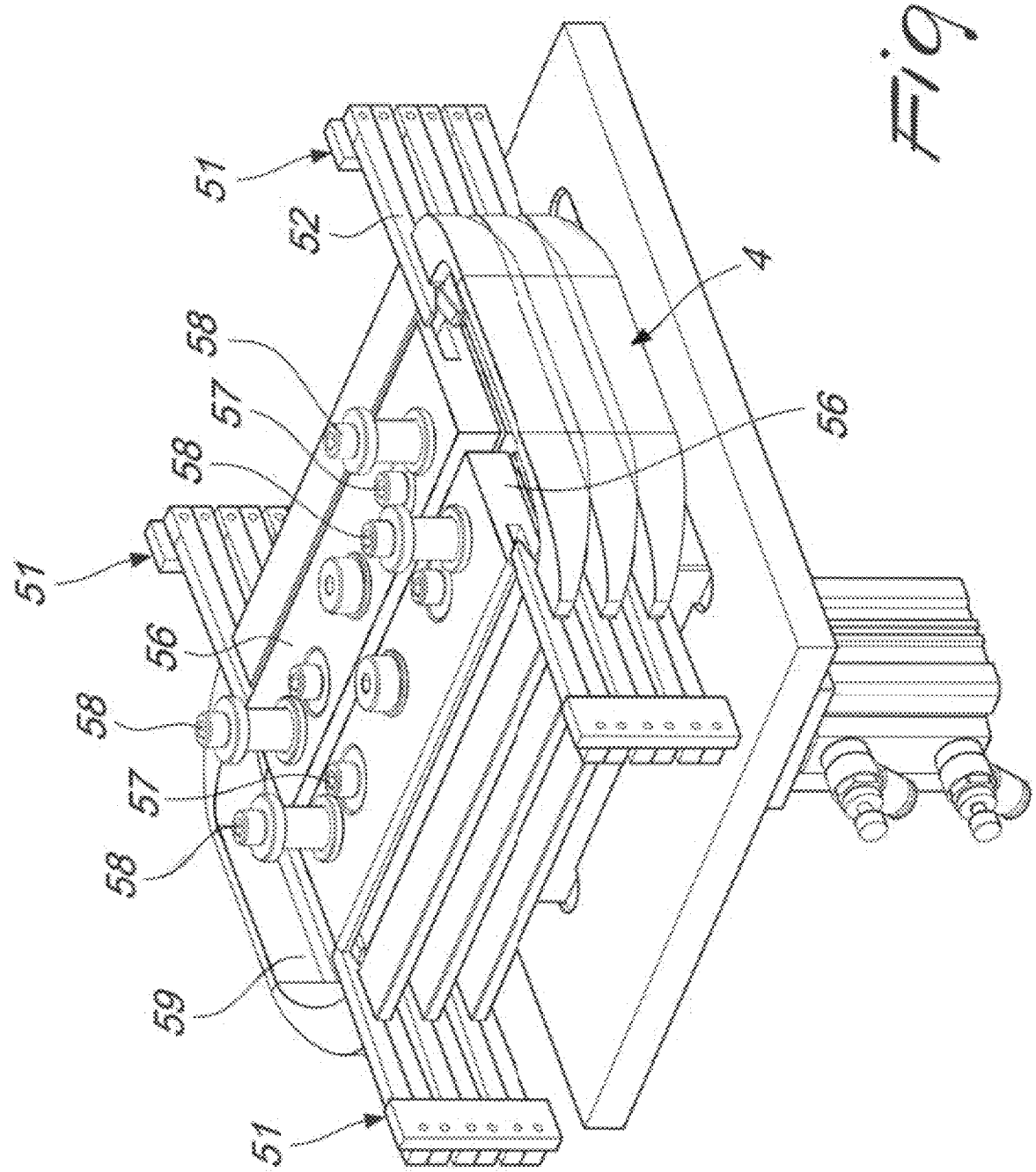
Figure 25:
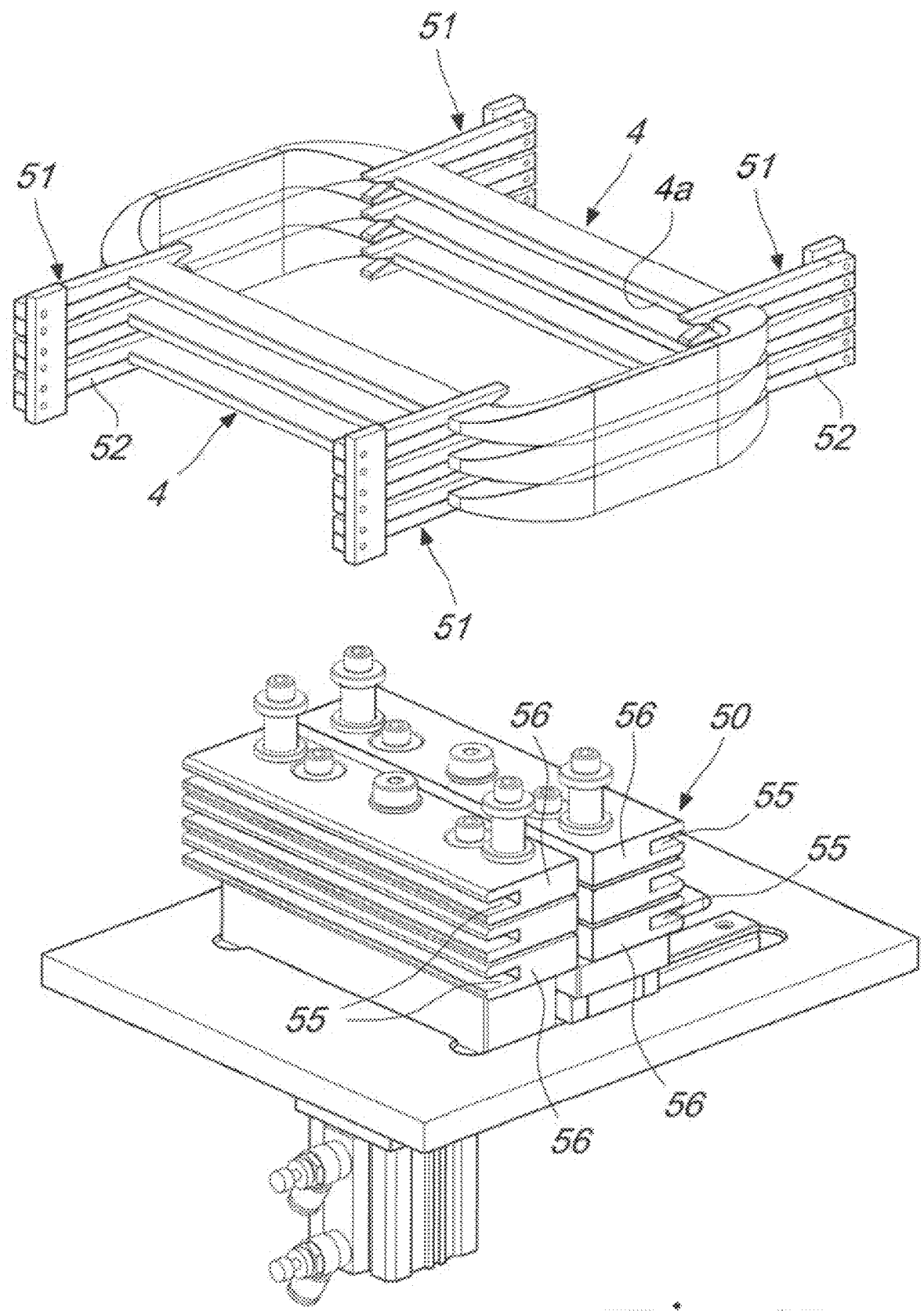
Figure 56:
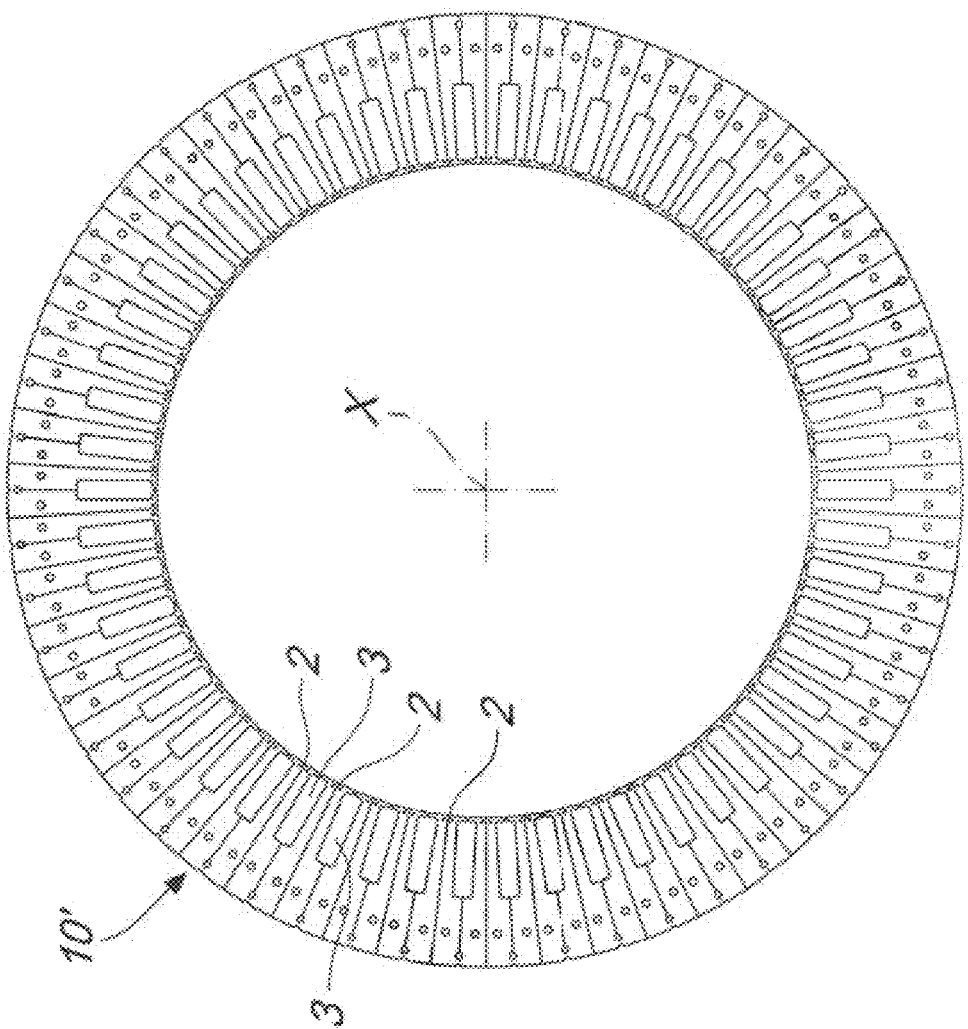
Figure 55:
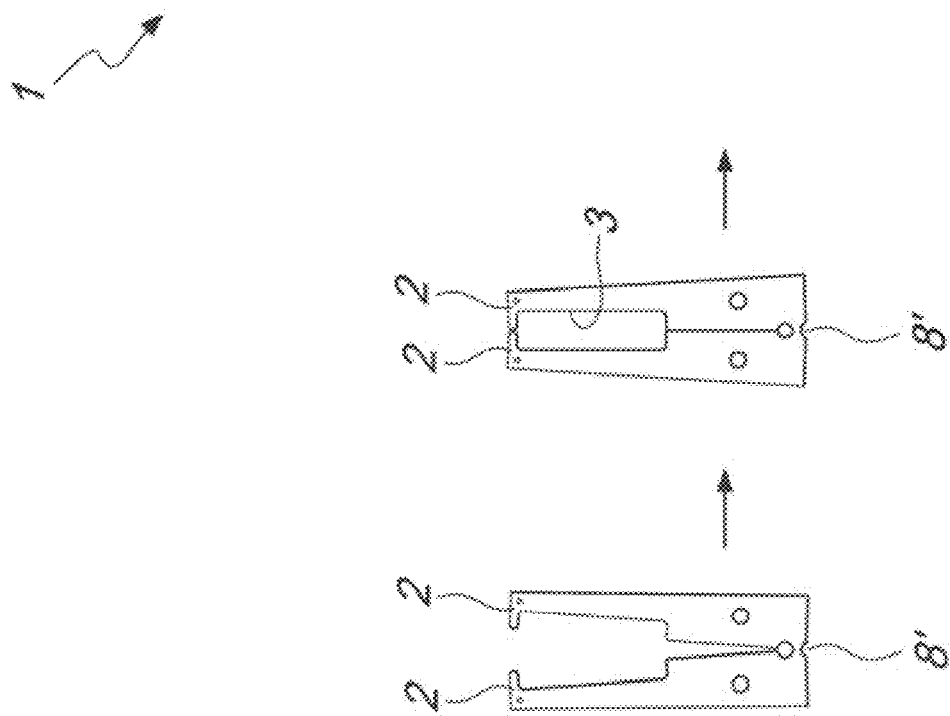
Figure 57:
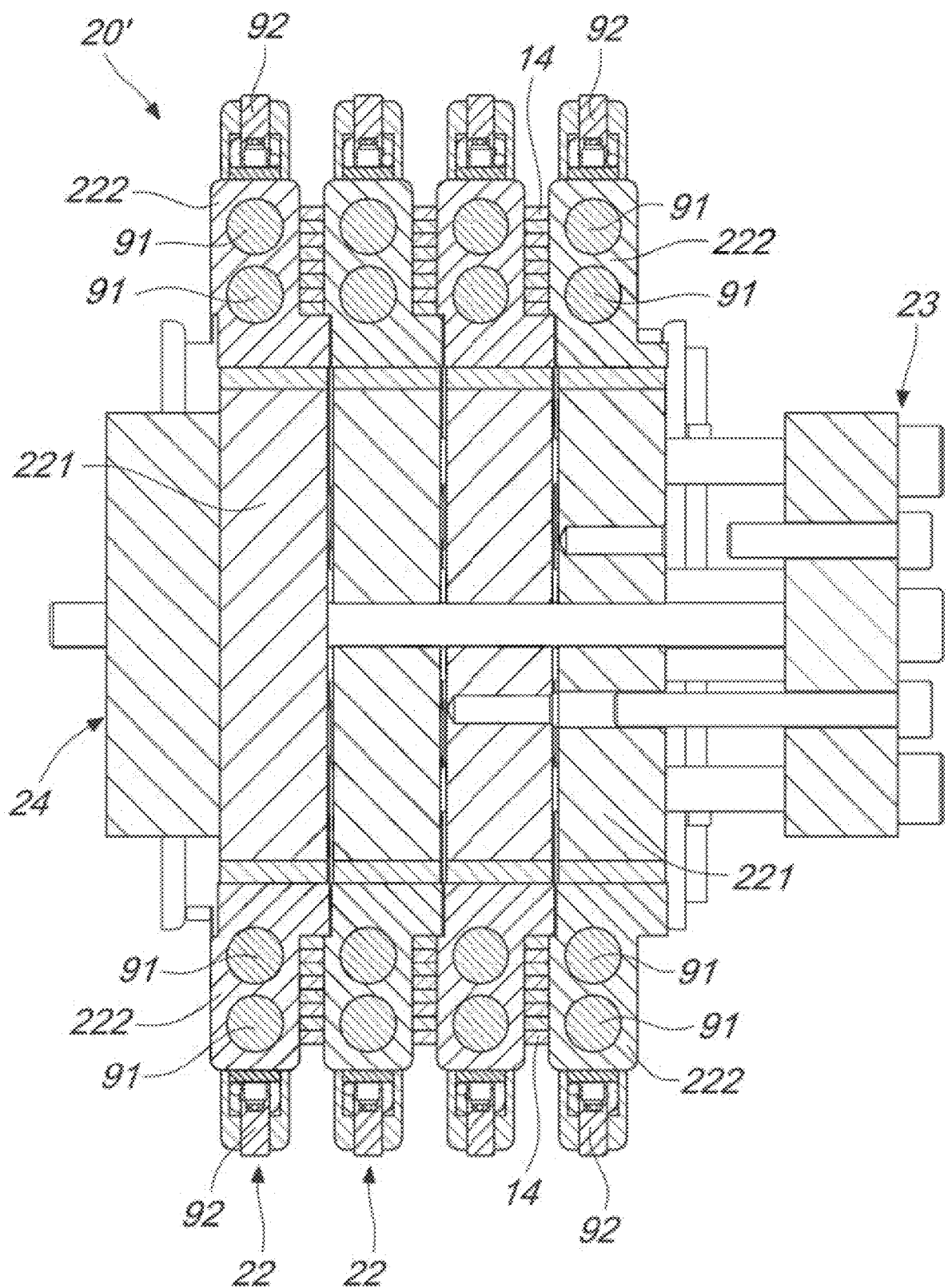
Figure 60:
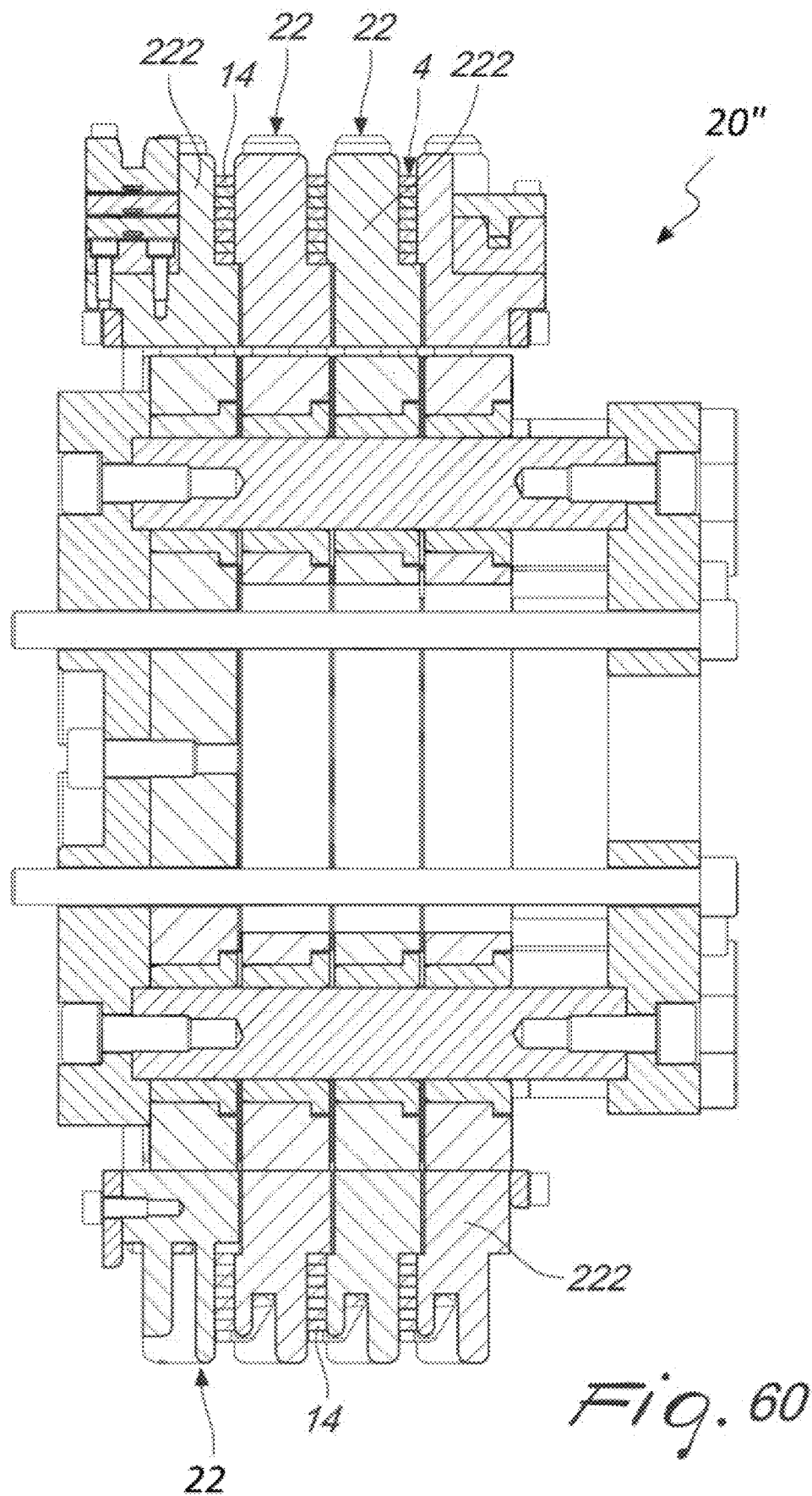
Figure 65:
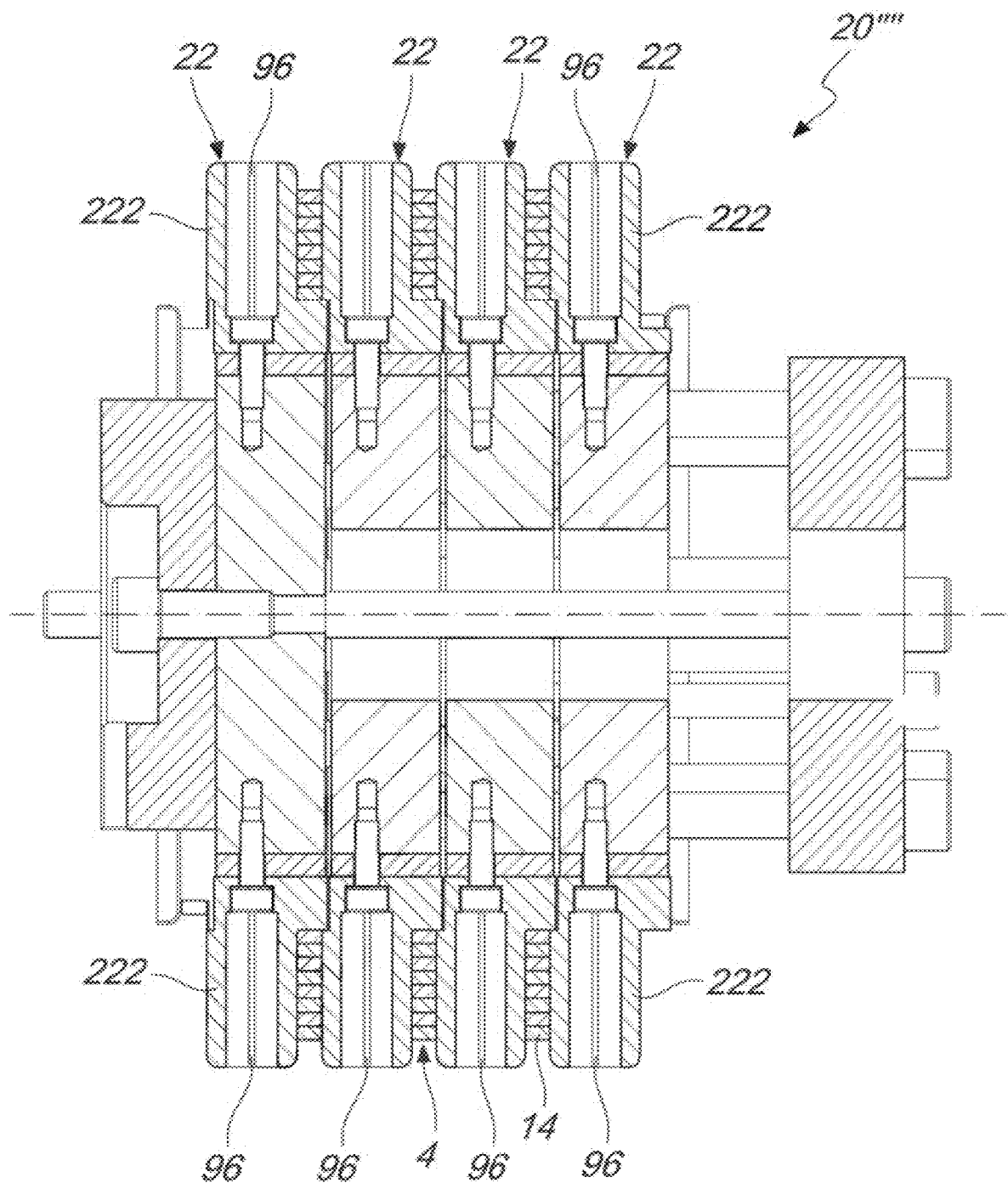
Figure 66A:
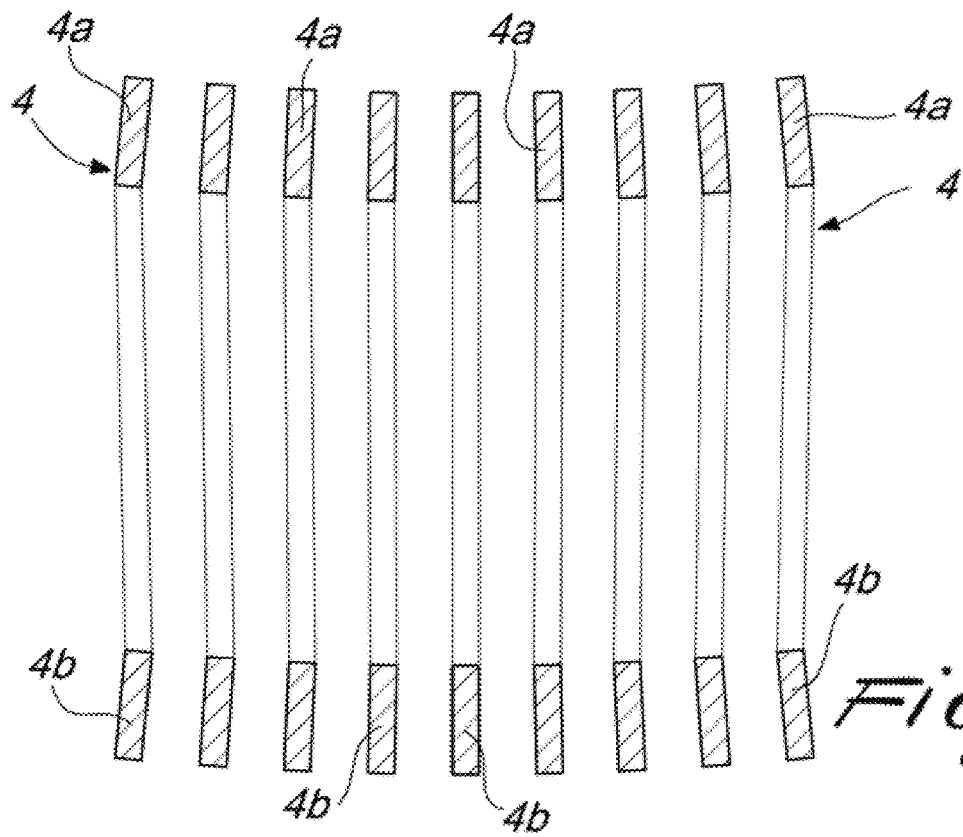
Figure 66B:
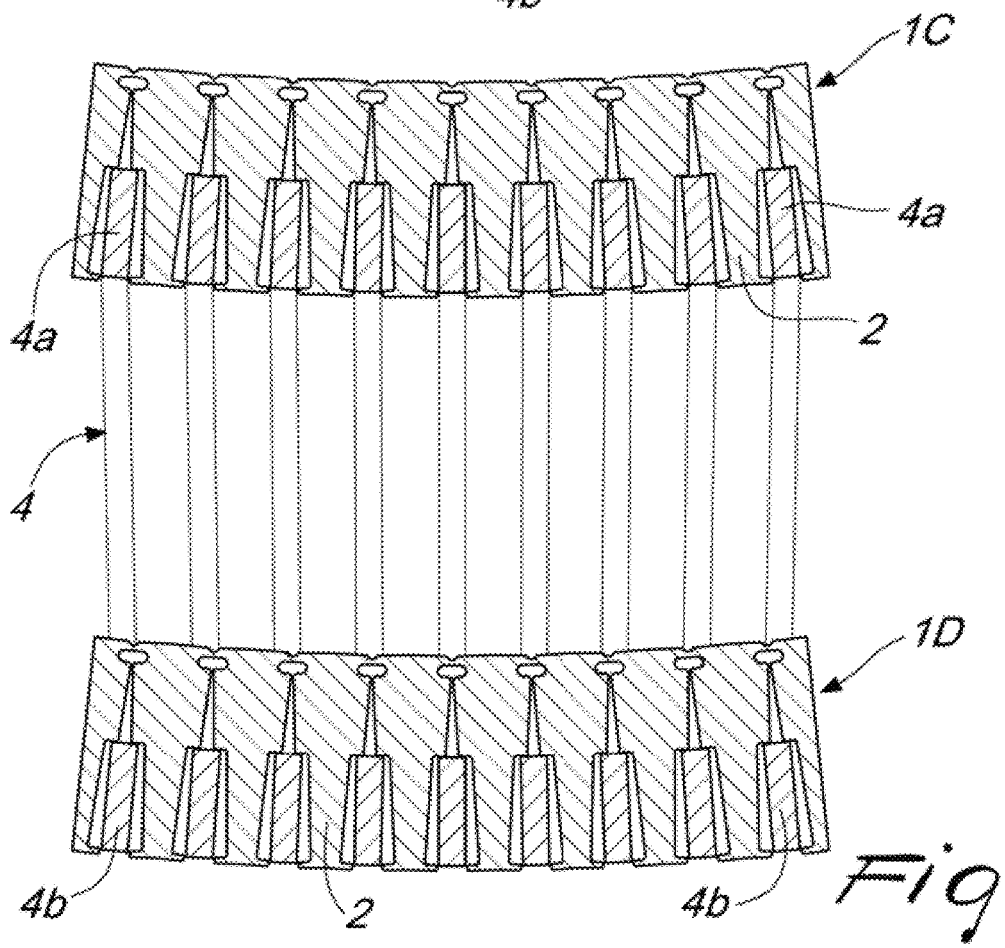
Figure 66C:
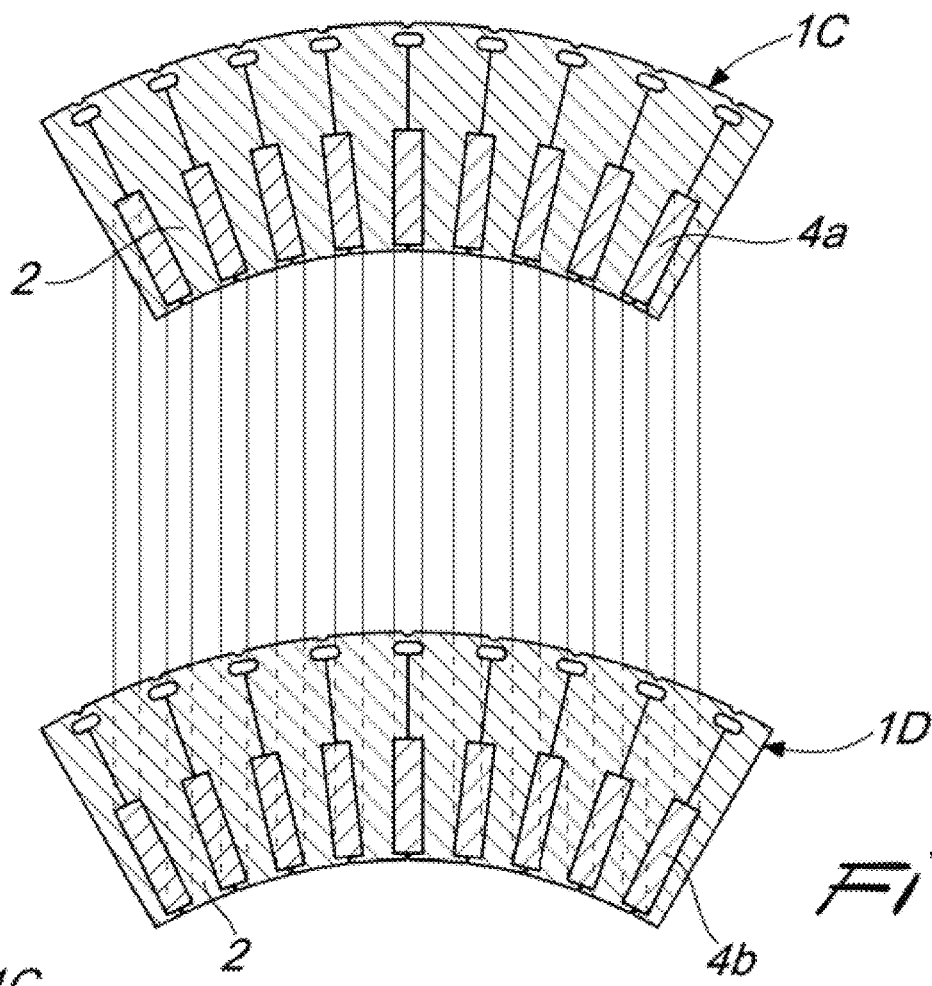
Figure 66D:
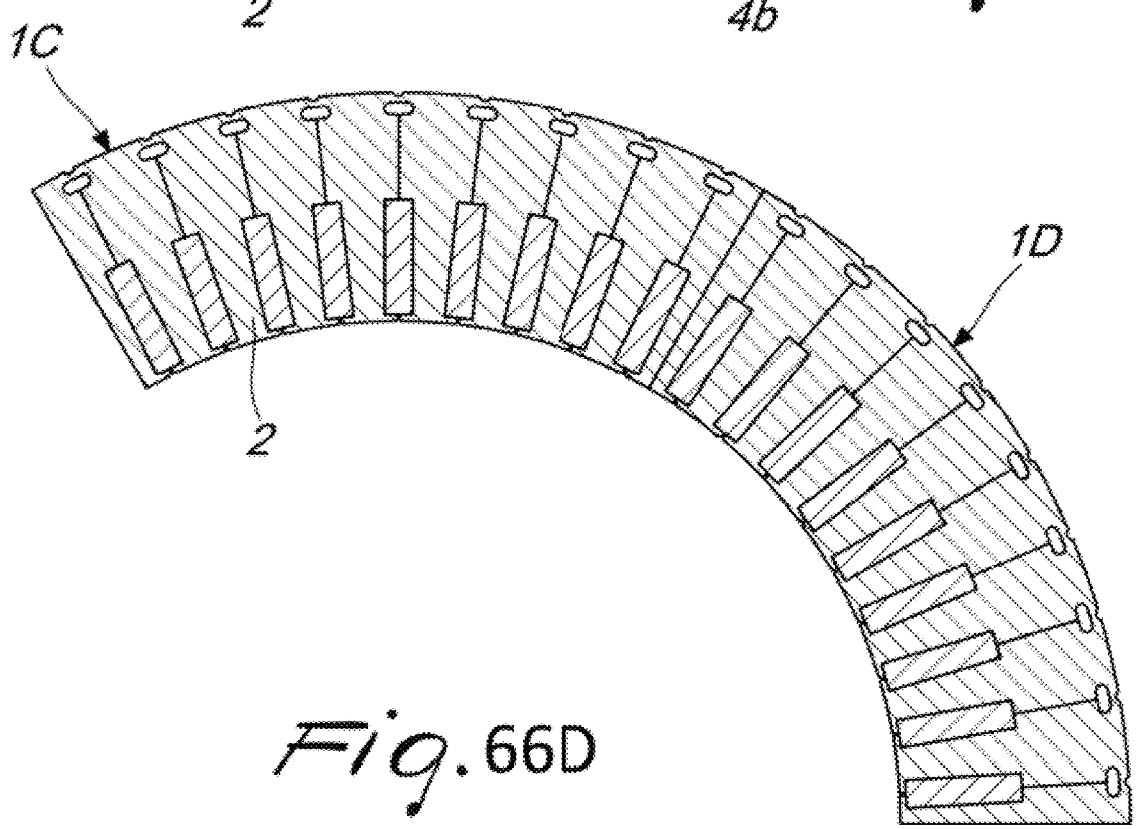
Figure 66E:
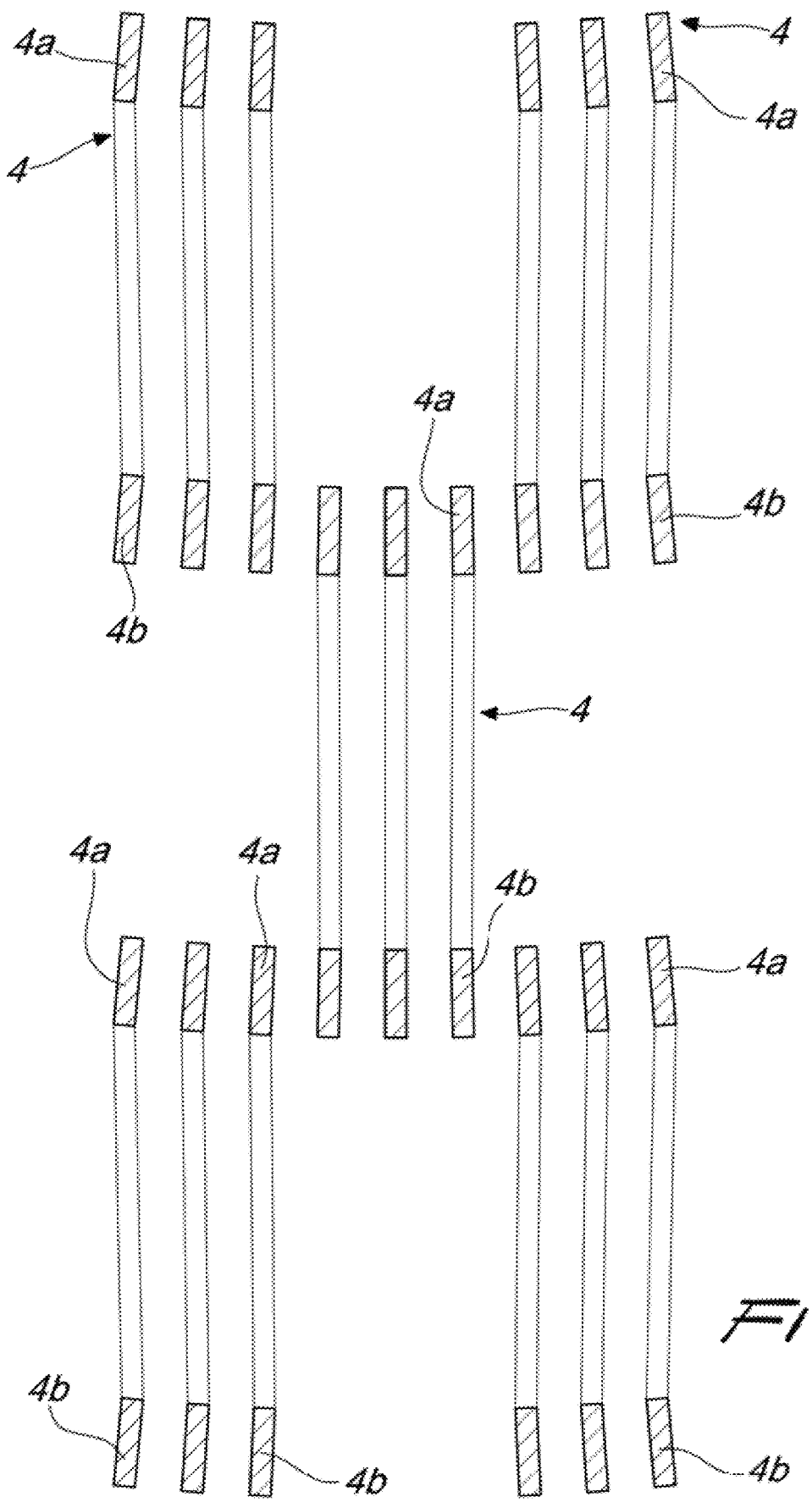
Figure 66G:
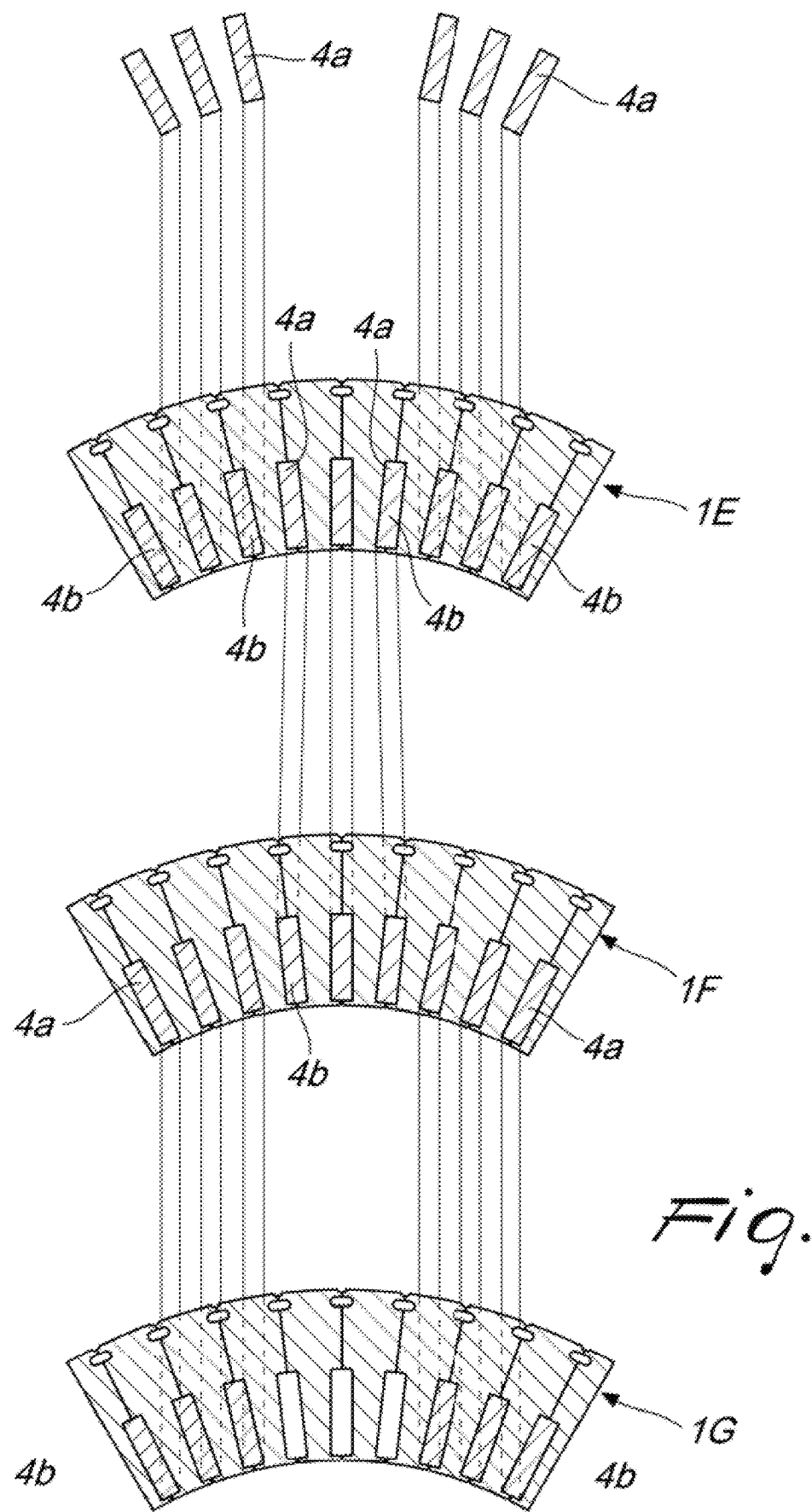
Figure 66H:
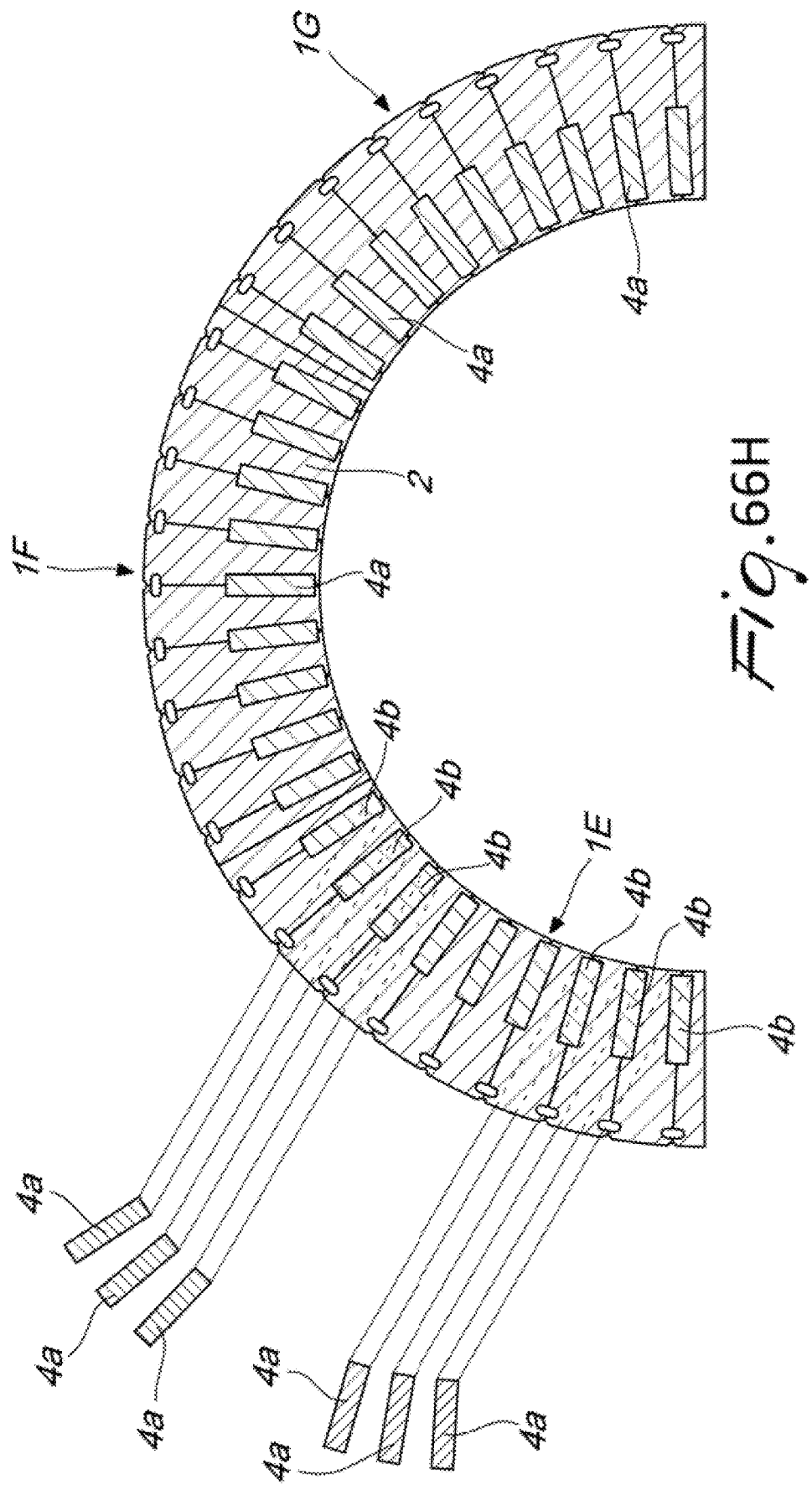
Figure 67A:
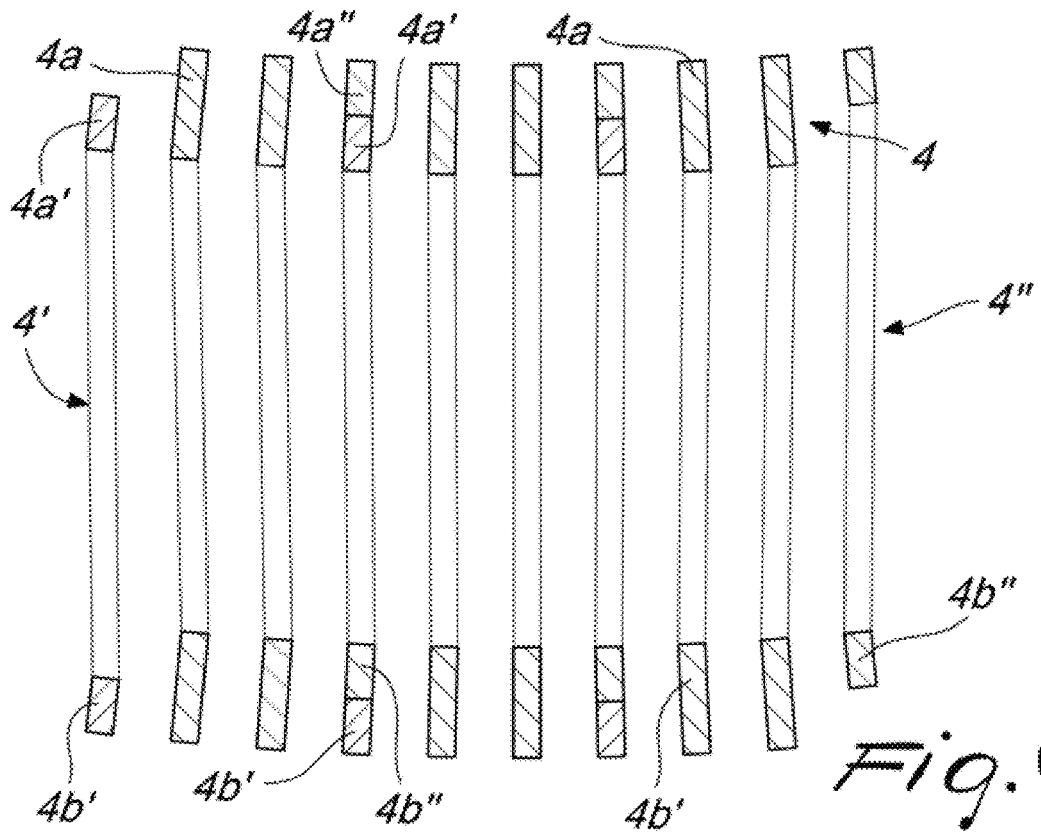
Figure 67B:
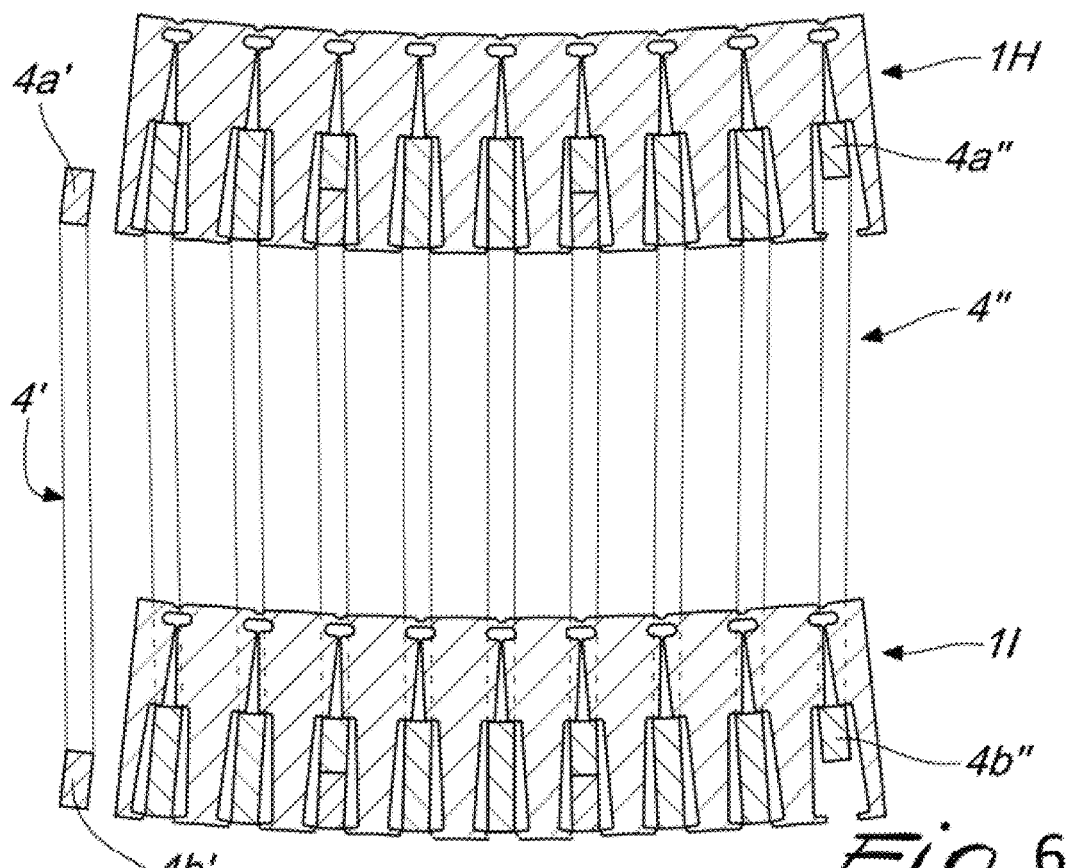
Figure 67C:
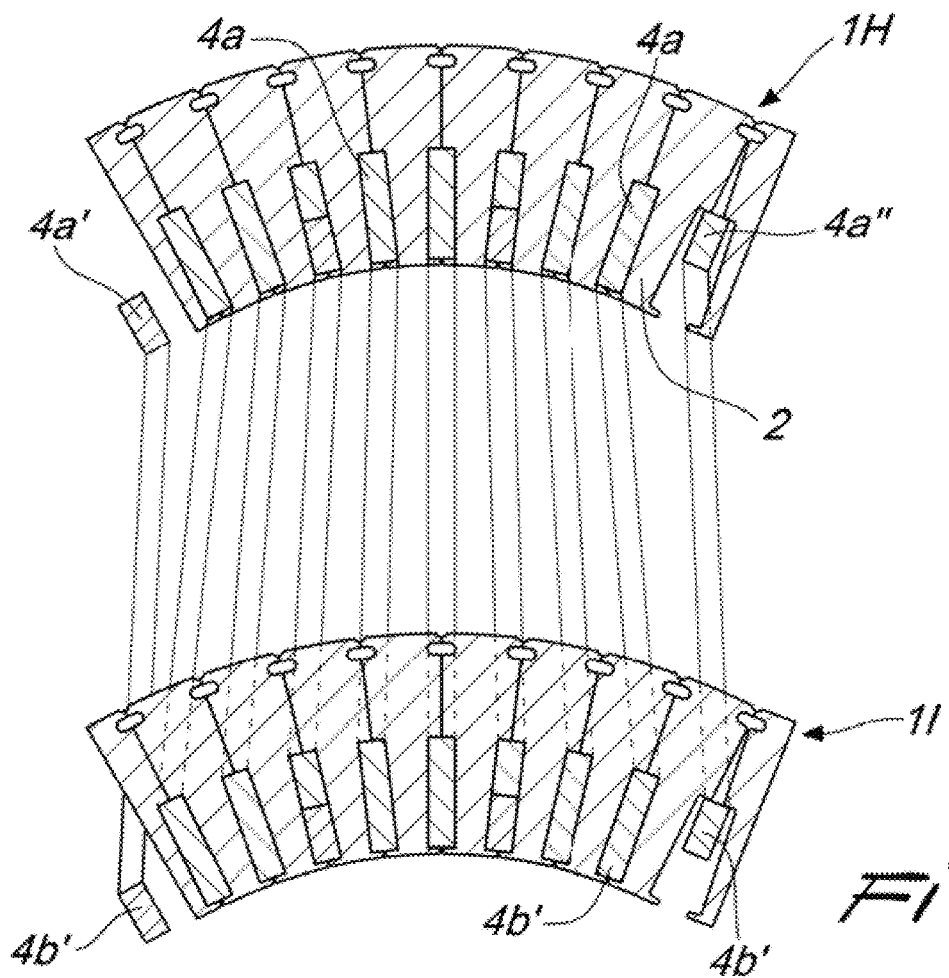
Figure 67D:
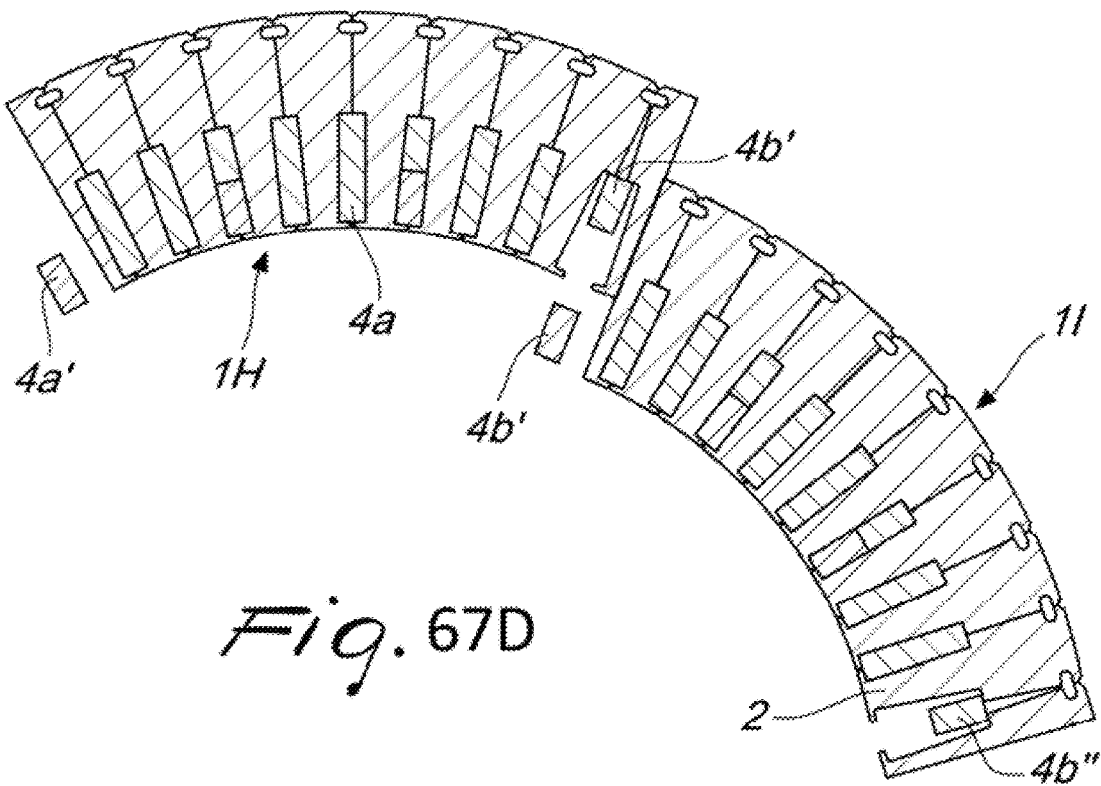
Figure 67E:
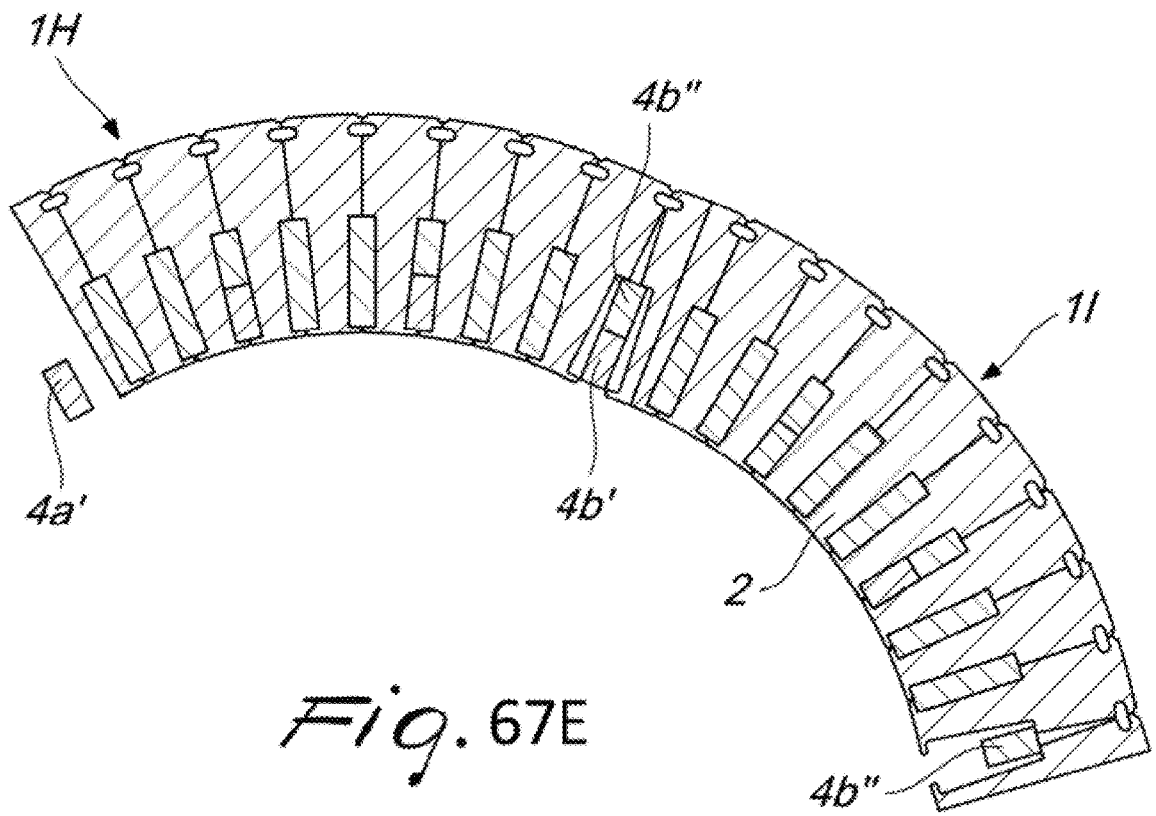
Figure 67F:
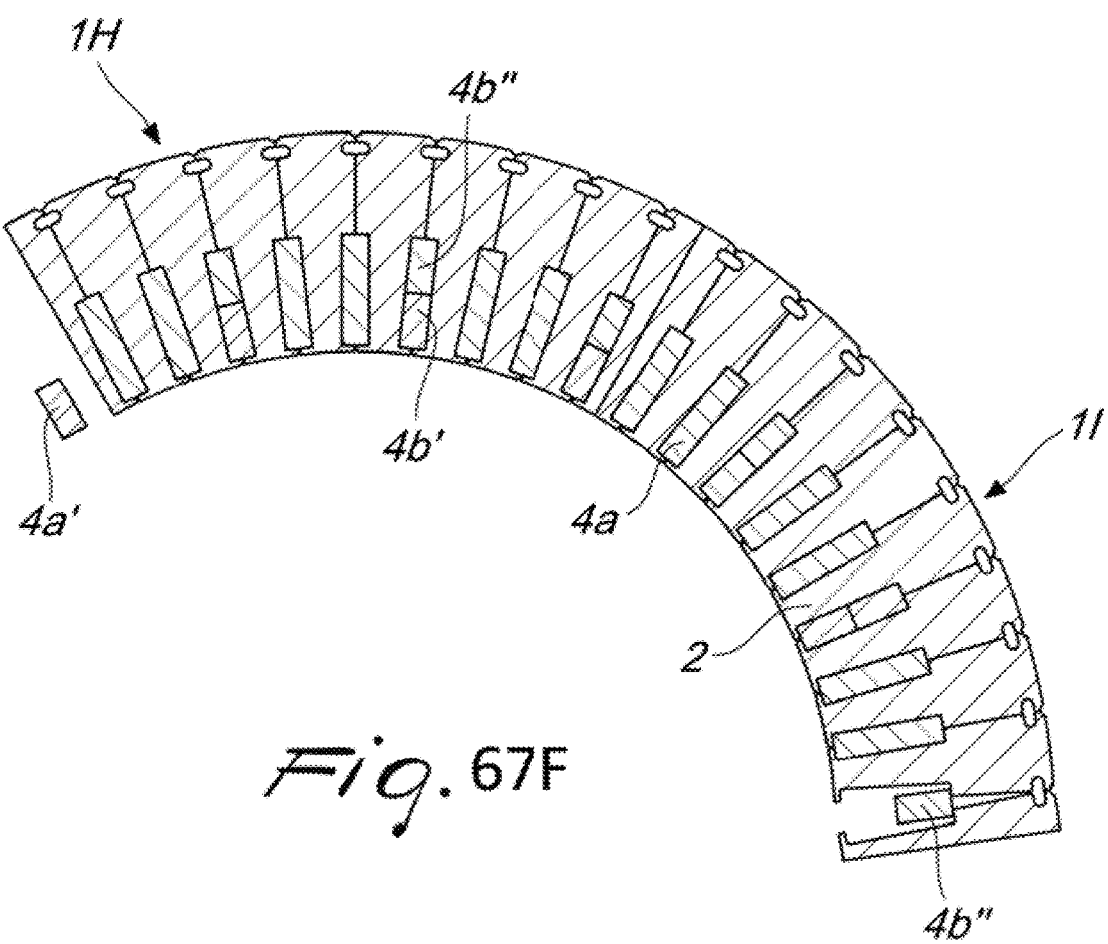
Figure 68A:
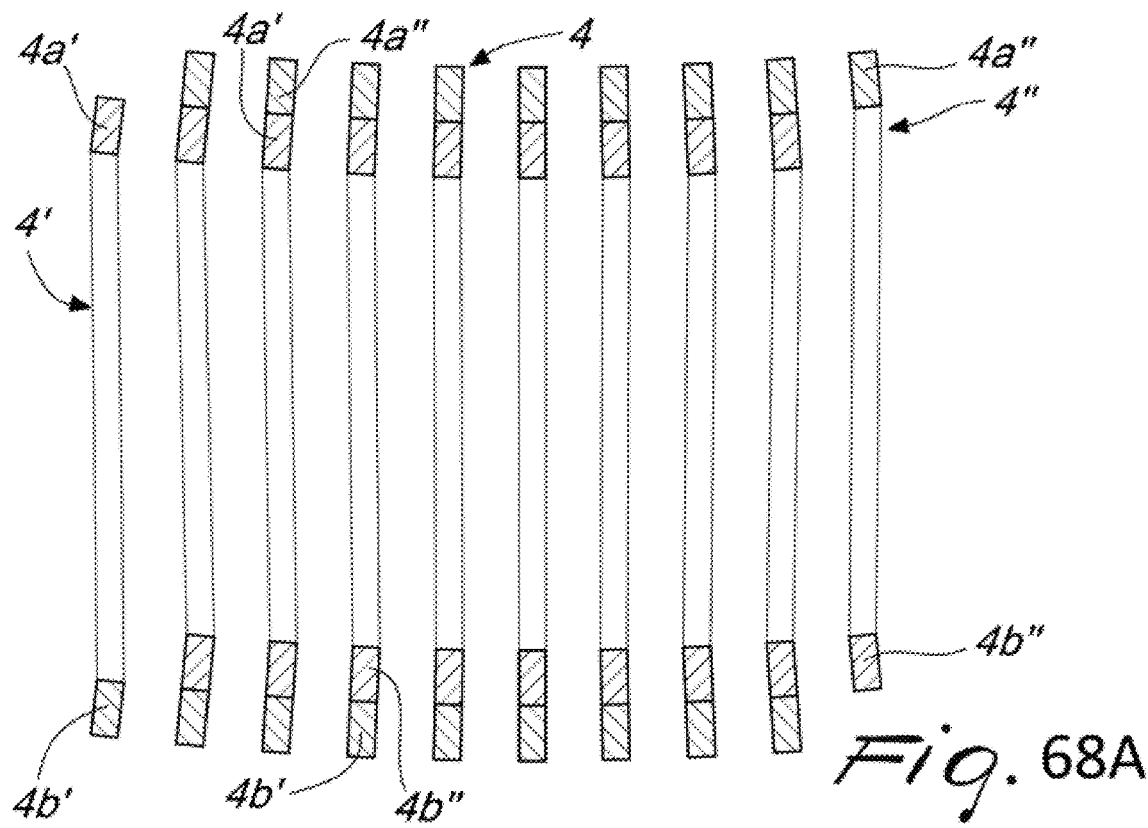
Figure 68B:
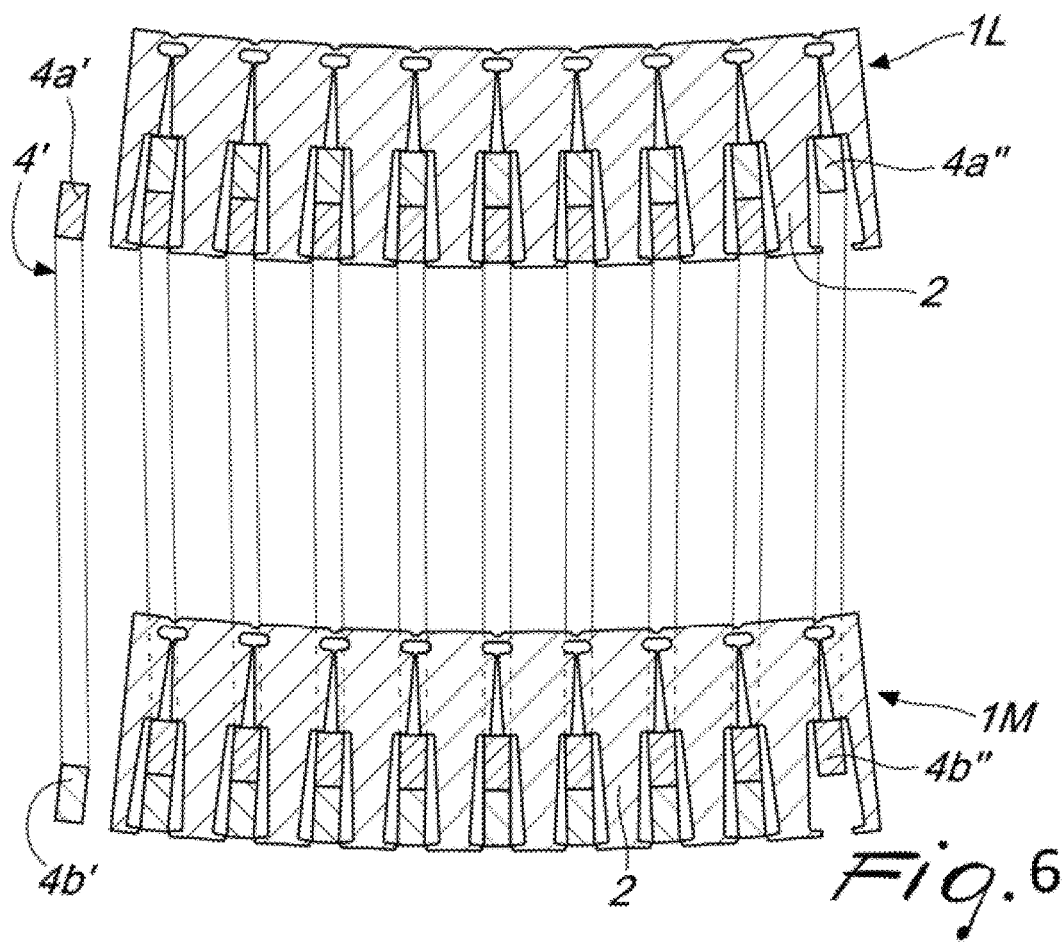
Figure 68C:
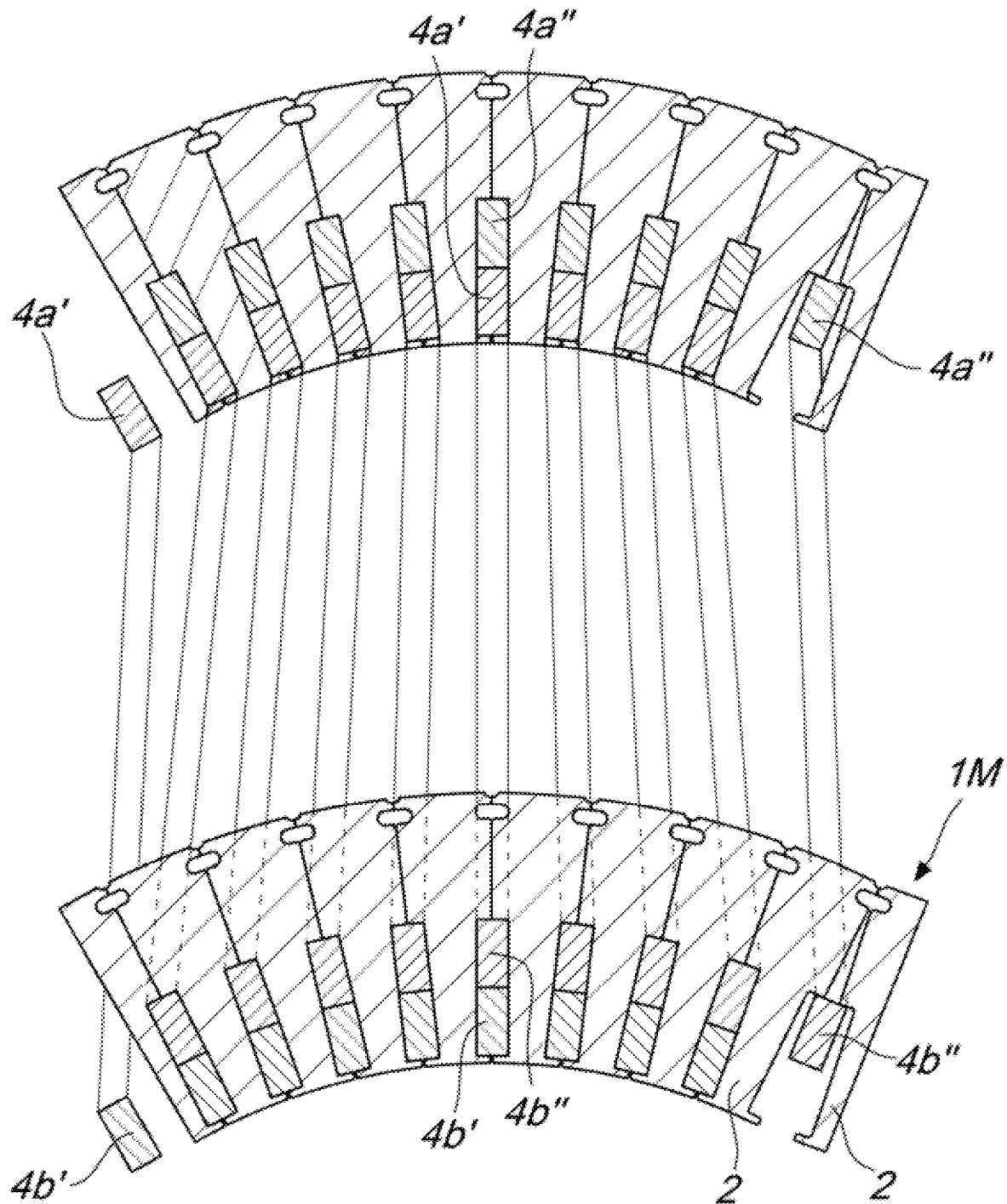
Figure 68D:
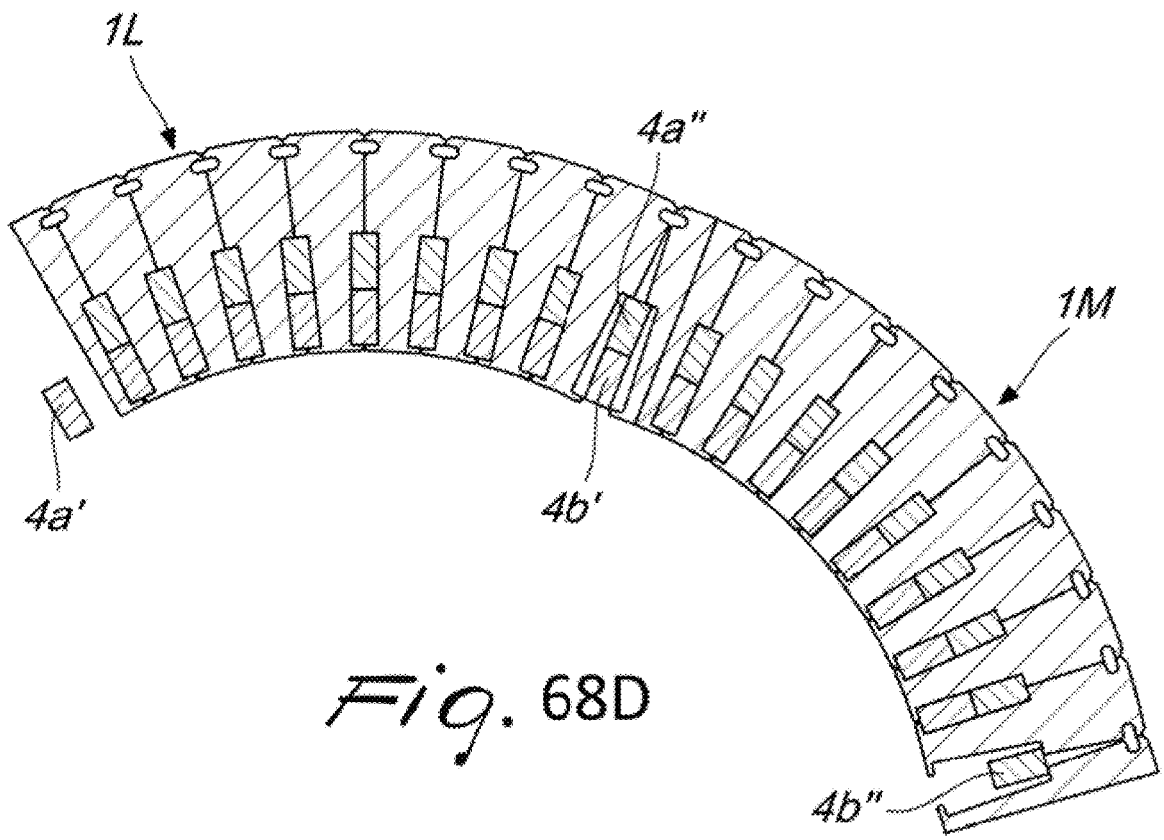
Figure 68E:
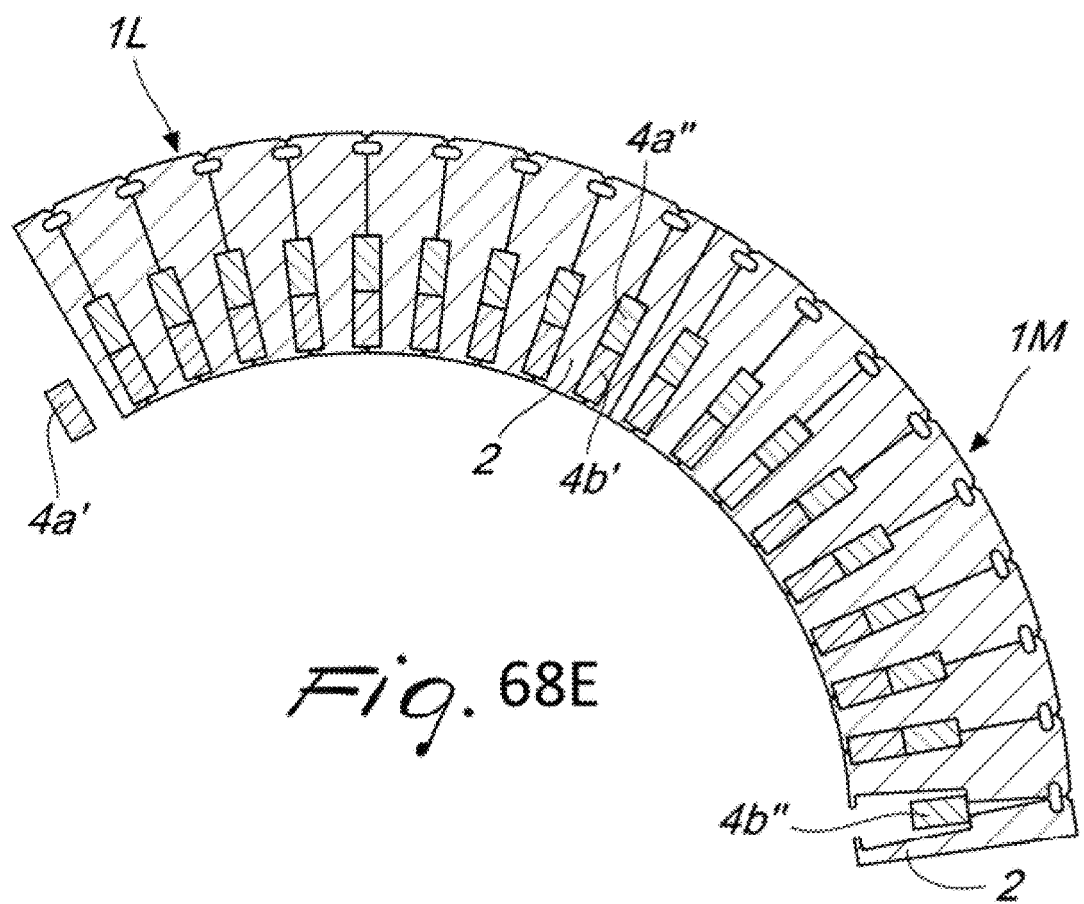
Figure 69A:
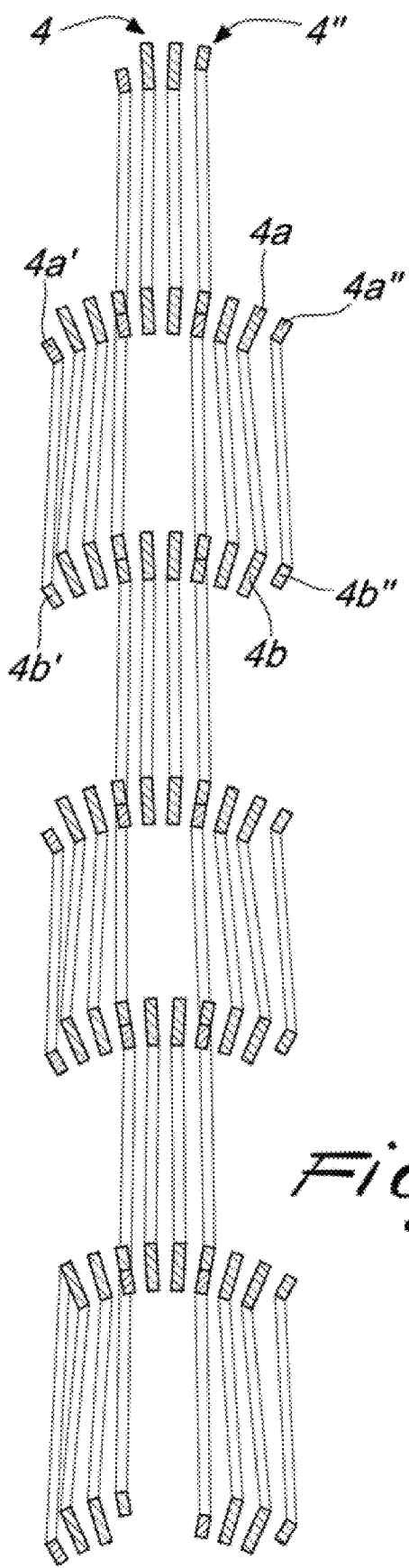
Figure 69B:
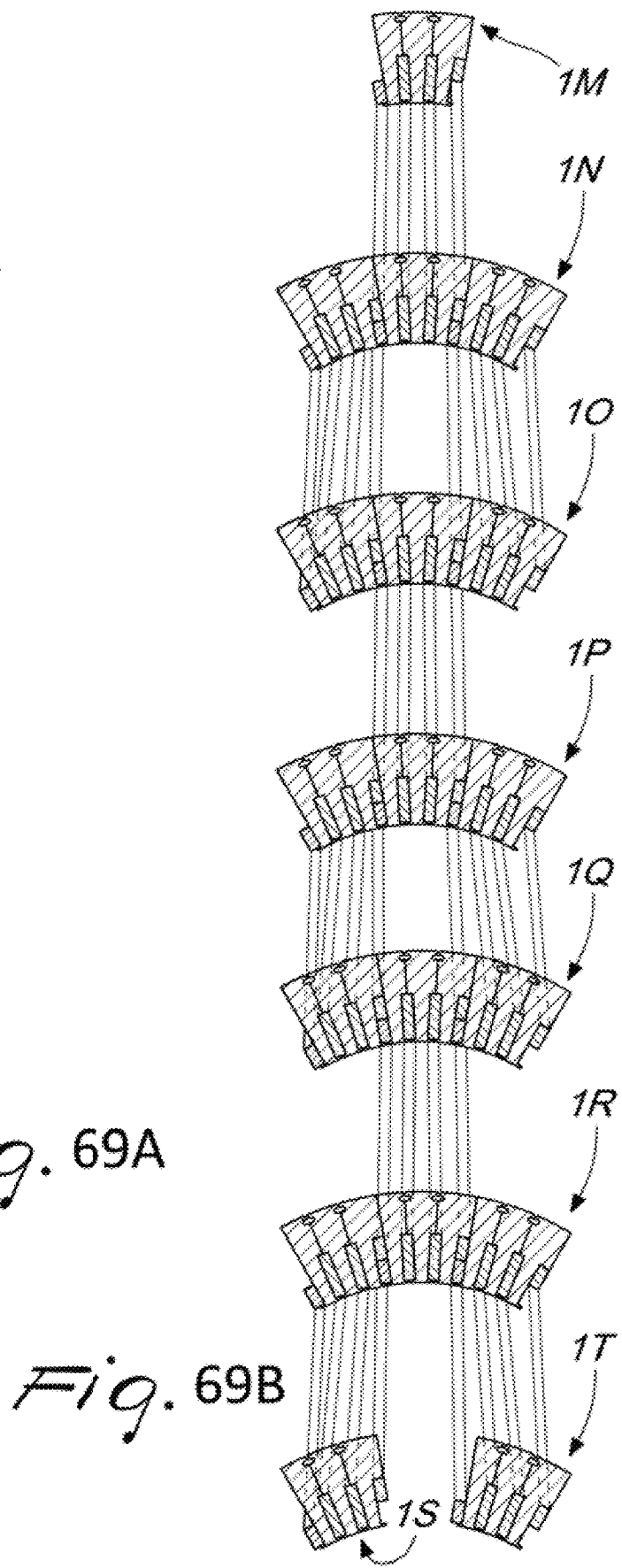
Figure 69C:
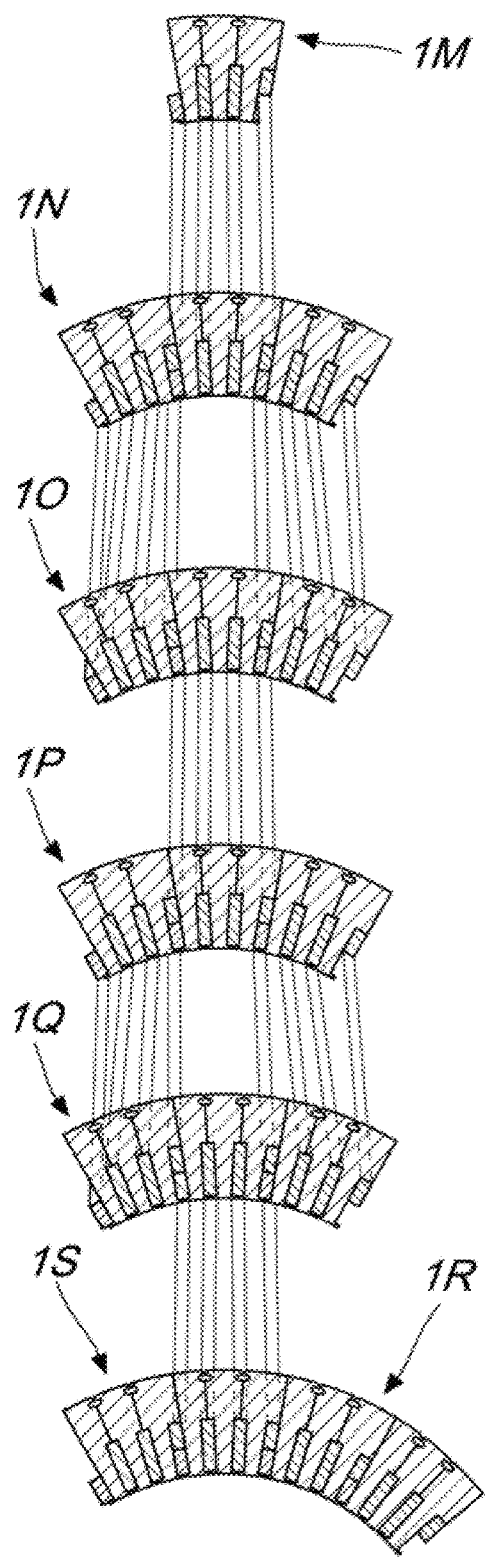
Figure 69D:
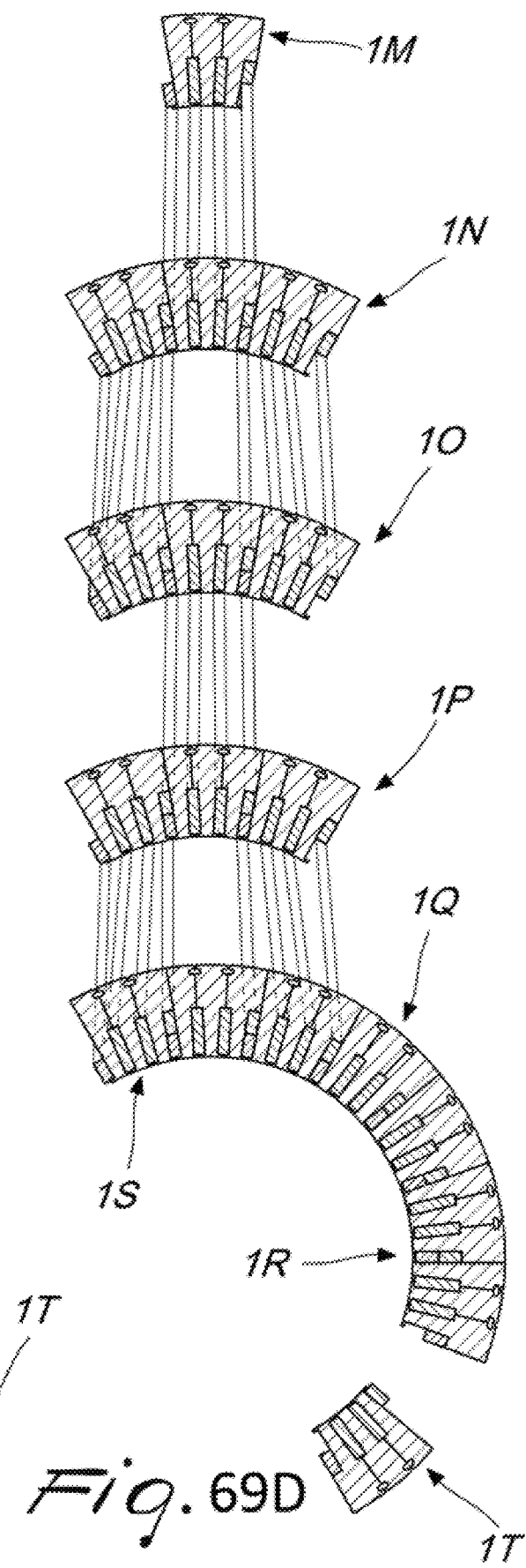
Figures 69E, 69F:
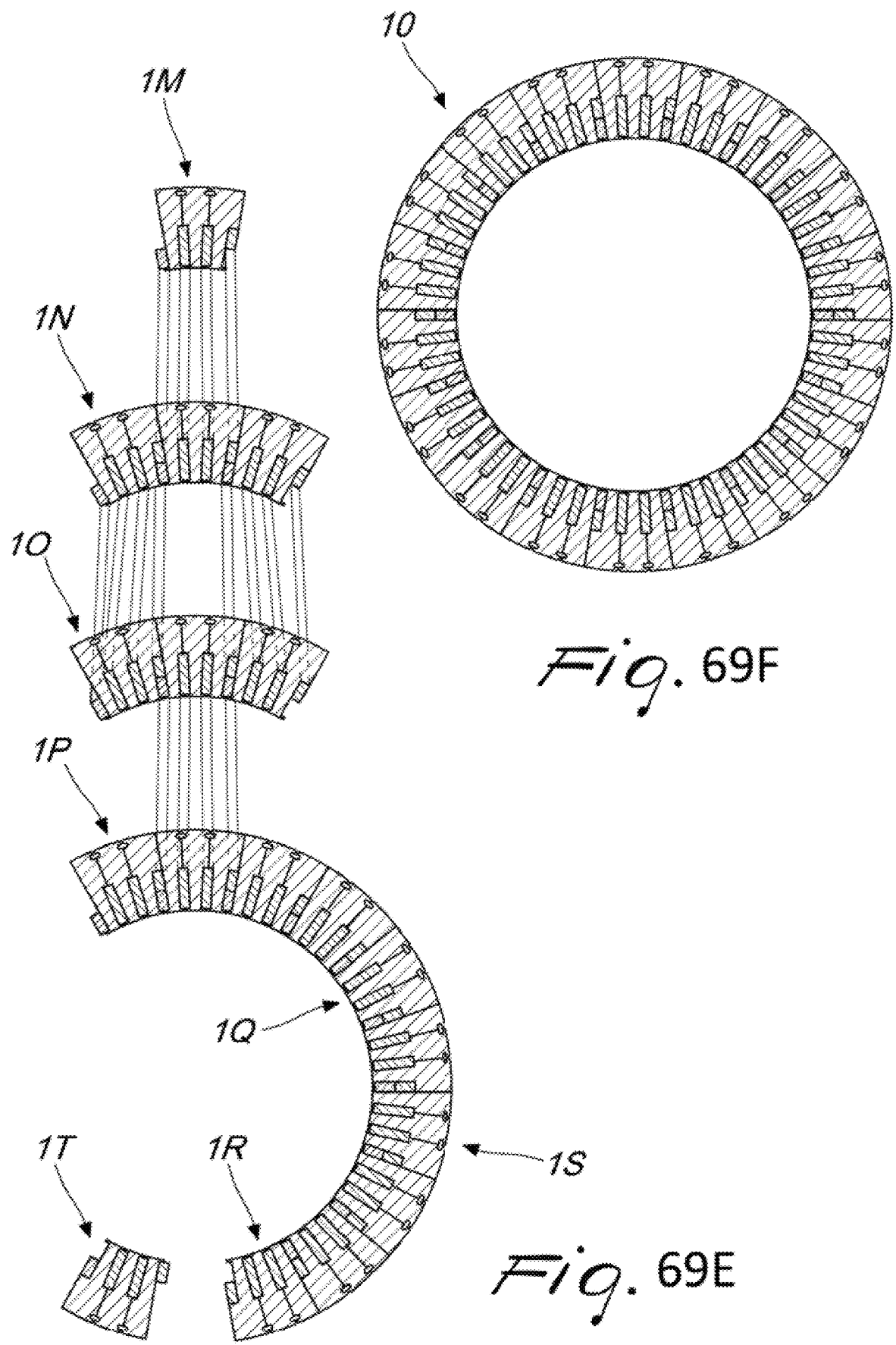
Figure 70A:
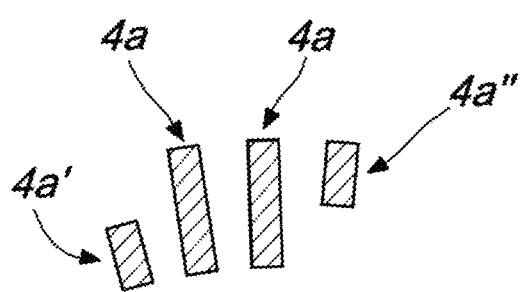
Figure 70B:
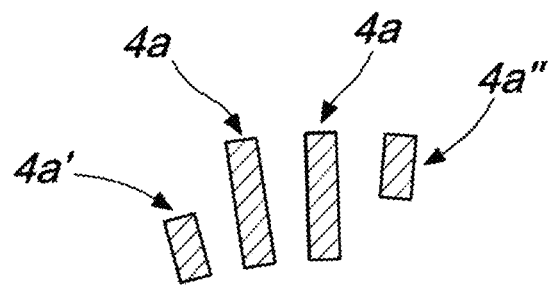
Figure 70C:
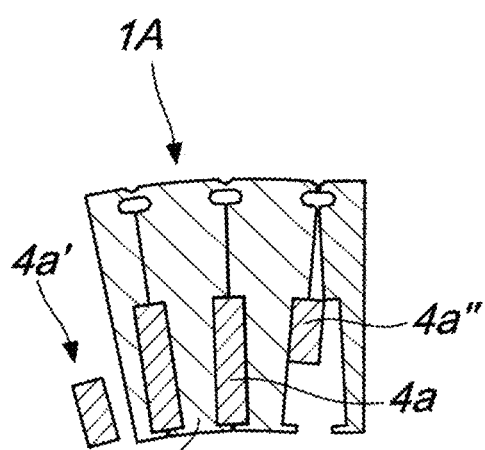
Figure 70D:
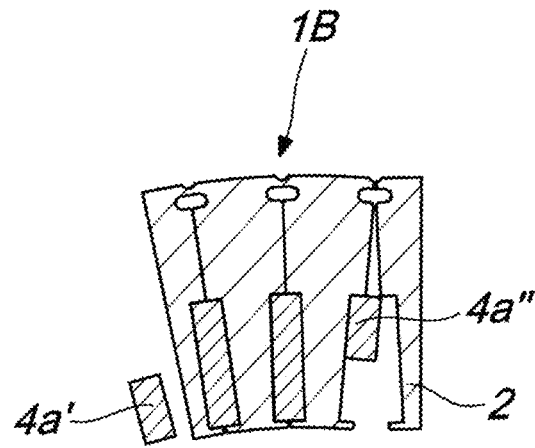
Figure 70E:
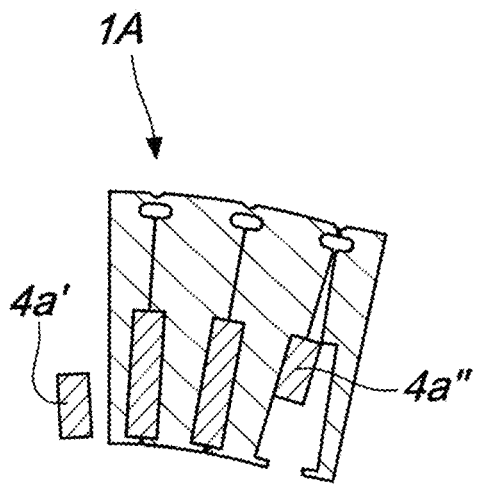
Figure 70F:
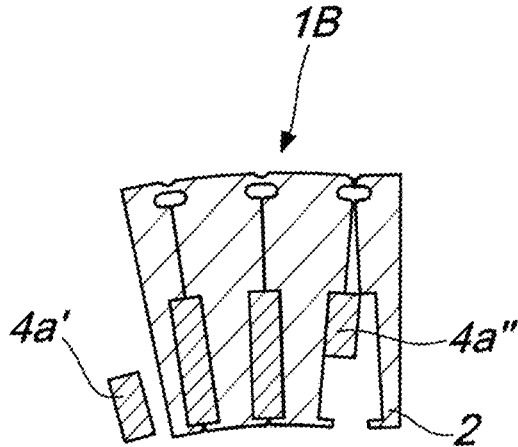
Figure 70G:
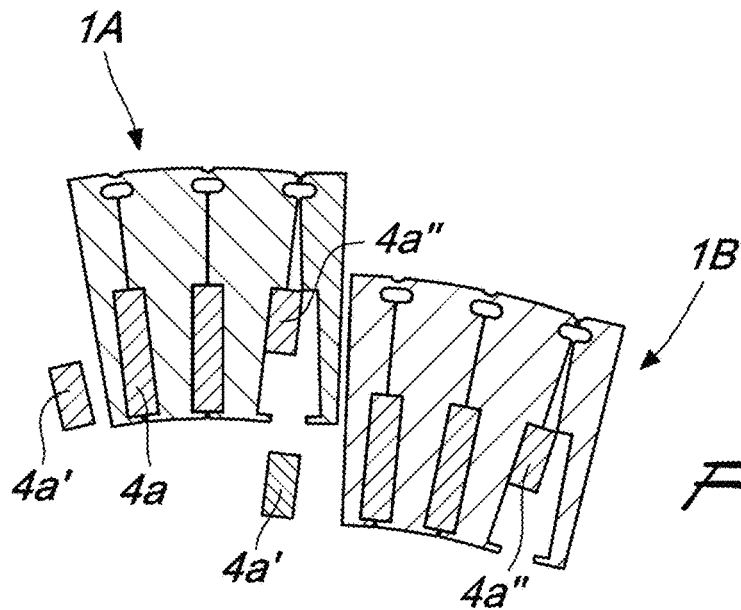
Figure 70H:
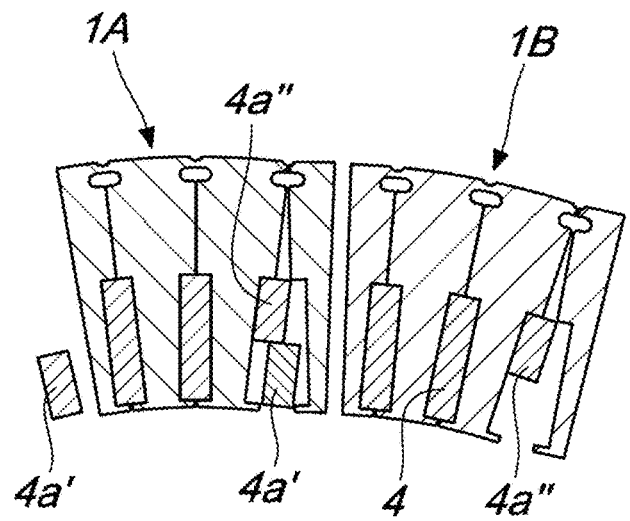
Figure 70I:
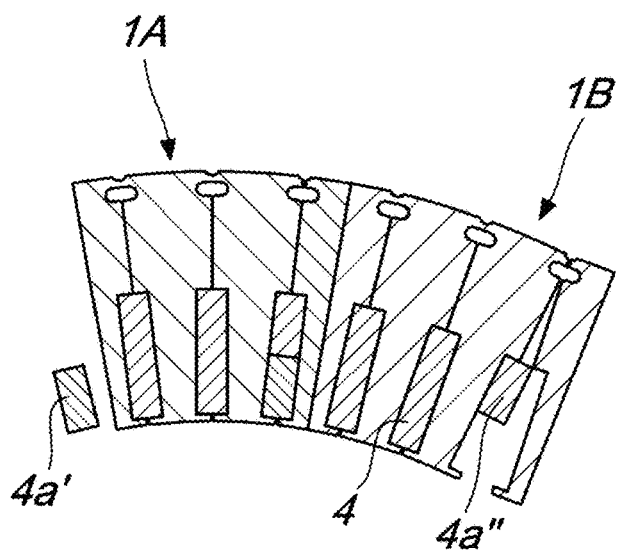
Figure 70J:
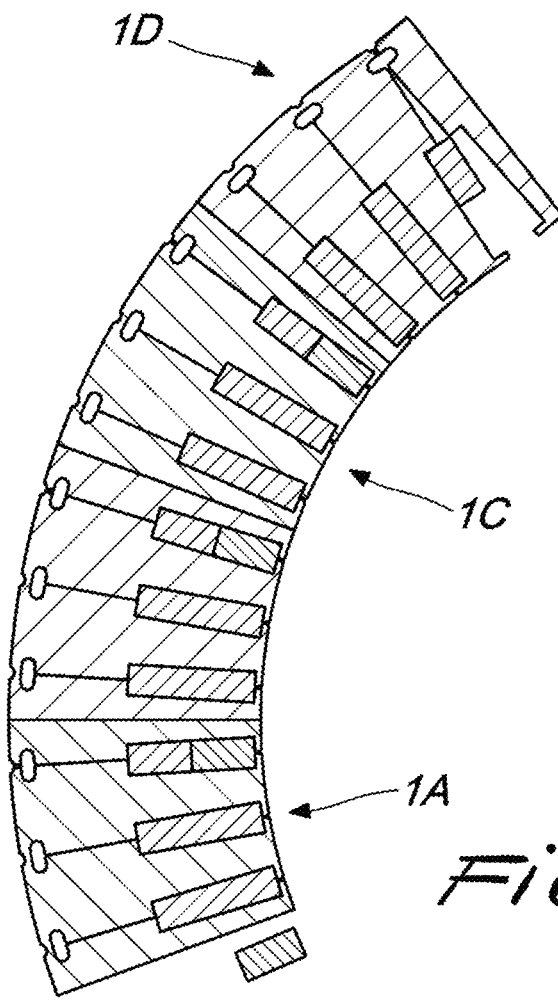
Figure 70K:
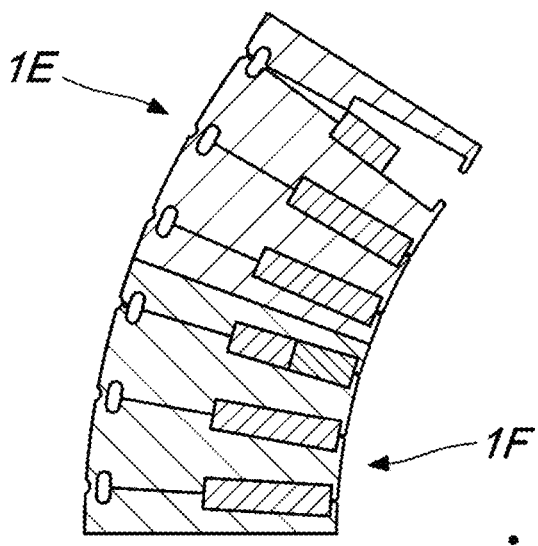
Figure 70L:
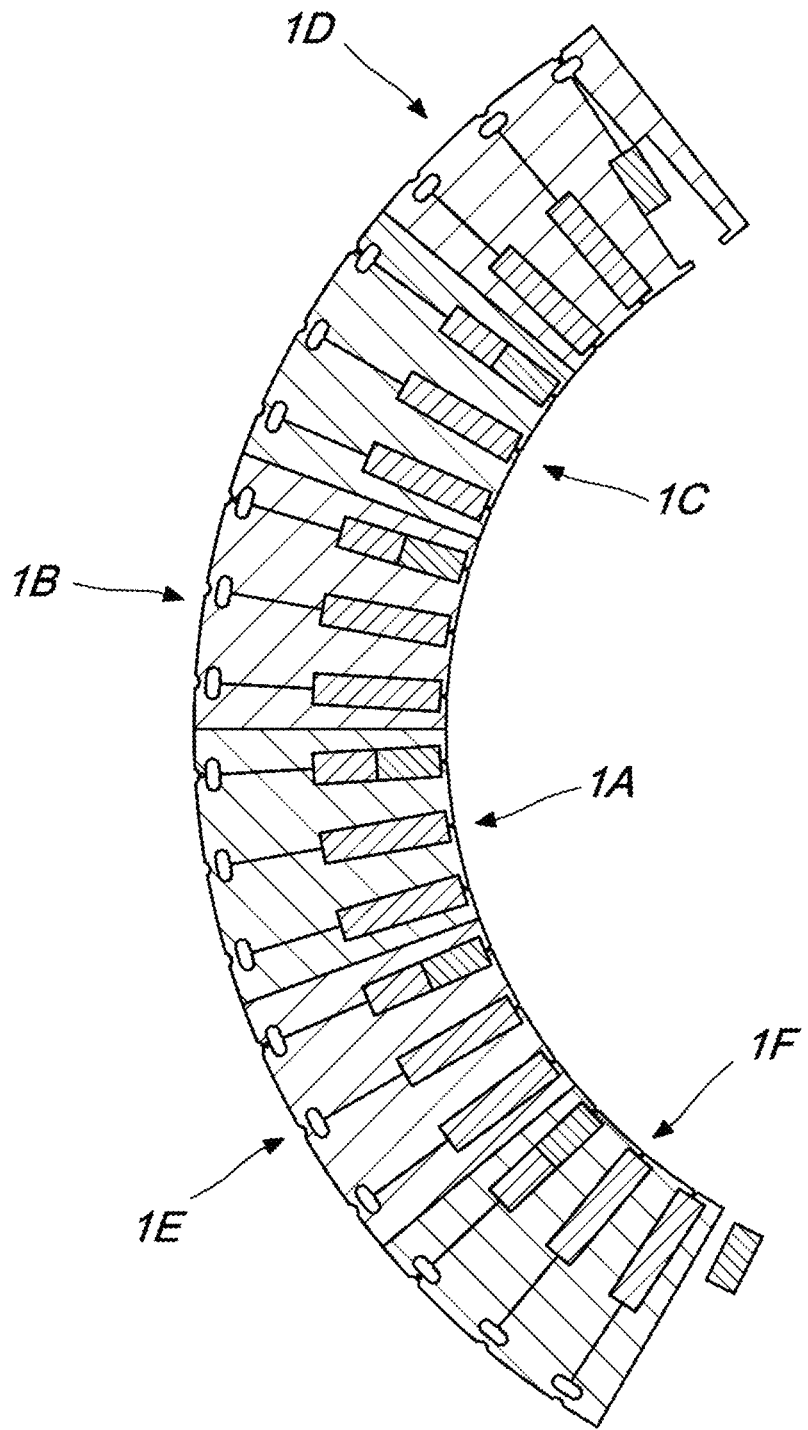
Figure 70M:
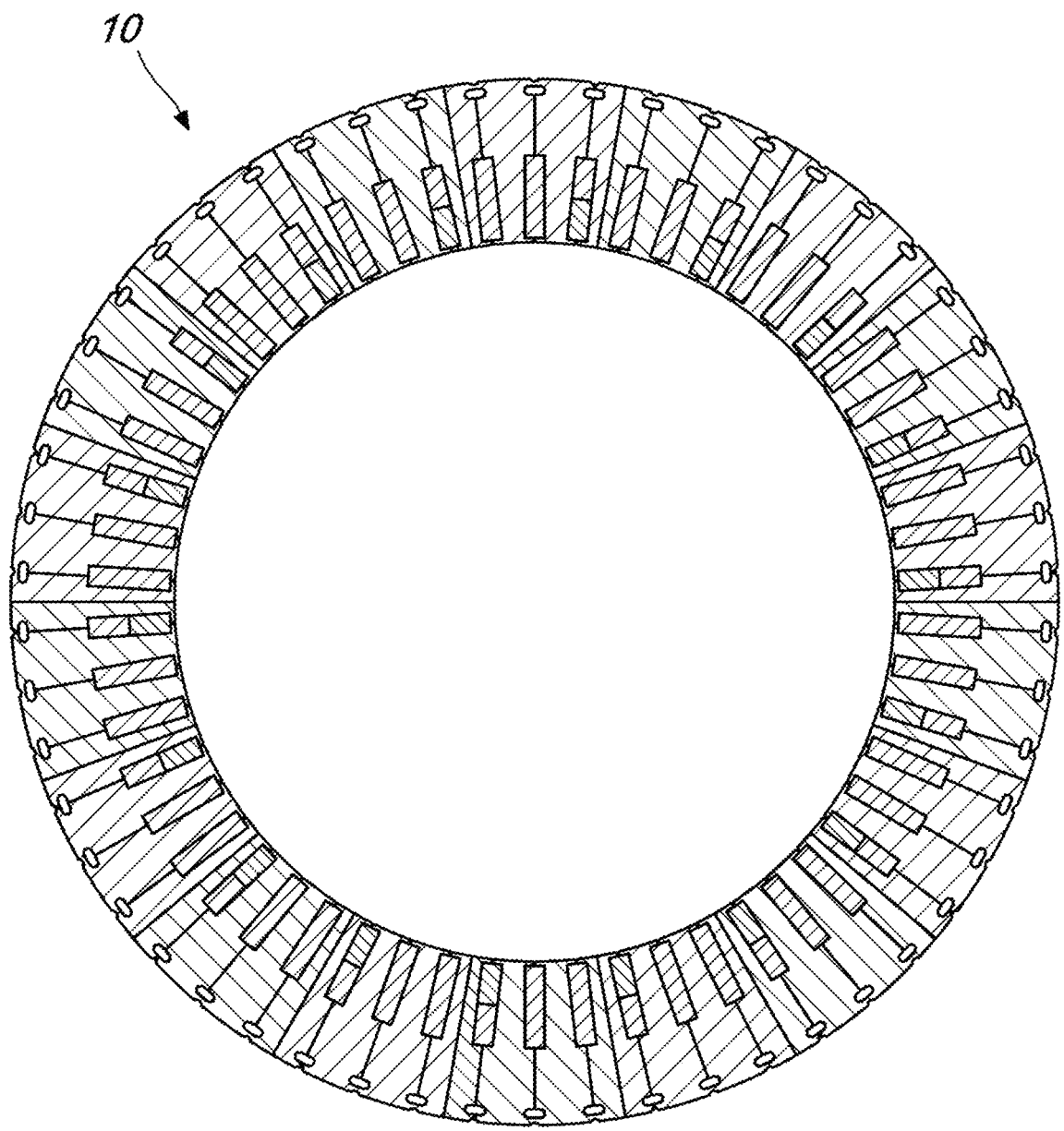
Figure 71A:
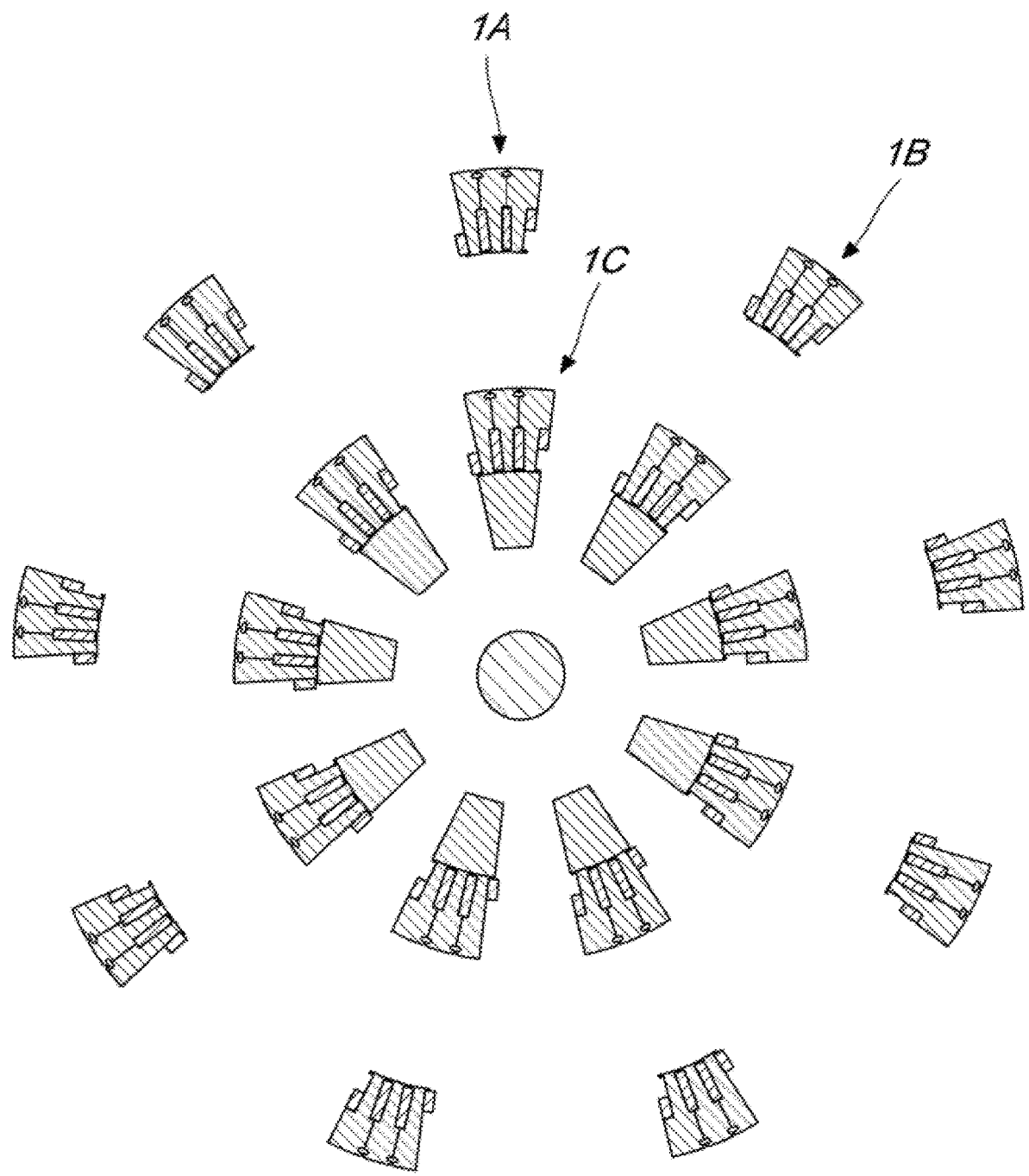
Figure 71B:
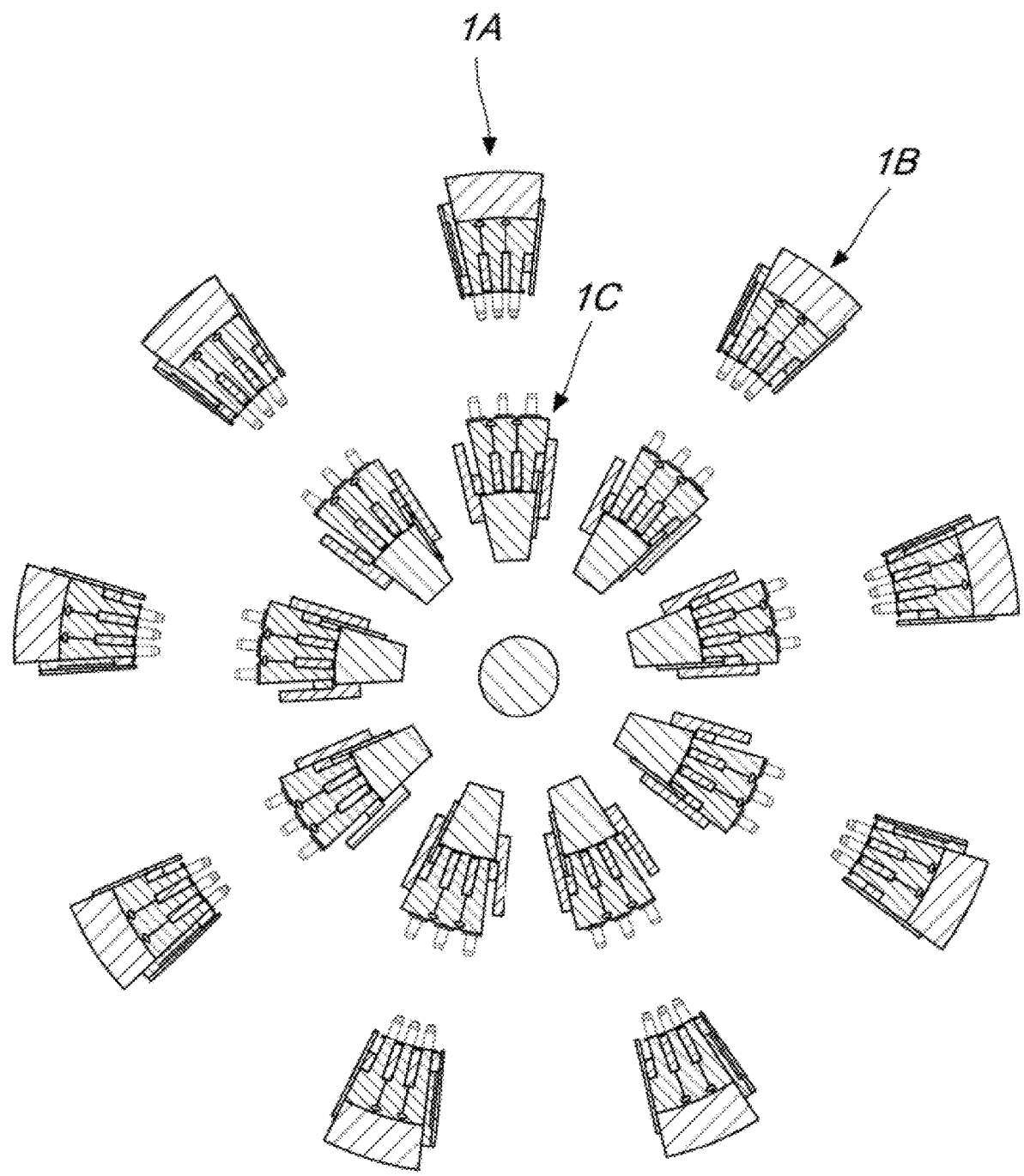
Figure 71C:
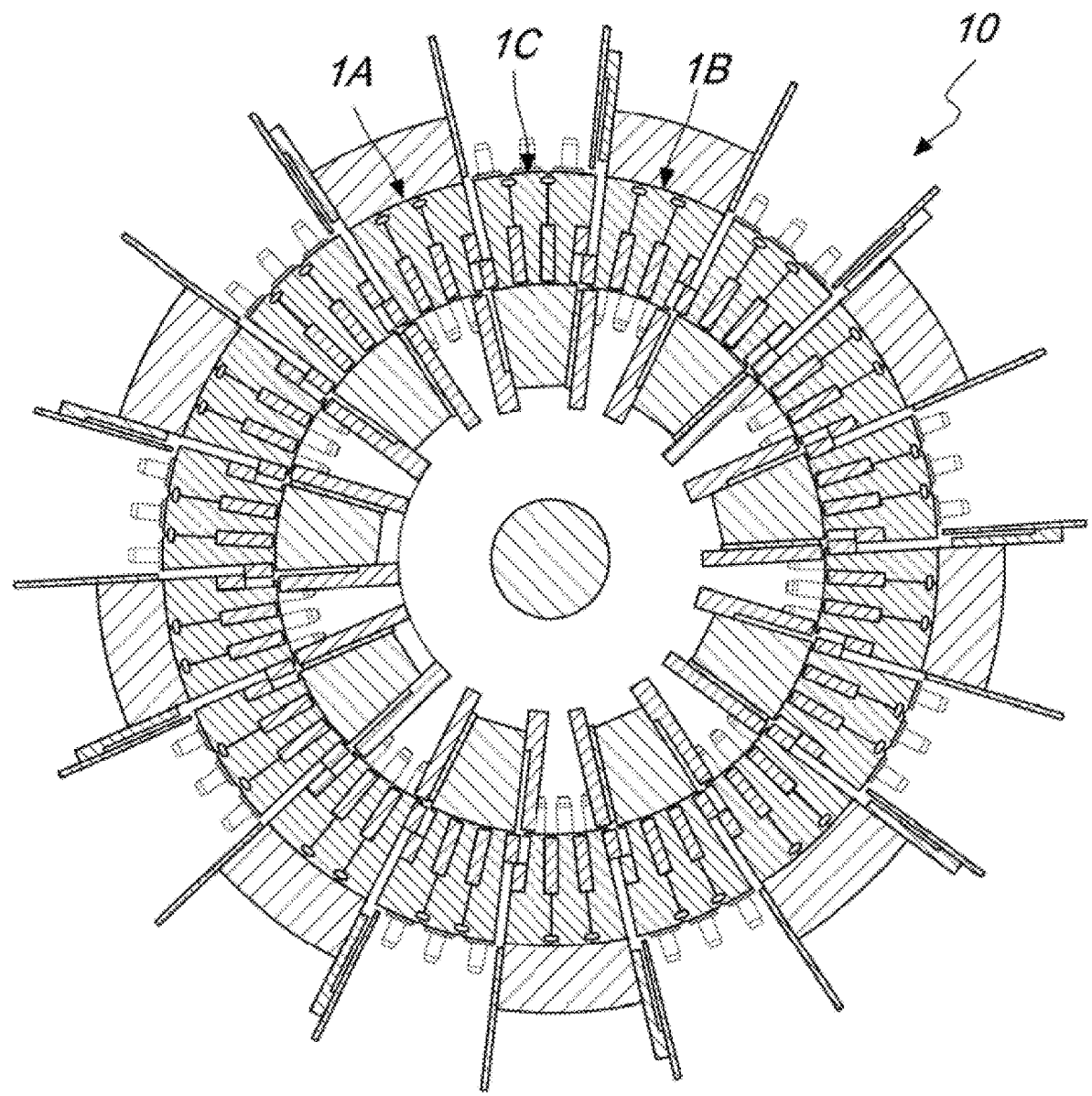
Figure 71D:
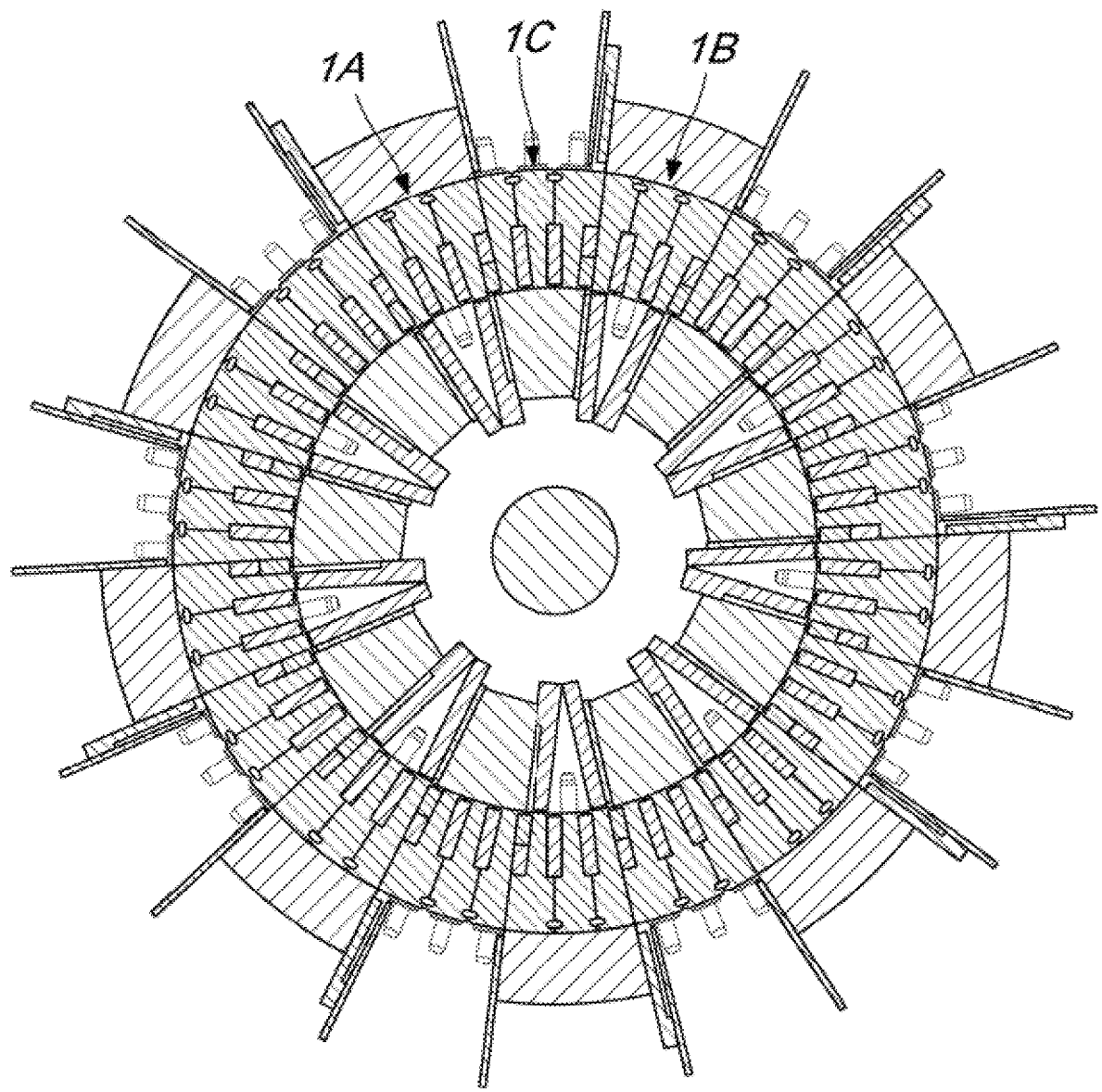
Figure 71E:
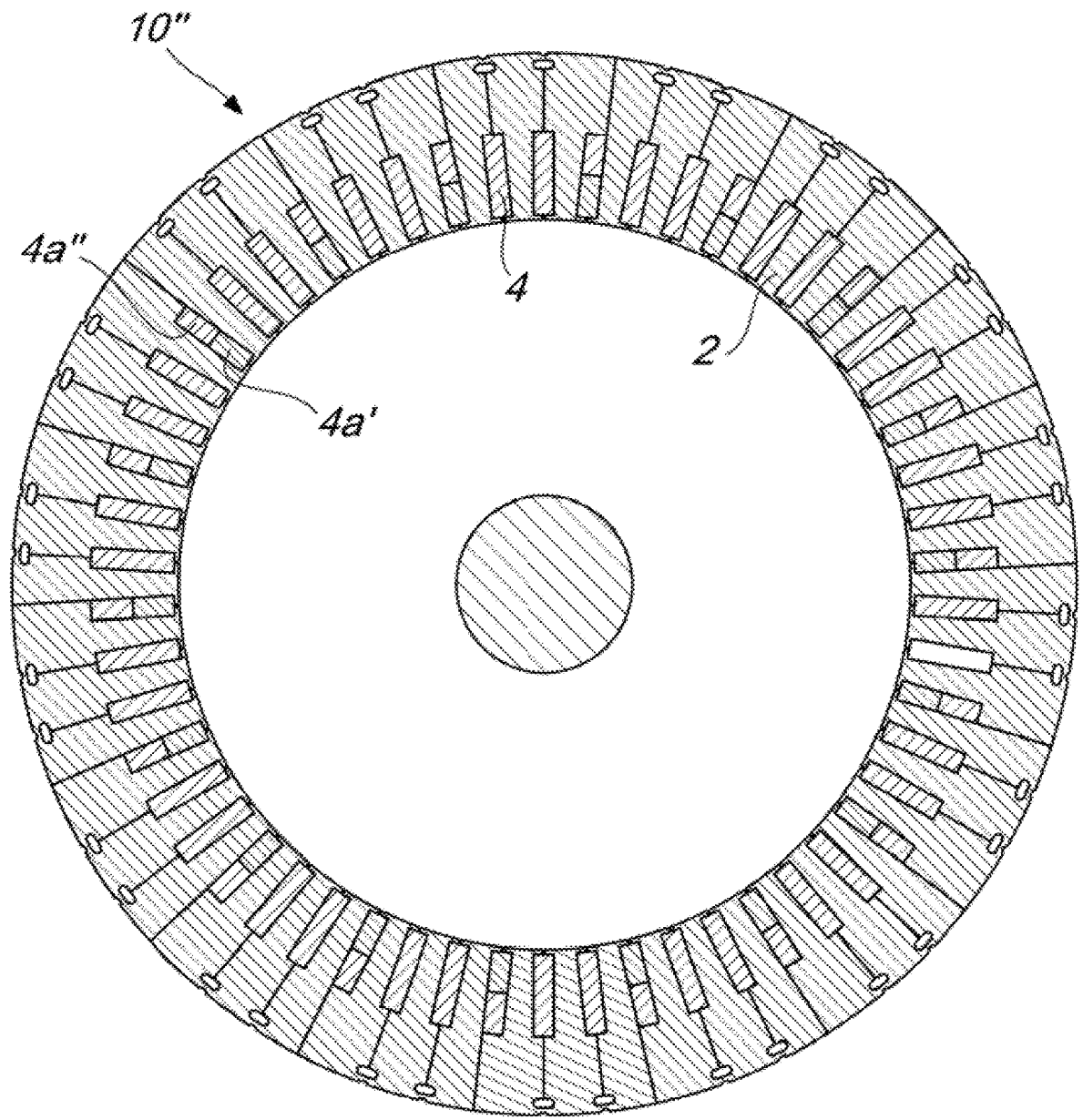
Figure 73:
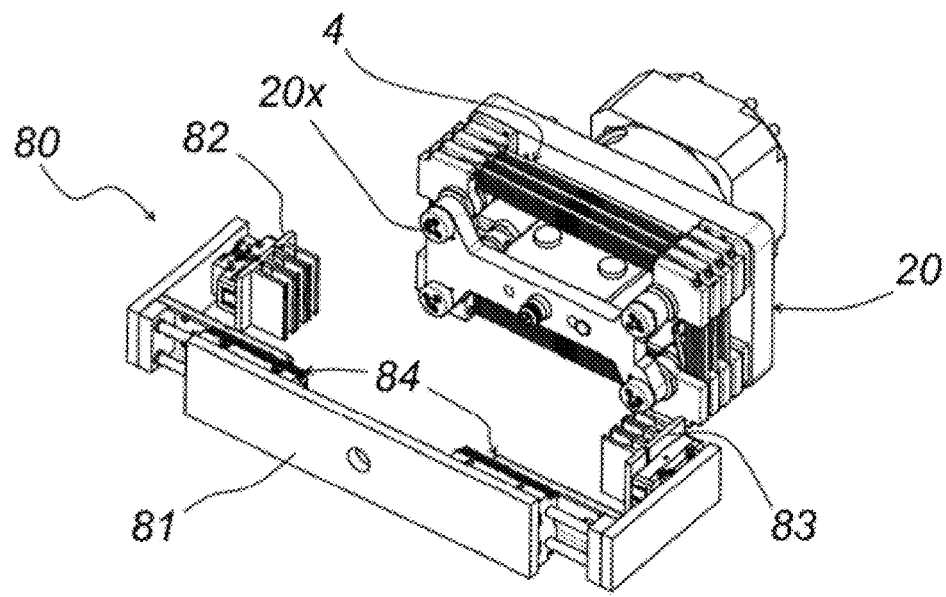
Figure 74:
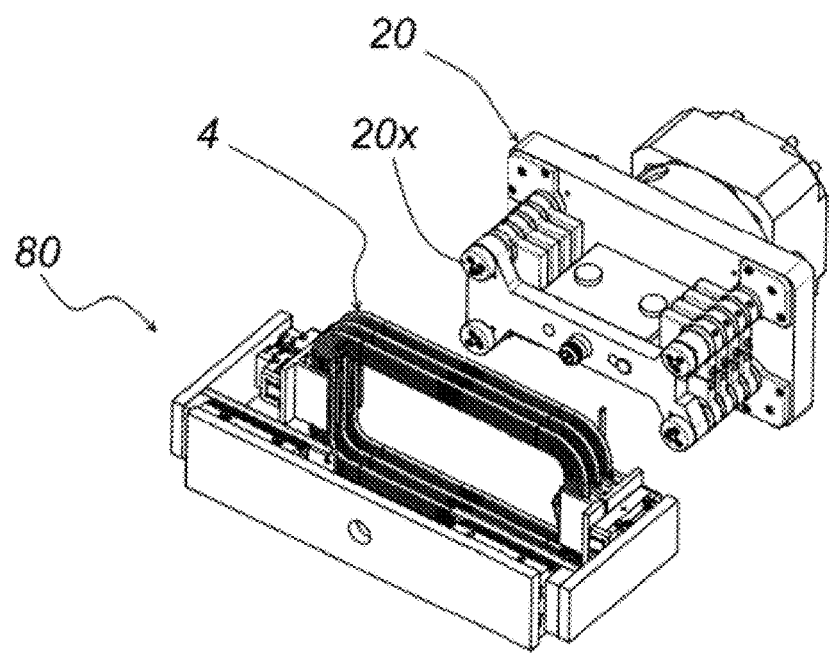
Figure 75:
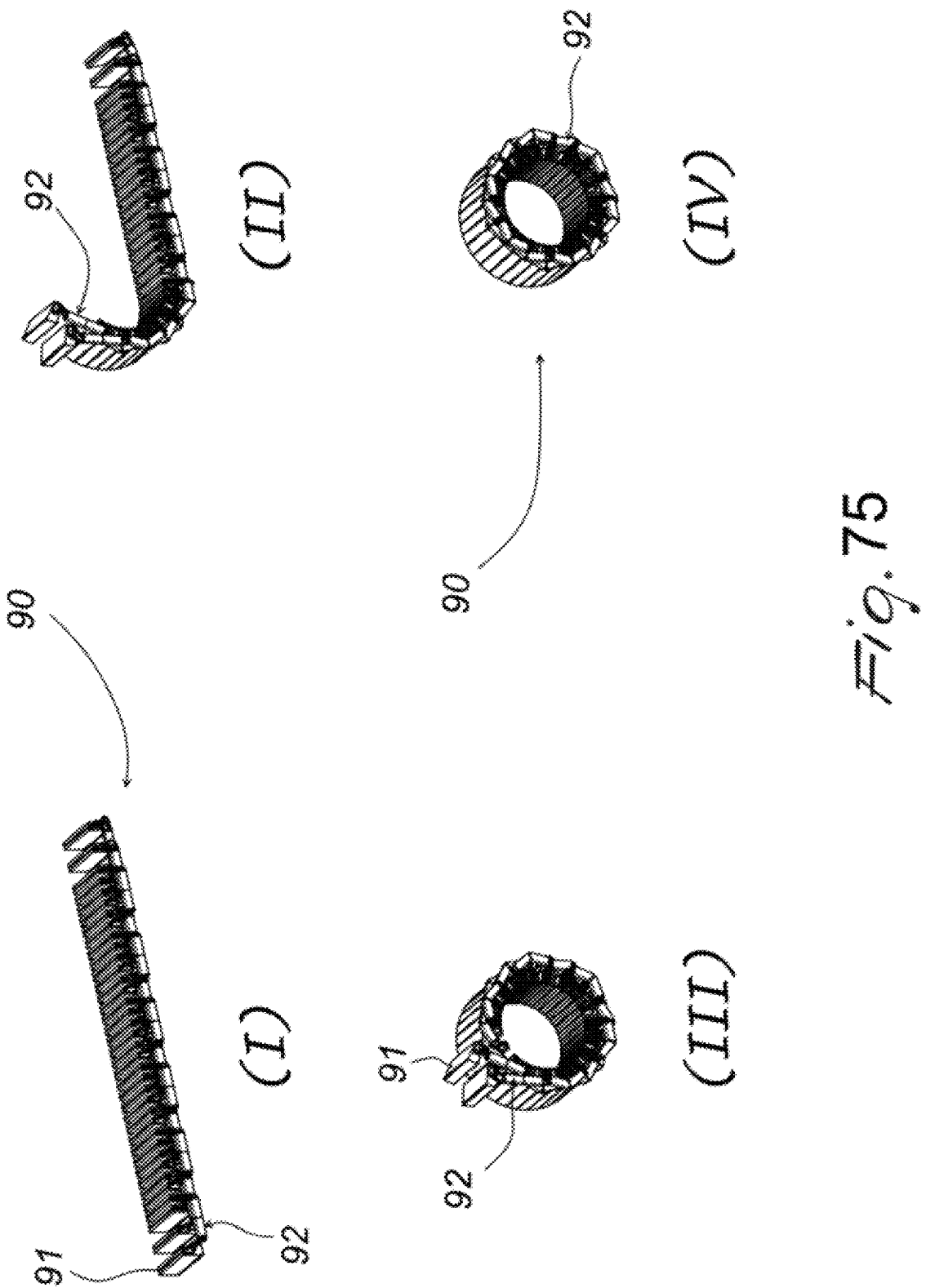
Figure 76:
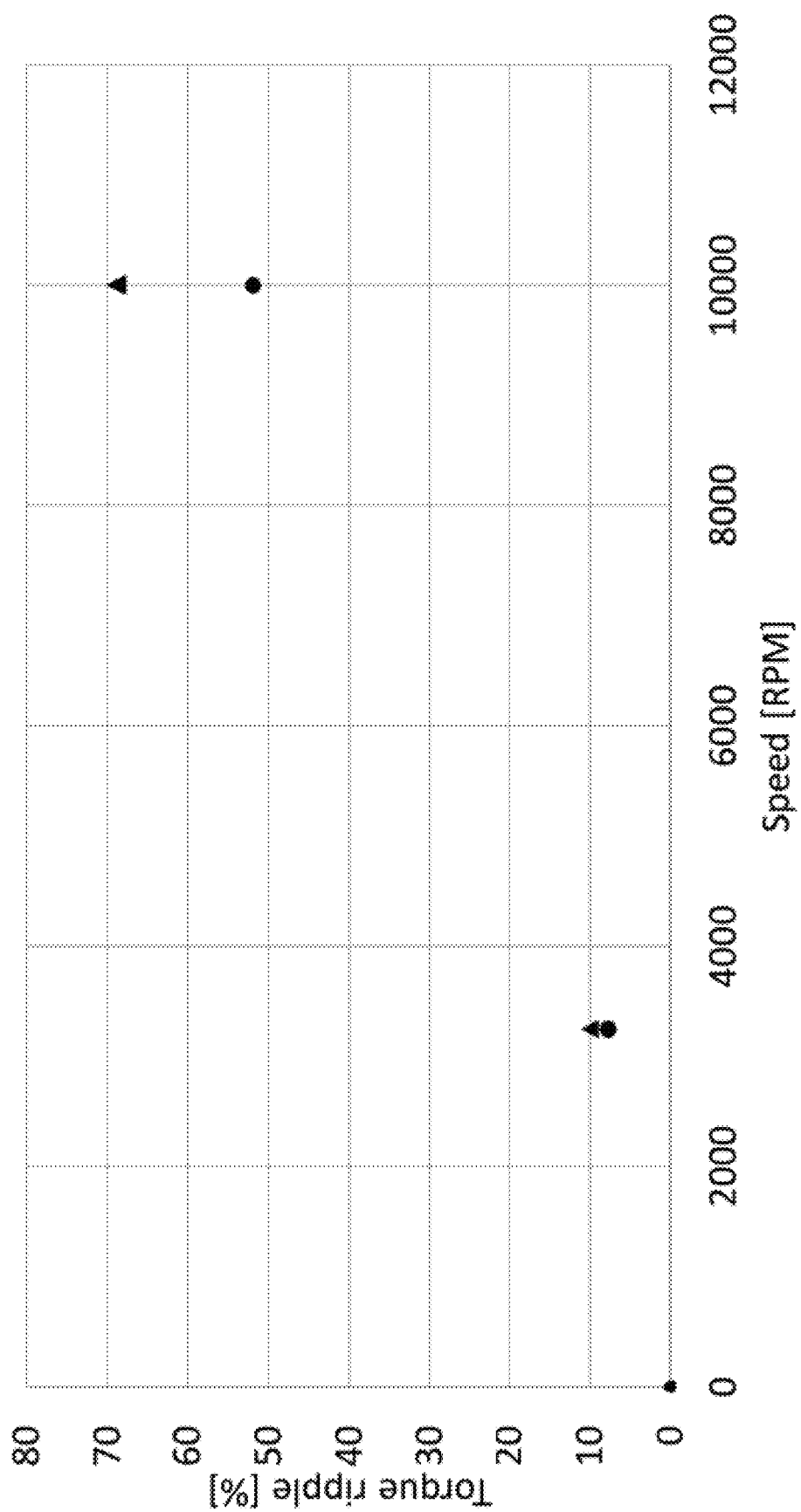
Figure 77:
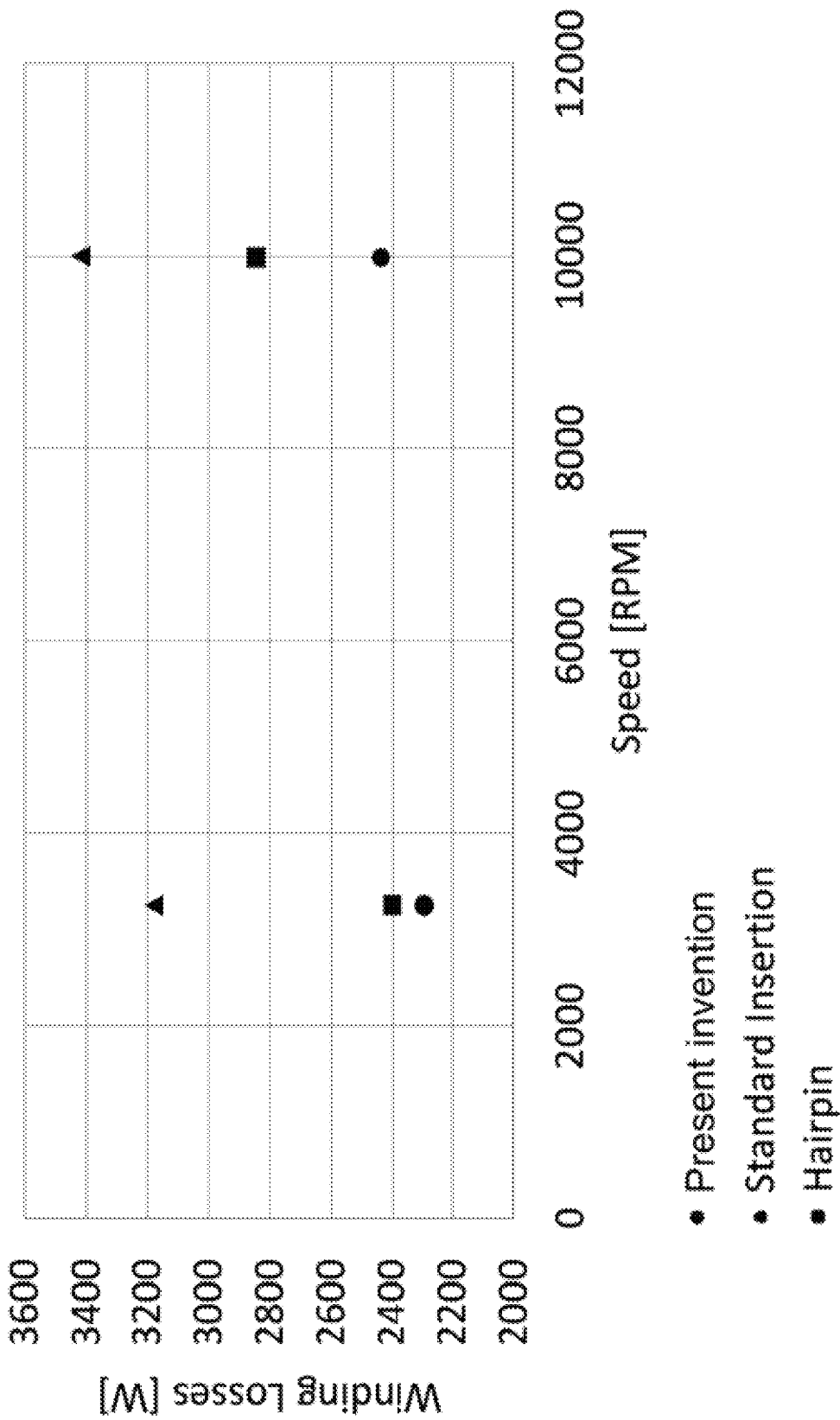
Figure 78:
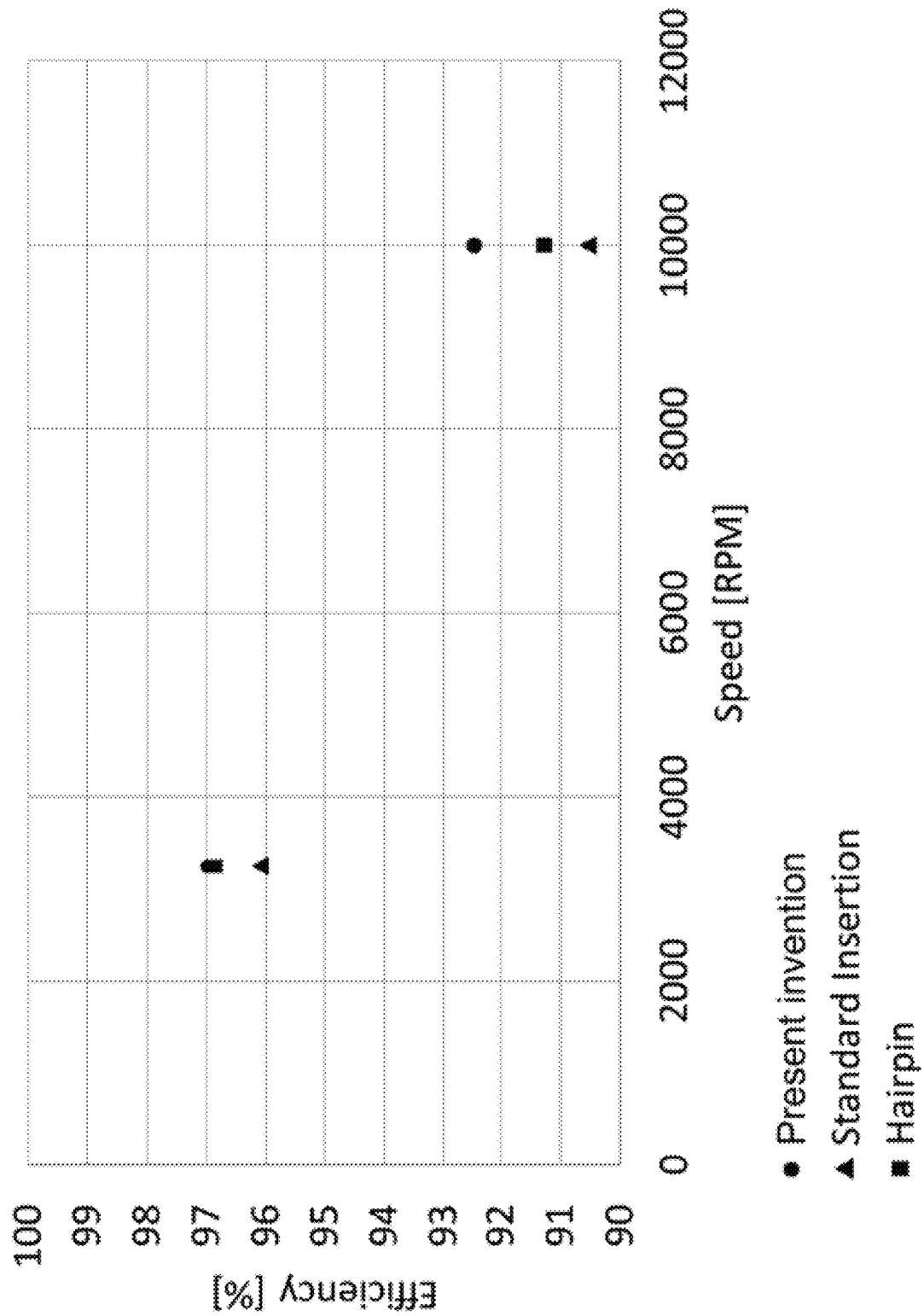
Figure 79:
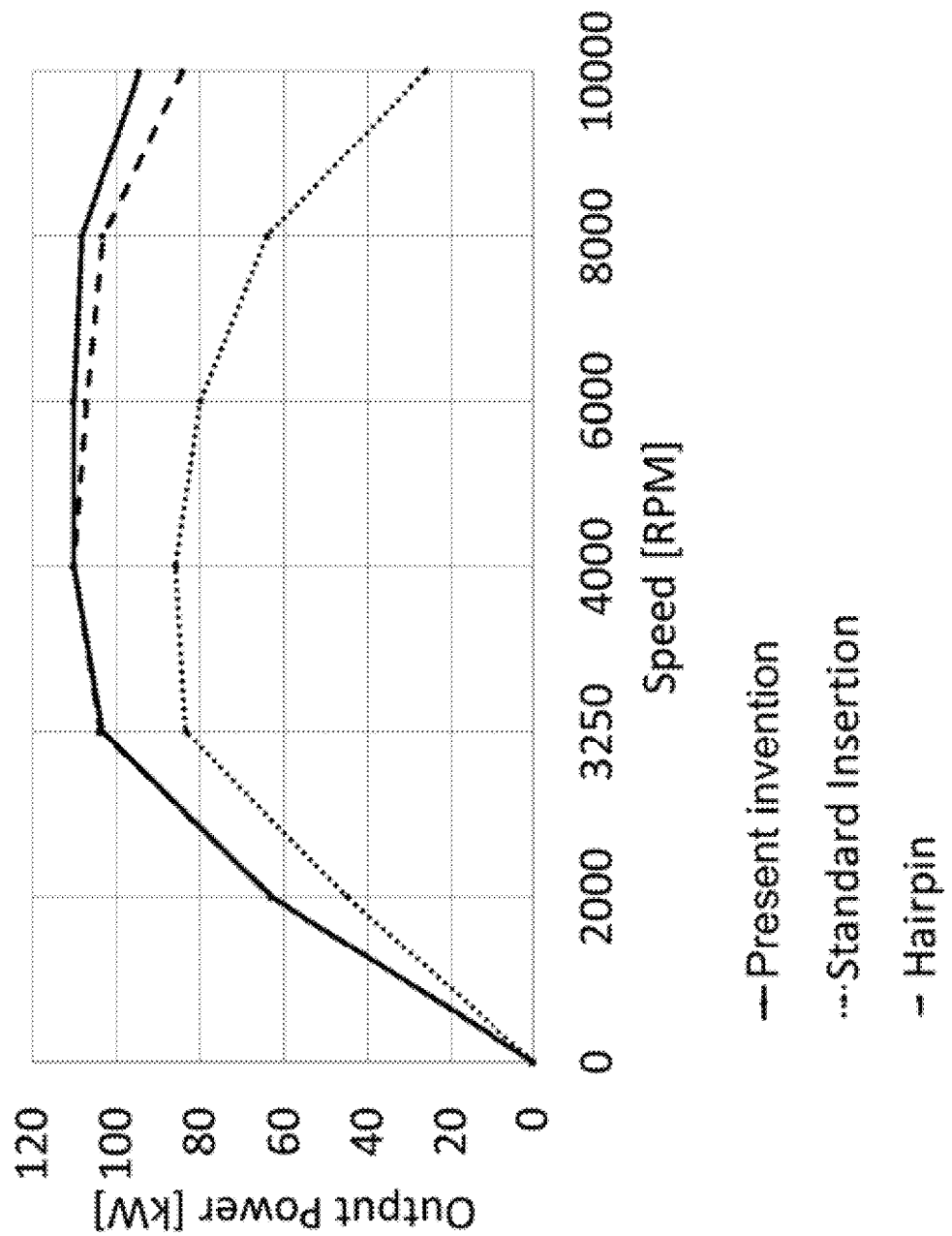
Figure 80:
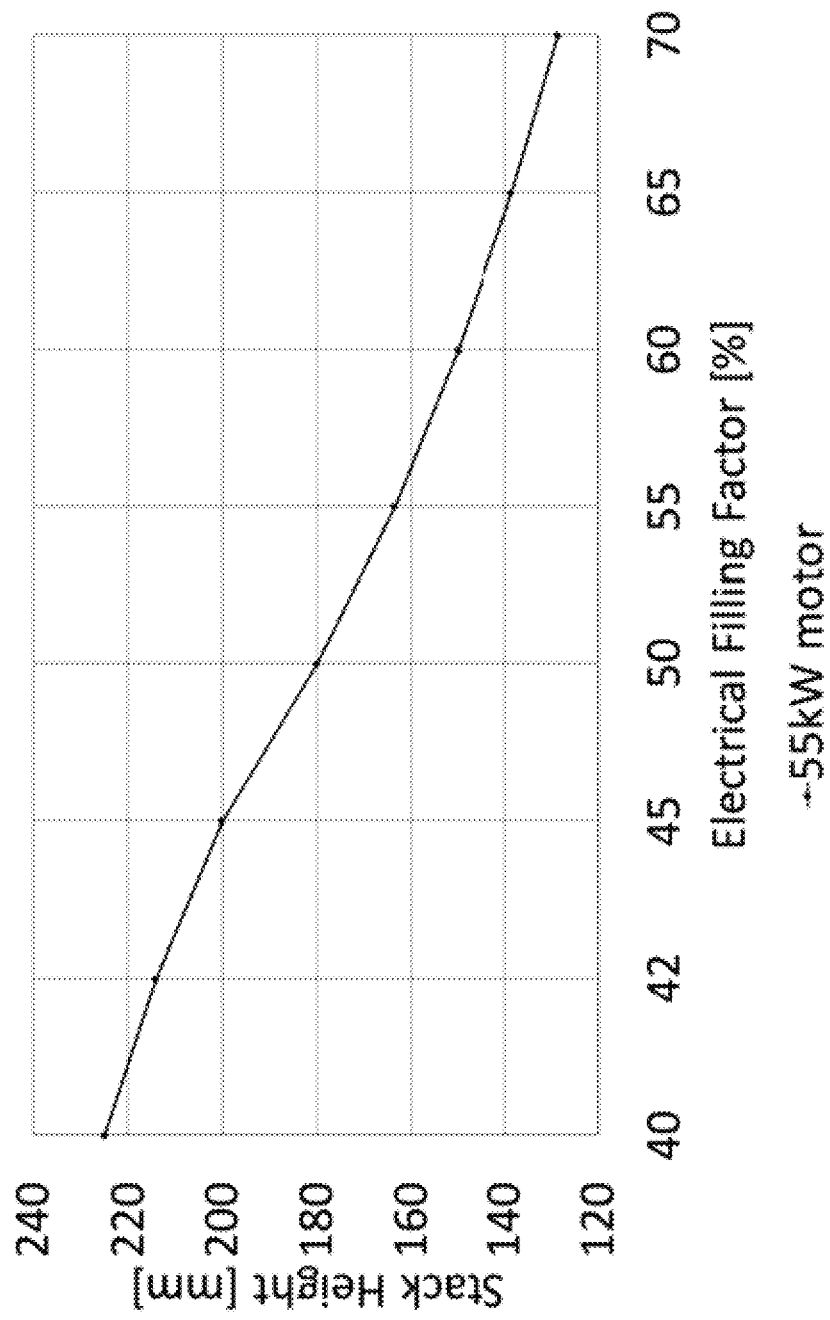

FIGS. 9*a*, 9*b* and 9*c* are sectional views of the loops of different possible types of winding;

FIGS. 10*a*, 10*b* and 10*c* are sectional views of the loops of different types of winding according to an optional solution;

FIG. 11 is a side and elevation view of the winding tool shown in FIG. 7;

FIG. 11A is a perspective view of a detail of a second embodiment of the winding tool according to the present invention;

FIGS. 12, 13 and 14 are sectional views, along different planes, of the winding tool of FIG. 7;

FIG. 12A is a front view of the winding tool of FIG. 11A;

FIG. 13A is a side view of the winding tool of FIG. 11A;

FIG. 14A is a top view of the winding tool of FIG. 11A;

FIG. 15 is a perspective view of a coil made in the coil making step A of the method;

FIG. 16 is a perspective view of a plurality of coils made in the coil making step A;

FIG. 17 is a perspective view of a pressing and carburizing apparatus during the pressing and carburizing step B of the method;

FIGS. 18 and 19 are sectional views of the apparatus of FIG. 17 at successive times of the pressing and carburizing step B;

FIGS. 15A and 16A are perspective views which show the two successive steps of the thermal treatment process performed on a coil accommodated on the winding tool of FIG. 11A;

FIGS. 17A and 18A are perspective views which show two successive steps of the pressing process performed on a coil accommodated on the winding tool of FIG. 11A;

FIG. 19A is a top and partial sectional view of FIG. 18A;

FIGS. 20 to 25 show a making sequence of a pitch correcting step by means of a pitch correcting device;

FIGS. 26 to 30 are perspective views of a sequence of a first possible embodiment of the coil housing and shaping steps;

FIGS. 31 to 35 are sectional views of the sequence of FIGS. 26 to 30;

FIGS. 36 to 40 are perspective views of a sequence of a second possible embodiment of the coil housing C and shaping D steps;

FIGS. 41 to 45 are sectional views of the sequence of FIGS. 26 to 30;

FIGS. 46 to 52 are perspective views of a sequence of a possible embodiment of the assembling step E;

FIGS. 53 and 54 show a first possible embodiment of a stator body of a stator made by means of the method according to the present invention;

FIGS. 55 and 56 show a second possible embodiment of a stator body of a stator made by means of the method according to the present invention;

FIG. 57 is a sectional perspective view of a third embodiment of the winding tool according to the present invention;

FIGS. 58 and 59 are perspective views of respectively a first and a second variation embodiment of the winding tool of FIG. 57;

FIG. 60 is a sectional view of the variation of the winding tool of FIG. 59;

FIGS. 61 to 64 are perspective views of further variation embodiments of the winding tool of FIG. 57;

FIG. 65 is a sectional perspective view of a variation embodiment of the winding tool of FIG. 57;

FIGS. 66A-66H show a first possible embodiment of a sequence for making the coil arranging, housing, shaping and assembling steps;

FIGS. 67A-67F show a second possible embodiment of a sequence for making the coil arranging, housing, shaping and assembling steps;

FIGS. 68A-68E show a third possible embodiment of a sequence for making the coil arranging, housing, shaping and assembling steps;

FIGS. 69A-69F show a fourth possible embodiment of a sequence for making the coil arranging, housing, shaping and assembling steps;

FIGS. 70A-70O show a fifth possible embodiment of a sequence for making the coil arranging, housing, shaping and assembling steps;

FIGS. 71A-71E show a sixth possible embodiment of a sequence for making the coil arranging, housing, shaping and assembling steps;

FIGS. 72A-72E show a seventh possible embodiment of a sequence for making the coil arranging, housing, shaping and assembling steps;

FIGS. 73 and 74 show, in perspective, a coil mobilization system in two different configurations of use;

FIGS. 75(I)-75(IV) show a possible implementation process of the method according to the present invention and a stator achievable with the method;

FIG. 76 is a comparative graph which shows the reduced torque ripples achievable in an electric motor provided with a stator made with the method of the present invention, with respect to the same motor provided with a stator according to known art, depending on the number of revolutions of the motor;

FIG. 77 is a comparative graph which shows the reduced leakages in the windings due to the transposition of the coils in an electric motor provided with the stator according to the method of the present invention, with respect to the same electric motor provided with a stator according to known art;

FIG. 78 is a comparative graph which shows the greater efficiency of an electric motor provided with the stator according to the method of the present invention, with respect to the efficiency of the same electric motor provided with a stator according to known art;

FIG. 79 is a comparative graph which shows the greater power supplied by an electric motor provided with the stator according to the method of the present invention, with respect to the power supplied by same electric motor provided with a stator according to known art;

FIG. 80 is a graph which specifies the axial dimension of a stator made with the method of the present invention, with respect to the filling factor;

Figure 81C:
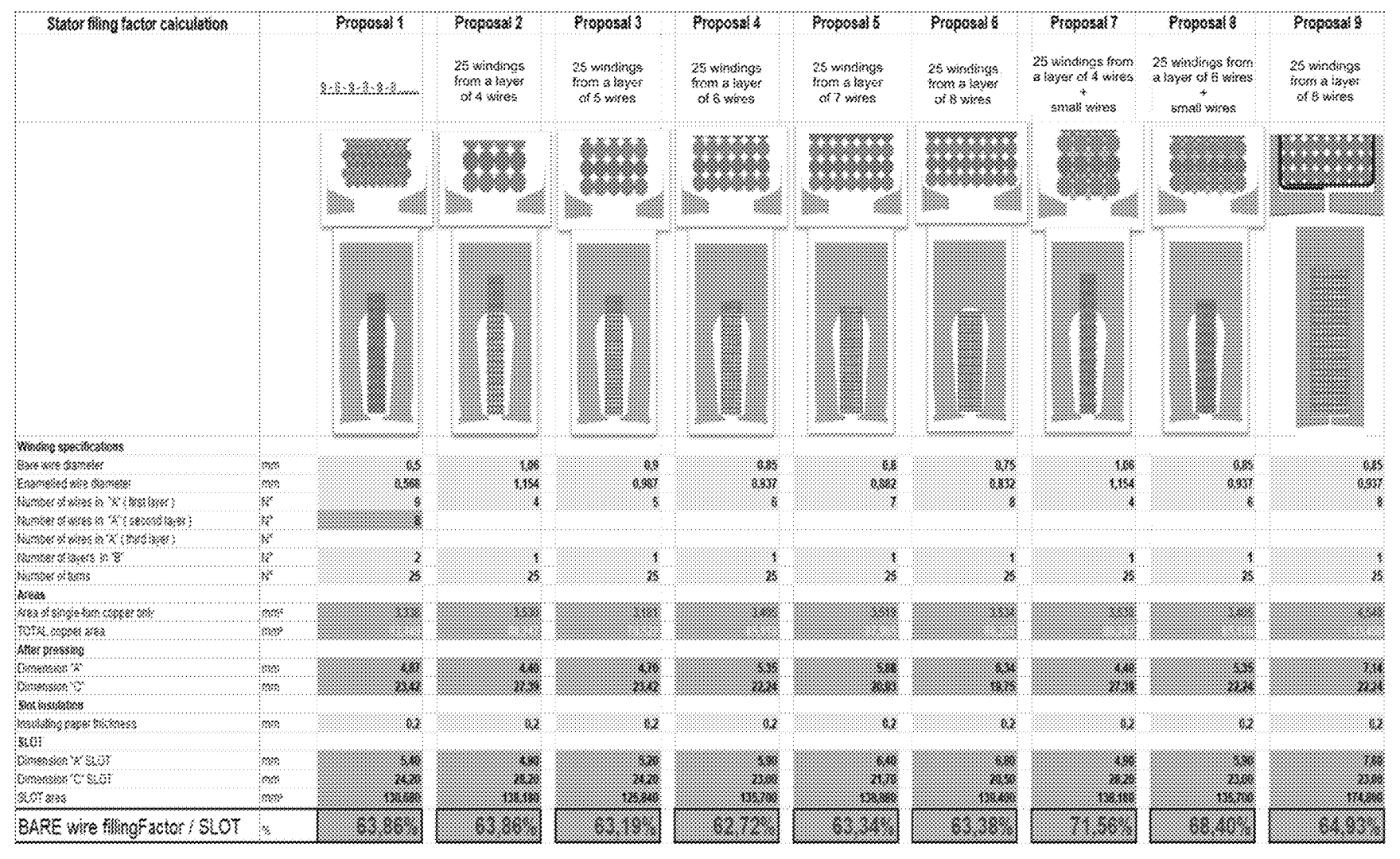

FIG. 81A shows a slot of a stator according to the known art, in cross section, and has a table of the corresponding constructive data;

FIG. 81B is a cross section of a stator portion in which two rectangular slots are shown, one filled with a winding according to the known art, the other filled with a winding made according to the method of the present invention; and FIG. 81C is a comparative table related to nine possible solutions made according to the method of the present invention, as an alternative to the solution according to the known art set forth in FIG. 81A.

DETAILED DESCRIPTION OF THE INVENTION

With reference to the figures mentioned, the method aims to make a stator 1 for electric motors, in particular a distributed winding stator of the type comprising a stator body 10, 10' which in turn comprises a plurality of stator teeth 2 (henceforth and in the accompanying claims, simply "teeth") arranged radially about a common central axis X and jutting out towards such central axis X. Such teeth 2 define, between them, a plurality of sectors, or slots, 3 (i.e. spaces delimited by two adjacent teeth 2) into which one or more coils 4 of conducting wire 14 are at least partially inserted.

More in detail, the substantially straight portions of longitudinal extent of the coils 4, i.e. of the wires 14, henceforth named "linear portions" 4*a*, 4*b*, are housed in the sectors 3.

Figure 1:
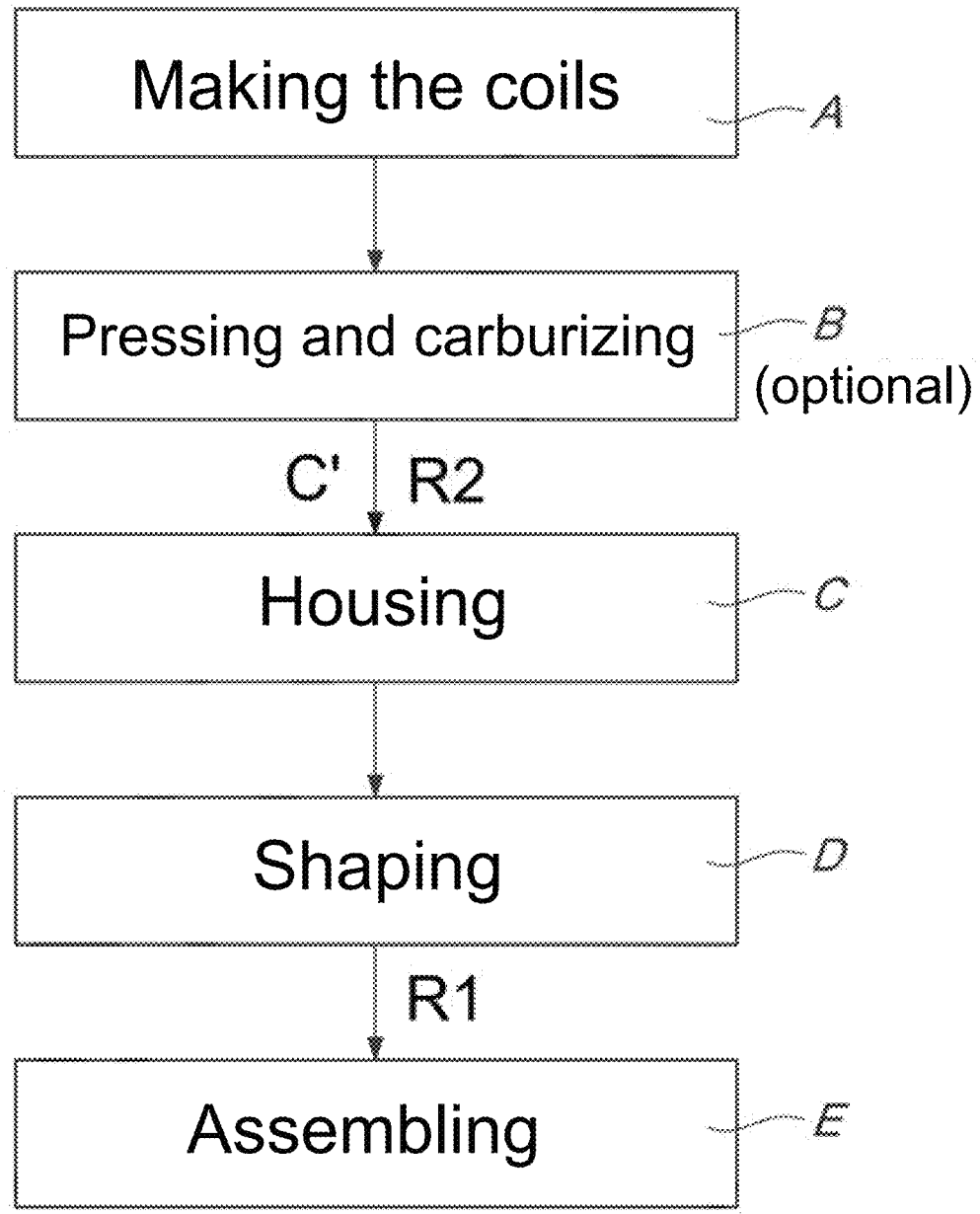
FIG. 1 is a flow diagram which shows the salient steps of the method according to the invention.

In its essential aspects, the method comprises the following steps (FIG. 1) which will be described hereunder in detail: a coil making step A, an optional pressing and/or carburizing step B, a coil housing step C, a shaping step D and an assembling step E.

Preferably, the method is made by means of a processing line which comprises: at least one winding tool 20 configured to perform the coil making step A, a coil mobilization apparatus configured to perform at least the coil housing step C, a shaping apparatus 700 configured to perform the shaping step D, and an assembling apparatus 600 configured to perform the assembling step E. Optionally, and preferably, the method comprises the step B and the processing line comprises a pressing and/or carburizing apparatus 300 configured to perform the pressing and/or carburizing step B, wherein the step B provides to carry out the pressing only, or the carburizing only, or both the pressing and carburizing, in the desired order or contemporaneously. The embodiment details of the elements composing the processing line will be described contextually to the method, thus also making their operation evident.

As mentioned, the method initially comprises a making step A of the coils 4, wherein one or more conducting wires 14 are wound on a winding tool 20 such as to form at least one coil 4 comprising at least one and preferably two linear portions 4*a*, 4*b*, each of which in turn comprises a plurality of individual linear portions of wire 14 and is adapted to be inserted into one of the sectors 3 of the stator body 10. The coil 4 thus made is practically formed by a plurality of loops of wire 14.

Preferably, in this step, the coil 4 is made such as to comprise a first 4*a* and a second 4*b* linear portion, parallel to each other and connected by nonlinear portions, which first 4*a* and second 4*b* portions will then each be inserted into a different sector 3.

Only one coil 4 (as in FIG. 15) or a plurality of coils 4 in series (as in FIG. 16), depending on the implementation choices, can be wound on the winding tool 20.

The winding is made with one, or two or more wires in parallel, such as to achieve coils 4 consisting for example of: one hundred loops made of only one wire 14, or fifty loops made of two wires in parallel, or ten loops made of ten wires 14 in parallel, etc.

A first embodiment of the winding tool is shown in FIGS. 7-14; a second embodiment is shown in FIGS. 7A-8A and in FIGS. 11A-19A; a third embodiment is shown in FIGS. 57-65.

With reference to FIGS. 7-14 the winding tool 20 preferably comprises a plurality of movable walls 22 comprised between an anchoring wall 23' and a removable disassembly wall 24'.

The anchoring wall 23' is configured to be coupled operatively to a winding spindle 244 such as to drive the rotation of the movable walls 22 and optionally comprises, for this purpose, a sleeve for hooking to the spindle 25.

The removable disassembly wall 24' can be decoupled from the anchoring wall 23' to release the movable walls 22 and allow the displacement of the coils 4 wound.

The movable walls 22 form one or more winding chambers 24 inside which the conducting wires 14 are wound to form the coils 4.

More in detail, in the preferred embodiment illustrated, the anchoring wall 23' further comprises a wire clamp 26 configured to clamp the incoming wires 14 to the winding (which are already arranged in the proper configuration).

Conveniently, the anchoring wall 23' is further provided with a centering pin 27 to center the movable walls 22, which centering pin juts out towards the removable wall 24' and engages a tunnel formed by central holes 28 which are obtained at the center of each movable wall 22.

A hooking end 271, for the hooking of the anchoring wall 23' to the removable wall 24', is present at the end of the centering pin 27.

Advantageously, the anchoring wall 23' is further provided with a plurality (four in the example illustrated) of axial positioning pins 231 also jutting out towards the removable wall 24' and which have the task of keeping the proper axial position of the movable walls 22 during the winding, by occupying respective positioning holes 29 obtained in the movable walls 22, such as to ensure the proper dimension of the winding chambers.

As can be noted from the figures, the axial-positioning pins 231 are formed by a plurality of longitudinal portions of diameters different and decreasing towards the removable wall 24', and the positioning holes 29 are of a different diameter in each movable wall 22, decreasing towards the removable wall 24', such as each movable wall 22 is locked on a respective longitudinal portion of the axial positioning pins 231.

The movable walls 22 thus ensure the axial dimension (determined by the thickness of the walls 22 and by the distance between the walls 22 themselves) during the winding step (of making the coils), but can be moved close to each other under the thrust of a press during the pressing step, which will be described hereunder. Such axial dimension is conveniently ensured by mechanical reference elements 291 which ensure the repeatability of the process and the consistency of the final dimensions of the pressed winding (i.e. of the coil 4). In practice, the winding tool 20 is configured such as the movable walls 22, under the action of a pressure, can move close to each other up to a distance defined by the mechanical reference elements 291 which act as a limit abutment.

The number of movable walls 22 in the winding tool 20 is determined by the number of coils 4 to be made in series (equal to the number of coils per electric pole and thus per sector 3)+1; thus by the formula Np=nm+1, wherein Np is the number of movable walls 22 and nm is the number of coils. In practice, the nm coils are the coils which will be part of an individual electric pole.

The movable walls 22 are substantially rectangular in plan, both in vertical section and in horizontal section. Preferably, the movable walls 22 are provided, on the sides jutting out outside the winding tool 20, with manipulation seats 249.

In the preferred embodiment, each movable wall 22 is formed by a central support 221, two winding cheeks 222 fixed to the two sides of the central support 221, in this case the manipulation seats 249 are obtained in the winding cheeks 222. In practice, in these embodiments, the winding chambers are defined between the winding cheeks 222.

Preferably, a thermal insulator is interposed, between the central support 221 and the winding cheeks 222, to limit thermal loss during the thermal carburizing treatment which will be described hereunder.

The removable disassembly wall 24' is removable in the sense that it can be decoupled from the fixed wall to allow to pull out the movable walls 22.

In the preferred embodiments, the removable wall 24' is also provided with a respective wire clamp 261 configured to clamp the wires 14 coming out of the winding, thus keeping them arranged in the proper configuration.

The removable wall 24' then comprises a coupling device 241 for the direct or indirect coupling to the anchoring wall 23' in which, for example, the hooking end 271 of the centering pin 27 of the anchoring wall 23' is hooked.

Preferably, the removable wall 24' further comprises a gripping element 242 adapted to be grasped or hooked to allow its movement.

In the preferred embodiments, the winding tool 20 comprises a plurality of corner elements 245 coupled to the removable wall 24', which slide on respective appropriately inclined guides 246. Such guides 246 extend from the removable wall towards, and preferably up to, the anchoring wall 23'. The corner elements act as abutment for the wires 14 during the winding.

Preferably, the corner elements 245 are at least four, one for each corner.

Figure 9:
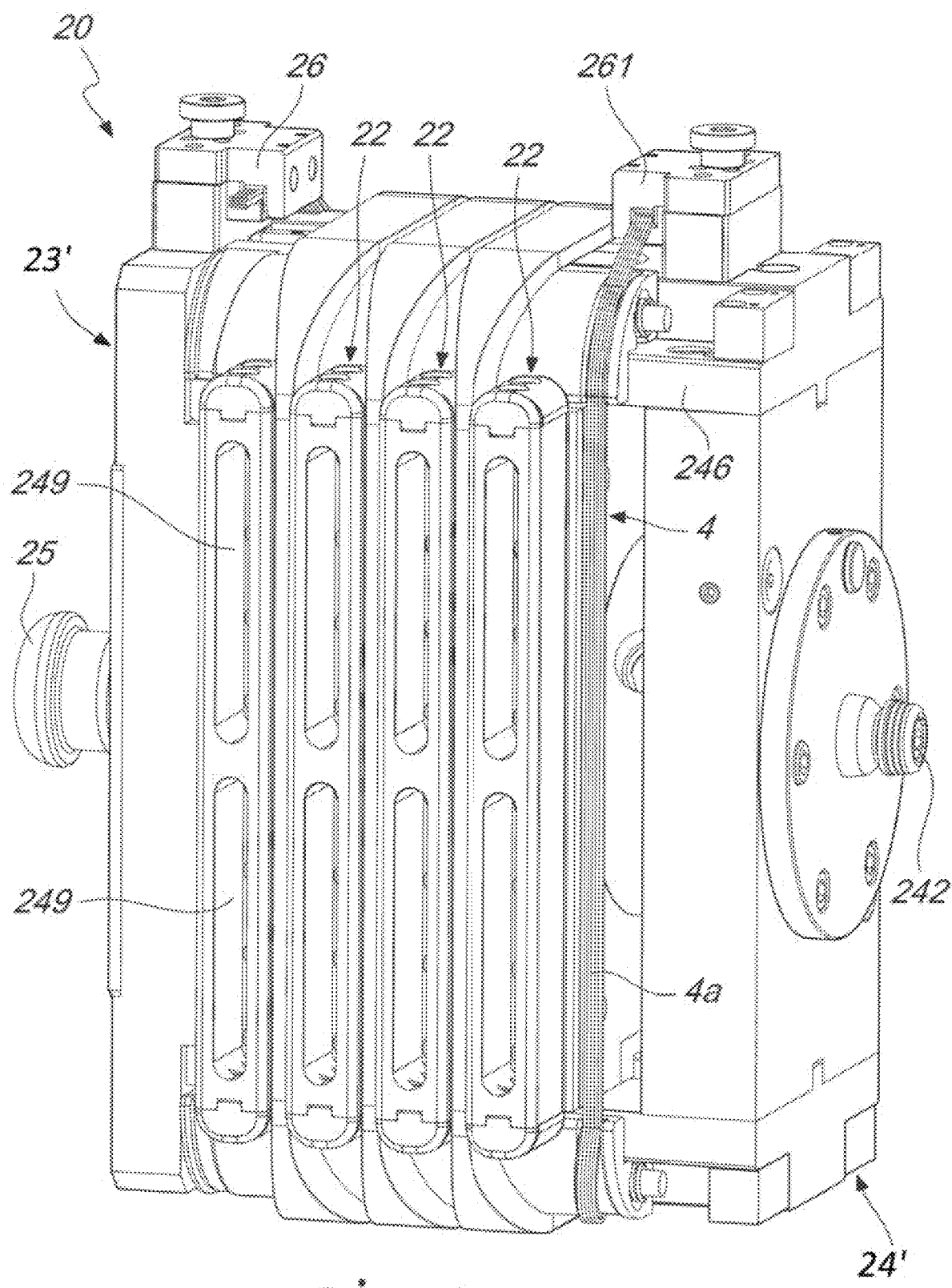
FIGS. 9 and 10 are perspective views of the winding tool of FIG. 7, in successive steps.

Thanks to this detail along the guides 246, the corner elements 245 slide towards the center of the winding tool 20 (as shown in FIGS. 9 and 10) during the pulling out of the removable wall 24' from the hooking wall such as to loosen the wires 14 forming the coils 4 and thus allowing the removal of the coils 4 without scrapes such as to prevent damage to the wire 14.

In the preferred embodiments, the processing line comprises a winding means 200 by means of which the winding of the wires 14 on the winding tool 20 is performed, i.e. the coil forming step 4.

Figure 2:
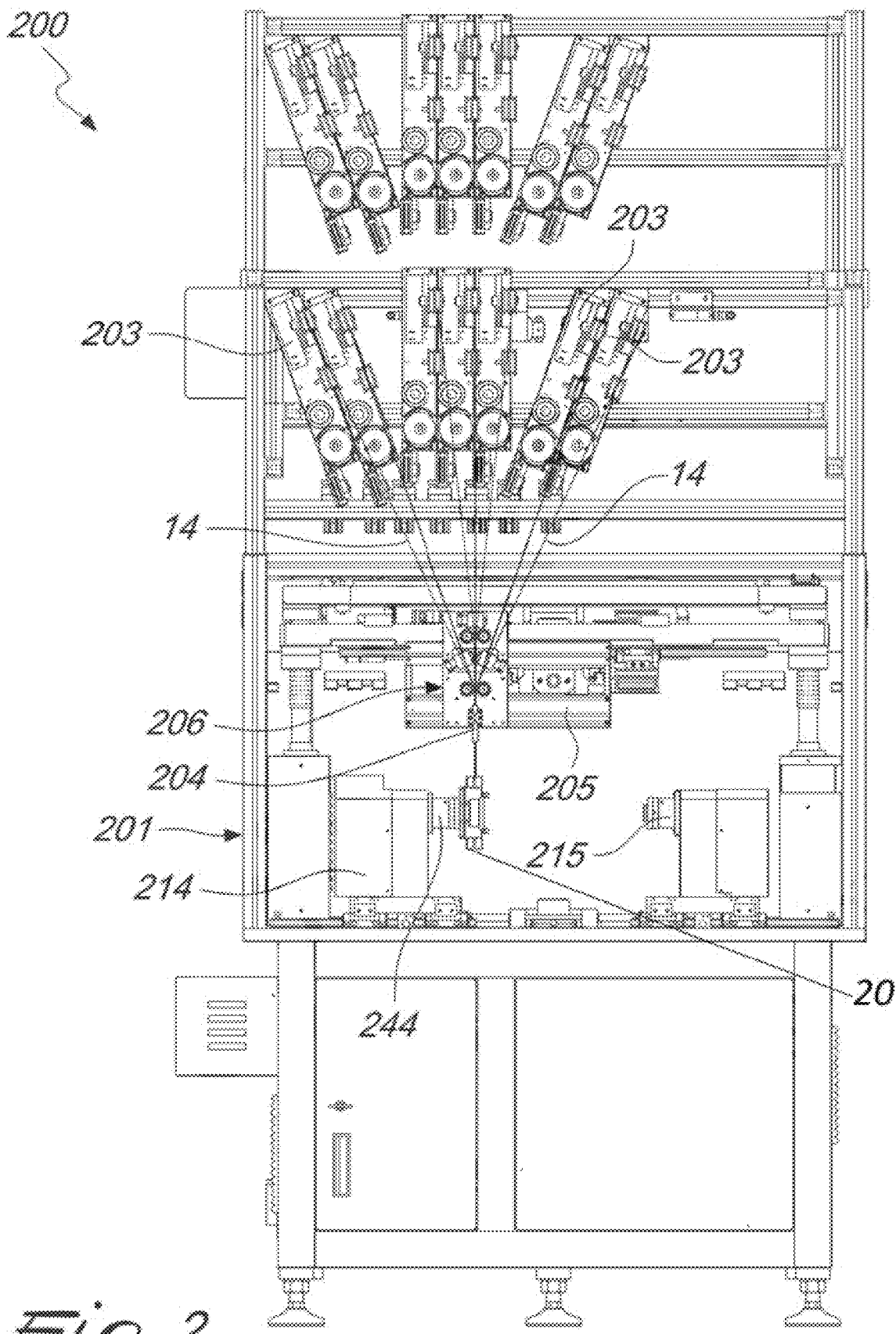
FIG. 2 is a front and elevation view of a possible embodiment of a winding machine.

A possible embodiment of the winding machine 200 is illustrated in FIG. 2.

This winding machine 200 comprises a supporting structure 201 which supports: a plurality of wire tensioning devices 203 (of known type) for tensioning the wires 14 to be wound, a wire guiding device 206 provided with a wire guiding tube 204 and movable along a wire guiding guide 205 (preferably consisting of a bar), a winding spindle 244 rotated by a motor 214 and adapted to rotate the winding tool 20 previously described, in practice being coupled to the sleeve for hooking to the spindle 25.

Such winding machine 200 can thus be configured in an operative winding configuration, wherein the wires 14 to be wound are tense and come out of the wire tensioning devices 203 towards the wire guiding device 206, which guides the wires 14 towards the winding tool 20 during the rotation thereof.

Optionally, the winding machine 200 further comprises a tailstock 215 positioned coaxially to the spindle 244 and adapted to be coupled to the removable wall 24' of the winding tool 20.

Figure 3:
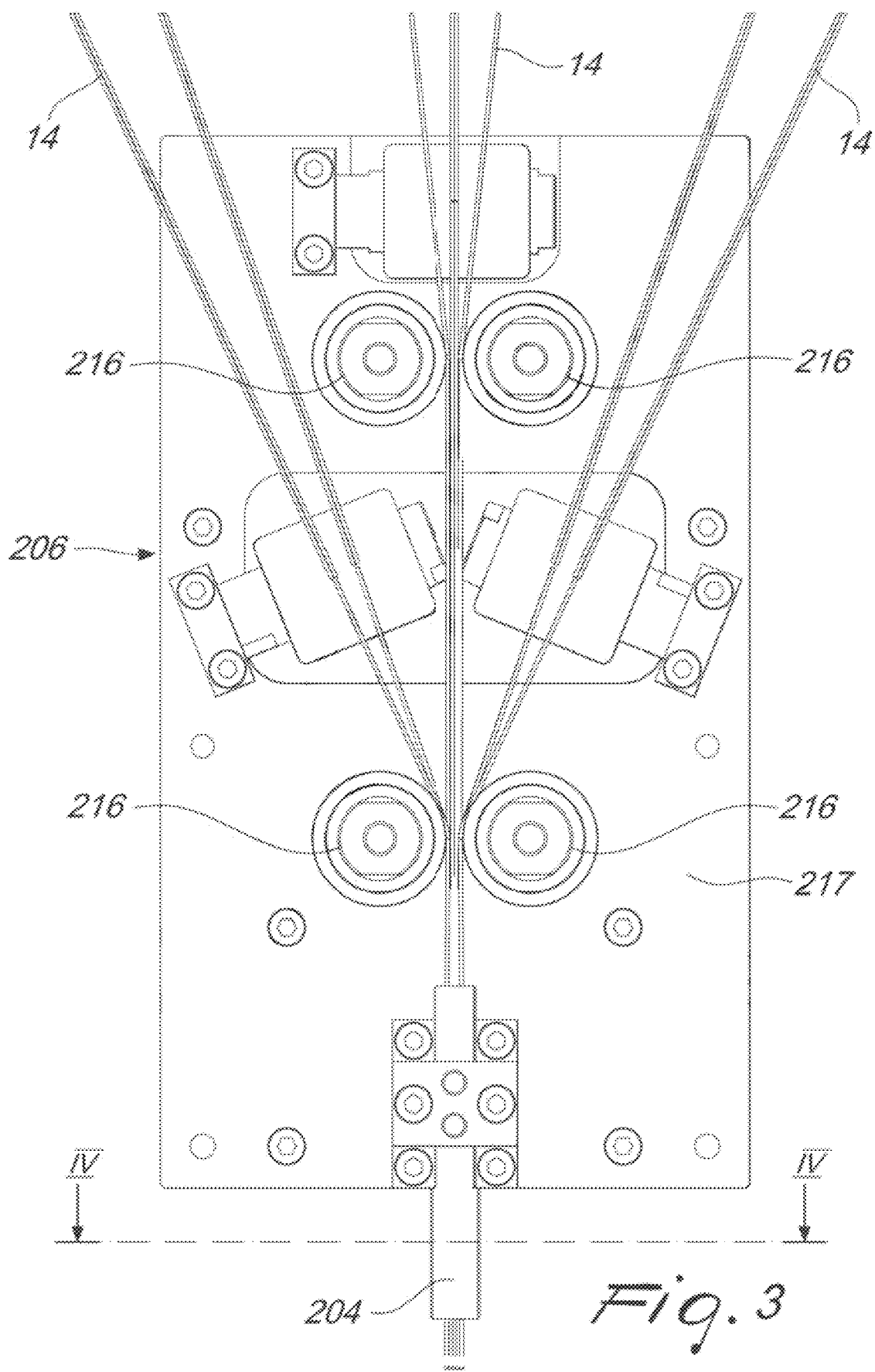
FIG. 3 is a plan detail of the machine of FIG. 2.

FIG. 3 shows, in detail, the wire guiding device 206 which comprises a base 217 on which wire directing elements 216 (preferably pairs of wheels) are fixed and direct the wires 14 into the wire guiding tube 204 which is placed at the end of the base 217 which is facing the winding tool 20.

Figure 4:
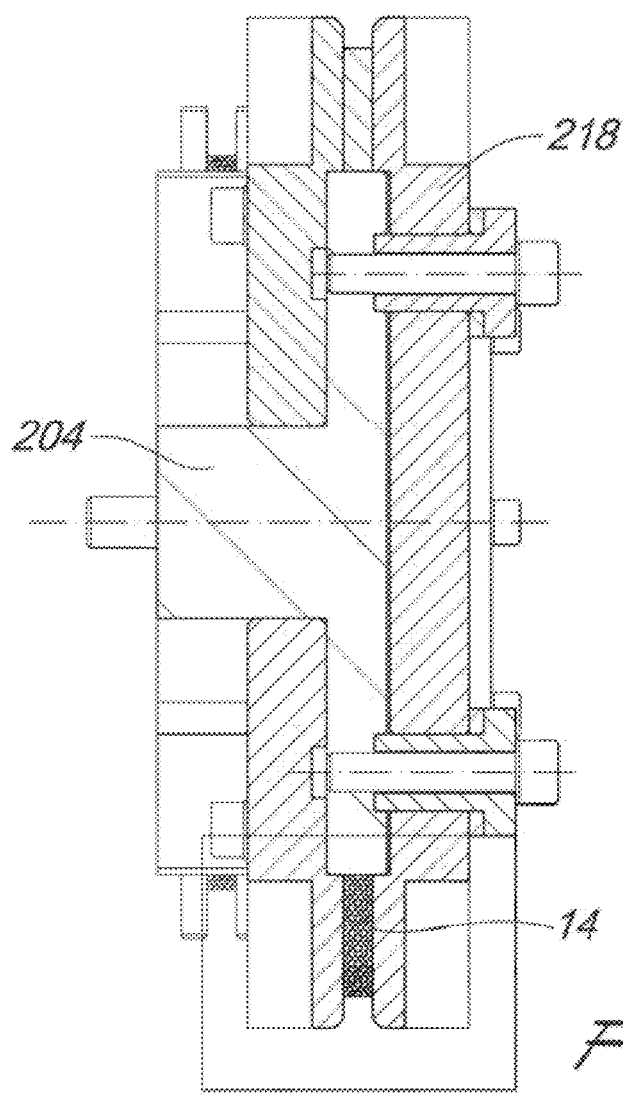
FIGS. 4, 5 and 6 are sectional details of the machine of FIG. 2.
Figure 5:
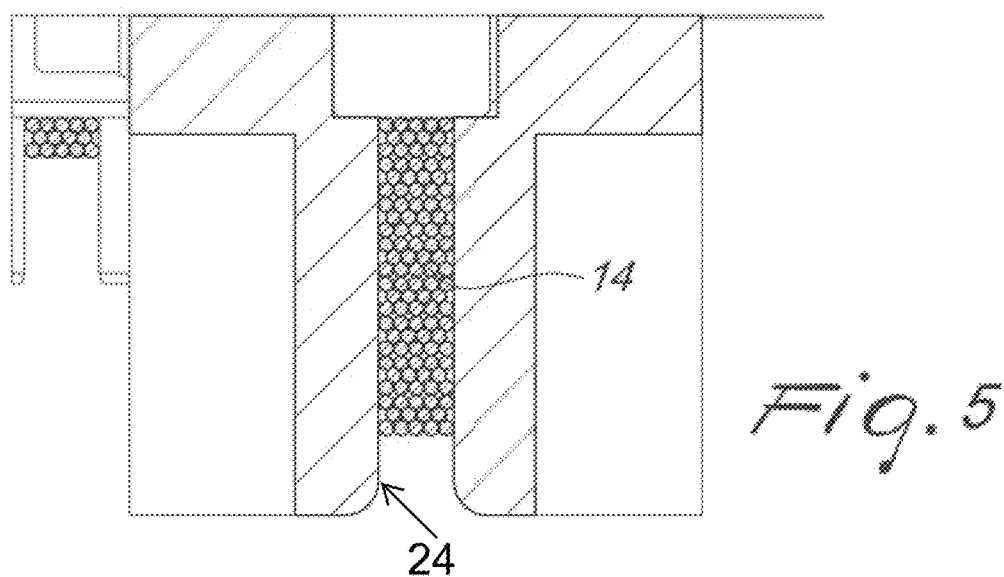

The details of a reeling member 218, which is preferably present in the winding machine 200 and positioned coaxially to the spindle 244, in which the wires 14 coming out of the wire guiding tube 204 are aligned in loops before being wound on the winding tool 20, are illustrated in FIGS. 4 and 5.

Figure 6:
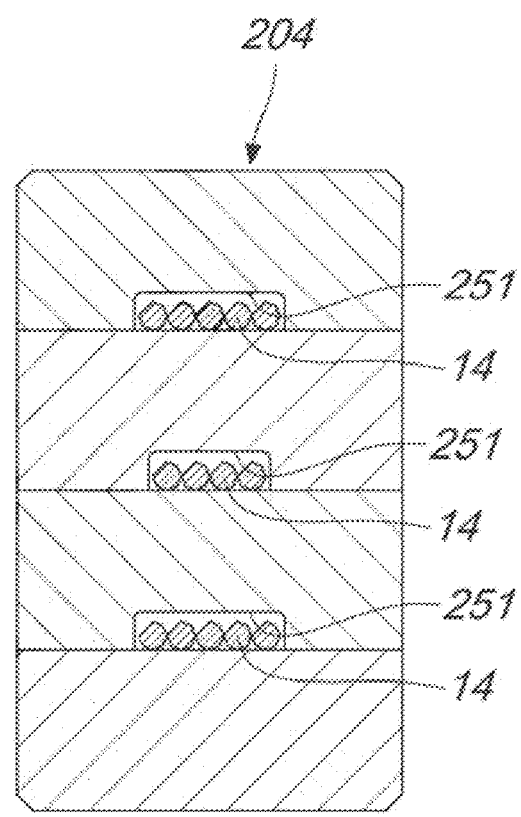

FIG. 6 shows a section of the wire guiding tube 204 composed of a plurality of sectors which define a plurality of separate ducts 251 for the wires 14, such as the wires 14 intended to form a level of a loop are kept in position in each duct 251. There are three ducts 251 in the example illustrated and the wires are arranged on three levels with a 5-4-5 sequence (five wires on the first level, four on the second level and five on the third level) for a total of fourteen wires in parallel for each loop, each of which wires 14 comes from and is managed by one of the fourteen wire tensioning devices 203 visible in FIG. 2.

Obviously, the number of wires 14 wound in parallel for each loop (and thus of wire tensioning devices 203), the number of levels (and thus of ducts 251 in the wire guiding tube 204) and the number of wires 14 per level can be varied and selected depending on the project requirements.

Following the coil forming step A, the method provides an optional, although preferential, pressing and/or carburizing step B, wherein the at least one linear portion 4a, 4b of the at least one coil 4 is pressed and subjected to a thermal carburizing treatment such as to compact the individual linear wire portions 1 one to another.

In practice, the coil 4, or coils 4, formed is/are displaced and positioned, together with the winding tool 20, in the pressing and/or carburizing apparatus 300, as shown for example in FIG. 17.

In the preferred embodiments, the apparatus 300 carries out both the pressing and carburizing 300 and comprises a housing seat 301 configured to house the winding tool 20 and one or more presser elements 30 configured to exert a pressure on the at least one linear portion 4a, 4b of the coil 4 wound on the winding tool 20.

Preferably, there are two presser elements 20 positioned coaxially on opposite sides of the housing seat and which exert a pressure one in direction of the other, preferably in horizontal direction, such as to press each one of the two opposite linear portions 4a, 4b of each coil.

The presser elements 30 are provided with at least one heating device 31 (preferably comprising one or more inductors) configured to heat the linear portion 4a, 4b before, after or during said pressure, such as to make the thermal carburizing treatment while the coil 4 is wound on the winding tool 20.

The presser elements are activated by means of a pressure kinematic system 304 which, in the embodiment illustrated, comprises a piston and a spring coaxial thereto.

In some embodiments, the heating devices 31 are comprised in, or coupled to, the presser elements 30 and more precisely in their heads 32, which constitute the end of the presser elements 30 themselves and which come into contact with the linear portions 4a, 4b during the pressing.

Conveniently, there is a number of heating devices 31 equal to the number of movable walls 2.

Optionally, the pressing and/or carburizing apparatus 300 comprises thermal probes 34 and/or pyrometers 35, preferably coupled to the presser elements 30, such as to allow the feedback control of the carburizing treatment by a control system which controls the heating elements 31.

More in detail, the pressing and/or carburizing apparatus 300 comprises, at the housing seat 301, fixed abutments 311 on which the winding tool 20 is leaned. Such fixed abutments 311 have leaning planes made of thermally insulating material, on which the winding tool 20 is leaned to limit heat loss.

Preferably, the pressing and/or carburizing apparatus 300 further comprises a pressing head 320 which moves orthogonally with respect to the presser elements 30, vertically 320 in the example illustrated, such as to compress the winding tool (and thus the coil 4) in orthogonal direction with respect to the presser elements 30, thus causing the movable walls 22 to move closer, such as to further compact the linear portions 4a, 4b of the coil 4 and to determine the thickness thereof using the mechanical reference elements 291, which act as limit abutments, as a reference. In practice, the press head 320 compresses the winding tool 20 (and thus the coil 4) against the fixed abutments 311.

Thus, in the preferred embodiment, the linear portions 4a, 4b of each coil 4 are subjected to two pressures in orthogonal directions to each other, as shown in FIGS. 17-19.

Conveniently, only the linear portions 4a, 4b of the coil 4 are pressed and subjected to thermal treatment, while the nonlinear portions (i.e. the parts of the coil 4 connecting the linear portions 4a, 4b, which are mainly curved and form the head of the coil 4) are left untreated such as to be able to easily shape them in the successive steps.

Once the predetermined carburizing temperature has been reached, which depends on the characteristics of the wire 14 used, the presser elements 30, and possibly the vertical press 320, keep the pressure for the time needed to cool, which is assisted by cooling devices (not illustrated), such as to stabilize the linear portions 4a, 4b at final dimensions.

In the example shown in the figures, the pressure exerted is in the range of 140-300 bars and the temperature reached by the heating elements 31 is in the range of 170°-210° C. The duration of step B is between 15 seconds to 2 minutes.

Optionally, the pressing and/or carburizing apparatus 300 comprises a loading slide 330 configured to bring the winding tool 20 with the coil 4 into the housing seat 301 and to deposit it on the fixed abutments 311. As visible in FIG. 17, the loading slide can slide along horizontal tracks 331 and is provided with a platform movable vertically and adapted to raise the winding tool 20.

Advantageously, the pressing and/or carburizing step B conforms and makes the dimension of the linear portions 4a, 4b of the coils 4 repeatable and compacts them by maximizing the filling factor. Moreover, the linear portions 4a, 4b thus treated solidify between them such as the arrangement of the wires 14 stays unchanged during the entire process; the wires are arranged and kept in an orderly, repeatable, matrix configuration and are not grouped in casual order as they keep the order given during the initial winding.

In the example described, the linear portions 4a, 4b of the coil 4 are first subjected to pressing and then to carburizing, but in general the method can be made by performing either the pressing or the carburizing, or both in the order described and also backwards, or even by performing the pressing and carburizing contemporaneously.

After the pressing and/or carburizing step B, when the coil 4 has cooled and thus solidified in the linear portions 4a, 4b, the coil itself is disassembled from the winding tool 20. By supporting the winding tool 20 by means of the sleeve for hooking to the spindle 25 and/or the gripping element 242, the coupling device 241 is unlocked (pneumatically).

The wire clamps 26, 261 are thus opened, for example by means of two external controls, to release the wires 14 coming in and out of the winding. At this point, a manipulator (not illustrated), which guides the removable wall 24' of the winding tool, starts to move away axially from the anchoring wall 23'. During the first step of this movement, the corner elements 245, sliding on the respective guides 246, start to move towards the center of the winding tool 20, such as to loosen the wire and allow the disassembly of the coils.

The manipulator which guides the removable wall 24' thus continues to move away axially from the anchoring wall 23' and a second manipulator takes the movable walls 22 by means of the manipulation seat 249 and moves them until pulling them out from the anchoring wall 23' (pulling them out from the pins 27, 231).

At this point, the coil 4, or coils 4, is/are removed from the winding tool 20.

FIGS. 9a, 9b, 9c show three different examples of loops achievable with a winding tool 20-20"" according to the present invention, wherein: in FIG. 9a, each loop S1, S2 is formed by two layers: a first layer of five wires and a second layer of four wires; in FIG. 9b, each loop S1', S2' is formed by two layers, both of five wires; in FIG. 9c, each loop S1", S2" is formed by three layers: a first layer of five wires, a second layer of four wires and a third layer of five wires.

These examples help understand how it is possible to recognize a stator made according to the present invention from a stator made according to the known art, thus by visually analyzing the arrangement and density of the wires in the sectors, or slots.

As can also be noted from the aforementioned figures, the round wires tend to leave free spaces; to overcome this problem, it is possible to resort to an optional solution illustrated in FIGS. 10a, 10b, 10c.

According to this optional and advantageous solution for the filling factor, during the coil making step and, more precisely, during the winding, complementary conducting wires of a smaller section 141, which go to occupy the space left free from the tangency of the wires 14 of greater section (i.e. the free spaces between the aforesaid wires 14 of greater section), are added to each loop S1, S2. This way, in the winding step, each loop S1, S2 will be formed by layers of wires of different section, alternated with each other, which, once wound, allow to achieve an even greater filling factor.

FIGS. 7A and 8A show another embodiment of the winding machine 200 and a second embodiment of the winding tool 20, usable as an alternative to the first. A wire directing device 150, which automatically allows to manage the distance between the various levels of the wires 14 coming in by means of a controlled axis, is used instead of the wire guiding device 206 with a single wire guiding tube 204 of FIG. 206.

This wire directing device 150 comprises an axial guide 151 along which a plurality of wire guiding tubes 152 slide in a controlled way and independently of one another.

The axial guide 151 in turn slides along a perpendicular guide 153, such as the wire guiding tubes 152 are movable along at least two axes.

Each wire guiding tube 152 is crossed by, and in practice directs, a layer of wires 14.

During the various winding steps, the wire guiding tubes 152 can move close to each other up to bringing the various levels of wire into contact, or can move away from each other such as each layer enters the winding independently and at a different moment than the others.

This makes it possible to deposit each layer on the winding tool 20 independently of the others to prevent them from getting in each other's way.

When required, the wire guiding tubes 152 move close to each other again to facilitate the operations which require that the wires 14 are all close to each other.

Optionally, in this embodiment, the winding tool 20 is rotated by a winding spindle 244' which is integral to a motor assembly 157 fixed to a carriage 158 movable along a track 159 (guide or rail or the like).

Considering the winding machine 200 shown in FIGS. 7A-8A and the respective winding tool 20, following the coil forming step A, the method provides a pressing and/or carburizing step B, as previously described and as will now be illustrated with reference to FIGS. 15A to 19A.

The heating device 30' shown in FIGS. 15A and 16A comprises one or more heating elements 31, preferably by induction. These heating elements 31 are shaped and arranged such as to be inserted between the linear portions 4a, 4b of the coils, in contact with or adjacent thereto. It is possible to perform this operation while the coil 4 is still accommodated on the winding tool 20 thanks to the fact that the linear portions 4a, 4b are left free.

Thus, these heating elements 31 have a longitudinal extent substantially equivalent to that of the linear portions 4a, 4b to be heated.

It should be noted that in the embodiment illustrated, the heating elements 31 substantially form a comb of elements parallel to each other.

In practice, the heating elements 31 are inserted between the linear portions 4a, 4b of the coils such as to heat them up to the carburizing temperature, as illustrated in FIG. 16A.

There is thus the time to remove the heating elements 31 and to insert, in their place, the pressing device 300 which presses the winding by exploiting the thermal inertia of the material.

In the embodiment illustrated in FIGS. 17A-19A, concerning the winding tool 20 mounted on the winding machine 200 shown in FIGS. 7A-8A, the pressing device 300 comprises a plate 301 to which a series of inclined planes 303 adapted to come into contact with the linear portions 4a, 4b to be pressed is combined.

Advantageously, the plate 301 is inserted into, or is anyhow mechanically coupled to, a complementary counterplate 302 positioned on the opposite side of the linear portions 4a, 4b, which complementary counterplate 302 in practice acts as an abutment element.

The plate 301 is pushed by means of a thrust device (not illustrated) against the counterplate 302. The inclined planes 303 are configured such as the moving of the plate 301 towards the counterplate 302 causes, by direct mechanical interaction, the compacting of the linear portions of the coil 4a, 4b.

Thus, the linear portions 4a, 4b of the winding are compacted to the desired dimensions by exploiting the force of the thrust device and the appropriately made inclined planes 303.

These carburizing and pressing operations can be made alternately or contemporaneously on the two sides of the winding tool 20, depending on the cycle time required by the plant during production.

Conveniently, only the linear portions 4a, 4b of the coil 4 are pressed and/or subjected to thermal treatment, while the nonlinear portions (i.e. the parts of the coil 4 connecting the linear portions 4a, 4b, which are mainly curved and form the head of the coil 4) are left untreated such as to be able to easily shape them in the successive steps.

After the pressing and/or carburizing step B, when the coil 4 has cooled and thus solidified in the linear portions 4a, 4b, the coil 4 or coils 4 can be removed from the winding tool 20 (any one of those described).

Optionally, as shown in FIGS. 20-26, when, in the coil making step A, a series of multiple coils 4 is made on the same winding tool 20 such as a linear portion 4a, 4b of a coil 4 is spaced from the linear portion of the successive coil 4 by a predetermined pitch distance, a step of correcting the pitch between the coils is performed before the housing step C and comprises the steps of: making the series of coils 4 interact mechanically with a pitch-correcting device 50 configured to correct the pitch distance between the linear portions 4a, 4b of the different coils 4, the coils are taken and brought into the pitch-correcting device 50 for this purpose, and displacing the coils 4 by means of pliers 51 configured to keep the pitch distance between the linear portions 4a, 4b of the coils 4.

These pliers 51 will insert the coils 4 between the teeth 2 in the successive housing step C.

More in detail, the pitch-correcting device 50 comprises a series of longitudinal seats 55 parallel to each other inside which the linear portions 4a, 4b of the coils, defined inside longitudinal blocks 56 parallel to each other, are inserted.

Once the linear portions 4a, 4b are inserted into the longitudinal seats 55, the distance between them, and thus the pitch distance between the linear portions 4a, 4b, can be adjusted by modifying the distance between the longitudinal blocks 56 by means of adjustment element 58 (such as for example screws or the like).

Additional adjustment elements 57 (for example screws) are also present to tighten the slits and to fasten the linear portions 4a, 4b during the adjustment.

Optionally, during the pitch-correcting process, it is possible to introduce insulating papers 59, which protect the same coils 4 from damages inside the stator 1, inside the coils 4 (preferably around the linear portions 4a, 4b).

The coils 4 are thus displaced by a mobilization apparatus, which comprises the aforesaid pliers 51 and other devices of the known type (for example arms, kinematic chains, etc.) selected according to the requirements, to perform the successive coil housing step C. An example of mobilization apparatus is shown in FIGS. 73-74.

More in detail, the aforesaid pliers 51 keep the pitch distance between the linear portions 4a, 4b of the coil 4 by means of a plurality of fingers 52 adapted to grasp said linear portions 4a, 4b.

With reference to FIGS. 26 to 45, in the coil housing step C, the linear portion 4a, 4b, or the linear portions 4a, 4b, of the coil 4, already carburized and pressed, is/are inserted into in a stator component 1A, 1B comprising a subset of the plurality of stator teeth 2 which will compose the stator body 10.

Such subset comprises at least two side-by-side teeth 2; in the example illustrated (FIG. 26), the stator component 1A, 1B comprises four teeth 2 which will define, between them, three sectors 3.

In practice, each linear portion 4a, 4b of each coil 4 is inserted between two side-by-side teeth 2.

In the preferred embodiments, among which those illustrated, each coil 4 has two parallel linear portions 4a, 4b which are each inserted into a different stator component 1A, 1B.

Thus, in the preferred embodiment illustrated, the coil 4 comprises a first 4a and a second 4b linear portion, the first linear portion 4a is inserted into a first stator component 1A and the second linear portion 4b of the same coil 4 is inserted into a second stator component 1B; each of such first 1A and second 1B stator component will be deformed in the successive shaping step D.

Preferably, during the coil housing step A, the stator components 1A, 1B are already housed into the shaping apparatus 700 through which the successive shaping step D is also made and, more precisely, each stator component 1A, 1B in a respective deforming vise 70A, 70B.

In the preferred embodiments, this shaping apparatus 700 comprises a couple of deforming vises 70A, 70B, each being configured to accommodate one of the stator components 1A, 1B between two jaws 71 adapted to compress such stator component 1A, 1B such as to move the teeth 2 therein close to each other.

At least one of the deforming vises 70A, 70B can be displaced (by means of a mobilization system, not illustrated, which can be made in an obvious way for the technician of the field) and configured to cause its rototranslation (R1, R2) with respect to the other deforming vise 70A, 70B.

After having inserted the linear portions 4a, 4b between the teeth 2 of the stator components 1A, 1B, the shaping step D is performed, wherein each stator component 1A, 1B is deformed (by the action of the deforming vise 70A, 70B into which it is inserted) such as to move the side-by-side teeth 2 close to each other such as to comprise (and possibly lock) each linear portion 4a, 4b in a sector 3 defined by two side-by-side teeth 2.

A finished stator portion 1A', 1B', comprising the at least two teeth 2 defining, between them, the sector 3 in which the linear portion 4a, 4b of the coil 4 (FIGS. 34, 39, 42) is comprised, is made this way starting from each stator component 1A, 1B. In the examples shown, each finished stator portion 1A', 1B' comprises four teeth 2 which define three sectors 3, each sector engaged by a linear portion 4a, 4b of a coil 4.

In the preferred embodiment illustrated, after the shaping step D, the first finished stator portion 1A' is rototranslated R1 with respect to the second finished stator portion 1B' until reaching the relative position which the first stator component 1A' will have with respect to the second stator component 1B' in the stator body 10.

Consequently, during the rototranslation R1, the coil 4 is deformed in its nonlinear portions which are curved.

More in detail, in a first embodiment illustrated in FIGS. 26 to 35, while the linear portions 4a, 4b of the coil 4 are inserted respectively into the first 1A and the second 1B stator component, these are aligned along the same plane with the teeth 2 of the first stator component 1A jutting out (vertically in the example illustrated) towards the second stator component 1B and the teeth 2 of the second stator component 1B jutting out away from the first stator component 1A or vice-versa, the teeth 2 of the first stator component 1A being in practice oriented in the same direction with respect to the teeth of the second stator component 1B. This way, the wires 14 of the coil 4, which are more inward in the sector 3 in the first stator component 1A, are positioned more outward in the sector 3 of the second stator component 1B, thus achieving a transposition of the loops which contributes to increasing the efficiency of the electric motor. Coils 4 of equal wire length are thus in practice achieved this way.

In a second embodiment illustrated in FIGS. 36 to 45, while the linear portions 4a, 4b of the coil 4 are inserted respectively into the first 1A and the second 1B stator component, these are aligned along the same plane with the teeth 2 of the first stator component 1A jutting out (vertically in the example illustrated) towards the second stator component 1B and the teeth 2 of the second stator component 1B jutting towards the first stator component 1A, the teeth 2 of the first stator component 1A being in practice oriented in an opposite and converging direction with respect to the teeth 2 of the second stator component 1B. This way, the aforesaid transposition of the loops is not achieved whereas coils 4 having a concentric distribution inside the stator are achieved.

In further possible embodiments of the method, the housing C and shaping D steps are performed after having deformed the coils 4 such as to position its linear portions 4a, 4b in a predetermined mutual position, in practice by rotating or rototranslating (for example by means of appropriate pliers) a linear portion 4a with respect to the other 4b, similarly to that which was described previously but without inserting them into the stator components 1A, 1B; the linear portions 4a, 4b are inserted only at this point into the stator components 1B, 1A, which are shaped as described previously.

This alternative is defined as the rototranslation R2 step, as an alternative to the R1 described above.

In practice, the method can be implemented with the following steps, in chronological order: A, optionally B, R2, C, D, E or with the steps A, optionally B, C, D, R1, E.

Optionally, after the pressing and/or carburizing step B, a step of insulating the conducting wires 4 is provided and can be performed by applying an electrically insulating layer (preferably an insulating film, for example of a specific insulating paper) on the wires 14 of the coils 4 (at least on the linear portions 4a, 4b), before inserting them between the teeth 2 of the stator components 1A, 1B; as an alternative, it is possible to position the electrically insulating layer between the teeth 2 of the stator components 1A, 1B before inserting the linear portions 4a, 4b of the coils 4 therein. A further alternative for performing the insulation is to overmould the wires 14 of the coils 4 (at least their linear portions 4a, 4b) with an electrically insulating material.

An assembling step E is indeed made, shown in FIGS. 46-52, wherein a plurality of finished stator portions 1A', 1B', 1C', 1D', achieved by means of respective housing C and shaping D steps (and rototranslation R1, R2), are assembled to one another such as to form the stator body 10.

More in detail, in the preferred embodiments of the assembling step, it is possible to proceed by fastening in sequence the plurality of finished stator portions 1A', 1B', 1C', 1D' on an outer surface 61 of a drum 60 (preferably rotatable) until forming a stator body 10 substantially cylindrical about the drum 60 to then remove such stator body 10 from the drum 60 itself.

In the preferred embodiments, the assembling step E is made by means of the assembling apparatus 600 which comprises a substantially cylindrical drum 60 (preferably rotatable).

The drum 60 has an outer surface 61 provided with a series of fastening seats 62 adapted to be engaged by respective fastening elements 63 (such as for example brackets which, in the example shown, have a bifurcate hooking end) for fastening the finished stator portions 1A', 1B' to the outer surface 61 of the drum.

Preferably, the drum 60 is divided into drum sectors 60A, 60B, 60C which can be moved close to each other such as to reduce the diameter of the drum 60 to allow the extraction of the stator body 10 formed on the outer surface 61 of the drum 60.

Figure 46:
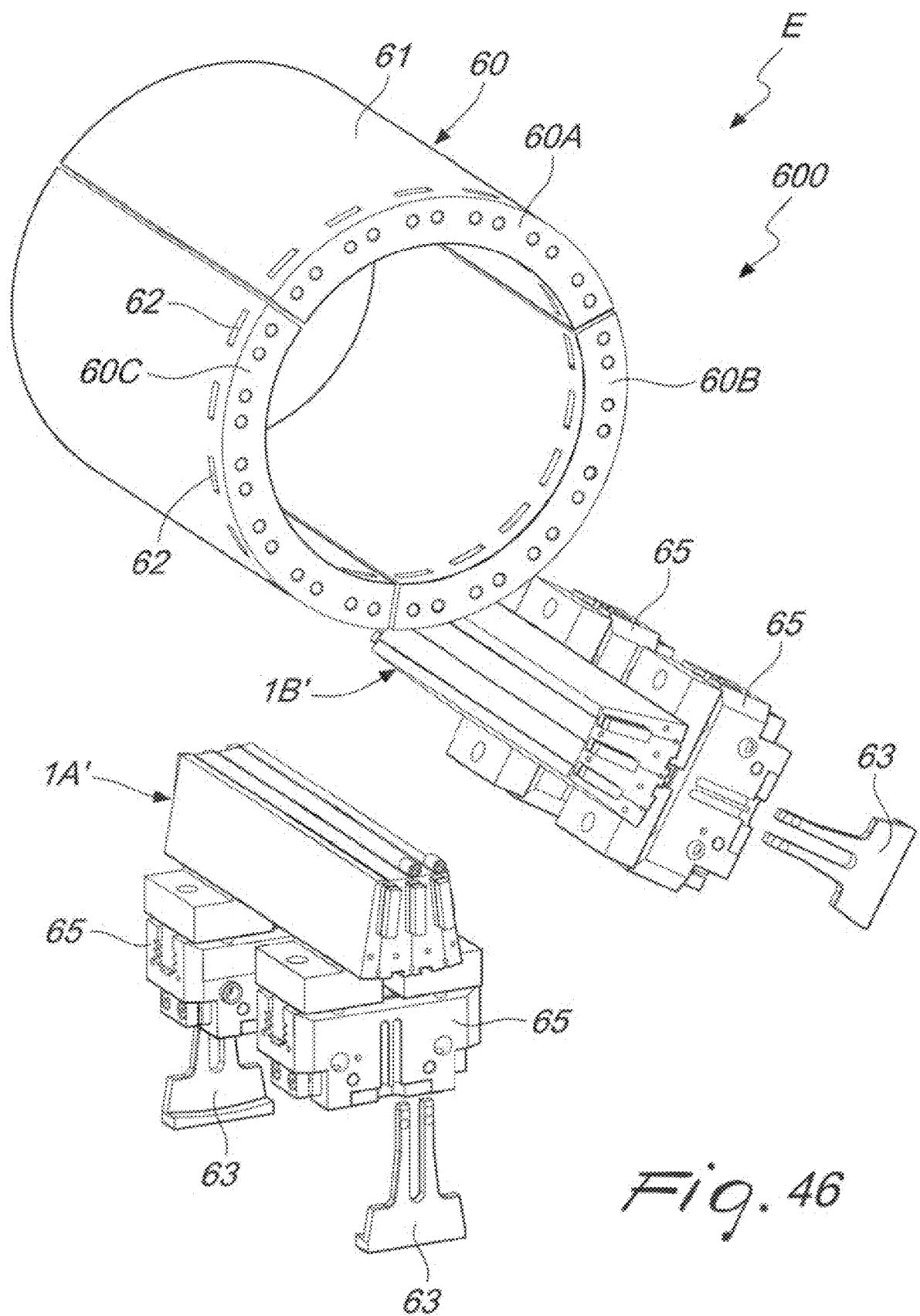
Figure 47:
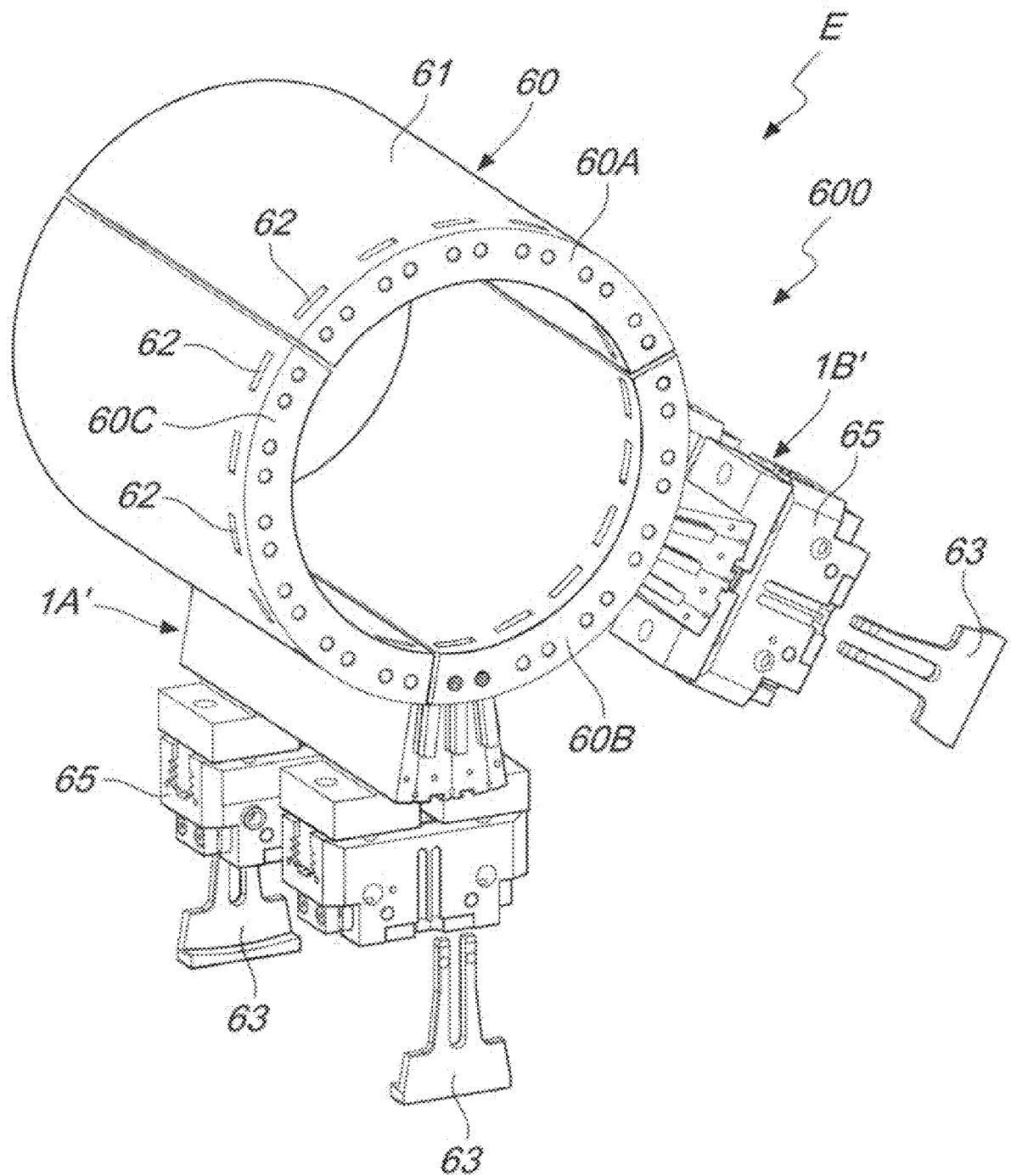
Figure 48:
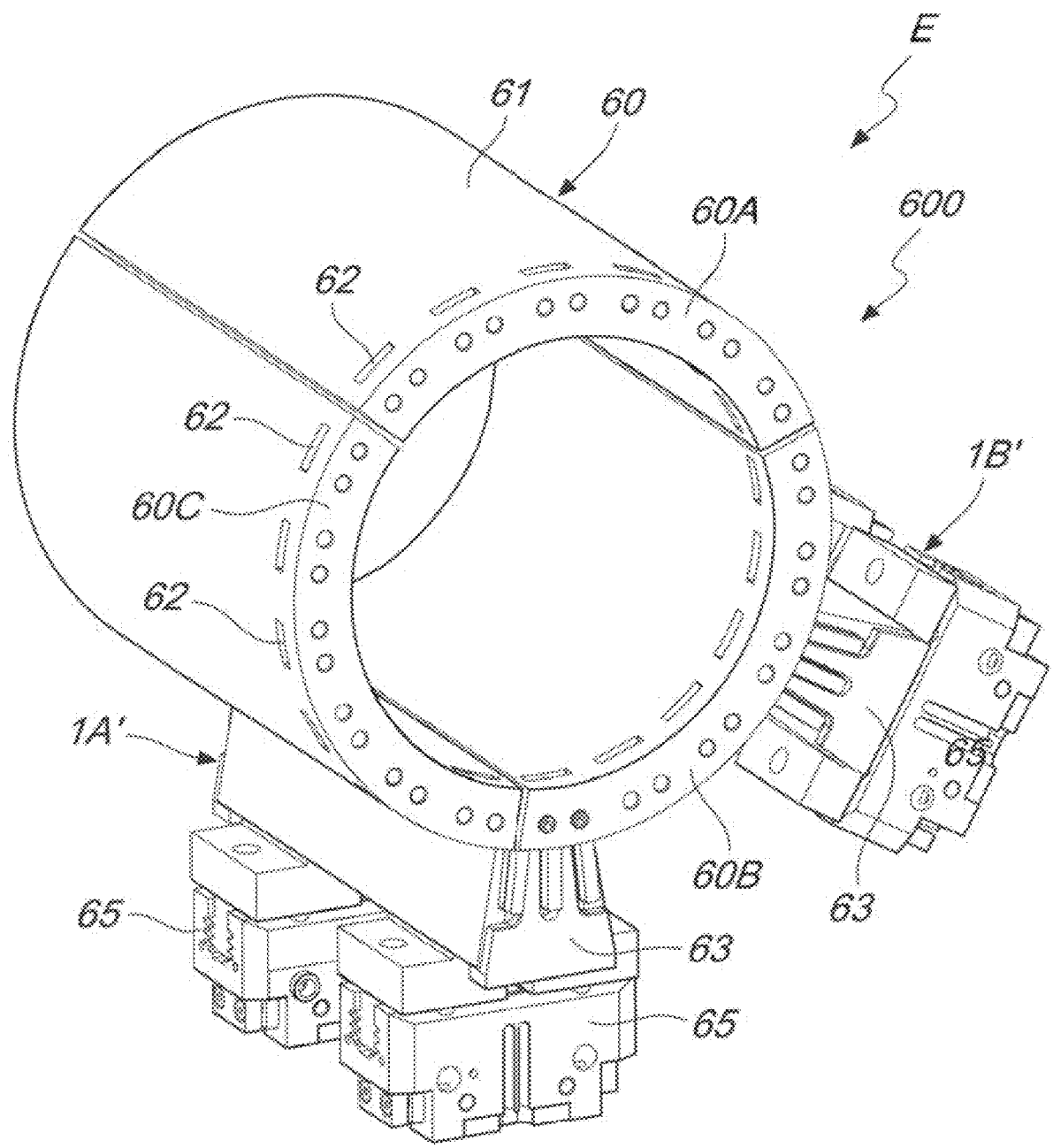
Figure 49:
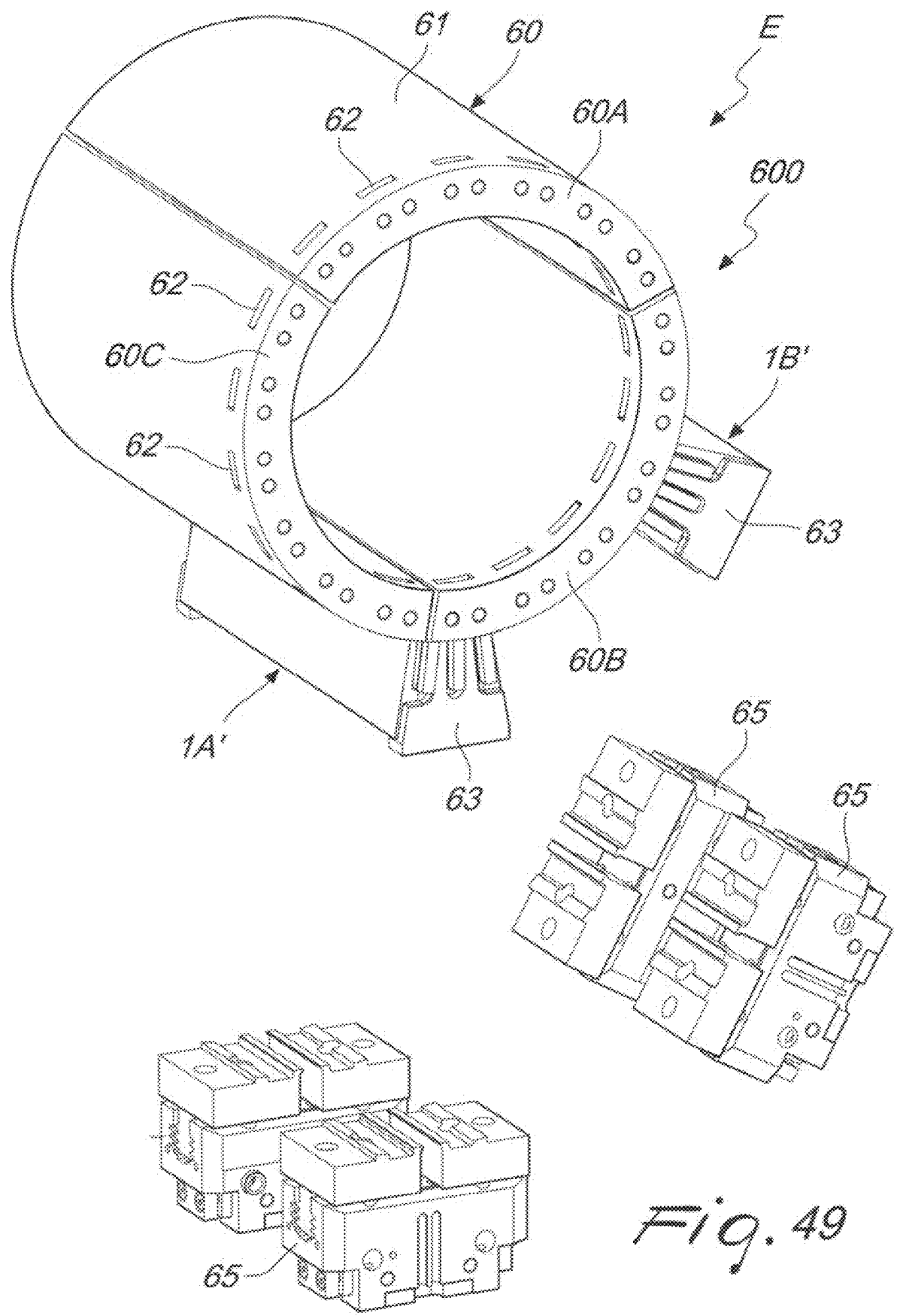
Figure 50:
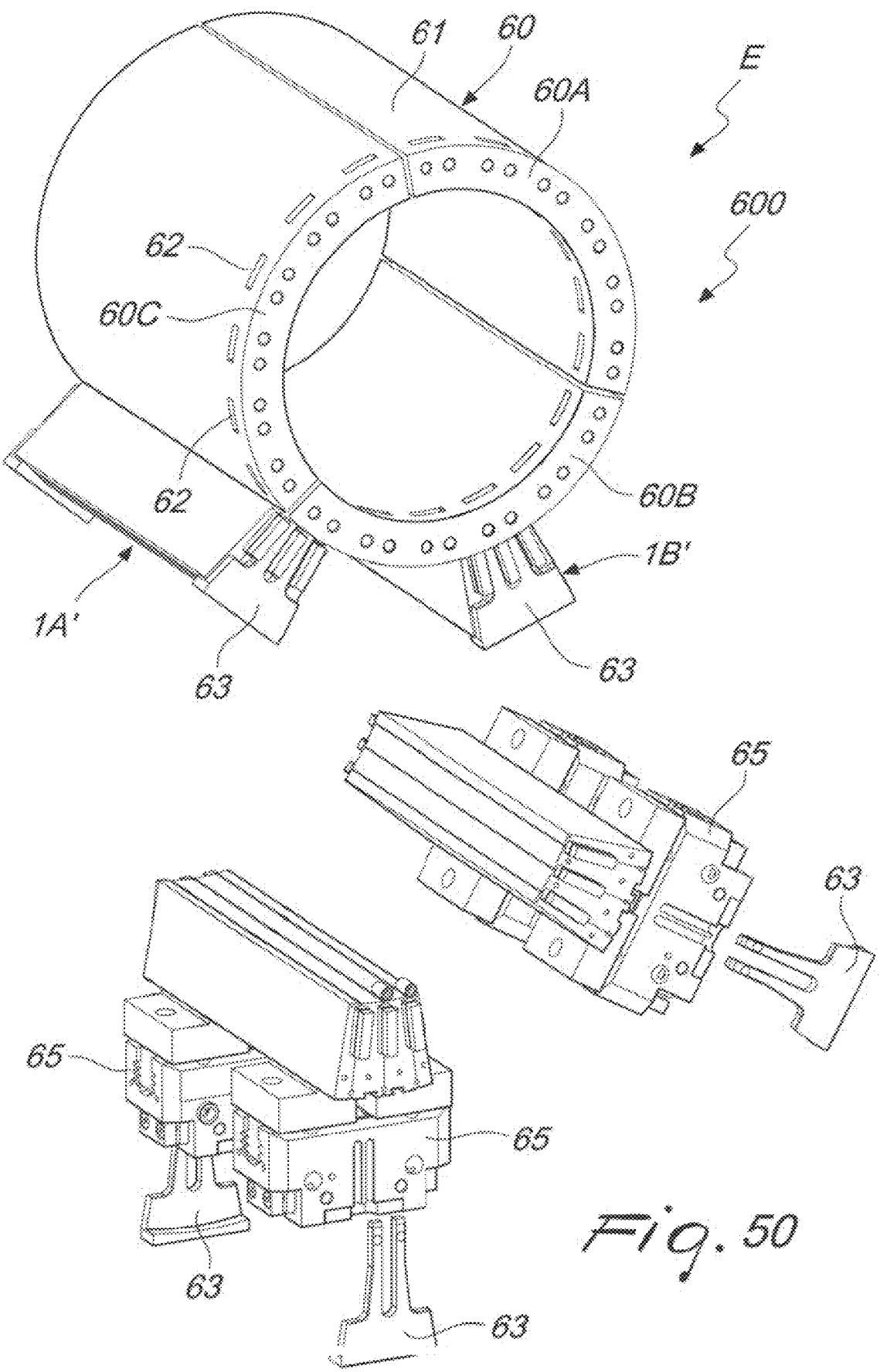
Figure 51:
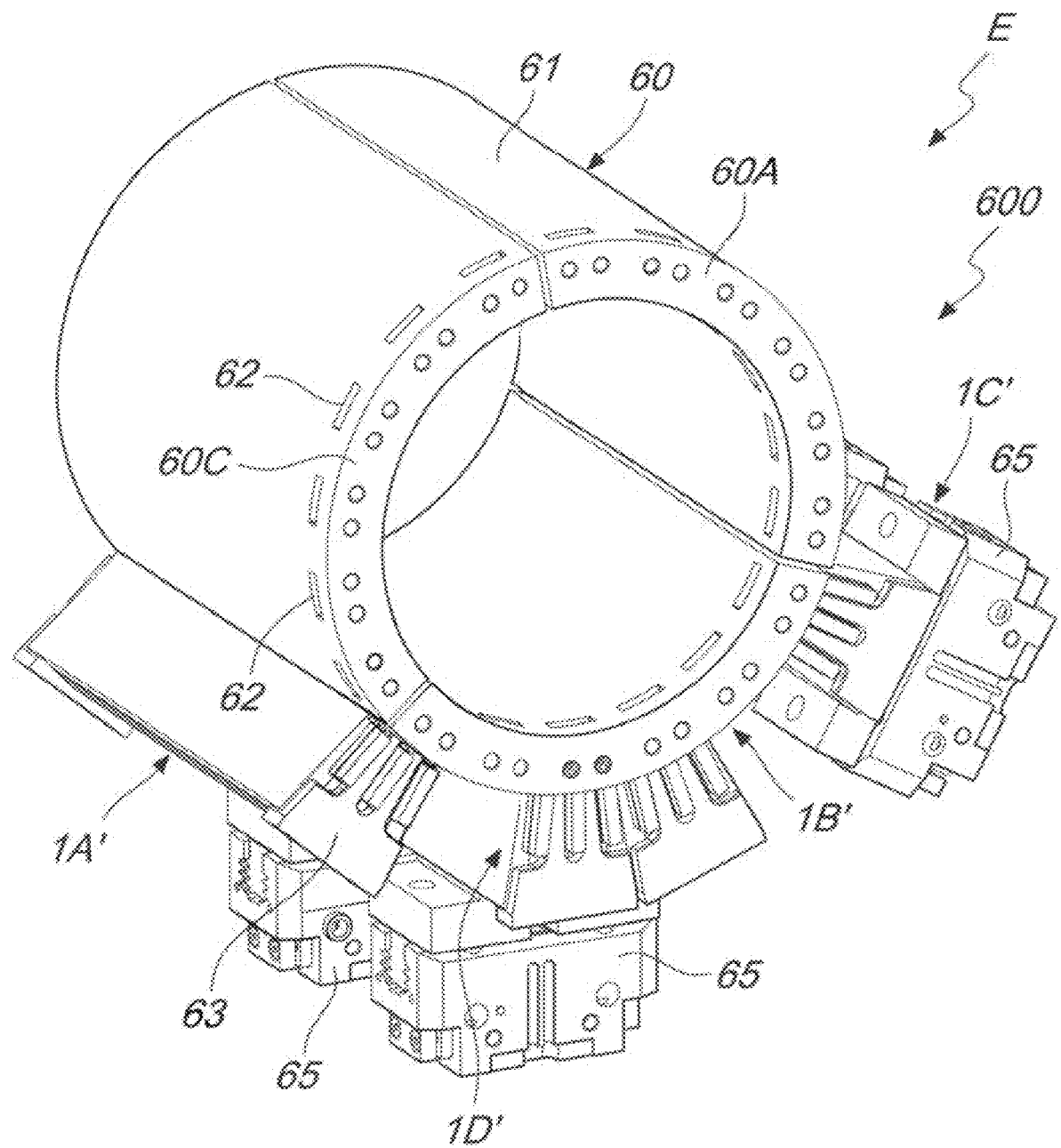

As illustrated in FIGS. 46 to 52, in the preferred embodiment, a retaining plier system 65, which are configured to be coupled to the finished stator portions 1A', 1B', positions the two finished stator portions 1A', 1B' (which share the same coil 4 and form a stator pole 1) formed together in the shaping step, each in a predetermined position (FIG. 46). Thus, the drum is displaced closer to the pliers 63 until coming into contact with the two finished stator portions 1A', 1B' (FIG. 47). At this point, the fastening elements 63 are inserted such as to fasten the two finished stator portions 1A', 1B' to the outer surface 61 of the drum 60 (FIG. 48). Successively, the retaining pliers 65 release the two finished stator portions 1A', 1B' and the drum 60 is moved away again, bringing along the two finished stator portions 1A', 1B' (FIG. 49).

Figure 52:
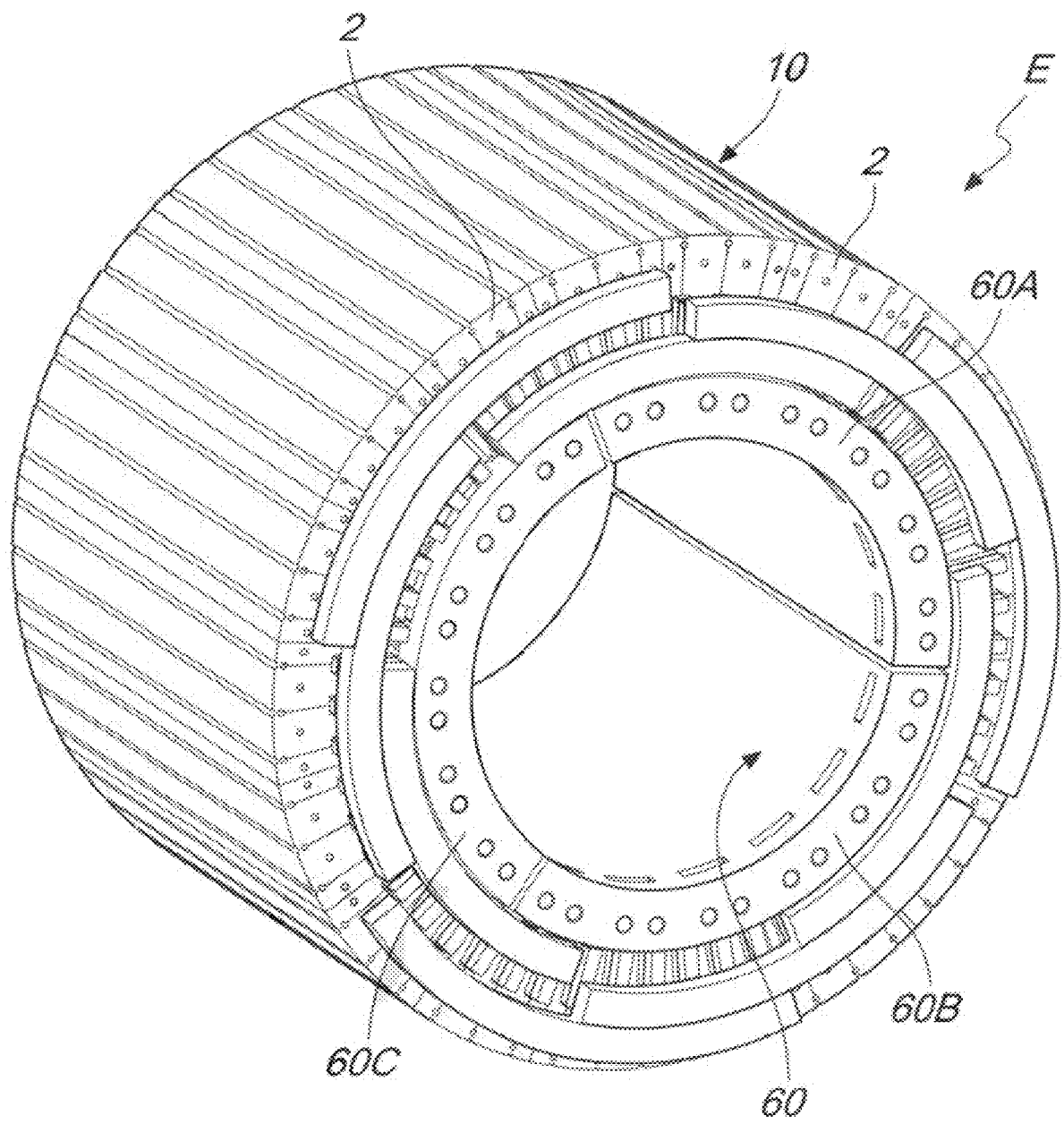

This process of fastening to the drum 60 just described is thus repeated in sequence for other finished stator portions 1C', 1D' (FIGS. 50 and 51) until completely covering the outer surface 61 of the drum 60, thus achieving a stator body 10 as illustrated in FIG. 52.

Optionally, during this assembling step E, between the fastening of a couple of finished stator portions 1A', 1B' and the successive 1C', 1D', insulating material is inserted between the adjacent finished stator portions 1A'-1C' to electrically insulate the phases.

At the end of the assembling step E, a prearranged manipulator delivers the stator body 10 by clamping it on the outer diameter and thus, after the drum sectors 60A, 60B, 60C have moved close to each other, thus decreasing the diameter of the drum 60, it is pulled out from the stator body 10.

At this point, the stator body 10 can be delivered to successive processing steps of known type which can comprise: pressing and welding the stator body 10 or direct insertion of the stator body 10 in a stator case, binding the winding heads (the parts of the wires 14 coming out of the sectors 3), shaping and/or pressing them, impregnation of the stator body, etc.

Two possible embodiments of stator bodies 10, 10', made according to the present invention (the windings are not shown for better clarity) are illustrated in FIGS. 53-56.

Specific shapes are made on the outer diameter of the stator body according to the requirements: in the first embodiment, there are cavities 8 which have undercuts, whereas there are substantially semicircular niches 8' in the second embodiment.

It should be noted that such stator bodies 10, 10' are taken apart at the stator teeth 2.

Advantageously, thanks to the peculiarity of the method, each sector 3 can accommodate one or a plurality of coils 4 which form an electric pole.

It should further be noted that the ends of the teeth 2 ("pole shoes"), in the shaping step, can be moved close to each other up to the minimal desirable distance such as to minimize the noise phenomena, in particular, torque ripples and efficiency losses.

It is thus advantageously possible to decrease the total number of sectors 3 to be assembled.

For example, as in the embodiments illustrated, an individual sector 3 can accommodate three coils 4 which can form the same phase or three different individual phases.

FIG. 57 shows a further advanced embodiment of the winding tool 20', wherein internal heating devices 91 (preferably electric resistances which are supplied by means of contacts 92 jutting outward) and which have the task to heat the linear portions 4a, 4d of the coils during the pressing and/or carburizing step B, are housed into the winding cheeks 222. These internal heating devices 91 can thus replace the heating devices 31 of the presser elements 30, or can be used in combination with them.

Further variation embodiments of the winding tool 20", 20''', 20'''', such as for example those illustrated in FIGS. 58 to 65, are also possible.

A first variation embodiment of the winding tool 20", which is configured to improve as much as possible the quality of the stratification, is illustrated in FIGS. 58, 59, 60, wherein the wires 14 are also kept with an optimal stratification in the nonlinear portions of the coils 4 such as to prevent a casual distribution in these portions from impacting the quality of the winding in the linear portions 4a, 4b. The wedge shape of the winding cheeks 222 in the upper part of the movable walls 22 should be noted.

FIGS. 61 to 64 show a second variation embodiment of the winding tool 20''', which is configured such as the movable walls 22 are movable longitudinally one with respect to the other with different and predetermined movements (mutually moving away and closer) to facilitate and ensure the perfect stratification of the wires during the winding, thus facilitating the entry of the wires 14 into the winding chambers (which are defined between a winding cheek 222 and the winding cheek 222 of the adjacent movable wall 22).

FIG. 65 shows a third variation embodiment of the winding tool 20'''' which comprises a series of heating housings 96 arranged to allow, in the pressing and/or carburizing step B, the entry of the heating devices 31 (preferably inductors) to carry out a localized heating, by induction, of the linear portions 4a, 4b of the coils 4. These heating housings 96 are obtained in the winding cheeks 222, since they are accessible from the outside.

Still in a further variation embodiment of the winding tool (not illustrated), the walls of the winding cheeks 222 defining, between them, the winding chambers are inclined such as to converge outward (unlike the embodiments shown in which they are parallel); advantageously, the inclination of these walls is defined according to the number of sectors 3 present in the stator body 10 finished according to the following formula: [inclination angle of the walls]=360°/[number of sectors], such as to then achieve a finished stator body 10 in which the side-by-side teeth 2 which define, between them, the sectors 3 are parallel and perfectly filled by concentric coils 4.

In a further embodiment (not illustrated), the walls of the winding cheeks 222 defining, between them, the winding chambers form a series of notches such as to converge outward.

Still in a further embodiment of the winding tool 20, the same comprises a series of movable walls 22 of different width from one another, decreasing towards the anchoring wall 23' or towards the removable wall 24', such as the winding width of the winding tool about which the coil 4 is wound is different for each coil 4 and decreasing in series, such as to achieve a series of coils 4 which have non linear portions of decreasing length. These coils 4 will be positioned concentrically in the stator.

In some embodiments, after the shaping step D, the first finished stator portion 1A' is rototranslated with respect to the second finished stator portion 1B' until reaching the relative position which the first stator component 1A' will have with respect to the second stator component 1B' in the stator body 10. Consequently, during the rototranslation, the coil 4 is deformed in the non linear portions which are curved. More in detail, in the embodiment illustrated in FIGS. 53-54 and 66A to 71C, while the linear portions 4a, 4b of the coil 4 are inserted respectively into the first 1A and the second 1B stator component, these are aligned along the same plane with the teeth 2 of the first stator component 1A jutting out (vertically in the example illustrated) towards the second stator component 1B and the teeth 2 of the second stator component 1B jutting out away from the first stator component 1A or vice-versa, the teeth 2 of the first stator component 1A being in practice oriented in the same direction with respect to the teeth of the second stator component 1B. This way, the wires 14 of the coil 4, which are more inward in the sector 3 in the first stator component 1A, are positioned more outward in the sector 3 of the second stator component 1B, thus achieving the transposition of the loops which contributes to increasing the final efficiency of the electric motor. Coils of equal wire length are thus in practice achieved this way.

In further possible embodiments of the method, the housing and shaping steps are performed after having deformed the coils 4 such as to position its linear portions 4a, 4b in a predetermined mutual position, in practice by rotating or rototranslating (for example by means of appropriate pliers) a linear portion 4a with respect to the other 4b, similarly to that which was described previously but without inserting them into the stator components 1A, 1B; the linear portions 4a, 4b are inserted only at this point into the stator components 1B, 1A, which are shaped as described previously.

Figure 72A:
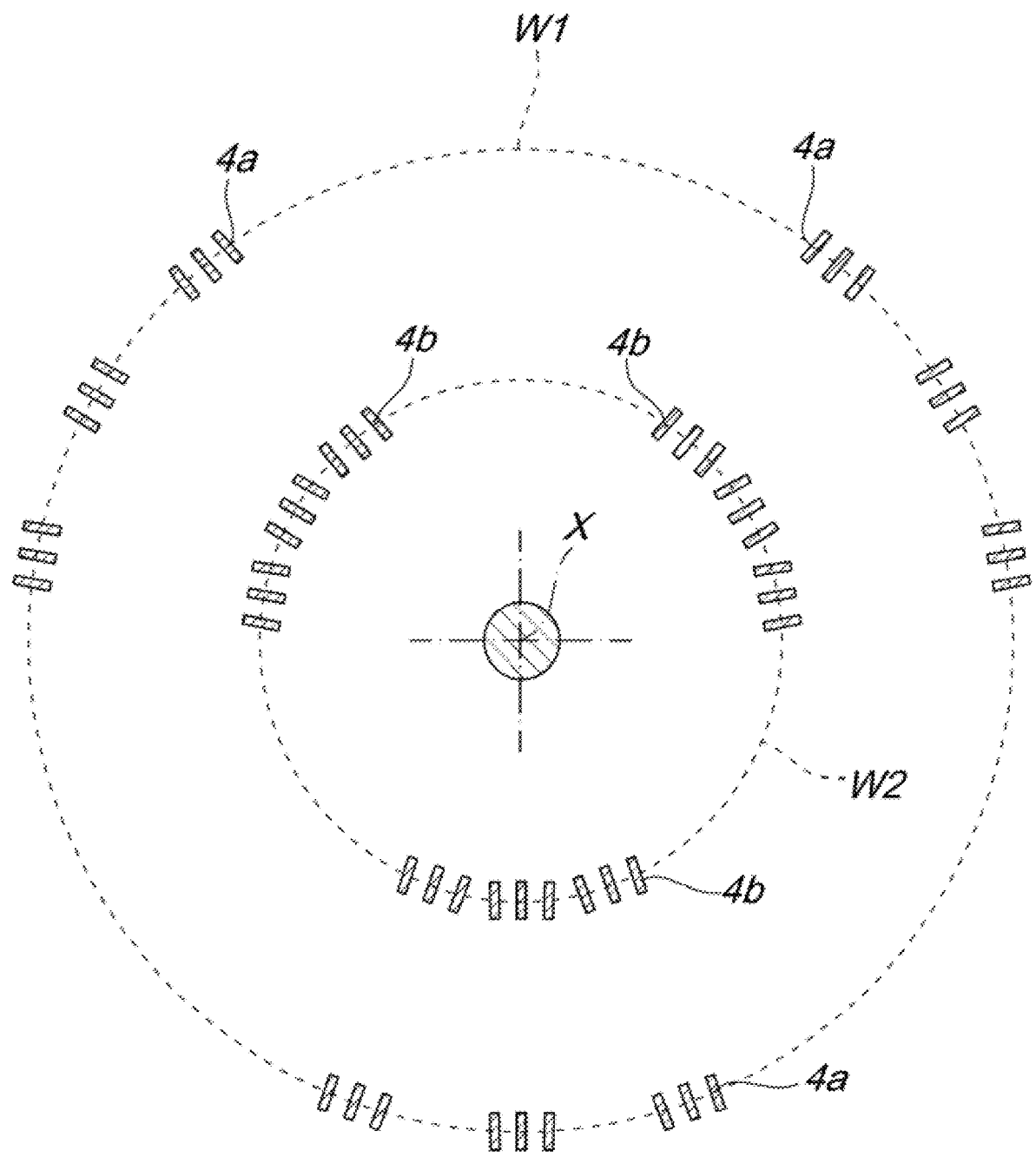
Figure 72B:
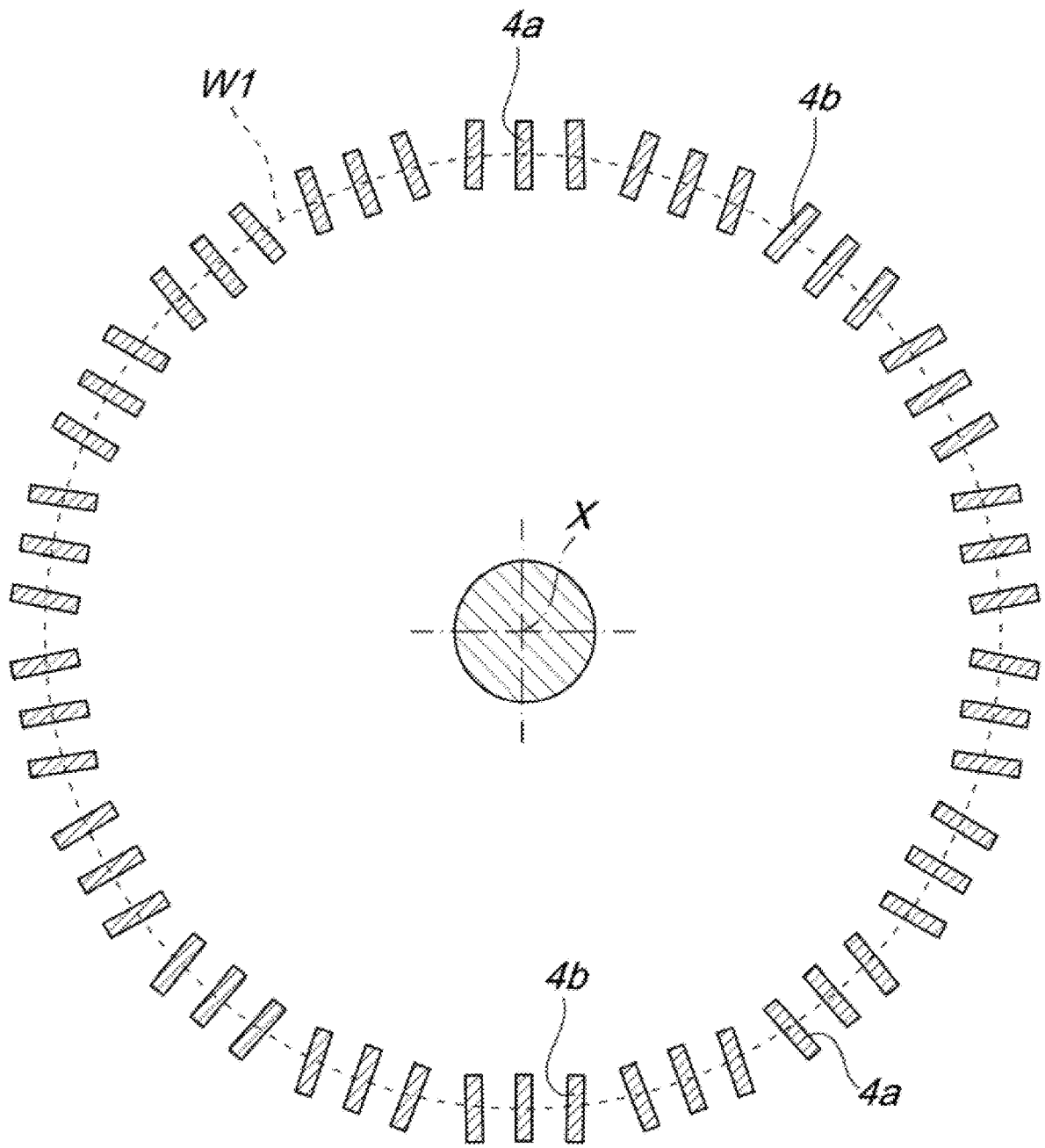

More in detail, in some embodiments, before or during the coil arranging step C, a coil bending step, wherein one or more coils 4 are bent such as to align the linear portions 4a, 4a', 4a'', 4b, 4b', 4b'' of the coils along one or more circumferences W1, W2 about a common central axis X, is carried out, as illustrated for example in FIGS. 72A and 72B. The bending is made such as the linear portions 4a, 4a', 4a'', 4b, 4b', 4b'' remain parallel to one another.

Figure 72C:
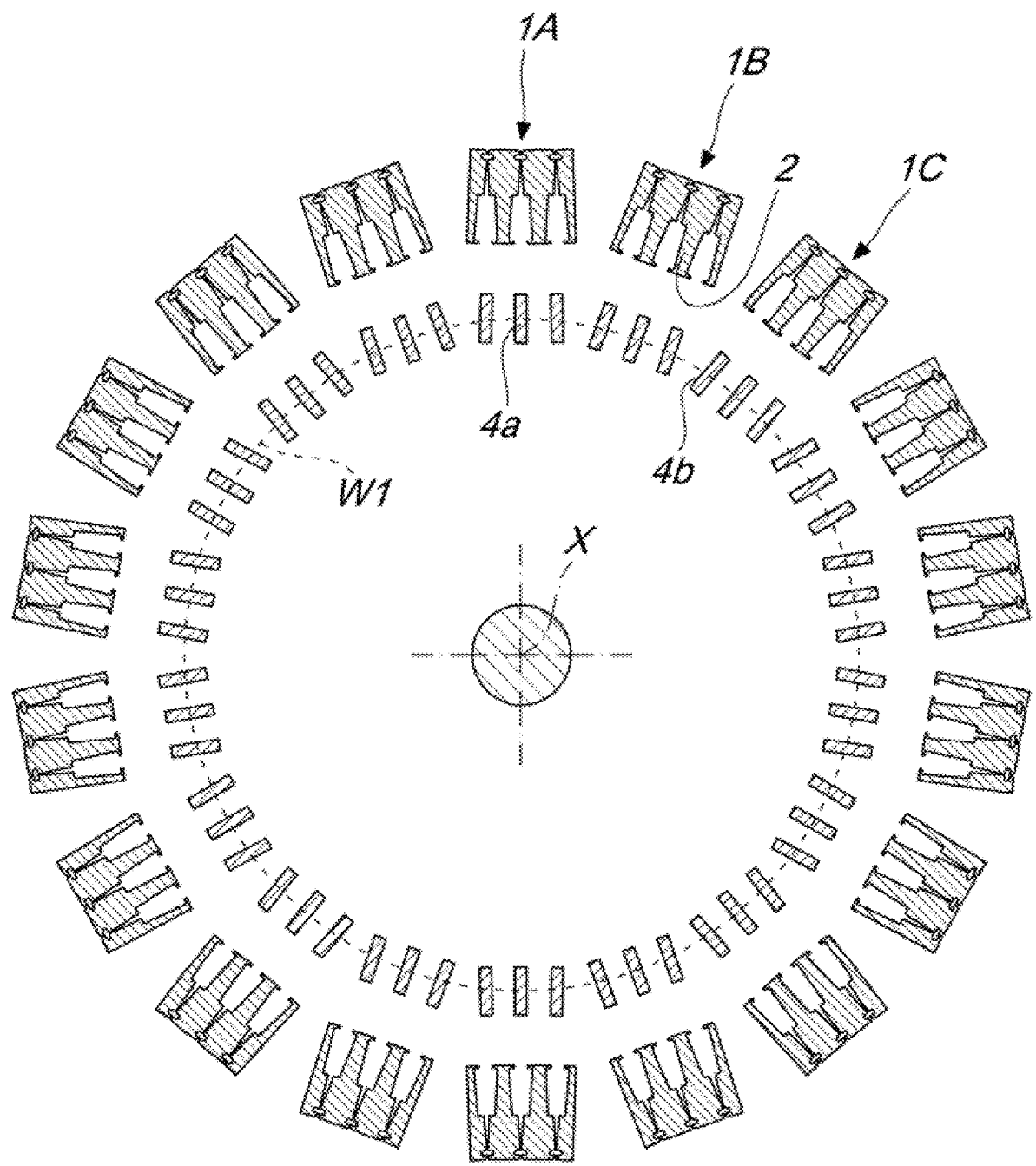

In the example illustrated in FIGS. 72A-72C, in the coil arranging step C, all the linear portions 4a, 4a', 4a'', 4b, 4b', 4b'' of the coils are aligned along the same circumference W1 and, in the successive housing step D, the stator components 1A-1T are radially inserted towards the linear portions 4a, 4a', 4a'', 4b, 4b', 4b'' such as the teeth 2 are inserted between the linear portions 4a, 4a', 4a'', 4b, 4b', 4b''.

Figure 72D:
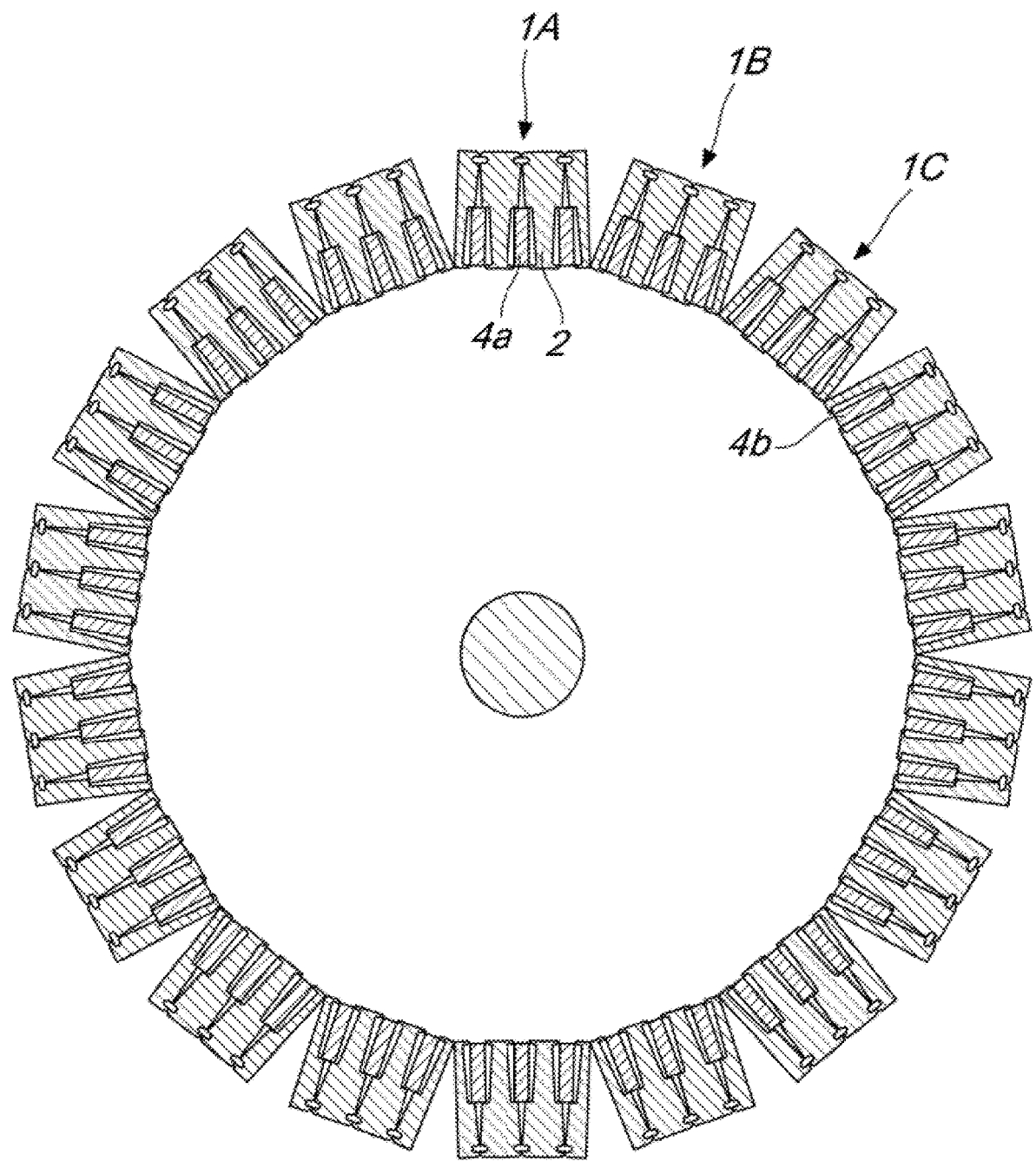
Figure 72E:
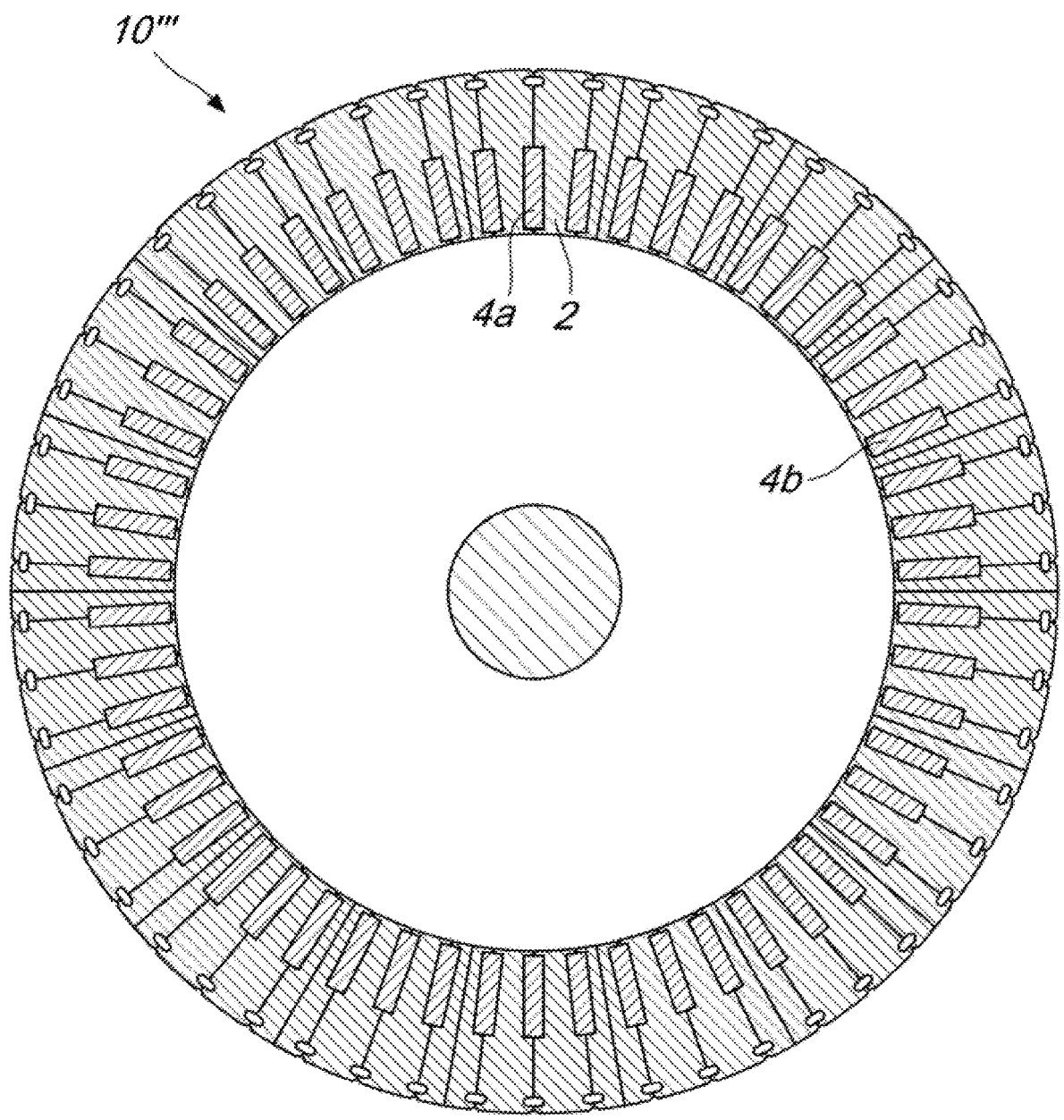

In this embodiment, the shaping step E is thus performed with the stator components 1A-1I arranged around the common central axis X, as shown in the passage from FIG. 72D to FIG. 72E.

Otherwise, in some embodiments such as that of FIGS. 69A-69F, in the housing step D, while the linear portions 4a, 4a', 4a'', 4b, 4b', 4b'' of a first coil 4 are inserted respectively into the first 1A, 1M and the second 1B, 1M stator component, said first 1A, 1M and second 1B, 1N stator components are aligned along the same plane with the teeth 2 of the first stator component 1A, M jutting out towards the second stator component 1B, 1N and the teeth 2 of the second stator component 1B, 1N jutting out away from the first stator component 1A, 1N or vice-versa.

Always in these embodiments, as that of FIGS. 69A-69F, in the housing step D, the first linear portion 4a, 4a', 4a'' of one or more second coils 4 is inserted into said second stator component 1N and the second linear portion 4b, 4b', 4b'' of said one or more second coils 4 is inserted into a third stator component 10 whose teeth 2 are jutting out away from the second stator component 1A, 1N, and so forth.

Optionally, in any embodiment, at least one linear portion 4a', 4a'', 4b', 4b'' of a first coil 4 and one linear portion 4a', 4a'', 4b', 4b'' of a second coil 4 are inserted between two side-by-side teeth, such as at least two linear portions 4a', 4a'', 4b', 4b'' of two different coils 4 are inserted into one or more of said sectors 3.

Finally, the assembling step E, as described above, is performed.

With reference to FIGS. 73 and 74, a system 80 for mobilizing the coils 4 is shown in an isometric view. The mobilization system 80 comprises a plier 81 provided with two claws 82, 83 movable to open and close, i.e. mutually moving away and closing, by respective pneumatic or electric actuators 84. The jaws 82, 83 comprise comb-shaped elements, or with fingers, shaped to be inserted between the loops of the coil 4 and to pick it up from the winding tool 20 while keeping the pitch distance between the loops themselves.

To remove the coils 4 from the winding tool 20, preferably already pressed and carburized, the system 80 brings the plier 81 next to a corresponding winding tool 20, i.e. adapted to operate with the system 80 (FIG. 73), to enclose the coil 4 with the claws 82, 83. At this point, the claws 82, 83 close onto the coil 4 and pick it up. A dedicated control (not shown) activates the rotating pins 20x of the winding tool such as to release the coil 4.

At this point, the mobilization system 80 pulls out the coil 4 from the winding tool 20 (FIG. 74); the rotating pins 20x are brought back to the original position before proceeding to the successive winding.

FIG. 75 comprises views I to IV and shows an alternative solution for the formation of a stator 90. A plurality of stator teeth 91, each independent of the others, is mounted in series on a deformable support, for example a metallic band (not visible). A winder device 92, provided with pliers, rotates or rototranslates the teeth 91 until forming the stator shown in view IV. The winder 92 comprises a plurality of pliers which are inserted between the teeth 91 (view I), rotated and rototranslated (views II and III) until bringing the teeth 91 on the circumference of reference (view IV) and are then extracted to disengage the teeth. Clearly, in the views of FIG. 75, the windings are not shown for better clarity, but it must be understood that, during the winding, the support is deformed to move the teeth close to each other and to lock the previously inserted windings into the slots.

FIG. 76 is a graph which shows the torque ripples (ordinate) with respect to the number of revolutions (abscissa) of an electric motor made according to the present invention and having a slot opening equal to 0.3 mm, less than the diameter of the conducting wires used to create the respective windings (coils 4) compared to a motor with the same characteristics, but made according to the known art and having a slot opening of 1 mm, necessarily greater than the diameter of the conducting wires used to create the respective windings, currently considered among the best.

The comparison was carried out under equal conditions: same motor power/size, same slot area, same conducting wire for the windings, with a diameter equal to 0.8 mm, same standard rotor.

At 3,250 revolutions per minute (RPM), considered here as nominal speed, the motor according to the known art has relative torque ripples of a value equal to 9.652%, whereas the motor according to the present invention equal to 7.824%. The difference is of about 18% to the advantage of the motor according to the present invention.

At 10,000 RPM, considered here as maximum speed, the motor according to the known art has relative torque ripples of a value equal to 68.547%, whereas the motor according to the present invention equal to 51.912%. The difference is of about 24% to the advantage of the motor according to the present invention.

FIG. 77 is a graph which shows the leakage currents in the stator windings (ordinate) with respect to the number of revolutions (abscissa) of an electric motor made according to the present invention, compared to two motors with the same characteristics but made according to the known art, one hairpin and one based on standard insertion of the windings.

The comparison was carried out under the same conditions: same motor power/size, same standard rotor, same winding stack height, etc.

At 3,250 revolutions per minute (RPM), considered here as nominal speed, the hairpin motor is affected by leakage currents in the stator windings of a value equal to 2,397.32 W, the motor with windings inserted in a standard way has leakages equal to 3,170.48 W, whereas the motor according to the present invention is affected by leakage currents equal to 2,293.99 W. This is a better value with respect to the two motors of the known art: the percentage of improvement is equal respectively to about 4% and about 27.5%.

At 10,000 revolutions per minute (RPM), considered here as maximum speed, the hairpin motor is affected by leakage currents in the stator windings of a value equal to 2,844.2 W, the motor with windings inserted in a standard way has leakages equal to 3,409.77 W, whereas the motor according to the present invention is affected by leakage currents equal to 2,434.8 W. This is a better value with respect to the two motors of the known art: the percentage of improvement is equal respectively to about 14.4% and about 28.6%.

FIG. 78 is a graph which shows the efficiency (ordinate) with respect to the number of revolutions (abscissa) of an electric motor made according to the present invention, compared to two motors with the same characteristics but made according to the known art, one hairpin and one based on standard insertion of the windings.

The comparison was carried out under the same conditions: same motor power/size, same slot area, same standard rotor, same winding stack height, etc.

At 3,250 revolutions per minute (RPM), considered here as nominal speed, the hairpin motor has an efficiency equal to 96.85%, the motor with windings inserted in a standard way has an efficiency equal to 96.06%, whereas the motor according to the present invention has an efficiency equal to 96.94%. This is a better value with respect to the two motors of the known art: the percentage of improvement is equal respectively to about 1% and about 0.1%.

At 10,000 revolutions per minute (RPM), considered here as maximum speed, the hairpin motor has an efficiency equal to 91.26%, the motor with the windings inserted in a standard way has an efficiency equal to 90.5%, whereas the motor according to the present invention has an efficiency equal to 92.45%. This is a better value with respect to the two motors of the known art: the percentage of improvement is equal respectively to about 2% and about 1.3%.

FIG. 79 is a graph which shows the supplied mechanical power (ordinate) with respect to the number of revolutions (abscissa) of an electric motor made according to the present invention, compared to two motors with the same characteristics but made according to the known art, one hairpin and one based on standard insertion of the windings.

The comparison was carried out under the same conditions: same motor power/size, same slot area, same standard rotor, same winding stack height, etc.

As can be noted, the motor of the present invention produces an even greater power, of about 20%, with respect to the motor based on the standard insertion of the windings. With respect to the hairpin motor, the motor of the present invention produces the same power, up to about 4,000 RPMs, and supplies, beyond this value, a greater power of about 10%.

FIG. 80 shows the stack height of the stator windings (ordinate), and thus of the active sides, in a stator made according to the present invention as the filling factor (abscissa) varies, for a motor size of 55 kW considered as an example. As can be noted, a significant decrease of the stack height is achieved as the filling factor increases. Simulations carried out by the Applicant have determined that a reduction of the stack height of up to 35% is achieved with respect to a motor with standard insertion of the windings.

FIG. 81A shows a cross section of a stator of a high-performance motor made according to the known art with the traditional insertion of the conducting wires F into the stator slots 100, between the teeth 101 and 102. 25 loops of a winding formed of 4 parallel copper wires having a diameter equal to 1 mm (the outer diameter of the resin coated wire 1.062 mm) for a total of one hundred wires per slot are housed into a slot having an area (in cross section) equal to 186.4 mm$^2$. A filling factor of 42.12% is achieved in this configuration, as denoted in the table of the figure itself.

FIG. 81B is a cross sectional view of a stator sector; two slots 103 and 104 are visible, the left one 103, in which a filling with a winding according to the known art is simulated, and the right one 104, in which a filling achieved by implementing the method according to the present invention is simulated. In the left slot 103, the conducting wires F are grouped but with a chaotic arrangement, not orderly; in the right slot 104, the conducting wires 14 are on the contrary grouped with an orderly arrangement, the same arrangement is achieved and kept in the linear portions 4a and 4b of the coil 4 used to make the winding object according to the present invention. The orderly arrangement of the conducting wires 14 in the right slot 104 is equivalent to the one visible in FIGS. 9a-10c. The diameter of the conducting wires F, 14 being equal and the stator slot being equal, in the left slot 103, the filling factor is 42.12% and in the right slot 104, the filling factor is 64.93%, i.e. significantly greater (more than 20%).

FIG. 81C shows nine possible arrangements of the conducting wires 14 in the linear portions 4a, 4b of the coils 4, inserted into the slot 100 of FIG. 81A (proposals 1 to 8) and in the slot 103 or 104 of FIG. 89B (proposal 9). The diameter of the conducting wires 14 and other parameters are denoted in the table for each proposal. The conducting wires 14 were pressed and carburized according to that which is described in step B. A thickness of 0.2 mm was considered for the insulating paper arranged between the wires 14 and the slot.

As can be noted by reading the last line at the bottom, the filling factor always results to be above 62.72% (proposal 4) and reaches 71.56% (proposal 7).

A rectangular slot was considered for proposal 9. The dimensions are denoted for each slot. FIGS. 81A-81C provide sufficient information to distinguish a stator directly achieved with the method of the present invention from stators achieved with the known art. It is indeed clear that the filling factor is definitely greater and, especially in the stator according to the present invention, the arrangement of the conducting wires 14 in the sectors, or slots, between the teeth is orderly, in a way not found in the known art. In particular, by observing FIGS. 89B and 89C, it can be noted that the conducting wires 14 are arranged in multiple loops (25 in the figures), each loop being constituted by a given number of wires (5, 6, 8, etc.) with an orderly matrix system that cannot be changed. The stator is thus recognizable with respect to other known stators, simply by observing the number and arrangement of the conducting wires in the slots between the stator teeth.

The invention claimed is:

1. A method for manufacturing a stator for electric motors, the stator comprising a stator body which comprises a plurality of side-by-side teeth arranged radially about a common central axis and defining, between them, a plurality of sectors in which one or more coils of conducting wire are at least partially inserted, the method comprising:
a coil making step, wherein one or more conducting wires are wound on a winding tool such as to form at least one coil comprising at least one linear portion in turn comprising a plurality of individual linear portions of wire and which is adapted to be inserted into one of said sectors;

a coil housing step, wherein the linear portion of the coil is inserted into a stator component comprising a subset of said plurality of side-by-side teeth, said linear portion of the coil being inserted between said two side-by-side teeth;

a shaping step, wherein said stator component is deformed such as to move the at least two side-by-side teeth close to each other, such as to achieve a finished stator portion comprising the two side-by-side teeth which define, between them, the sector in which the linear portion of the coil is comprised;

an assembling step, wherein a plurality of finished stator portions, achieved by means of respective housing and shaping steps, are assembled to one another such as to form said stator body, characterized by the step of:

after the shaping step, rototranslating of a first finished stator portion with respect to a second finished stator portion, wherein the first finished stator portion and the second finished stator portion engage the same coil, until reaching the relative position which said first finished stator portion will have with respect to said second finished stator portion in the stator body, and consequently deforming the coil, or as an alternative before the shaping step, rototranslating a first stator component with respect to a second stator component, until reaching the relative position which said first stator component will have with respect to said second stator component in the stator body, deforming the coil correspondingly to the arrangement of the first rototranslated stator component and of the second rototranslated stator component and proceeding to the coil housing step.

2. The method according to claim 1, wherein the coil made in the coil making step comprises a first and a second linear portion, wherein, in said coil housing step, said first linear portion of the coil is inserted into a first stator component and said second linear portion of the coil is inserted into a second stator component; each of said first and second stator component being deformed in said shaping step such as to achieve a first finished stator portion and a second finished stator portion.

3. The method according to claim 1, characterized by a pressing and/or carburizing step, wherein said linear portion of the at least one coil is subjected to a pressing step or to a thermal carburizing treatment, or to both the pressing step and the thermal carburizing treatment, in the desired order or contemporaneously, such as to compact said individual linear wire portions.

4. The method according to claim 3, wherein said pressing and/or carburizing step comprises the step of pressing the linear portions of the coil by one or more presser elements and of heating said linear portions by means of one or more heating devices comprised in, or coupled to, said presser elements, while the coil is wound on said winding tool.

5. The method according to claim 3, wherein, in the pressing and/or carburizing step, said thermal carburizing treatment is made by inserting one or more heating elements between the linear portions of the coils, such as to heat them up to a predetermined carburizing temperature, while said coil is accommodated on the winding tool.

6. The method according to claim 3, wherein, in said pressing and/or carburizing step, the linear portions are pressed by means of a pressing device which is inserted between said linear portions, while said coil is accommodated on the winding tool.

7. The method according to claim 3, wherein, in said coil making step, a series of multiple coils is made on the same winding tool such as a linear portion of a coil is spaced from the linear portion of the successive coil by a predetermined pitch distance;
wherein there are comprised, between said pressing and/or carburizing step and the housing step, the steps of:
making the series of coils interact mechanically with a pitch-correcting device configured to correct the pitch distance between the linear portions of the different coils,
displacing the coils by means of pliers configured to keep said pitch distance between the linear portions of the coils;
in said housing step, the coils being inserted between said teeth by means of said pliers.

8. The method according to claim 1, wherein, in the housing step, while the linear portions of the coil are inserted respectively into the first and the second stator component, said first and second stator components are aligned along the same plane with the teeth of the first stator component jutting out towards the second stator component and the teeth of the second stator component jutting out away from the first stator component or vice-versa.

9. The method according to claim 1, wherein, in the housing step, while the linear portions of the coil are inserted respectively into the first and the second stator component, said first and second stator components are aligned along the same plane with the teeth of the first stator component jutting out towards the second stator component and the teeth of the second stator component jutting out towards the first stator component.

10. The method according to claim 1, wherein, in said coil making step, complementary wires having a smaller section with respect to the section of said conducting wires are added to said one or more conducting wires, such as said complementary wires occupy the free spaces between the conducting wires.

11. The method according to claim 1, further comprising a step of insulating the wires, wherein an electrically insulating layer: is applied at least on said linear portions of the coil, possibly after a pressing and/or carburizing step, whenever provided, or is applied between the teeth of the stator components before said coil housing step.

12. The method according to claim 1, comprising a coil arranging step, prior to the coil housing step, wherein a plurality of coils is aligned in a predetermined order such as the first linear portion and the second linear portion of at least one coil are aligned respectively with the first linear portion of at least one second coil and with the second linear portion of at least one third coil.

13. The method according to claim 12, wherein, before said housing step, before or during said coil arranging step, a coil bending step, wherein one or more coils are bent such as to align said linear portions of said one or more coils along one or more circumferences about a common central axis, is carried out.

14. The method according to claim 13, wherein, in said coil arranging step, all the linear portions of the coils are aligned along the same circumference and, in said housing step, the stator components are radially inserted towards said linear portions such as the teeth are inserted between said linear portions.

15. The method according to claim 13, wherein, in said coil housing step, said first linear portion of the coil is inserted into a first stator component and said second linear portion of the coil is inserted into a second stator component; each of said first and second stator component being deformed in said shaping step such as to achieve a first finished stator portion and a second finished stator portion.

16. The method according to claim 12, wherein, in the housing step, at least one linear portion of a first coil and one linear portion of a second coil are inserted between two side-by-side teeth, such as at least two linear portions of two different coils are inserted into one or more of said sectors.

17. The method according to claim 12, wherein, in the housing step, while the linear portions of a first coil are inserted respectively into a first and a second stator component, said first and second stator components are aligned along the same plane with the teeth of the first stator component jutting out towards the second stator component and the teeth of the second stator component jutting out away from the first stator component or vice-versa.

18. The method according to claim 17, wherein, in said housing step, the first linear portion of one or more second coils is inserted into said second stator component and the second linear portion of said one or more second coils is inserted into a third stator component whose teeth are jutting out away from the second stator component.

19. The method according to claim 1, wherein said assembling step comprises the steps of:
fastening, in sequence, said plurality of finished stator portions on an outer surface of a drum until forming a stator body substantially cylindrical about said drum; and
removing said stator body from the drum.

20. A processing line for implementing the method according to claim 1, characterized by comprising:
at least one winding tool configured to perform said coil making step,
an apparatus for mobilizing the coils, which is configured to perform at least said coil housing step,
a shaping apparatus configured to perform said shaping step,
an assembling apparatus configured to perform said assembling step,
characterized by a mobilization system configured to rototranslate a first finished stator portion with respect to a second finished stator portion, wherein the first finished stator portion and the second finished stator portion share a same coil, until reaching the relative position which said first finished stator portion will have with respect to said second finished stator portion in the stator body, and consequently deforming the coil, or
by a mobilization system configured to rototranslate a first stator component with respect to a second stator component, until reaching the relative position which said first stator component will have with respect to said second stator component in the stator body, and to deform the coil until achieving that the respective linear portions are mutually arranged correspondingly to the arrangement of the first rototranslated stator component and the second rototranslated stator component, before they are housed into the first stator component and the second stator component.

21. The processing line according to claim 20, characterized in that said winding tool comprises a plurality of movable walls comprised between:
- an anchoring wall configured to be coupled operatively to a winding spindle,
- a removable disassembly wall which can be decoupled from said anchoring wall to release said movable walls;
- said movable walls forming one or more winding chambers inside which said conducting wires are wound to form the coils.

22. The processing line according to claim 20, characterized by comprising a winding machine comprising a supporting structure which supports:
- a plurality of wire tensioning devices for tensioning the wires to be wound,
- a wire guiding device provided with a wire guiding tube and movable along a wire guiding guide,
- a winding spindle rotated by a motor and adapted to rotate said winding tool;
- said winding machine being able to be configured in an operative winding configuration, wherein said wires to be wound are tense and come out of said wire tensioning devices towards said wire guiding device, which guides the wires towards said winding tool during the rotation thereof.

23. The processing line according to claim 20, comprising a pressing and/or carburizing apparatus configured to subject the coil to a pressing step, a thermal carburizing treatment, or to both.

24. The processing line according to claim 20, characterized in that said pressing and/or carburizing apparatus comprises a housing seat configured to house said winding tool and:
- one or more presser elements configured to exert a pressure on the at least one linear portion of the coil wound on said winding tool, and as an alternative, or in addition,
- at least one heating device configured to heat said linear portion before, after or during said pressure.

25. The processing line according to claim 20, characterized in that said apparatus for mobilizing the coils comprises a plurality of pliers configured to keep a predetermined pitch distance between the linear portions of the coils by means of a plurality of fingers adapted to grasp said linear portions.

26. The processing line according to claim 20, characterized in that said shaping apparatus comprises a couple of deforming vises, each of which being configured to accommodate one of said stator components between two jaws adapted to compress said stator component such as to move its teeth close to each other; at least one of said deforming vises being able to be displaced by said mobilization system to cause its rotation or rototranslation with respect to the other deforming vise.

27. The processing line according to claim 20, characterized in that said assembling apparatus comprises a substantially cylindrical drum which has an outer surface provided with a series of fastening seats adapted to be engaged by respective fastening elements for fastening said finished stator portions to the outer surface of the drum.

28. The processing line according to claim 27, characterized in that said drum is divided into drum sectors which can be moved close to each other to allow the extraction of the stator body formed on the outer surface of the drum.

29. A method for manufacturing a stator for electric motors, the stator comprising a stator body which comprises a plurality of side-by-side teeth arranged radially about a common central axis and defining, between them, a plurality of sectors in which one or more coils of conducting wire are at least partially inserted, the method comprising:
- a coil making step, wherein one or more conducting wires are wound on a winding tool such as to form at least one coil comprising at least one linear portion in turn comprising a plurality of individual linear portions of wire and which is adapted to be inserted into one of said sectors;
- a coil housing step, wherein the linear portion of the coil is inserted into a stator component comprising a subset of said plurality of side-by-side teeth, said linear portion of the coil being inserted between said two side-by-side teeth;
- a shaping step, wherein said stator component is deformed such as to move the at least two side-by-side teeth close to each other, such as to achieve a finished stator portion comprising the two side-by-side teeth which define, between them, the sector in which the linear portion of the coil is comprised;
- an assembling step, wherein a plurality of finished stator portions, achieved by means of respective housing and shaping steps, are assembled to one another such as to form said stator body, characterized by the step of:
- after the shaping step, rototranslating of a first finished stator portion with respect to a second finished stator portion, wherein the first finished stator portion and the second finished stator portion engage the same coil, until reaching the relative position which said first finished stator portion will have with respect to said second finished stator portion in the stator body, and consequently deforming the coil, or as an alternative
- before the shaping step, rototranslating a first stator component with respect to a second stator component, until reaching the relative position which said first stator component will have with respect to said second stator component in the stator body, deforming the coil correspondingly to the arrangement of the first rototranslated stator component and of the second rototranslated stator component and proceeding to the coil housing step, and further characterized by a pressing and/or carburizing step, wherein said linear portion of the at least one coil is subjected to a pressing step or to a thermal carburizing treatment, or to both the pressing step and the thermal carburizing treatment, in the desired order or contemporaneously, such as to compact said individual linear wire portions.

\* \* \* \* \*